US012525896B2

(12) United States Patent
Danilovic et al.

(10) Patent No.: US 12,525,896 B2
(45) Date of Patent: Jan. 13, 2026

(54) MULTI-LEVEL INVERTER FOR WIRELESS POWER TRANSMISSION

(71) Applicant: WiTricity Corporation, Watertown, MA (US)

(72) Inventors: Milisav Danilovic, Watertown, MA (US); Oguz Atasoy, Delft (NL); Nam Hoai Le, Aarau (CH); David Gellis, Cambridge, MA (US)

(73) Assignee: WiTricity Corporation, Watertown, MA (US)

( * ) Notice: Subject to any disclaimer, the term of this patent is extended or adjusted under 35 U.S.C. 154(b) by 11 days.

(21) Appl. No.: 18/486,835

(22) Filed: Oct. 13, 2023

(65) Prior Publication Data

US 2024/0136945 A1 Apr. 25, 2024

Related U.S. Application Data

(60) Provisional application No. 63/379,537, filed on Oct. 14, 2022.

(51) Int. Cl.
*H02M 7/483* (2007.01)
*B60L 53/122* (2019.01)
(Continued)

(52) U.S. Cl.
CPC ......... *H02M 7/4835* (2021.05); *B60L 53/122* (2019.02); *B60L 53/22* (2019.02);
(Continued)

(58) Field of Classification Search
CPC ............. H02M 7/4835; H02M 1/0058; H02M 7/5387; H02M 7/487; H02J 50/12; B60L 53/22; B60L 2210/40
See application file for complete search history.

(56) References Cited

U.S. PATENT DOCUMENTS 10,680,457 B2  6/2020  Weidner et al.
11,356,015 B2 * 6/2022  Lukic ............... H01F 27/325
(Continued)

FOREIGN PATENT DOCUMENTS

WO    WO-2022097051 A1    5/2022

OTHER PUBLICATIONS

PCT/US2023/076883—International Search Report and Written Opinion, May 13, 2024, 18 pages.
(Continued)

*Primary Examiner* — Rexford N Barnie
*Assistant Examiner* — Duc M Pham
(74) *Attorney, Agent, or Firm* — Goodwin Procter LLP

(57) ABSTRACT

Described herein are controllers configured for a wireless power system and methods for such controllers and systems. The controller includes a control module configured to generate a first control signal having a first voltage level and a second control signal having a second voltage level and a modulator configured to (a) receive a signal representative of the output current and (b) generate carrier signals based on the output current. When a first carrier signal is greater than the first voltage level, a first gate drive signal for a first switch is high and when a second carrier signal is greater than the second voltage level, a second gate drive signal for a second switch is high, thereby driving an inverter to output a multi-level voltage having a first output level based on the first drive signal and a second output level based on the second drive signal.

22 Claims, 86 Drawing Sheets

(51) Int. Cl.
*B60L 53/22* (2019.01)
*H02J 50/12* (2016.01)
*H02M 1/00* (2007.01)
*H02M 7/487* (2007.01)
*H02M 7/5387* (2007.01)

(52) U.S. Cl.
CPC .......... *H02J 50/12* (2016.02); *H02M 1/0058* (2021.05); *H02M 7/5387* (2013.01); *B60L 2210/40* (2013.01); *H02M 7/4837* (2021.05); *H02M 7/487* (2013.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2011/0193416 A1 | 8/2011 | Campanella et al. |
| 2014/0035704 A1 | 2/2014 | Efe et al. |
| 2014/0241507 A1 | 8/2014 | Woywode et al. |
| 2014/0361636 A1 | 12/2014 | Endo et al. |
| 2015/0051750 A1 | 2/2015 | Kurs et al. |
| 2016/0248275 A1 | 8/2016 | Okidan |
| 2017/0117751 A1 | 4/2017 | Karnstedt et al. |
| 2017/0324351 A1 | 11/2017 | Rochford |
| 2021/0257866 A1* | 8/2021 | Lee .................. H02J 50/12 |

OTHER PUBLICATIONS

Mauerer, et al., "Low Jitter GaN E HEMT Gate Driver With High Common Mode Voltage Transient Immunity", IEEE Transactions on Industrial Electronics, Nov. 2017, vol. 64, No. 11: pp. 9043-9051, doi: 10.1109/TIE.2017.2677354.

Huber, et al., "Common mode currents in multi cell Solid State Transformers", 2014 International Power Electronics Conference (IPEC Hiroshima 2014 ECCE Asia), 2014: pp. 766-773, doi: 10.1109/IPEC.2014.6869674.

Kulanayagam, et al., "Reduction of heat sink common mode currents in switching mode power supply circuits", Advances in Radio Science, 2011, vol. 9: pp. 317-321, doi:10.5194/ars-9-317-2011.

Christensen, et al., "Common mode current mitigation for medium voltage half bridge SiC modules," 2017 19th European Conference on Power Electronics and Applications (EPE'17 ECCE Europe), 2017: pp. P.1-P.8, doi: 10.23919/EPE17ECCEEurope.2017.8099202.

Yuan, et al., "Self-balancing of the clamping capacitor voltages in the multilevel capacitor clamping inverter under sub harmonic PWM modulation", IEEE Transactions on Power Electronics, Mar. 2001, vol. 16, No. 2: pp. 256-263, doi: 10.1109/63.911150.

Barth et al., "Design and control of a GaN-based, 13-level, flying capacitor multilevel inverter", 2016 IEEE 17th Workshop on Control and Modeling for Power Electronics (COMPEL), 2016: pp. 1-6, doi: 10.1109/COMPEL.2016.7556770.

Higa, et al., "Development of Flying Capacitor Dual Active Bridge Converter using Multi-mode Operation depending on Output Power," IEEJ Transactions on Industry Applications, Oct. 2017, vol. 137, No. 10: pp. 760-768, doi: 10.1541/ieejias. 137.760.

Kusaka, et al., "Power Decoupling Circuit with Flying Capacitor DC-DC Converter", 2020 22nd European Conference on Power Electronics and Applications (EPE'20 ECCE Europe), Lyon, France, 2020: pp. 1-10, doi: 10.23919/EPE20ECCEEurope43536.2020.9215921.

\* cited by examiner

| Mode | 1st Leg State | 2nd Leg State | Output Voltage Level | Output Voltage |
|---|---|---|---|---|
| 1 | a | a | 0 | 0V |
| 2 | m | m | 0 | 0V |
| 3 | b | b | 0 | 0V |
| 4 | m | a | 1 | +Vdc/2 |
| 5 | a | m | 1 | -Vdc/2 |
| 6 | b | m | 1 | +Vdc/2 |
| 7 | m | b | 1 | -Vdc/2 |
| 8 | b | a | 2 | +Vdc |
| 9 | a | b | 2 | -Vdc |

FIG. 10B

MULTI-LEVEL INVERTER FOR WIRELESS POWER TRANSMISSION

CROSS-REFERENCE TO RELATED APPLICATIONS

This application claims priority to U.S. Provisional Application No. 63/379,537, filed Oct. 14, 2022 and titled "MULTI-LEVEL INVERTER FOR WIRELESS POWER TRANSMISSION," the entire contents of which is incorporated by reference.

TECHNICAL FIELD

The following disclosure is directed to multi-level inverters for wireless power transmission and, more specifically, methods and systems for generating asymmetrical, multi-level voltages for wireless power transmission.

BACKGROUND

Wireless power systems can include one or more wireless power transmitters configured to transmit power to one or more wireless power receivers via an oscillating electromagnetic field. Wireless power receivers can be coupled to one or more batteries such that the received power is used to charge the batteries. Wireless power systems can be configured to power various electronic devices (e.g., phones, laptops, medical devices, vehicles, robots, etc.).

SUMMARY

At least one aspect of the present disclosure is directed to an inverter configured for a wireless power system. The inverter includes at least one capacitor and at least one switching leg. Each switching leg includes a plurality of switches having at least one switch coupled to the at least one capacitor. The plurality of switches of each switching leg are configured to be controlled such that, during operation: (i) an output voltage is produced, the output voltage having an asymmetric multilevel profile with at least four non-zero unequal voltage levels and (ii) at least one switch of the plurality of switches operates with zero-voltage switching.

In one embodiment, the plurality of switches of each switching leg are configured to be controlled such that, during operation: (iii) at least one switch of the plurality of switches is operated to transition from a minimum voltage level of the output voltage to a maximum voltage level of the output voltage by providing a first non-zero voltage level for a first duration and a second non-zero voltage level for a second duration and (iv) at least one switch of the plurality of switches is operated to transition from the maximum voltage level of the output voltage to the minimum voltage level of the output voltage by providing the first non-zero voltage level for a third duration and the second non-zero voltage level for a fourth duration, wherein the first and third durations and/or the second and fourth durations have different lengths. In some embodiments, transitioning from the minimum voltage level of the output voltage to the maximum voltage level of the output voltage includes operating at least one switch of the plurality of switches to provide a zero voltage level for a fourth duration. In various embodiments, transitioning from the maximum voltage level of the output voltage to the minimum voltage level of the output voltage includes operating at least one switch of the plurality of switches to provide the zero voltage level for a fifth duration.

In some embodiments, the inverter includes at least one input configured to receive an input voltage Vdc. In one embodiment, the minimum voltage level is $-Vdc$, the first non-zero voltage level is $-Vdc/n$, the second non-zero voltage level is $+Vdc/n$, and the maximum voltage level is $+Vdc$, wherein n is a positive integer equal to or greater than two. In various embodiments, the multilevel profile includes at least five distinct voltage levels comprising the minimum voltage level of $-Vdc$, the first non-zero voltage level of $-Vdc/2$, a zero voltage level, the second non-zero voltage level of $+Vdc/2$, and the maximum voltage level $+Vdc$. In certain embodiments, each switch of the plurality of switches is an N-channel MOSFET.

In one embodiment, the plurality of switches of each switching leg includes a first switch, a second switch, a third switch, and a fourth switch. In some embodiments, the at least one capacitor includes (i) a first capacitor coupled between a first node and a second node and (ii) a second capacitor coupled between the second node and a third node, wherein the first switch of the switching leg is coupled between the first node and a fourth node, the second switch of the switching leg is coupled between the fourth node and the third node, wherein the third switch of the switching leg and the fourth switch of the switching leg are coupled between the second node and the fourth node, wherein a source of the third switch of the switching leg is connected to the source of the fourth switch of the switching leg, and wherein the first node and the third node are inputs to the inverter. In some embodiments, the first switch of the switching leg is coupled between a first node and a second node, the second switch of the switching leg is coupled between the second node and a third node, the third switch of the switching leg is coupled between the third node and a fourth node, and the fourth switch of the switching leg is coupled between the fourth node and a fifth node, wherein the capacitor is coupled between the second node and the fourth node, and wherein the first node and the fifth node are inputs to the inverter.

In some embodiments, the at least one capacitor includes (i) a first capacitor coupled between a first node and a second node and (ii) a second capacitor coupled between the second node and a third node, wherein the first switch of the switching leg is coupled between the first node and a fourth node, the second switch of the switching leg is coupled between the fourth node and a fifth node, the third switch of the switching leg is coupled between the fifth node and a sixth node, and the fourth switch of the switching leg is coupled between the sixth node and the third node, wherein a first device is coupled between the second node and the fourth node, and a second device is coupled between the second node and the sixth node, and wherein the first node and the third node are inputs to the inverter. In one embodiment, the first and second devices are diodes. In various embodiments, the first and second devices are switches.

In one embodiment, the at least one capacitor includes (i) a first capacitor coupled between a first node and a second node, (ii) a second capacitor coupled between the first node and a third node and (iii) a third capacitor coupled between the second node and the third node, wherein the first switch of a first switching leg is coupled between the first node and a fourth node, the second switch of the first switching leg is coupled between the fourth node and the third node, the third switch of the first switching leg is coupled between the third node and a fifth node, and the fourth switch of the first switching leg is coupled between the fifth node and the second node, wherein the first switch of a second switching leg is coupled between the first node and a sixth node, the second switch of the second switching leg is coupled between the sixth node and the third node, the third switch of the second switching leg is coupled between the third node and a seventh node, and the fourth switch of the second switching leg is coupled between the seventh node and the second node, wherein a fifth switch of the first switching leg is coupled between the fourth node and an eighth node, a fifth switch of the second switching leg is coupled between the seventh node and the eighth node, a sixth switch of the first switching leg is coupled between the fourth node and a ninth node, and a sixth switch of the second switching leg is coupled between the sixth node and the ninth node, and wherein the first node and the second node are inputs to the inverter.

In some embodiments, the at least one capacitor includes (i) a first capacitor coupled between a first node and a second node, (ii) a second capacitor coupled between the first node and a third node, and (iii) a third capacitor coupled between the second node and the third node, wherein the first switch of a first switching leg is coupled between the first node and a fourth node, the second switch of the first switching leg is coupled between the fourth node and the third node, the third switch of the first switching leg is coupled between the third node and a fifth node, and the fourth switch of the first switching leg is coupled between the fifth node and the second node, wherein the first switch of a second switching leg is coupled between the first node and a sixth node, the second switch of the second switching leg is coupled between the sixth node and the third node, the third switch of the second switching leg is coupled between the third node and a seventh node, and the fourth switch of the second switching leg is coupled between the seventh node and the second node, and wherein the first node and the second node are inputs to the inverter. In one embodiment, the inverter is a half-bridge inverter. In some embodiments, the inverter is a full-bridge inverter.

Another aspect of the present disclosure is directed to a wireless power system including an inverter having at least one capacitor and at least one switching leg. Each switching leg includes a plurality of switches having at least one switch coupled to the at least one capacitor. The plurality of switches of each switching leg are configured to be controlled such that, during operation: (i) an output voltage is produced, the output voltage having an asymmetric multi-level profile with at least four non-zero unequal voltage levels and (ii) the plurality of switches operate with zero-voltage switching.

In some embodiments, the plurality of switches of each switching leg are configured to be controlled such that, during operation: (iii) at least one switch of the plurality of switches is operated to transition from a minimum voltage level of the output voltage to a maximum voltage level of the output voltage by providing a first non-zero voltage level for a first duration and a second non-zero voltage level for a second duration, and (iv) at least one switch of the plurality of switches is operated to transition from the maximum voltage level of the output voltage to the minimum voltage level of the output voltage by providing the first non-zero voltage level for a third duration and the second non-zero voltage level for a fourth duration, wherein the first and third durations and/or the second and fourth durations have different lengths. In one embodiment, the inverter is disposed within a wall box and wherein an output of the inverter is connected to the impedance matching network via a cable.

In various embodiments, the inverter is disposed within a charging pad configured to be positioned under a vehicle and wherein an input to the inverter is connected to a cable.

Another aspect of the present disclosure is directed to a controller for a wireless power system. The system includes an inverter configured to output an output current and the controller is configured to generate gate drive signals for driving respective switches of the inverter. The controller includes a control module configured to generate a first control signal having a first voltage level and a second control signal having a second voltage level and a modulator configured to (a) receive a signal representative of the output current and (b) generate carrier signals based on the output current. The carrier signals comprise a first carrier signal and a second carrier signal such that: (i) when the first carrier signal is greater than the first voltage level, a first gate drive signal for a first switch is high, and (ii) when the second carrier signal is greater than the second voltage level, a second gate drive signal for a second switch is high, thereby driving the inverter to output a multi-level voltage having a first output level based on the first drive signal and a second output level based on the second drive signal.

In one embodiment, the multi-level voltage has an asymmetrical waveform. In some embodiments, the carrier signals are configured, at least in part, to maintain zero voltage switching by the switches of the inverter. In various embodiments, a voltage value of the second output level is approximately equal to a value of the second voltage level. In certain embodiments, a voltage value of the first output level is approximately half of a value of the second voltage level.

In some embodiments, the first gate drive signal is high for a first duration in which the first carrier signal is greater than the first voltage level and the second gate drive signal is high for a second duration in which the second carrier signal is greater than the second voltage signal. In one embodiment, the first voltage level is based on a value of the second voltage level. In certain embodiments, at least one of the first carrier signal and the second carrier signal has sawtooth modulation. In various embodiments, at least one of the first carrier signal and the second carrier signal has triangular modulation.

In one embodiment, the modulator is configured to receive and generate analog signals. In some embodiments, the modulator is configured to receive and generate digital signals.

Another aspect of the present disclosure is directed to a method for controlling a wireless power system including an inverter configured to output an output current and a controller configured to generate gate drive signals for driving respective switches of the inverter. The method includes generating, via the controller, a first control signal having a first voltage level and a second control signal having a second voltage level, receiving, at the controller, a signal representative of the output current, and generating, via the controller, carrier signals based on the output current. The carrier signals comprise a first carrier signal and a second carrier signal such that: (i) when the first carrier signal is greater than the first voltage level, a first gate drive signal for a first switch is high, and (ii) when the second carrier signal is greater than the second voltage level, a second gate drive signal for a second switch is high, thereby driving the inverter to output a multi-level voltage having a first output level based on the first gate drive signal and a second output level based on the second gate drive signal.

In one embodiment, the multi-level voltage has an asymmetrical waveform. In some embodiments, generating the carrier signals based on the output current includes generating carrier signals that are configured, at least in part, to maintain zero voltage switching by the switches of the inverter. In various embodiments, a voltage value of the second output level is approximately equal to a value of the second voltage level. In certain embodiments, a voltage value of the first output level is approximately half of a value of the second voltage level.

In some embodiments, the first gate drive signal is high for a first duration in which the first carrier signal is greater than the first voltage level and the second gate drive signal is high for a second duration in which the second carrier signal is greater than the second voltage signal. In one embodiment, the first voltage level is based on a value of the second voltage level. In certain embodiments, at least one of the first carrier signal and the second carrier signal has sawtooth modulation. In some embodiments, at least one of the first carrier signal and the second carrier signal has triangular modulation.

In one embodiment, the controller is configured to receive and generate analog signals. In some embodiments, the controller is configured to receive and generate digital signals.

Another aspect of the present disclosure is directed to a rectifier configured for a wireless power system. The rectifier includes at least one capacitor and at least one switching leg, each switching leg including a plurality of switches having at least one switch coupled to the at least one capacitor. The plurality of switches of each switching leg are configured to be controlled such that, during operation: (i) a plurality of output voltages are produced, the plurality of output voltages including at least two non-zero unequal voltage levels and (ii) at least one switch of the plurality of switches operates with zero-voltage switching.

BRIEF DESCRIPTION OF THE DRAWINGS

FIG. 10B is a table illustrating several modes for an inverter configuration in accordance with at least one embodiment described herein.

DETAILED DESCRIPTION

Disclosed herein are exemplary embodiments of systems and methods for providing wireless power transmission using multi-level inverters and, more specifically, methods and systems for generating asymmetrical, multi-level voltage waveforms for wireless power transmission.

Wireless Power Systems

Figure 1:
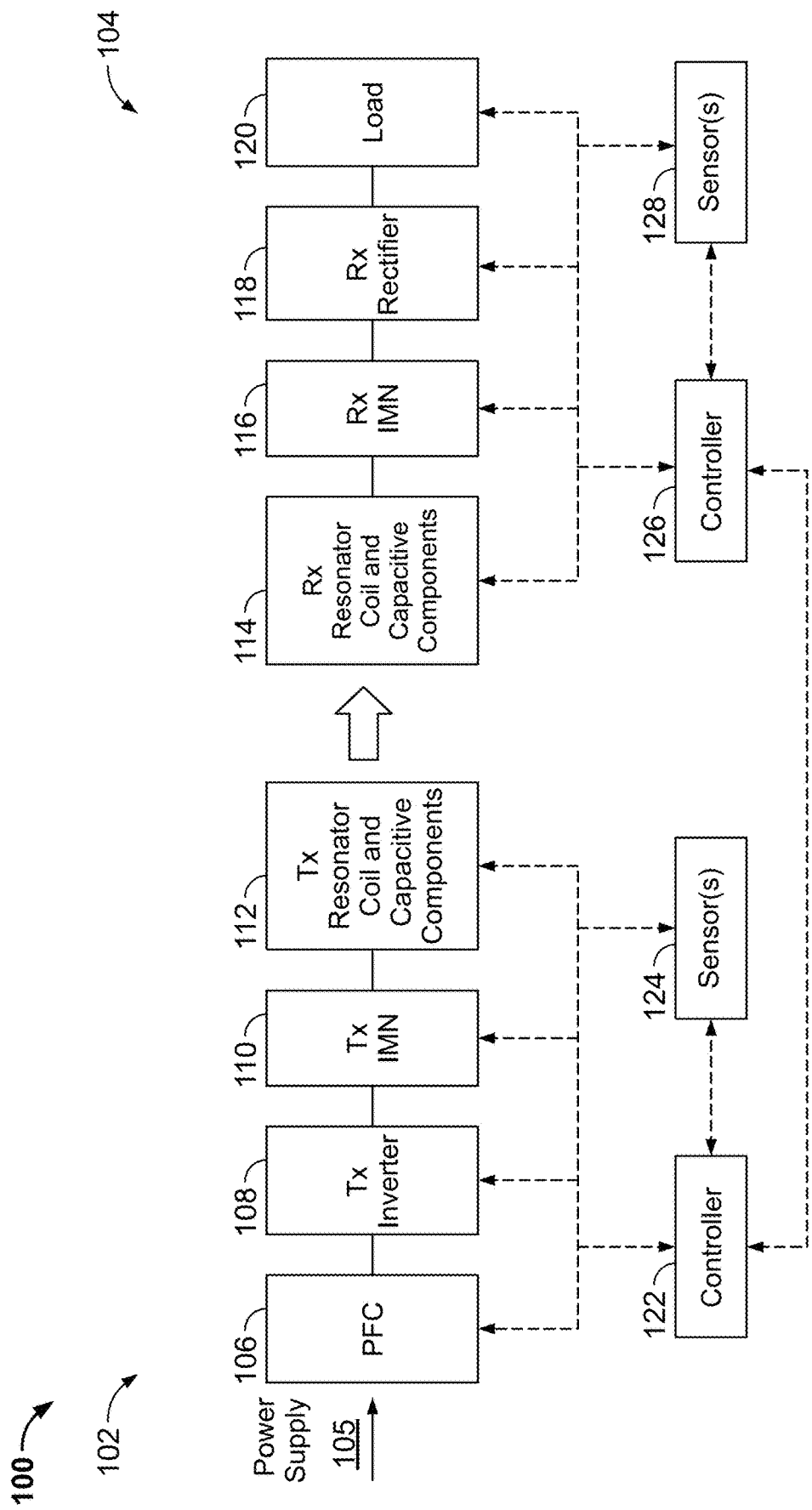
FIG. 1 is a block diagram of an exemplary wireless power system.

FIG. 1 is a block diagram of an exemplary wireless power system 100. The system 100 includes a wireless power transmitter 102 and a wireless power receiver 104. In transmitter 102, a power supply 105 (e.g., AC mains, battery, etc.) provides power to an inverter 108. Additional components can include power factor correction (PFC) circuit 106 before the inverter stage 108. The inverter 108 drives the transmitter resonator coil and capacitive components 112 ("resonator"), via an impedance matching network 110 (including fixed or tunable network components). The resonator 112 produces an oscillating magnetic field which induces a current or voltage in receiver resonator 114. The received energy is provided to a rectifier 118 via impedance matching network 116 (including fixed or tunable network components). Ultimately, the rectified power is provided to a load 120 (e.g., one or more batteries of an electric or hybrid vehicle). In some embodiments, the battery voltage level can impact various parameters (e.g., impedance) of the wireless power system 100. Therefore, the battery voltage level may be received, determined, or measured to be provided as input to other portions of the wireless power system 100. For example, typical battery voltage ranges for electric vehicles include 280 V-420 V, etc.

In some embodiments, one or more components of the transmitter 102 and receiver 104 can be coupled to controllers 122, 126, respectively, which may each include a communication module (e.g., Wi-Fi, radio, Bluetooth, in-band signaling mechanism, etc.). In some embodiments, one or more components of the transmitter 102 and receiver 104 can be coupled to one or more sensors 124, 128 (e.g., current sensor(s), voltage sensor(s), power sensor(s), temperature sensor(s), fault sensor(s), etc.). The controllers 122, 126 and sensor(s) 124, 128 can be operably coupled to control portions of the transmitter 102 and receiver 104 based on feedback signals from the sensor(s) 124, 128.

Examples of wireless power systems can be found in U.S. Pat. No. 8,461,719, granted Jun. 11, 2013, and titled "Wireless energy transfer systems," and U.S. Pat. No. 8,933,594, granted Jan. 13, 2015, and titled "Wireless energy transfer for vehicles," both of which are hereby incorporated by reference in their entireties.

In some embodiments, the exemplary impedance matching networks 110, 116 can include one or more variable impedance components. The one or more variable impedance components may be referred together herein as a "tunable matching network" (TMN). TMNs can be used in adjusting the impedance (e.g., including the reactance) of the wireless power transmitter 102 and receiver 104. In some embodiments, tunable matching network(s) may be referred to as "tunable reactance circuit(s)". In some applications, e.g., wireless power transmission, impedances seen by the wireless power transmitter 102 and receiver 104 may vary dynamically. In such applications, impedance matching between a receiver resonator coil (of 114) and a load 120, and a transmitter resonator coil (of 112) and the inverter 108, may be required to prevent unnecessary energy losses and excess heat.

High-power wireless power transmitters can be configured to transmit wireless power in applications such as powering or charging batteries of vehicles, industrial machines, robots, or electronic devices relying on high power. For the purpose of illustration, the following disclosure focuses on wireless power transmission for vehicles (e.g., electric vehicles, hybrid vehicles, etc.). However, it is understood that any one or more of the embodiments described herein can be applied to other applications in which wireless power can be used.

As discussed herein, a wireless power transmitter (e.g., wireless power transmitter 102) or at least a portion of a wireless power transmitter may be referred to as a "ground assembly" or "GA". Likewise, a wireless power receiver (e.g., wireless power receiver 104) or at least a portion of a wireless power receiver may be referred to as a "vehicle assembly" or "VA".

Wireless Power Transmitters

As discussed above, the wireless power transmitter 102 produces an oscillating magnetic field which induces a current or voltage in receiver resonator 114. The inverter 108 of the wireless power transmitter 102 receives DC power from the PFC circuit 106. In some examples, the PFC circuit 106 includes a DC/DC converter configured to convert the DC power output from the PFC circuit 106. For example, the DC/DC converter converts the DC power from a first voltage level to one or more second voltage levels. The one or more second voltage levels may correspond to the configuration of the inverter 108. In other examples, an external DC/DC converter is positioned between the PFC circuit 106 and the inverter 108.

Figure 2:
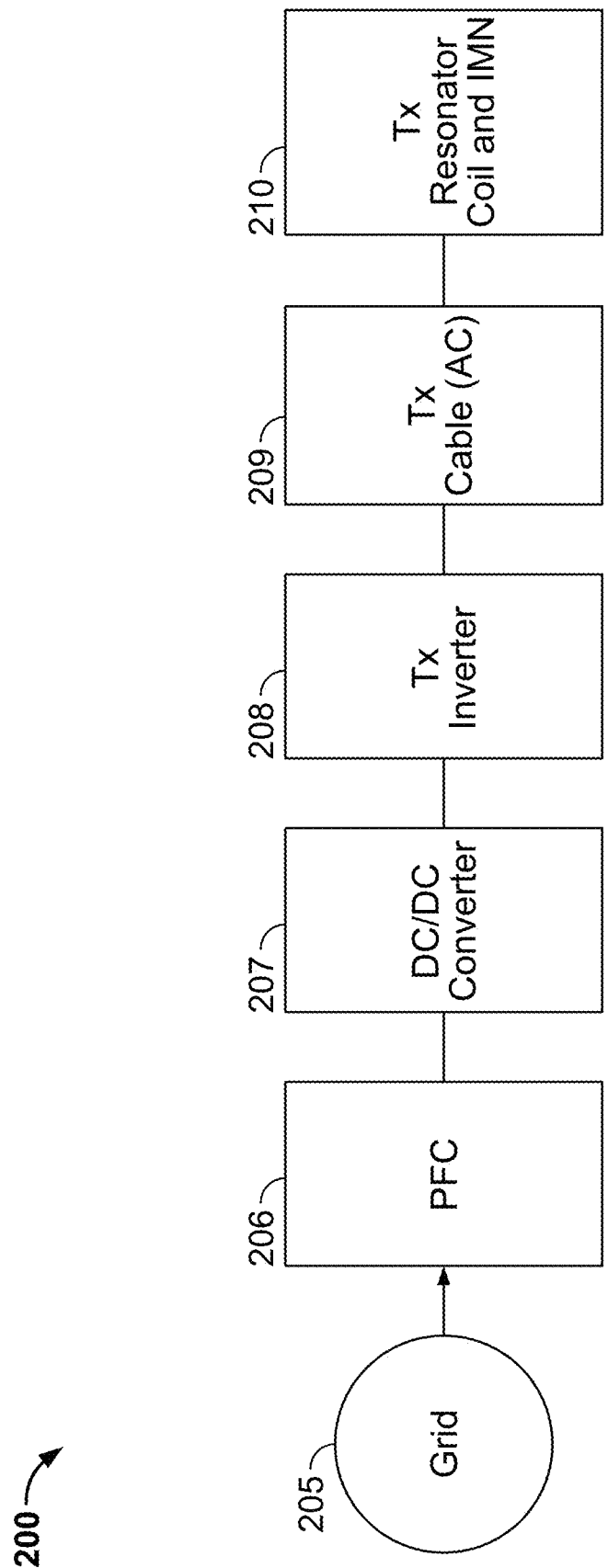
FIG. 2 is a block diagram of an example wireless power transmitter.

FIG. 2 is a block diagram of an example wireless power transmitter 200. In one example, the wireless power transmitter 200 corresponds to the wireless power transmitter 102 of FIG. 1. As shown, the transmitter 200 includes a PFC circuit 206 which receives power from the Grid 205, a DC/DC converter 207, an inverter 208, a transmitter (Tx) cable 209, and a transmitter resonator coil 210. In some examples, the PFC circuit 206, the DC/DC converter 207, and the inverter 208 are included in a common assembly. For example, the common assembly may be a "wallbox" assembly installed in a private garage, public garage, parking lot, etc. Likewise, the transmitter resonator coil 210 and additional impedance matching components may be included in a GA coupled to the wallbox assembly via the Tx cable 209.

The Tx cable 209 provides AC power from the inverter 208 to the transmitter resonator coil 210.

Figure 3A:
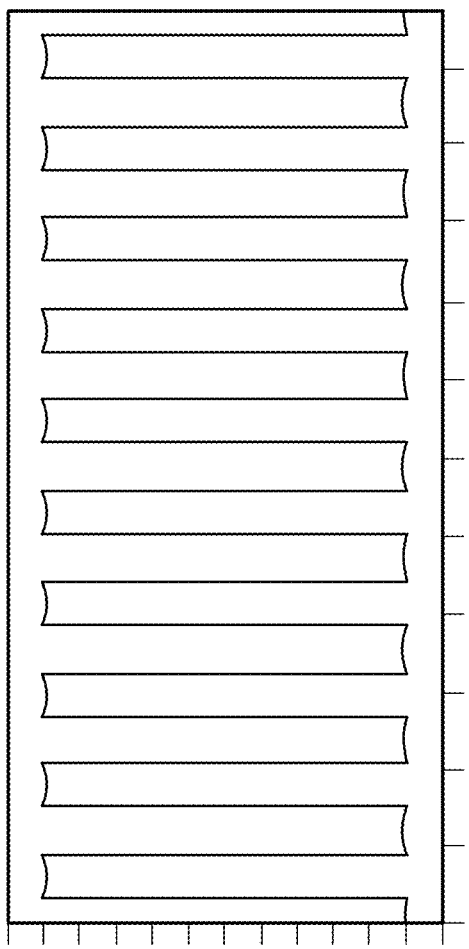
FIGS. 3A and 3B are plots illustrating example waveforms associated with the wireless power transmitter of FIG. 2.
Figure 3B:
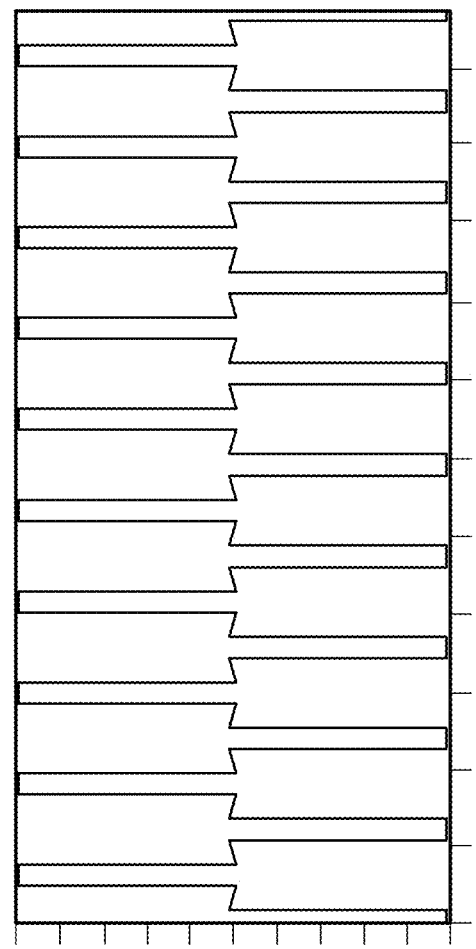

In one example, the inverter 208 is an H-bridge resonant inverter. To drive load(s) by wireless power transmission (e.g., the resonator coil 210), the inverter 208 outputs AC power having multiple distinct voltage levels. FIG. 3A is an example input voltage waveform provided to the inverter 208 and FIG. 3B is an example output waveform provided by the inverter 208. The inverter 108 produces a waveform having three distinct voltage levels: +Vdc, 0, and −Vdc (e.g., as shown in FIG. 3B). In such examples, the inverter 208 receives a wide input voltage range (e.g., −Vdc to +Vdc) to produce the distinct voltage levels (e.g., as shown in FIG. 3A). The wide input voltage range is produced by a combination of the PFC circuit 206 and the DC/DC converter 207. However, such a wide input voltage range may increase the complexity and cost of the PFC circuit 206. In addition, the inclusion of the DC/DC converter 207 may increase the cost while reducing the efficiency of the transmitter 200 (or the wireless power system 100). As such, the DC/DC converter 207 can be eliminated by using a multi-level inverter in wireless power transmitters. The use of a tunable matching network (TMN) may also be eliminated by using a multi-level inverter.

Figure 4A:
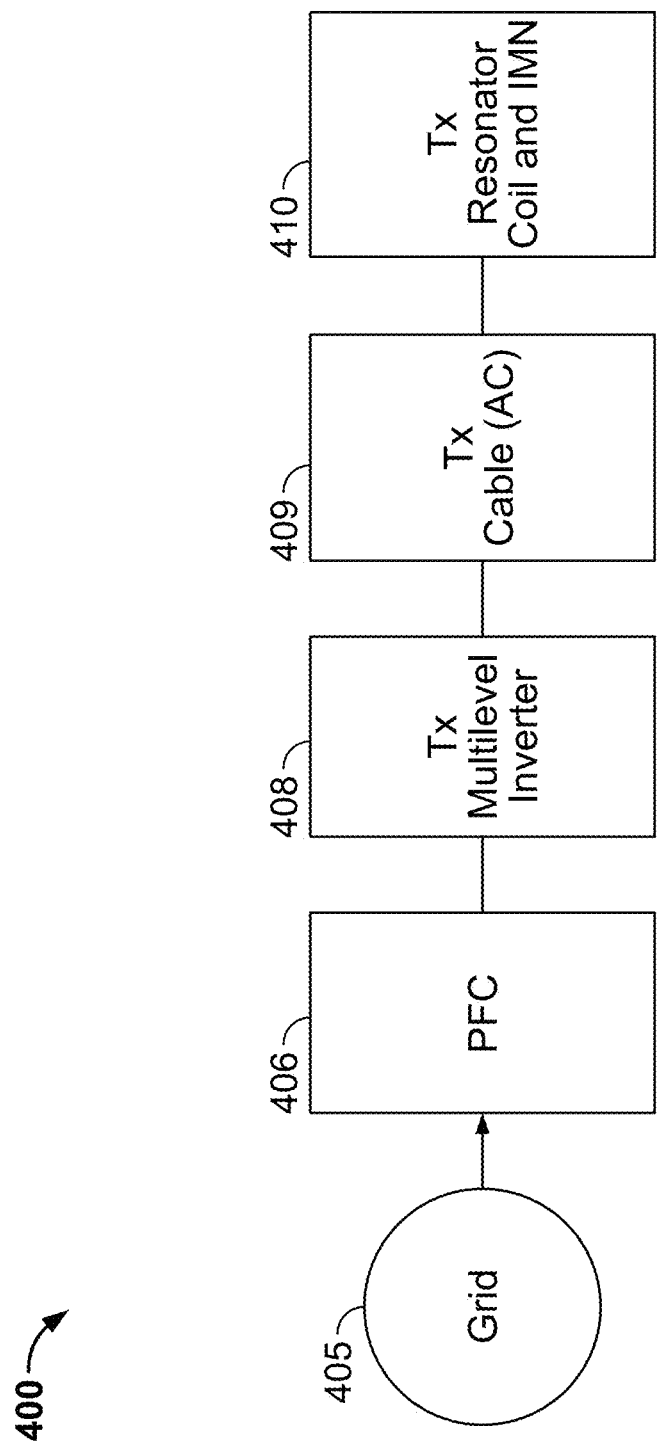
FIG. 4A is a block diagram of a wireless power transmitter in accordance with at least one embodiment described herein.
Figure 4B:
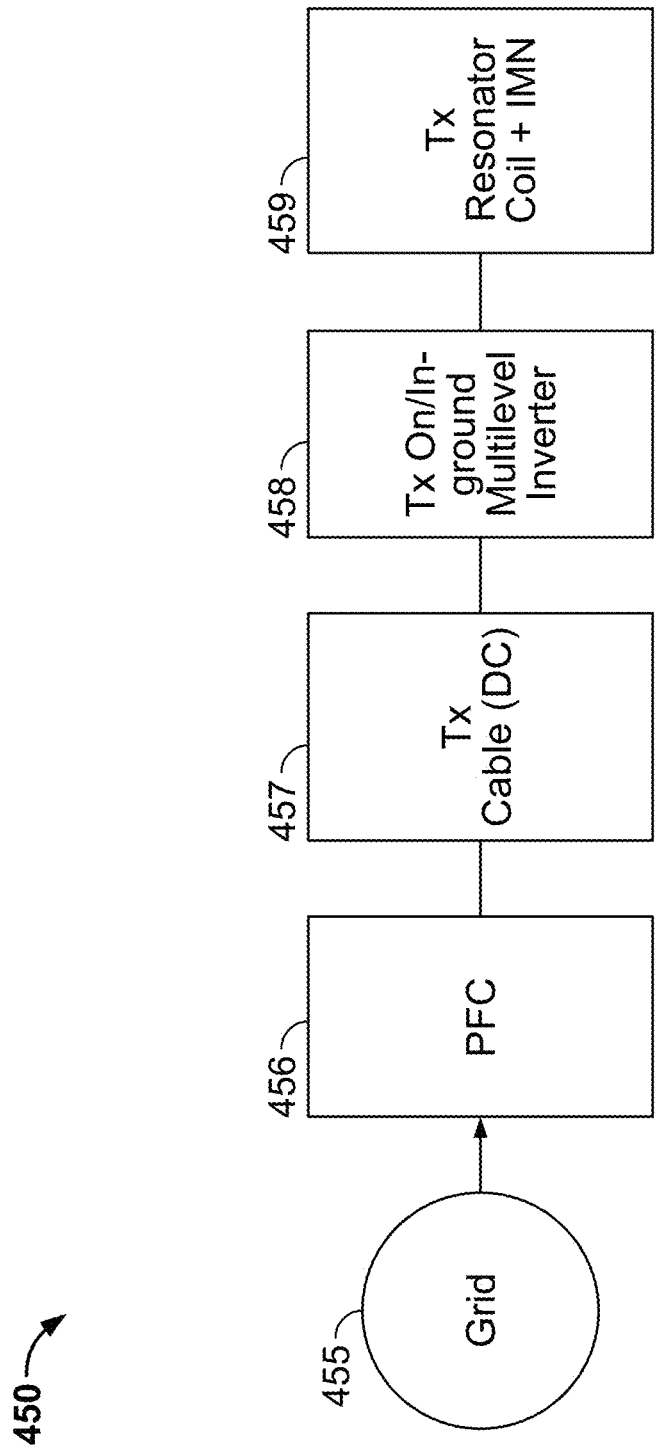
FIG. 4B is a block diagram of another wireless power transmitter in accordance with at least one embodiment described herein.

FIG. 4A is a block diagram of a wireless power transmitter 400 including a multi-level inverter. In one example, the wireless power transmitter 400 corresponds to the wireless power transmitter 102 of FIG. 1. As shown, the transmitter 400 includes a PFC circuit 406, a multi-level inverter 408, a Tx cable 409, and a transmitter resonator coil 410. In some examples, the PFC circuit 406 and the inverter 408 are included in a wallbox assembly. Likewise, the transmitter resonator coil 410 and additional impedance matching components may be included in a GA coupled to the wallbox assembly via the Tx cable 409. The Tx cable 409 provides AC power (e.g., high frequency AC power) from the inverter 408 to the transmitter resonator coil 410. FIG. 4B is a block diagram of a wireless power transmitter 450 including a multi-level inverter. In the example of FIG. 4B, the wireless power transmitter 450 corresponds to the wireless power transmitter 102 of FIG. 1. As shown, the transmitter 450 includes a PFC circuit 456, a Tx cable 457, a multi-level inverter 458, and a transmitter resonator coil 459. In some examples, the PFC circuit 456 is included in a wallbox assembly, while the multi-level inverter 458, the transmitter resonator coil 459, and additional impedance matching components are included in a GA coupled to the wallbox assembly via the Tx cable 457. The Tx cable 457 provides DC power from the PFC circuit 456 to the multi-level inverter 458. In some examples, being that the Tx cable 457 is configured to provide DC power, the cost and size of the Tx cable 457 may be reduced (e.g., relative to Tx cables 209, 409). In addition, the power dissipation in the Tx cable 457 may be reduced (e.g., relative to Tx cables 209, 409).

In one example, the multi-level inverter 408 or 458 is one of a T-type inverter, a flying capacitor (FC) inverter, a neutral point clamped (NPC) inverter, an active neutral point clamped (ANPC) inverter, or any other suitable multi-level inverter type. To drive load(s) by wireless power transmission, the inverter outputs AC power having multiple distinct voltage levels. In one example, the PFC circuit 406 or 456 is configured to provide DC power having a fixed voltage level to the multi-level inverter. The multi-level inverter converts the DC power directly into the output AC power. As such, the need for a DC/DC converter is eliminated, reducing the cost while improving the efficiency of the transmitter 400, 450 (and, thereby, the wireless power system 100). In some examples, the complexity and cost of the PFC circuit is also reduced.

Multi-Level Inverter Topologies for Wireless Power Transmission

As described above, the wireless power transmitters 400, 450 can include multi-level inverters configured as T-type inverters, FC inverters, NPC inverters, ANPC inverters, or any other suitable multi-level inverter type. Several of these multi-level inverter topologies are described in greater detail below.

Figure 5:
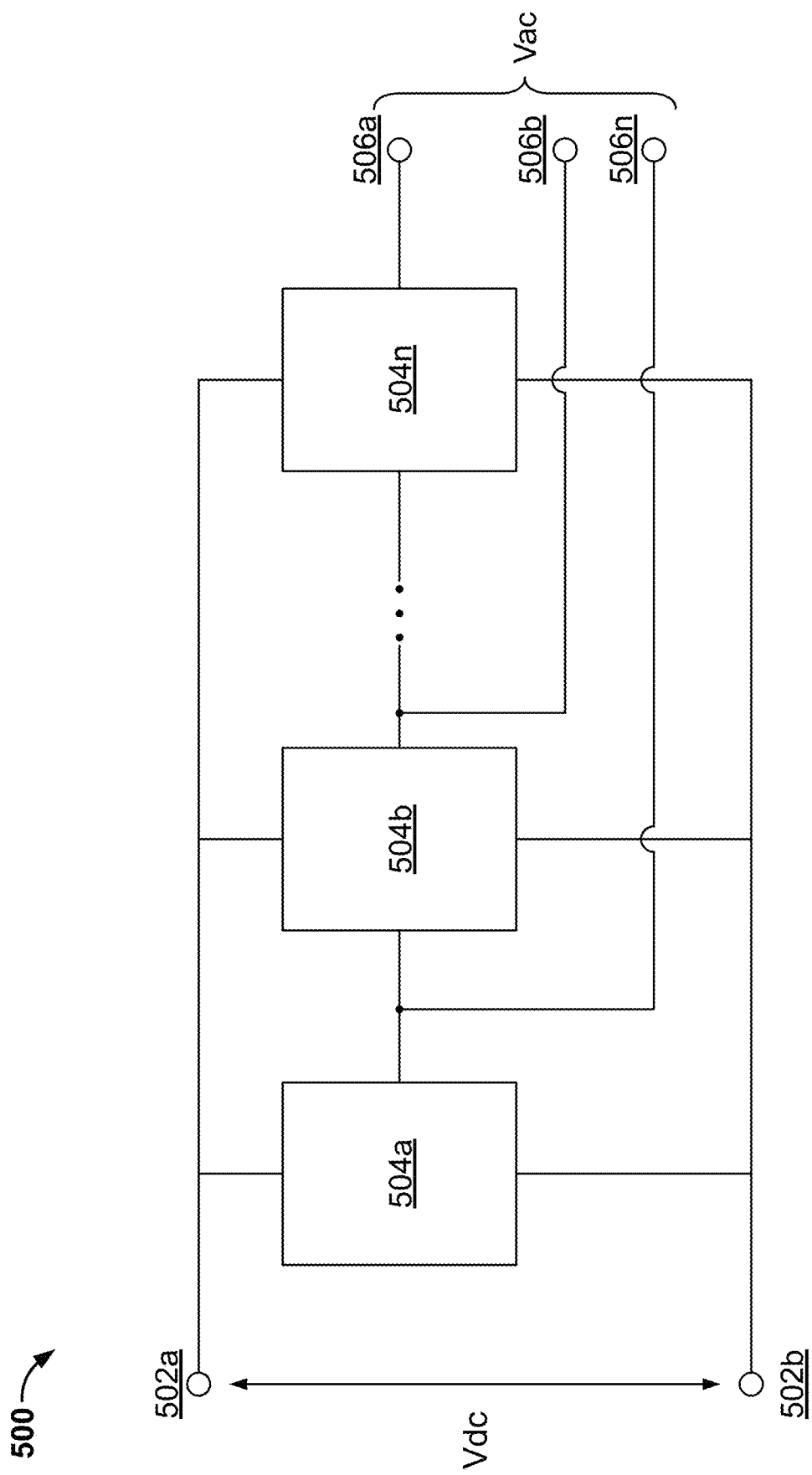
FIG. 5 is a block diagram of a multi-level inverter.

FIG. 5 is a block diagram of a multi-level inverter 500. The inverter 500 includes a first input 502a, a second input 502b, a plurality of switching legs 504, and a plurality of outputs 506. The plurality of switching legs 504 includes n switching legs, where n≥1. In one example, the plurality of outputs 506 includes n outputs (e.g., one output per switching leg). However, in other examples, the plurality of outputs 506 may include a different number of outputs (e.g., 2 n or two outputs per switching leg). The first and second inputs 502a, 502b receive input DC power Vdc (e.g., from a PFC circuit). Likewise, the plurality of outputs provide AC power Vac (e.g., to a transmit resonator coil). While not shown, one or more capacitors may be coupled between the first and second inputs 502a, 502b.

The plurality of switching legs 504 are coupled between the first and second inputs 502a, 502b and convert the input DC power received at the first and second inputs 502a, 502b into the output AC power provided at the plurality of outputs 506. The plurality of switching legs are operated to generate an output waveform having multiple distinct voltage levels. In one example, the number of n switching legs included in the inverter 500 corresponds to the configuration of the inverter. For example, the inverter 500 may include one switching leg in a half-bridge configuration and two switching legs in a full-bridge configuration. In some examples, the number of distinct voltage levels included in the output waveform corresponds to the number of n switching legs included in the inverter 500. A single-leg inverter (i.e., n=1) may generate an output waveform having a maximum of three distinct voltage levels (e.g., 0V, +Vdc/2, +Vdc). For multi-leg inverters (i.e., n>1), the voltage differentials across the individual switching legs (e.g., the plurality of outputs 506) are used to generate additional voltage levels. For example, a two-leg inverter (i.e., n=2) may generate an output waveform having a maximum of five distinct voltage levels (e.g., −Vdc, −Vdc/2, 0V, +Vdc/2, +Vdc). The plurality of switching legs 504 are operated using various switching sequences to generate an asymmetrical, multi-level waveform, as described in greater detail herein.

The inverter 500 may be configured as a T-type inverter, an FC inverter, a NPC inverter, an ANPC inverter, or any other suitable multi-level inverter type. As such, each switching leg of the plurality of switching legs 504 has a specific topology corresponding to the inverter type (e.g., T-type, FC, NPC, etc.). Several examples of these switching leg topologies are described in greater detail below in FIGS. 6A-6D. Throughout these and subsequent figures, a plurality of switches are shown, each switch having a gate, a drain, and a source. In some examples, each switch is a FET (e.g., an N-channel MOSFET, a P-channel MOSFET, etc.). Other types of transistors or switching technology may be used.

Figure 6A:
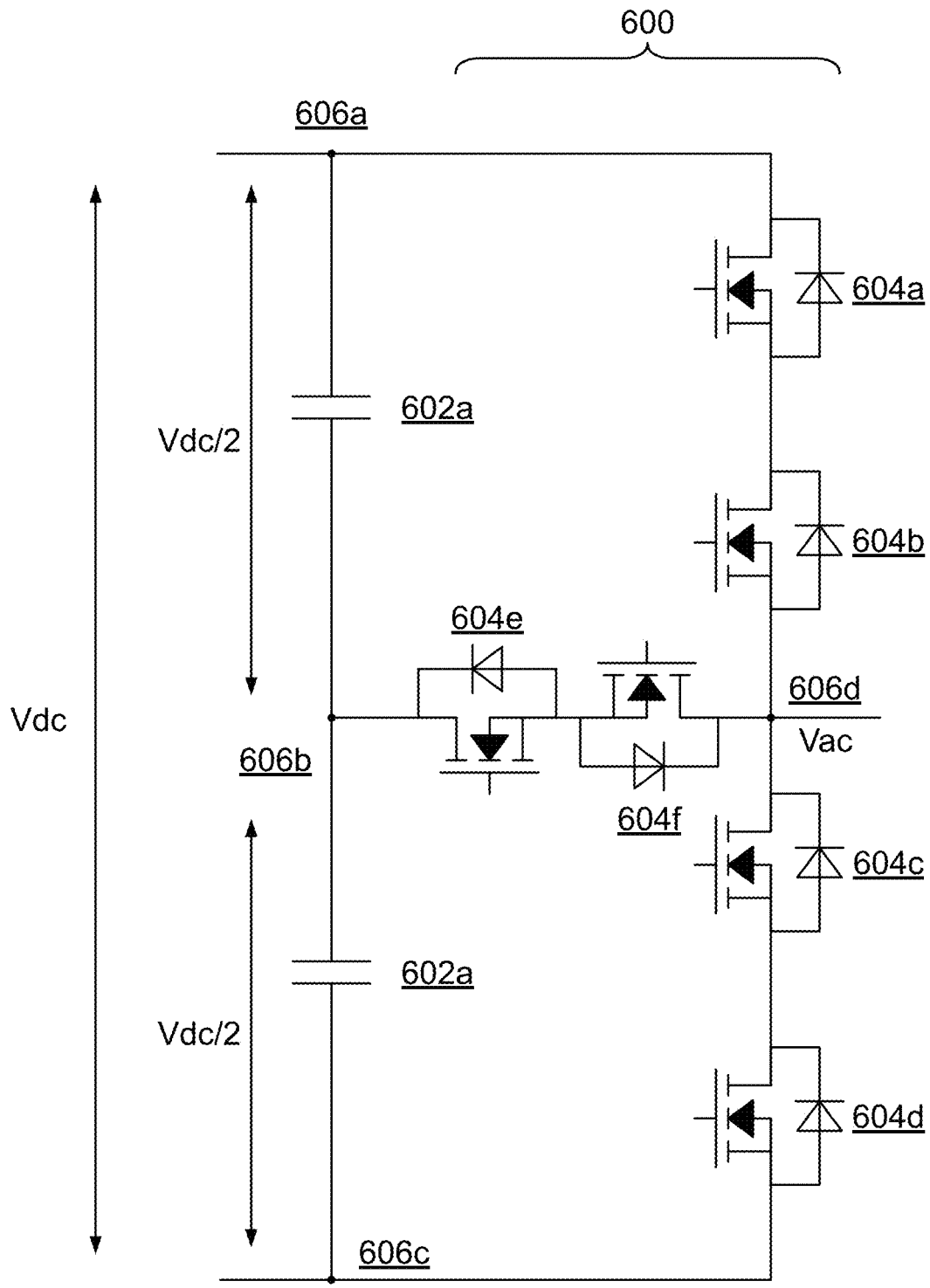
FIG. 6A is a schematic diagram of an example T-type inverter switching leg.

FIG. 6A is a schematic diagram of an example T-type inverter switching leg 600. The switching leg 600 represents one instance of a switching leg 504 included in the inverter 500 of FIG. 5. As shown, the switching leg 600 includes a plurality of switches 604 coupled to a first capacitor 602a and a second capacitor 602b. The switching leg 600 includes a first node 606a, a second node 606b, a third node 606c, and a fourth node 606d. The first and third nodes 606a, 606c are inputs to the switching leg 600 (or the inverter 500) and receive DC power (e.g., from a PFC circuit). Likewise, the fourth node 606d is an output of the switching leg 600 (or inverter 500) to provide AC power (e.g., to a transmit resonator coil). The second node 606b is a mid-point connection.

The first capacitor 602a is coupled between the first node 606a and the second node 606b. The second capacitor is coupled between the third node 606c and the second node 606b. An input voltage Vdc received at the first node 606a and the third node 606c is split across the capacitors 602a, 602b. For example, each capacitor 602a, 602b may store half of the input voltage Vdc (e.g., Vdc/2). In some examples, the capacitors 602a, 602b are referred to as bus capacitors. In one example, a single set of the capacitors 602 is included in the inverter 500; however, in other examples, a set of the capacitors 602 may be included for each instance of the switching leg 600 in the inverter 500.

In the example switching leg 600, the plurality of switches 604 includes a first switch 604a, a second switch 604b, a third switch 604c, a fourth switch 604d, a fifth switch 604e, and a sixth switch 604f. The number of switches included in the switching leg 600 is proportional (or scaled) to the input voltage Vdc. In some examples, the second switch 604b and the fourth switch 604d may be optional depending on the input voltage Vdc or the rated voltage of the remaining switches (e.g., switches 604a, 604c).

The first switch 604a and the second switch 604b are coupled in series between the first node 606a and the fourth node 606d. The drain of the first switch 604a is coupled to the first node 606a, the source of the first switch 604a is coupled to the drain of the second switch 604b, and the source of the second switch 604b is coupled to the fourth node 606d. The third switch 604c and the fourth switch 604d are coupled in series between the third node 606c and the fourth node 606d. The drain of the third switch 604c is coupled to the fourth node 606d, the source of the third switch 604c is coupled to the drain of the fourth switch 604d, and the source of the fourth switch 604d is coupled to the third node 606c. The fifth switch 604e and the sixth switch 604f are coupled in series between the second node 606b and the fourth node 606d. The drain of the fifth switch 604e is coupled to the second node 606d, the source of the fifth switch 604e is coupled to the source of the sixth switch 604f, and the drain of the sixth switch 604f is coupled to the fourth node 606d. In some examples, the fifth and sixth switches 604e, 604f correspond to a bidirectional switch.

Figure 6B:
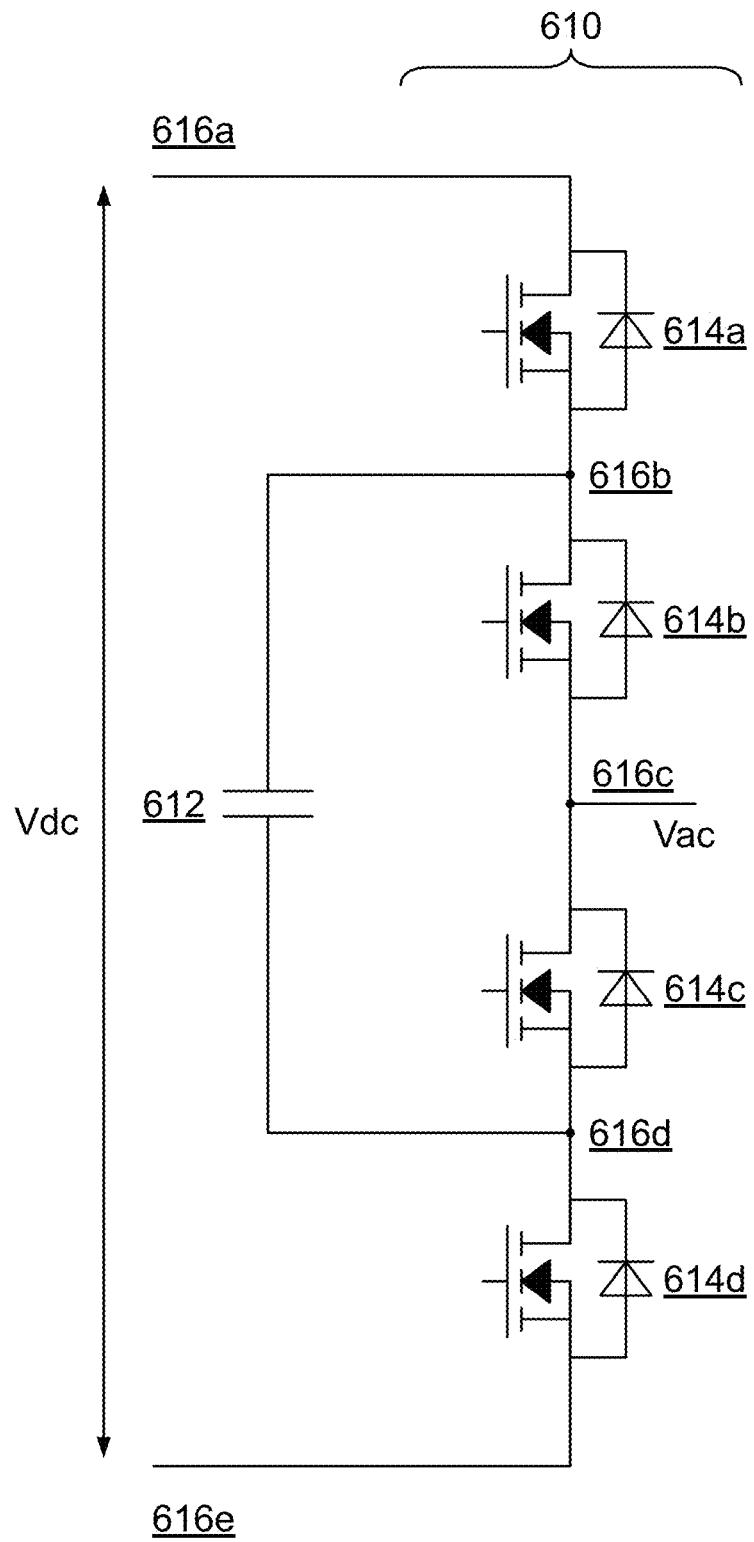
FIG. 6B is a schematic diagram of an example flying capacitor (FC) inverter switching leg.

FIG. 6B is a schematic diagram of an example FC inverter switching leg 610. The switching leg 610 represents one instance of a switching leg 504 included in the inverter 500 of FIG. 5. As shown, the inverter 610 includes a capacitor 612 and a plurality of switches 614. The inverter 610 includes a first node 616a, a second node 616b, a third node 616c, a fourth node 616d, and a fifth node 616e. The first and fifth nodes 616a, 616e are inputs to the switching leg 610 (or inverter 500) and receive DC power (e.g., from a PFC circuit). Likewise, the third node 616c is an output of the switching leg 610 (or inverter 500) to provide AC power (e.g., to a transmit resonator coil).

The capacitor 612 is coupled between the second node 616b and the fourth node 616d. An input voltage Vdc is received at the first node 616a and the fifth node 616e. A portion of the input voltage Vdc is stored by the capacitor 612 (e.g., Vdc/2).

In the example switching leg 610, the plurality of switches 614 includes a first switch 614a, a second switch 614b, a third switch 614c, and a fourth switch 614d. The first switch 614a is coupled between the first node 616a and the second node 616b. The drain of the first switch 614a is coupled to the first node 616a and the source of the first switch 614a is coupled to the second node 616b. The second switch 614b is coupled between the second node 616b and the third node 616c. The drain of the second switch 614b is coupled to the second node 616b and the source of the second switch 614b is coupled to the third node 616c. The third switch 614c is coupled between the third node 616c and the fourth node 616d. The drain of the third switch 614c is coupled to the third node 616c and the source of the third switch 614c is coupled to the fourth node 616d. The fourth switch 614d is coupled between the fourth node 616d and the fifth node 616e. The drain of the fourth switch 614d is coupled to the fourth node 616d and the source of the fourth switch 614d is coupled to the fifth node 616e.

Figure 6C:
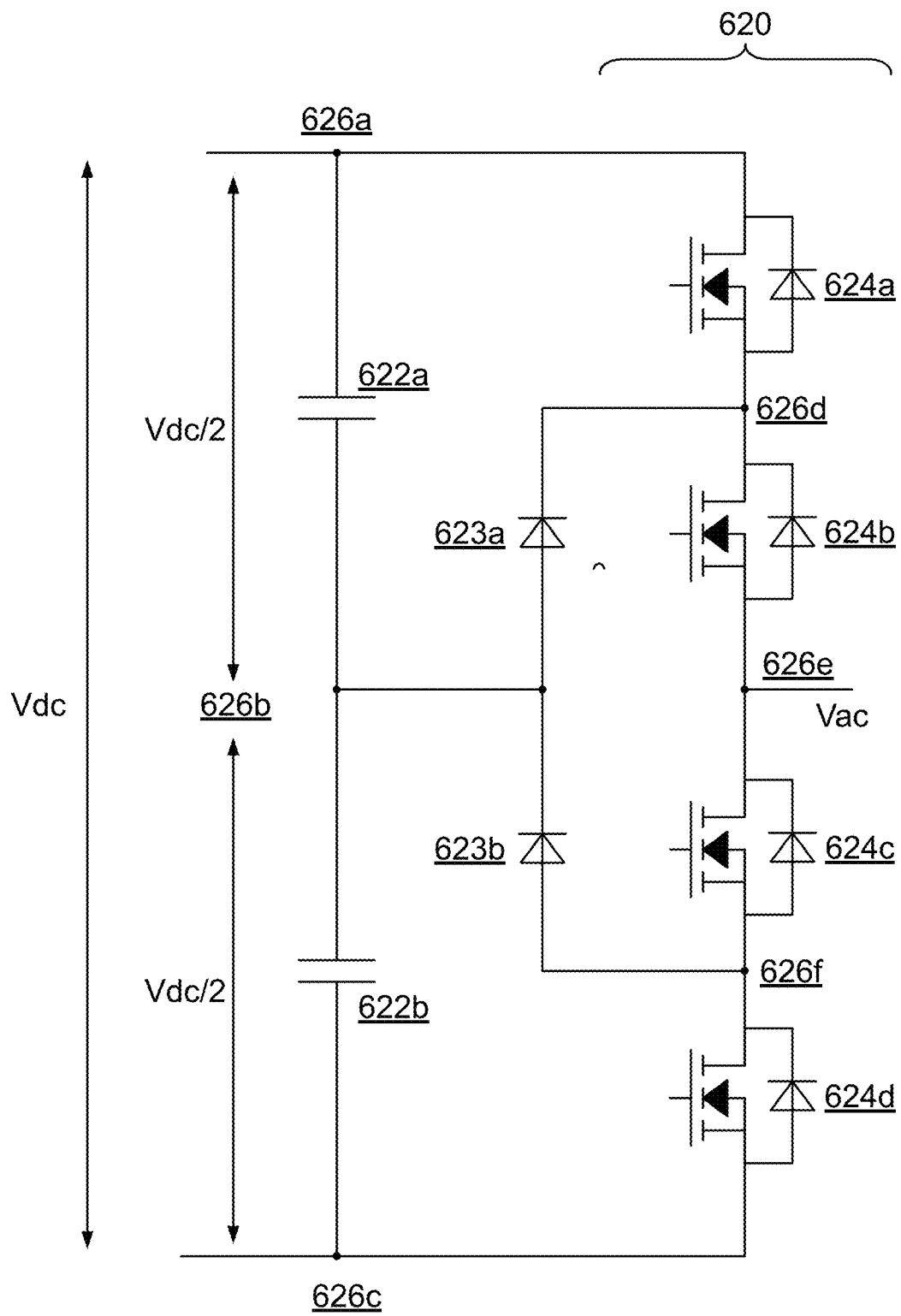
FIG. 6C is a schematic diagram of an example neutral point clamped (NPC) inverter switching leg.

FIG. 6C is a schematic diagram of an example NPC inverter switching leg 620. The switching leg 620 represents one instance of a switching leg 504 included in the inverter 500 of FIG. 5. As shown, the switching leg 620 includes a first diode 623a, a second diode 623b, and a plurality of switches 624. The diodes 523a, 523b and the plurality of switches 624 are coupled to a first capacitor 622a and a second capacitor 622b. The switching leg 620 includes a first node 626a, a second node 626b, a third node 626c, a fourth node 626d, a fifth node 626e, and a sixth node 626f. The first and third nodes 626a, 626c are inputs to the switching leg 620 (or inverter 500) and receive DC power (e.g., from a PFC circuit). Likewise, the fifth node 626e is an output of the switching leg 620 (or inverter 500) to provide AC power (e.g., to a transmit resonator coil). The second node 626b is a mid-point connection.

The first capacitor 622a is coupled between the first node 626a and the second node 626b. The second capacitor 622b is coupled between the third node 626c and the second node 626b. In some examples, the capacitors 622a, 622b are referred to as bus capacitors. An input voltage Vdc received at the first node 626a and the third node 626c is split across the capacitors 622a, 622b. For example, each capacitor 622a, 622b may store half of the input voltage Vdc (e.g., Vdc/2). In one example, a single set of the capacitors 622 is included in the inverter 500; however, in other examples, a set of the capacitors 622 may be included for each instance of the switching leg 620 in the inverter 500.

The first diode 623a is coupled between the second node 626b and the fourth node 626d. The anode of the first diode 623a is coupled to the second node 626b and the cathode of the of the first diode 623a is coupled to the fourth node 626d. The second diode 623b is coupled between the second node 626b and the sixth node 626f. The cathode of the second diode 623b is coupled to the second node 626b and the anode of the second diode 623b is coupled to the sixth node 626f.

In the example switching leg 620, the plurality of switches 624 includes a first switch 624a, a second switch 624b, a third switch 624c, and a fourth switch 624d. The first switch 624a is coupled between the first node 626a and the fourth node 626d. The drain of the first switch 624a is coupled to the first node 626a and the source of the first switch 624a is coupled to the fourth node 626d. The second switch 624b is coupled between the fourth node 626d and the fifth node 626e. The drain of the second switch 624b is coupled to the fourth node 626d and the source of the second switch 624b is coupled to the fifth node 626e. The third switch 624c is coupled between the fifth node 626e and the sixth node 626f. The drain of the third switch 624c is coupled to the fifth node 626e and the source of the third switch 624c is coupled to the sixth node 626f. The fourth switch 624d is coupled between the sixth node 626f and the third node 626c. The drain of the fourth switch 624d is coupled to the sixth node 626f and the source of the fourth switch 624d is coupled to the third node 626c.

Figure 6D:
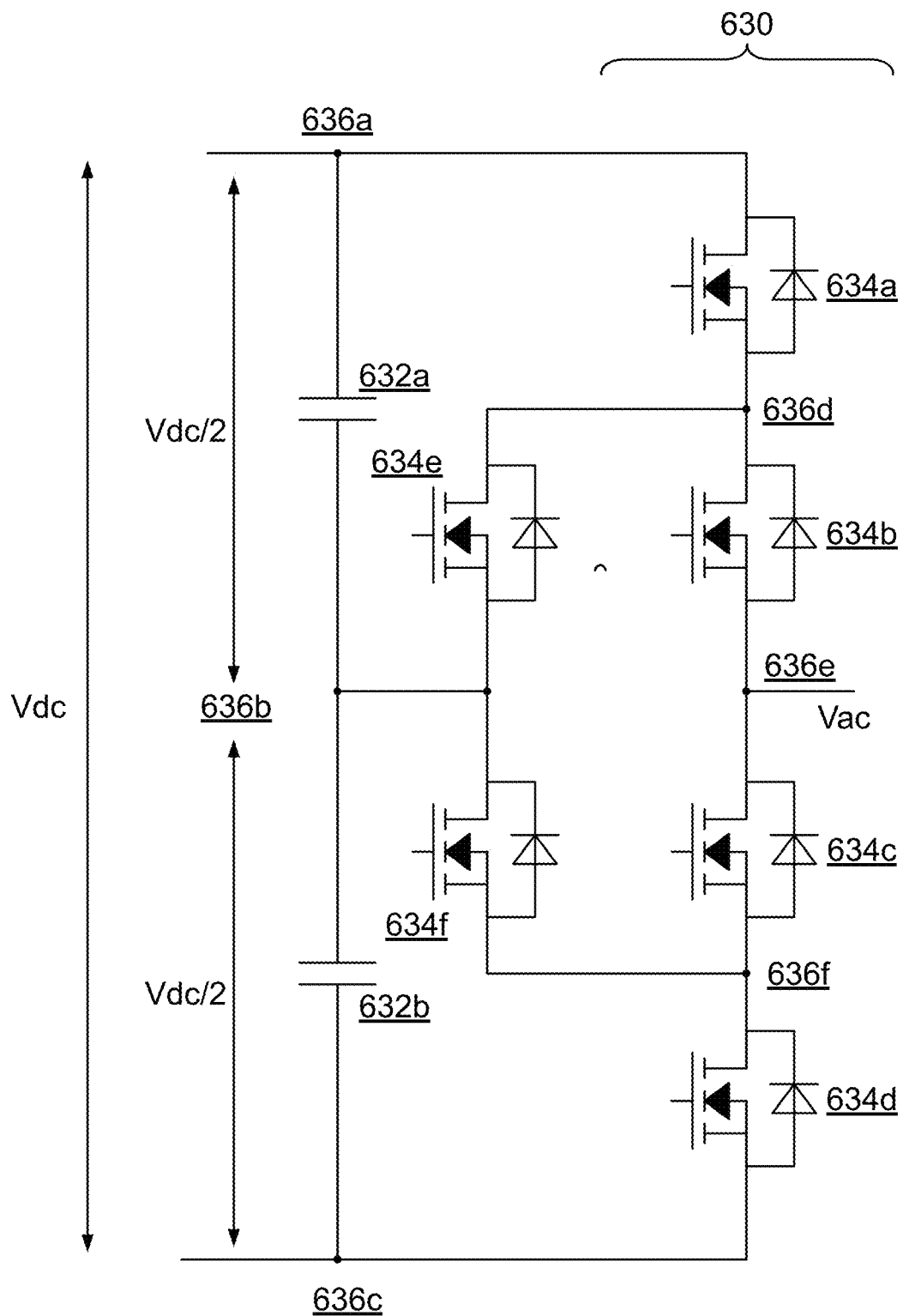
FIG. 6D is a schematic diagram of an example active neutral point clamped (ANPC) inverter switching leg.

FIG. 6D is a schematic diagram of an example ANPC inverter switching leg 630. The switching leg 630 represents one instance of a switching leg 504 included in the inverter 500 of FIG. 5. As shown, the switching leg 630 includes a plurality of switches 634 coupled to a first capacitor 632a and a second capacitor 632b. The switching leg 630 includes a first node 636a, a second node 636b, a third node 636c, a fourth node 636d, a fifth node 636e, and a sixth node 636f. In one example, the first and third nodes 636a, 636c are inputs to the switching leg 630 (or inverter 500) and receive DC power (e.g., from a PFC circuit). Likewise, the fifth node 636e is an output of the switching leg 630 (or inverter 500) to provide AC power (e.g., to a transmit resonator coil). The second node 636b is a mid-point connection.

The first capacitor 632a is coupled between the first node 636a and the second node 636b. The second capacitor 632b is coupled between the third node 636c and the second node 636b. In some examples, the capacitors 632a, 632b are referred to as bus capacitors. An input voltage Vdc received at the first node 636a and the third node 636c is split across the capacitors 632a, 632b. For example, each capacitor 632a, 632b may store half of the input voltage Vdc (e.g., Vdc/2). In one example, a single set of the capacitors 632 is included in the inverter 500; however, in other examples, a set of the capacitors 632 may be included for each instance of the switching leg 630 in the inverter 500.

In the example of switching leg 630, the plurality of switches 634 includes a first switch 634a, a second switch 634b, a third switch 634c, a fourth switch 634d, a fifth switch 634e, and a sixth switch 634f. The first switch 634a is coupled between the first node 636a and the fourth node 636d. The drain of the first switch 634a is coupled to the first node 636a and the source of the first switch 634a is coupled to the fourth node 636d. The second switch 634b is coupled between the fourth node 636d and the fifth node 636e. The drain of the second switch 634b is coupled to the fourth node 636d and the source of the second switch 634b is coupled to the fifth node 636e. The third switch 634c is coupled between the fifth node 636e and the sixth node 636f. The drain of the third switch 634c is coupled to the fifth node 636e and the source of the third switch 634c is coupled to the sixth node 636f. The fourth switch 634d is coupled between the sixth node 636f and the third node 636c. The drain of the fourth switch 634d is coupled to the sixth node 636f and the source of the fourth switch 634d is coupled to the third node 636c. The fifth switch 634e is coupled between the fourth node 636d and the second node 636b. The drain of the fifth switch 634e is coupled to the fourth node 636d and the source of the fifth switch 634e is coupled to the second node 636b. The sixth switch 634f is coupled between the sixth node 636f and the second node 636b. The drain of the sixth switch 634f is coupled to the second node 636b and the source of the sixth switch 634f is coupled to the sixth node 636f.

Multi-Level Voltage Waveforms for Wireless Power Transmission

Figure 7:
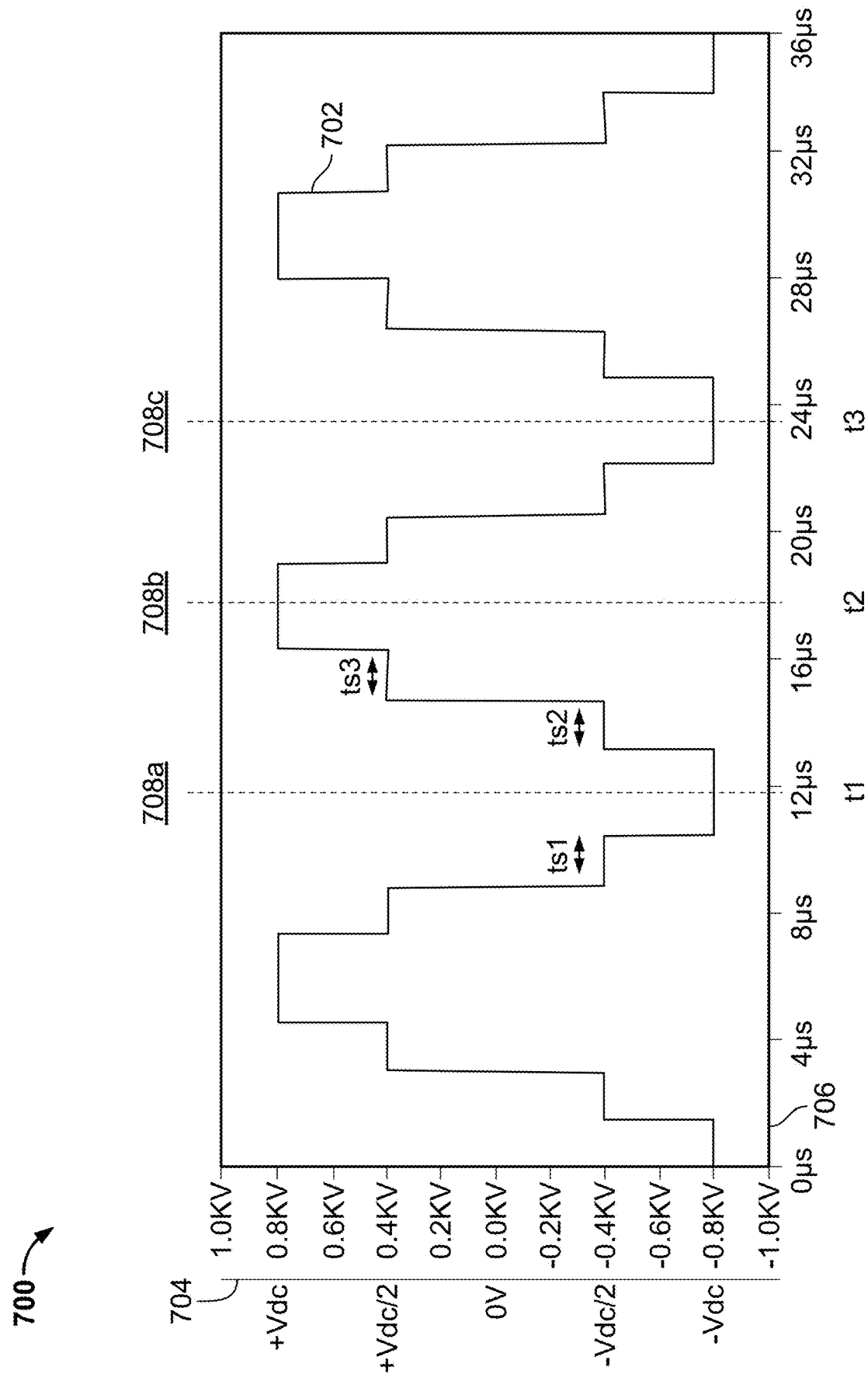
FIG. 7 is a plot illustrating an example symmetrical, multi-level voltage waveform.

As described above, the inverter 500 generates an output waveform having multiple distinct voltage levels (e.g., three levels, five levels, seven levels, etc.). FIG. 7 illustrates a plot 700 of an example multi-level voltage waveform 702. The y-axis 704 represents the voltage level of the waveform and the x-axis 706 represents time (e.g., in μs). In one example, the waveform 702 includes five distinct voltage levels. The voltage levels may correspond to the input voltage Vdc to the inverter. For example, the waveform 702 has a first voltage level at −Vdc (e.g. −800V), a second voltage level at −Vdc/2 (e.g., −400V), a third voltage level at 0V, a fourth voltage level at +Vdc/2 (e.g., 400V), and a fifth voltage level at +Vdc (e.g., 800V).

As shown, the waveform 702 is symmetrical about the y-axis 704. In this context, "symmetrical" refers to the duration (or width) of each voltage step. For example, at time t1, the waveform 702 is symmetric about a first reference line 708a that is parallel to the y-axis 704. Prior to time t1, the waveform 702 steps down with a first step at +Vdc, a second step at +Vdc/2, a third step at −Vdc/2, and a fourth step at −Vdc. After time t1, the waveform 702 steps back up in the reverse order with a first step at −Vdc, a second step at −Vdc/2, a third step at +Vdc/2, and a fourth step at +Vdc. The durations of the steps at each voltage level are substantially the same when stepping up or down. For example, the voltage step on the way down at −Vdc/2 has a first duration ts1 that is substantially equal to a second duration ts2 of the voltage step at −Vdc/2 on the way up. The waveform 702 maintains this symmetric configuration over time. For example, at time t2, the waveform 702 is symmetric about a second reference line 708b that is parallel to the y-axis 704. At time t3, the waveform 702 is symmetric about a third reference line 708c that is parallel to the y-axis 704, and so on. In some examples, the step duration is substantially the same for each voltage level. For example, the first and second durations ts1, ts2 for the voltage steps at −Vdc/2 may be substantially equal to a third duration ts3 for the voltage steps at +Vdc/2, and so on.

The inverter 500 may be controlled using conventional switching sequences to generate symmetrical waveforms (e.g., the waveform 702 of FIG. 7). For example, such switching sequences may include conventional pulse width modulation (PWM) techniques. Operating the inverters to generate symmetrical waveforms may enable simplified implementations for DC to AC power conversion. However, the symmetrical waveform 702 does not account for zero-voltage switching (ZVS) of the inverter switches. Because of this, the inverter 500 operates with reduced efficiency when controlled to generate the symmetrical waveform 702. This reduction in efficiency can provide undesirable performance for wireless power transmission. As such, it is desirable to control the inverter to generate a waveform that is optimized for wireless power transmission.

Figure 8:
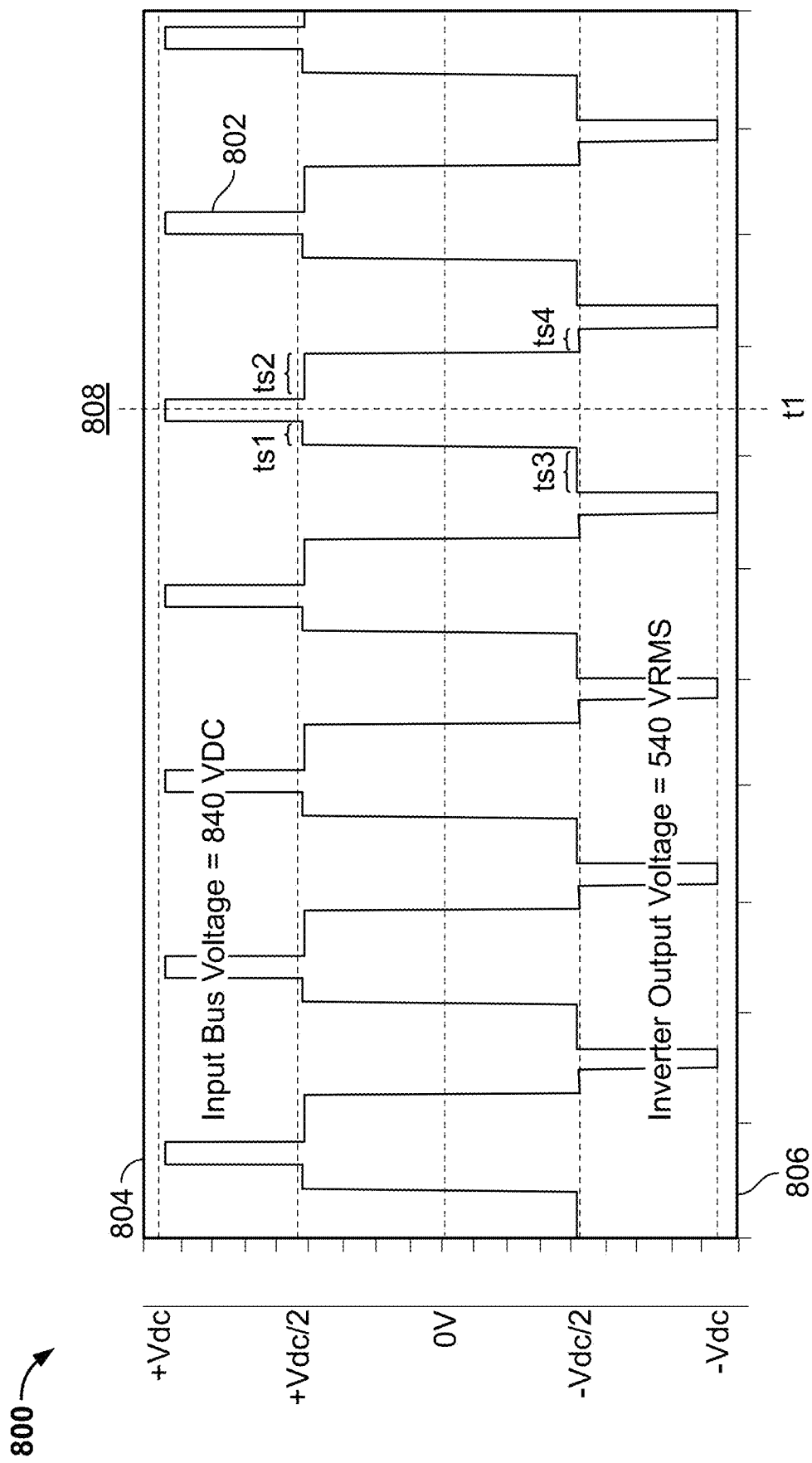
FIG. 8 a plot illustrating an asymmetrical, multi-level voltage waveform in accordance with at least one embodiment described herein.

FIG. 8 illustrates a graph 800 of a multi-level voltage waveform 802 having an asymmetrical implementation that is configured for wireless power transmission. The waveform is generated with a particular switching time that guarantees that the inverter switches are not hard-switched. The multi-level voltage waveform 802 allows the inverter of the transmitter (e.g., inverter 500) to operate with an extended operating range. The extended operating range supports various load states that dynamically change as a function of battery voltage (e.g., the load 120 in FIG. 1) and coupling strength (e.g., the alignment of coils 112, 114 in FIG. 1).

In FIG. 8, the y-axis 804 represents the voltage level of the waveform and the x-axis 806 represents time (e.g., in μs). In one example, the waveform 802 includes five distinct voltage levels. The voltage levels may correspond to the input voltage Vdc to the inverter (e.g., inverter 500). For example, the waveform 802 has a first voltage level at −Vdc (e.g. −840V), a second voltage level at −Vdc/2 (e.g., −420V), a third voltage level at 0V, a fourth voltage level at +Vdc/2 (e.g., 420V), and a fifth voltage level at +Vdc/2 (e.g., 840V). While the illustrated waveform includes five distinct voltages levels, it should appreciated that asymmetrical waveforms may have a different number of voltage levels. For example, a waveform may have a first voltage level at −Vdc/2 (e.g., −420V), a second voltage level at 0V, and a third voltage level at +Vdc/2 (e.g., 420V). In another example, a waveform may have a first voltage level at −Vdc (e.g. −840V), a second voltage level at −Vdc/2 (e.g., −420V), a third voltage level at +Vdc/2 (e.g., 420V), and a fourth voltage level at +Vdc (e.g., 840V). The number of voltage levels included in the waveform may change as a function of the load state (e.g., based on battery voltage and coupling strength).

As shown, the waveform 802 is asymmetrical about the y-axis 804. In this context, "asymmetrical" refers to the duration of each voltage step. For example, at time t1, the waveform 802 is asymmetric about a reference line 808 that is parallel to the y-axis 804. Prior to time t1, the waveform 802 steps up with a first step at −Vdc, a second step at −Vdc/2, a third step at 0V, a fourth step at +Vdc/2, and a fifth step at +Vdc. After time t1, the waveform 802 steps back down in the reverse order with a first step at +Vdc, a second step at +Vdc/2, a third step at 0V, a fourth step at −Vdc/2, and a fifth step at −Vdc. In one example, the step duration at one or more of the voltage levels changes when stepping up and down. For example, the voltage step on the way up at +Vdc/2 has a first duration ts1 that is different (i.e., shorter or longer) than a second duration ts2 of the voltage step at +Vdc/2 on the way down. In some examples, the step durations may vary between voltage levels. For example, at least one of the first and second durations is ts1, ts2 for the voltage steps at +Vdc/2 may be different (i.e., shorter or longer) than a third duration ts3 for the voltage step at −Vdc/2. Similarly, at least one of the first, second, and third durations ts1, ts2, ts3 may be different (i.e., shorter or longer) than a fourth duration ts4 for the voltage step at −Vdc/2. In some examples, the waveform 802 maintains this asymmetric configuration over time.

It should be appreciated that the asymmetric configuration of the waveform may be dynamically updated over time. For example, the asymmetric configuration may change from cycle-to-cycle (or period-to-period) of the waveform 802. In some examples, the number of voltages level included in the waveform may be dynamically updated over time. For example, while the waveform 802 described above includes five distinct voltage levels, the waveform may be generated with two distinct voltage levels, three distinct voltage levels, four distinct voltage levels, six distinct voltage levels, and so on. In some examples, the number of voltage levels included in the waveform can change on a cycle-to-cycle (or period-to-period) basis. In one example, operating the inverters to generate asymmetrical waveforms allows ZVS of the inverter switches. As such, the efficiency of the inverter can be improved relative to the symmetrical waveform operation. In some examples, other performance characteristics of the inverter (e.g., bus balancing, switch loss balancing, etc.) are improved by operating the inverter to generate the asymmetrical waveform.

Switching Sequences for Multi-Level, Asymmetrical Voltage Waveforms

The inverter 500 can be controlled using a plurality of different switching sequences to generate asymmetrical waveforms (e.g., waveform 802 of FIG. 8). In some examples, an optimal switching sequence is selected from the plurality of switching sequences based on the inverter type and at least one desired performance characteristic of the inverter.

Figure 9:
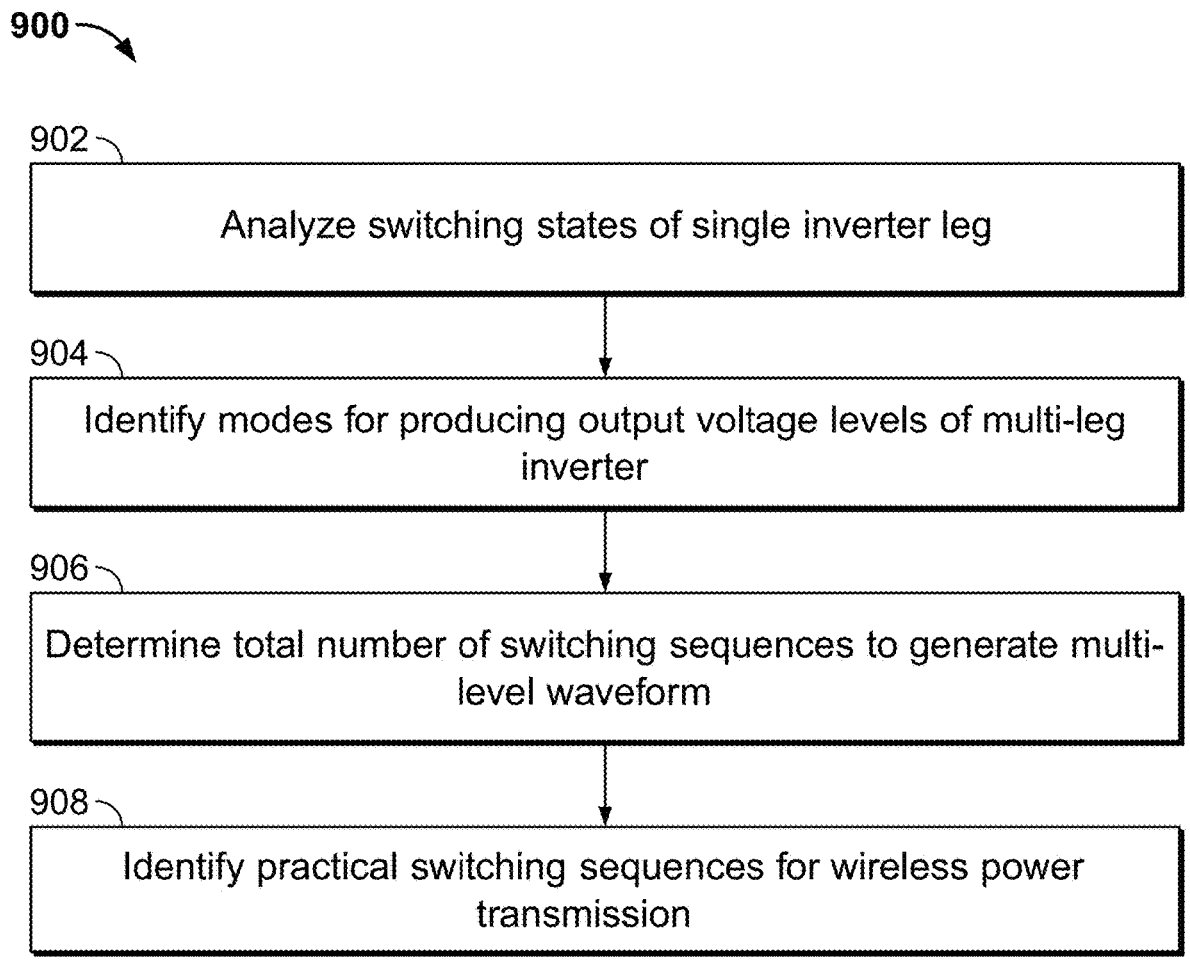
FIG. 9 is a flow diagram of a method for selecting a switching sequence to generate an asymmetrical waveform in accordance with at least one embodiment described herein.

FIG. 9 is a flow diagram of a method 900 for selecting a switching sequence to generate an asymmetrical waveform. In one example, the method 900 may be used for the inverter 500.

At block 902, the different switching states for each switching leg 504 of the inverter 500 are analyzed. In one example, the analysis includes all possible combinations of switches being turned on/off to produce a desired number of voltage levels (e.g., 0V, Vdc/2, Vdc, etc.) at the output 506 of the switching leg 504. In this context, "on" refers to a closed switch state and "off" refers to an open switch state. In some examples, the analysis is limited to include practical switching states. For example, the analysis of the switching leg 600 of FIG. 6A may only include combinations where two switches of the plurality of switches 604 are turned on at the same time (e.g., six different combinations). In certain examples, switching states can be eliminated from the analysis based on undesirable performance. For example, switching states that produce shoot-through conditions may be eliminated.

Figure 10A:
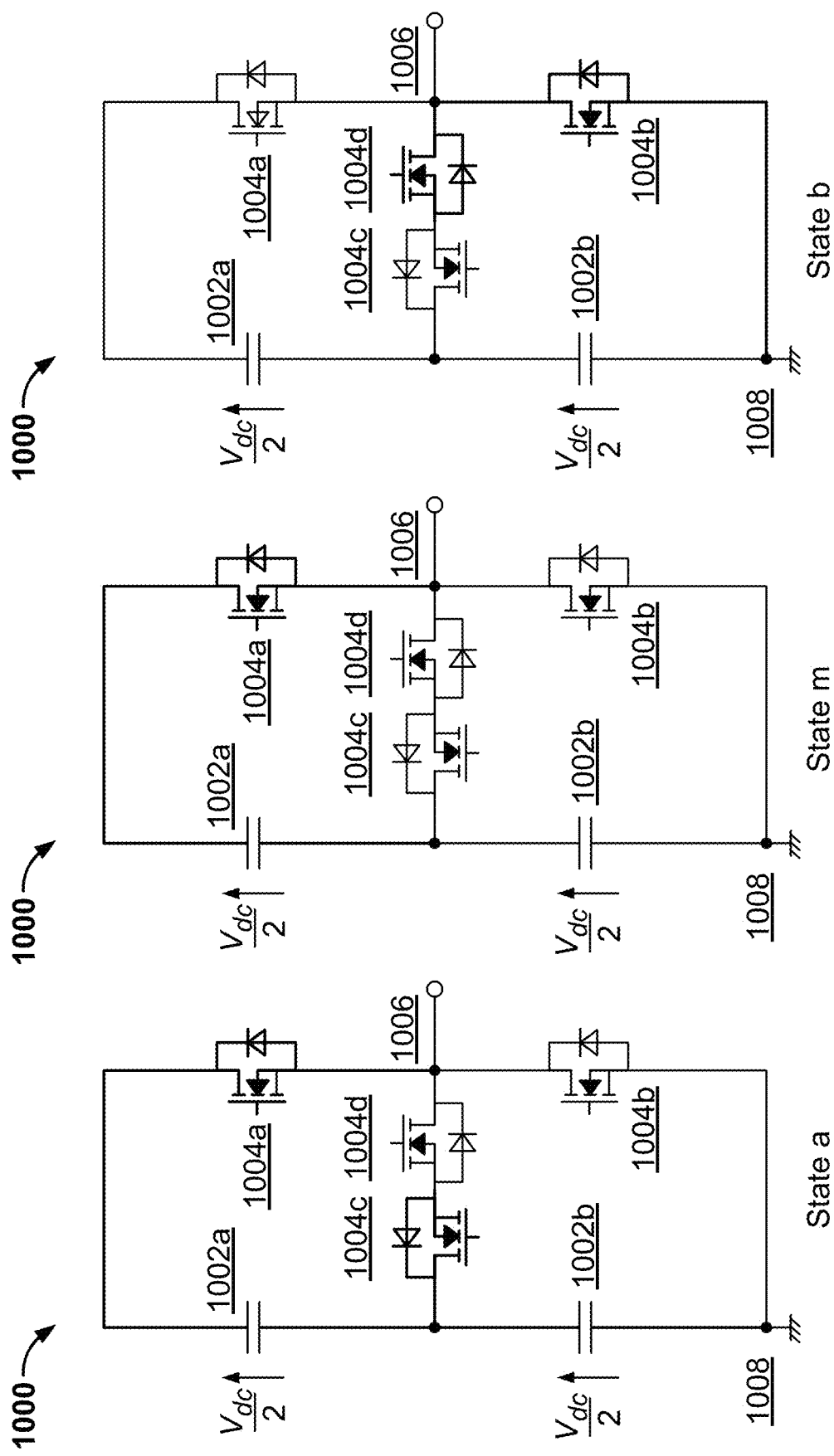
FIG. 10A is a diagram illustrating several switching leg states in accordance with at least one embodiment described herein.

FIG. 10A illustrates several switching states for an example switching leg 1000. In one example, the switching leg 1000 corresponds to a switching leg 504 of the inverter 500. The switching leg 1000 is a T-type switching leg. In some examples, the switching leg 1000 is substantially the same as the switching leg 600 of FIG. 6A, except the switching leg 1000 includes four switches rather than six switches. For example, the switching leg 1000 includes a first switch 1002a, a second switch 1002b, a third switch 1002c, and a fourth switch 1002d. In other examples, the switching leg 1000 may include a different number of switches (e.g., six, eight, etc.). The switches 1004 are coupled to a first capacitor 1002a and a second capacitor 1002b and operated to provide various bus voltages (e.g., Vdc, Vdc/2, 0V) to an output node 1006.

In one example, the switching states shown in FIG. 10A correspond to practical switching states identified by the analysis in block 902 for the switching leg 1000. As shown, the switching leg 1000 operates in a first state 'a' to provide 0V to the output node 1006. In state 'a', the second and fourth switches 1004b, 1004d are turned on (i.e., closed) to couple the output node 1006 to a neutral (or ground) connection 1008 such that 0V is provided to the output node 1006a. The switching leg 1000 operates in a second state 'm' to provide Vdc/2 to the output node 1006. In state 'm', the third and fourth switches 1004c, 1004d are turned on (i.e., closed) to couple the output node 1006 across the second capacitor 1002b. As such, half of the bus voltage Vdc/2 is provided to the output node 906 during state 'm'. The switching leg 1000 operates in a third state 'b' to provide Vdc to the output node 1006. In state 'b', the first and third switches 1004a, 1004c are turned on (i.e., closed) to couple the output node 1006 across the first and second capacitors 1002a, 1002b. As such, the full bus voltage Vdc is provided to the output node 1006 during state 'b'.

Returning to FIG. 9, at block 904, the resulting switching states are used to identify modes for producing the output voltage levels of the multi-leg inverter 500. In one example, the inverter 500 is configured as a five-level inverter having two switching legs (e.g., two instances of the switching leg 1000 of FIG. 10A). Each switching leg may be controlled independently such that the inverter 500 produces the five output voltage levels: −Vdc, −Vdc/2, 0V, Vdc/2, and Vdc (or Level 0: 0V, Level 1: |Vdc/2|, and Level 2: |Vdc|).

FIG. 10B is a table 1020 illustrating several example modes for the five-level, two-leg inverter configuration. In a first mode, both the first and second switching legs of the inverter operate in switching state 'a' to provide 0V. The voltage differential between the first switching leg and the second switching leg (e.g., 0V−0V) produces the Level 0 output voltage (i.e., 0V) in the first mode. Likewise, in a second mode both the first and second switching legs operate in switching state 'm' to provide Vdc/2. The voltage differential between the first switching leg and the second switching leg (e.g., Vdc/2−Vdc/2) produces the Level 0 output voltage 0V in the second mode. Given that the first and second switching legs provide voltages that cancel, the common mode voltage (e.g., noise) is reduced in the second mode. Similarly, in a third mode both the first and second switching legs operate in switching state 'b' to provide Vdc. The voltage differential between the first switching leg and the second switching leg (e.g., Vdc−Vdc) produces the Level 0 output voltage 0V in the third mode. As such, the two-leg inverter may have three different modes for producing the Level 0 output voltage 0V. As described above, undesired common mode voltages are reduced when operating the inverter in the second mode to produce the Level 0 output voltage 0V. The inverter may rotate between the three modes (e.g., periodically or dynamically) to minimize common mode voltages when generating the Level 0 output voltage. Likewise, given that power loss is distributed differently in each of the three modes, the inverter may be operated to distribute power loss (e.g., heat) amongst the switches. For example, the inverter may rotate between the three different modes to distribute power loss in a substantially equal manner across the switches of the inverter. Alternatively, the inverter may rotate between the three modes to concentrate power loss on one or more specific switches.

In in a fourth mode the first switching leg operates in switching state 'm' to provide Vdc/2 while the second switching leg operates in switching state 'a' to provide 0V. The voltage differential between the first switching leg and the second switching leg (e.g., Vdc/2−0V) produces the Level 1 output voltage +Vdc/2 in the fourth mode. Likewise, in a fifth mode the first switching leg operates in switching state 'a' to provide 0V while the second switching leg operates in switching state 'm' to provide Vdc/2. The voltage differential between the first switching leg and the second switching leg (e.g., 0V−Vdc/2) produces the Level 1 output voltage −Vdc/2 in the fifth mode. Similarly, in a sixth mode the first switching leg operates in switching state 'b' to provide Vdc while the second switching leg operates in switching state 'm' to provide Vdc/2. The voltage differential between the first switching leg and the second switching leg (e.g., Vdc−Vdc/2) produces the Level 1 output voltage +Vdc/2 in the sixth mode. In a seventh mode the first switching leg operates in switching state 'm' to provide Vdc/2 while the second switching leg operates in switching state 'b' to provide Vdc. The voltage differential between the first switching leg and the second switching leg (e.g., Vdc/2−Vdc) produces the Level 1 output voltage −Vdc/2 in the seventh mode. As such, the two-leg inverter may have four different modes for producing the Level 1 output voltage |Vdc/2|.

In an eighth mode the first switching leg operates in switching state 'b' to provide Vdc while the second switching leg operates in switching state 'a' to provide 0V. The voltage differential between the first switching leg and the second switching leg (e.g., Vdc−0V) produces the Level 2 output voltage +Vdc in the eighth mode. Likewise, in a ninth mode, the first switching leg operates in switching state 'a' to provide 0V while the second switching leg operates in switching state 'b' to provide Vdc. The voltage differential between the first switching leg and the second switching leg (e.g., 0V−Vdc) produces the Level 2 output voltage −Vdc in the ninth mode. As such, the two-leg inverter may have two different modes for producing the Level 2 output voltage |Vdc|.

Figure 10C:
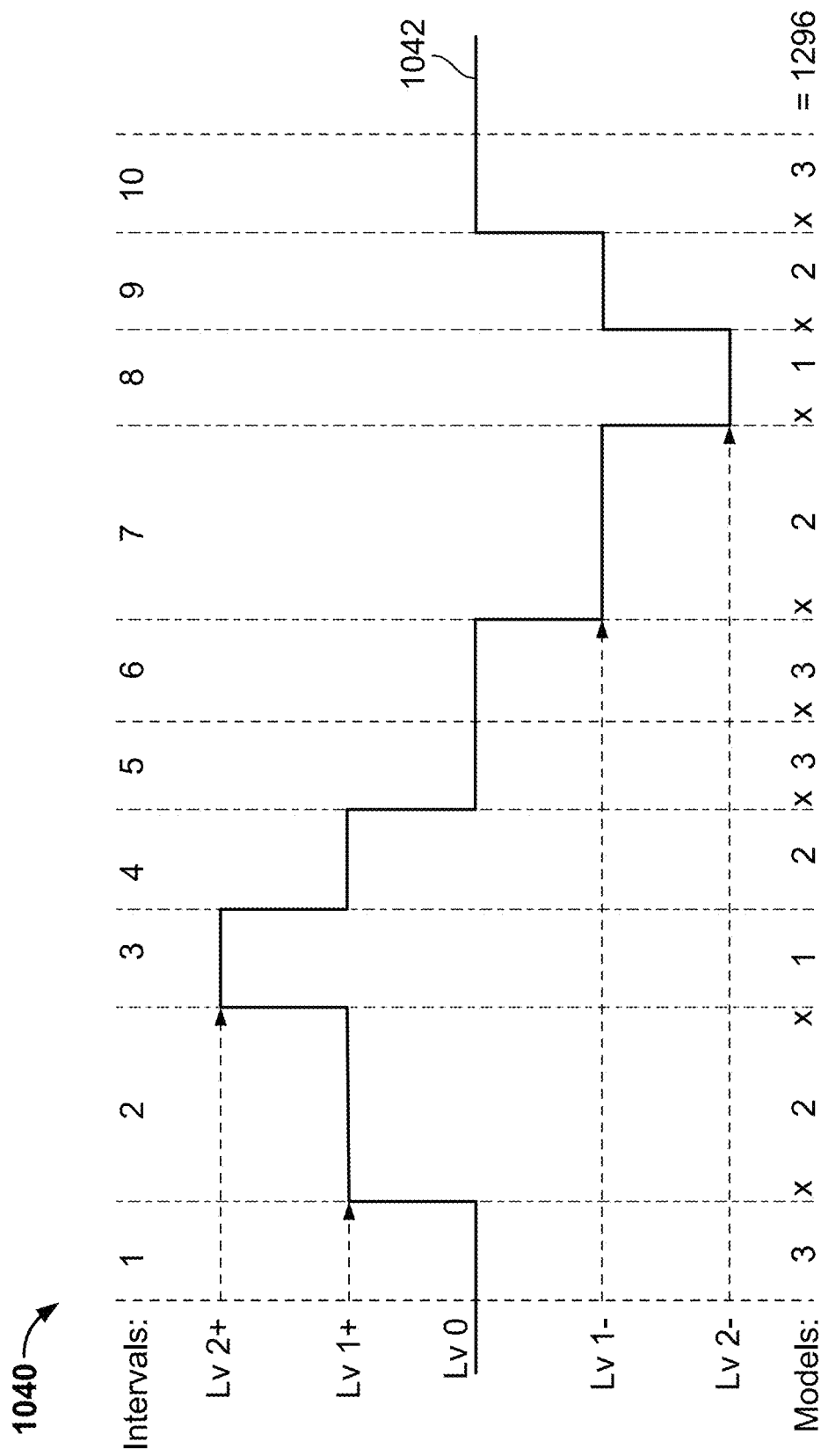
FIG. 10C is a plot of a multi-level voltage waveform in accordance with at least one embodiment described herein.

Returning to FIG. 9, at block 906, the total number of switching sequences for generating the multi-level waveform is determined. As shown in the plot 1040 of FIG. 10C, a multi-level voltage waveform 1042 is generated by operating the inverter to produce the Level 0 output voltage during a first interval, a Level 1 output voltage (e.g., +Vdc/2) during a second interval, a Level 2 output voltage (e.g., +Vdc) during a third interval, a Level 1 output voltage (e.g., +Vdc/2) during a fourth interval, and so on. As described above, the inverter may operate in different modes to produce the different output voltages. For example, the inverter may operate in one of three different modes (e.g., the first, second, or third mode) to produce the Level 0 output voltage 0V during the first interval, one of two different modes (e.g., the fourth or sixth mode) for producing the Level 1 output voltage +Vdc/2 during the second interval, one mode (e.g., the eighth mode) for producing the Level 2 output voltage +Vdc during the third interval, one of two different modes (e.g., the fourth or sixth mode) for producing the Level 1 output voltage +Vdc/2 during the fourth interval, and so on. As such, the inverter has many possible switching sequences for generating the multi-level waveform 1042. For example, the two-leg, five-level inverter configuration may have 1296 possible switching sequences for generating the waveform 1042.

Returning to FIG. 9, at block 908, the total number of switching sequences is filtered to identify switching sequences that enable the inverter to operate with desired performance for wireless power transmission. In one example, a switching sequence is determined as practical for wireless power transmission if the sequence enables one or more desired performance characteristic of the inverter. For example, such performance characteristics may include: turn-on ZVS, turn-off voltage clamping, top-level synchronization, DC link cap voltage balancing, single element switching, balanced loss distribution, or any combination thereof.

Turn-on ZVS refers to ZVS for each inverter switch at turn-on. In some examples, the turn-on ZVS performance characteristic may be optional for lighter load applications. In one example, ZVS is provided for a single switch being turned on during a switching event of the inverter (e.g., state change). In some examples, ZVS is provided for two or more switches being turned on simultaneously.

Turn-off voltage clamping refers to partial soft switching that is accomplished by clamping the switch voltage during turn-off to a lower level than the full bus voltage (i.e., Vdc). In some examples, the turn-off voltage clamping performance characteristic may be optional for max duty cycle applications, rollover conditions where ZVS is otherwise maintained, or low duty cycle applications.

Top-level synchronization refers to synchronization of the top-level voltage pulse (e.g., interval 3 in FIG. 10C) to an appropriate point on the inverter output current profile (e.g., approximately where the current crosses zero). This synchronization performance characteristic is described in greater detail below.

DC link cap voltage balancing refers to equally balancing the voltage of the capacitors of the split DC input bus (e.g., capacitors 602a, 602b of FIG. 6A) through intrinsically even use. In other words, the inverter switches may be operated such that substantially equal power is provided from each capacitor during one period of the switching sequence.

Single element switching refers to only a single switch being actively turned on at a given time during the switching sequence.

Balanced loss distribution refers to evenly balancing power dissipation among similar devices (e.g., the inverter switches). In some examples, the switching sequence may enable this performance characteristic of the inverter through periodic alternation (described in greater detail below).

In some examples, additional criteria may be used for selection of practical switching sequences. For example, switching sequences that use different switching modes to produce the Level 0 voltage in consecutive intervals (e.g., intervals 5 and 6 of FIG. 10C) may be eliminated from consideration. In addition, switching sequences where more than one pair of switches are switched between intervals may be eliminated from consideration. In other examples, additional criteria may be used for switching sequence selection.

While the examples above describe a five-level inverter having two switching legs, it should be appreciated that the method 900 may be used with different inverter configurations. For example, the method 900 may be used to identify switching sequences for three-level inverters, seven-level inverters, etc. Likewise, the method 900 may be used to identify switching sequences for single leg inverters, three leg inverters, etc.

Figure 11A:
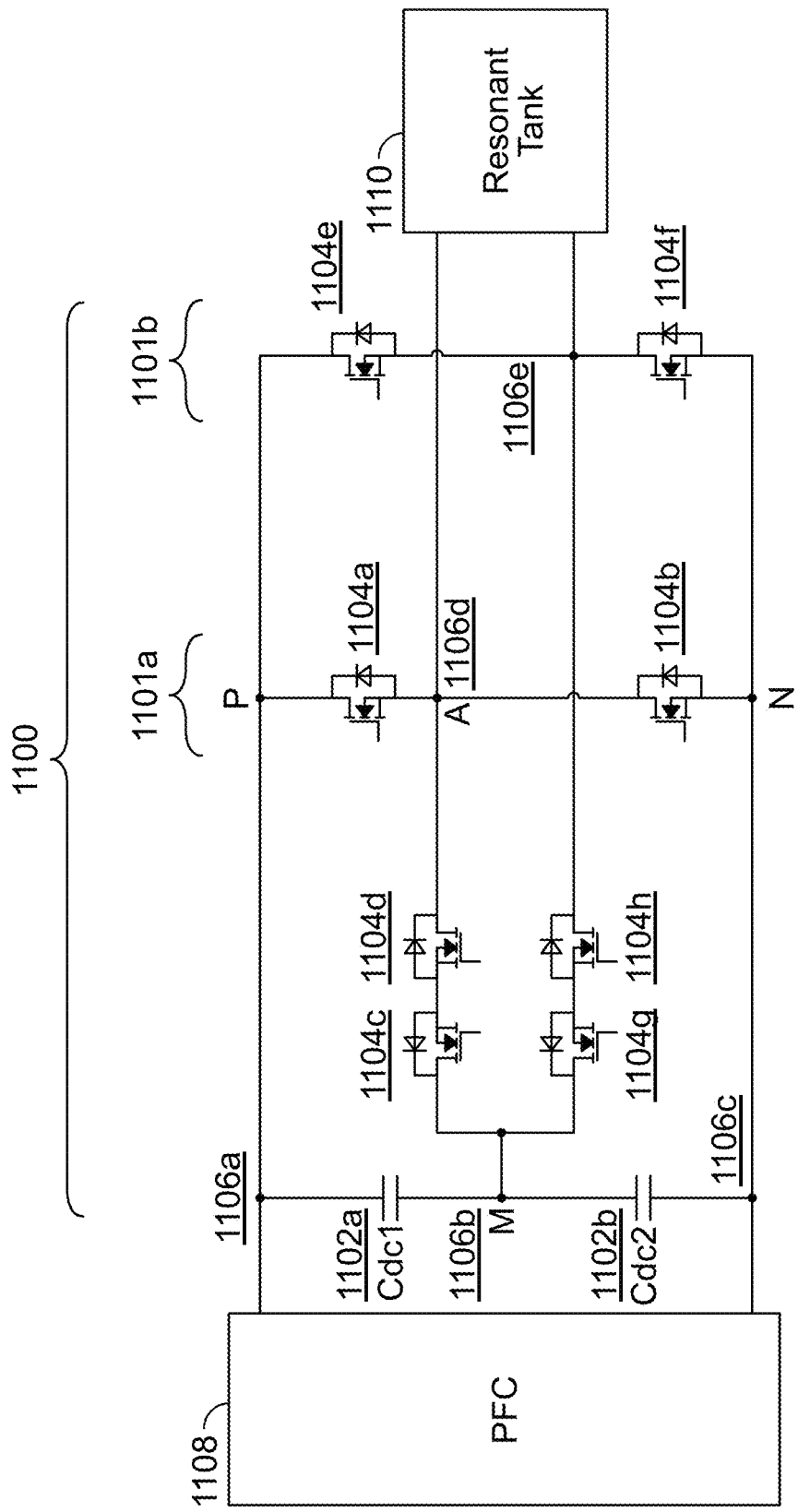
FIG. 11A is a schematic diagram of a multi-level inverter in accordance with at least one embodiment described herein.
Figure 11B:
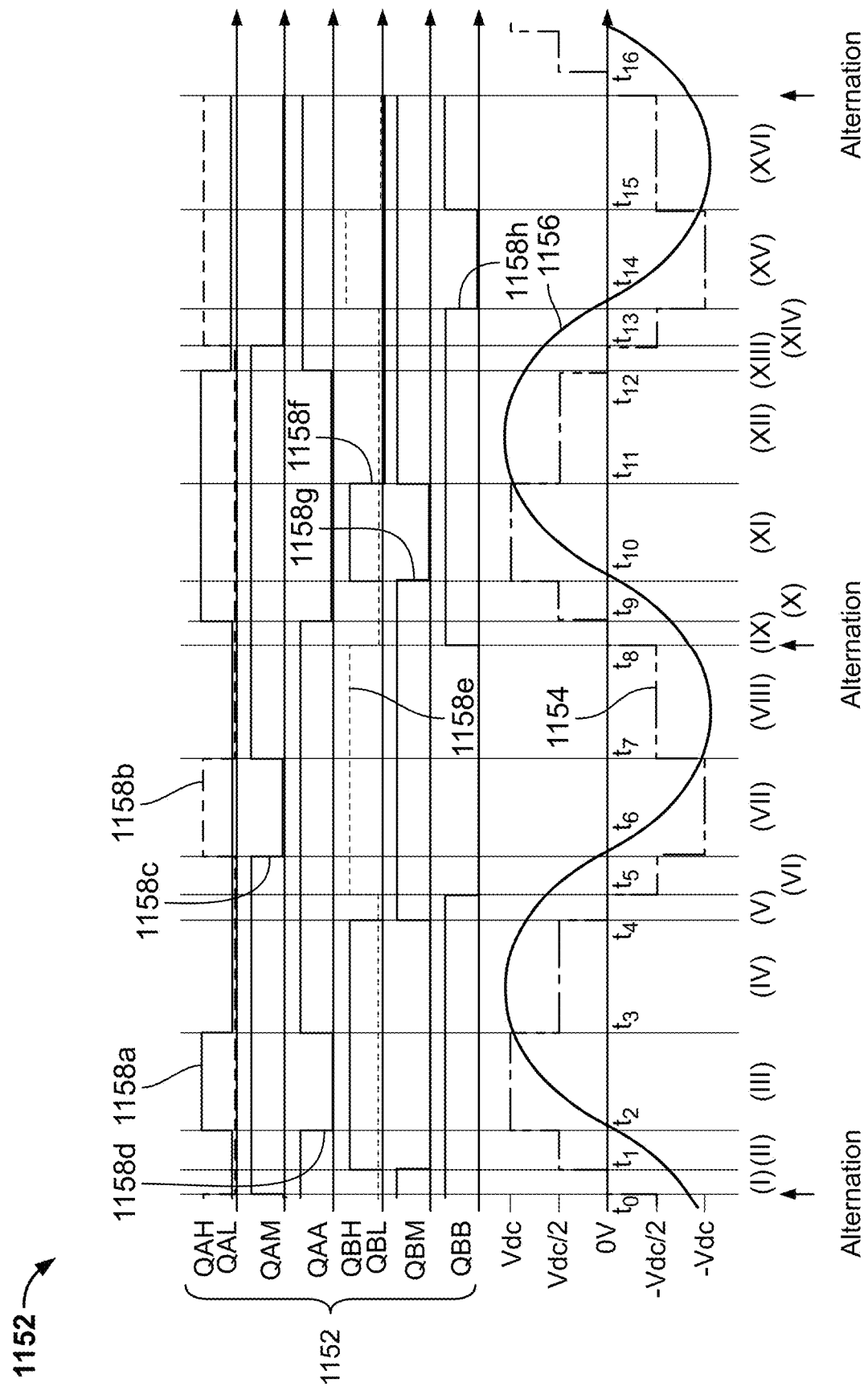
FIG. 11B is a plot illustrating a switching sequence for the multi-level inverter of FIG. 11A in accordance with at least one embodiment described herein.

FIG. 11A is a schematic diagram of a portion of a transmitter including a multi-level inverter 1100 and FIG. 11B is a plot 1150 including an example switching sequence 1152 for the multi-level inverter 1100. In one example, the inverter 1100 corresponds to the inverter 500 of FIG. 5. In some examples, the switching sequence 1152 corresponds to a switching sequence identified by the method 900 of FIG. 9 for wireless power transmission.

The multi-level inverter 1100 is a T-type inverter that includes a first switching leg 1101a and a second switching leg 1101b. In one example, each switching leg 1101a, 1101b is substantially the same as the switching leg 1000 of FIG. 10A. In other examples, the inverter 1100 may include a different number of switching legs (e.g., one, three, etc.) and/or a different number of switches per switching leg (e.g., six, eight, etc.).

As shown, the inverter 1100 includes a first capacitor 1102a, a second capacitor 1102b, and a plurality of switches 1104. The inverter 1100 includes a first node 1106a, a second node 1106b, a third node 1106c, a fourth node 1106d, and a fifth node 1106e. The first and third nodes 1106a, 1106c are inputs to the inverter 1100 and receive DC power (e.g., from a PFC circuit 1108). Likewise, the fourth and fifth nodes 1106d, 1106e are outputs of the inverter 1100 to provide AC power (e.g., to a resonant tank 1110). The second node 1106b is a mid-point connection. The resonant tank 1110 includes a resonator coil and impedance matching components. In some examples, the resonant tank 1110 corresponds to the transmitter resonator coils 410, 459 of FIGS. 4A, 4B.

The first capacitor 1102a is coupled between the first node 1106a and the second node 1106b. The second capacitor is coupled between the third node 1106c and the second node 1106b. An input voltage Vdc received at the first node 1106a and the third node 1106c is split across the capacitors 1102a, 1102b. For example, each capacitor 1102a, 1102b may store half of the input voltage Vdc (e.g., Vdc/2).

The plurality of switches 1104 includes a first switch 1104a, a second switch 1104b, a third switch 1104c, a fourth switch 1104d, a fifth switch 1104e, a sixth switch 1104f, a seventh switch 1104g, and an eighth switch 1104h. In one example, the first switching leg 1101a includes the first switch 1104a, the second switch 1104b, the third switch 1104c, and the fourth switch 1104d. The second switching leg 1101b includes the fifth switch 1104e, the sixth switch 1104f, the seventh switch 1104g, and the eighth switch 1104h.

The drain of the first switch 1104a is coupled to the first node 1106a and the source of the first switch 1104a is coupled to the fourth node 1104d. The drain of the second switch 1104b is coupled to the fourth node 1104d and the source of the second switch 1104b is coupled to the third node 1106c. The third and fourth switches 1104c, 1104d are coupled in series between the second node 1106b and the fourth node 1106d. The drain of the third switch 1104c is coupled to the second node 1106b, the source of the third switch 1104c is coupled to the source of the fourth switch 1104d, and the drain of the fourth switch 1104d is coupled to the fourth node 1106d. The drain of the fifth switch 1104e is coupled to the first node 1106a and the source of the fifth switch 1104e is coupled to the fifth node 1106e. The drain of the sixth switch 1104f is coupled to the fifth node 1106e and the source of the sixth switch 1104f is coupled to the third node 1106c. The seventh and eighth switches 1104g, 1104h are coupled in series between the second node 1106b and the fifth node 1106e. The drain of the seventh switch 1104g is coupled to the second node 1106b, the source of the seventh switch 1104g is coupled to the source of the eighth switch 1104h, and the drain of the eighth switch 1104h is coupled to the fifth node 1106e.

The plurality of switches 1104 convert the input DC power (or input voltage Vdc) received at the first and third nodes 1106a, 1106c into the output AC power (or output voltage Vac) provided at the fourth and fifth nodes 1106d, 1106e. In some examples, the plurality of switches 1104 are operated via the switching sequence 1152 of FIG. 11B to generate an asymmetrical multi-level waveform. As shown in FIG. 11B, the switching sequence 1152 includes a plurality of control signals 1158. In one example, each control signal of the plurality of control signals 1158a-h corresponds to a switch of the plurality of switches 1104a-h. For example, a first control signal 1158a corresponds to the first switch 1104a, a second control signal 1158b corresponds to the second switch 1104b, and so forth. In one example, each control signal is a gate drive signal provided to the gate of each switch 1104. In some examples, when the control signal is high ('1') the switch is turned on (or closed) and when the control signal is low ('0') the switch is turned off (or opened). In other examples, the switches may be configured to operate differently (e.g., active low switches).

The plurality of switches 1104 are operated in accordance with the switching sequence 1152 to generate an asymmetrical, multi-level voltage waveform 1154. The voltage waveform 1154 produces a corresponding current 1156 having a sinusoidal (or substantially sinusoidal) waveform. As shown in FIG. 11B, plurality of switches 1104 are operated such that the inverter 1100 provides different output voltages (e.g., Level 0, Level 1, and Level 2 voltages) during different intervals of time (labeled as (I), (II), etc.). For example, during interval (I), the switching sequence 1152 operates the inverter 1100 to provide the Level 0 output voltage 0V. During interval (II), the switching sequence 1152 operates the inverter 1100 to provide the Level 1 output voltage +Vdc/2, and so on. In one example, the switching sequence 1152 is configured to enable one or more performance characteristics of the inverter 1100, as described above with respect to the method 900 of FIG. 9. As such, the switching sequence 1152 may operate the inverter 1100 to provide: turn-on ZVS, turn-off voltage clamping, top-level synchronization, DC link cap voltage balancing, single element switching, balanced loss distribution, or any combination thereof.

FIGS. 12A-12G illustrate various states of the inverter 1100 while being operated by the switching sequence 1152 to generate the asymmetrical, multi-level voltage waveform 1154.

Figure 12A:
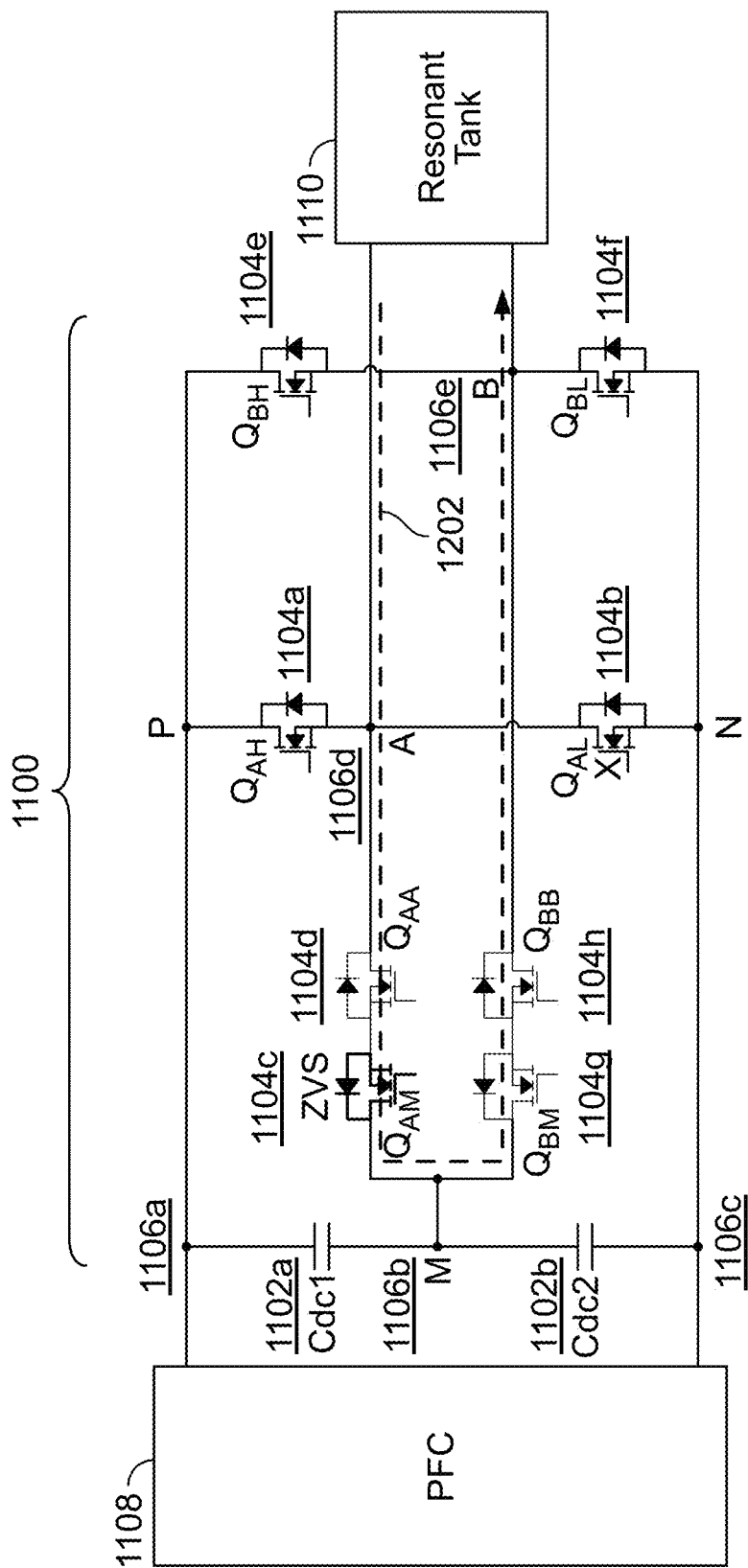
FIGS. 12A-12G are schematic diagrams illustrating the operation of the multi-level inverter of FIG. 11A in accordance with at least one embodiment described herein.

FIG. 12A corresponds to operation of the inverter 1100 during a first interval (I) (i.e., time $t_0$ to time $t_1$). In one example, the switching sequence 1152 controls the inverter 1100 to operate in the second mode shown in table 1020 of FIG. 10B during the first interval (I). As such, both the first and second switching legs 1101a, 1101b operate in switching state 'm'. As shown in FIG. 11B, at time $t_0$, the third control signal 1158c is driven high to turn on the third switch 1104c with ZVS. The second control signal 1158b is driven low to turn off the second switch 1104b. The fourth switch 1104d, the seventh switch 1104g, and the eighth switch 1104h operate in a static on state during the first interval (I). Likewise, the first switch 1104a, the fifth switch 1104e, and the sixth switch 1104f operate in a static off state during the first interval (I).

Returning to FIG. 12A, a first commutation path 1202 is provided through the "on" switches 1104c, 1104d, 1104g, and 1104h. Current is received at the fourth node 1106d from the resonant tank 1110. The first commutation path 1202 directs the current to the fifth node 1106e where it is returned to the resonant tank 1110. The switches 1104c, 1104d of the first switching leg 1101a are configured to clamp the fourth node 1106d to the second node 1106b to provide a voltage level of Vdc/2 at the fourth node 1106d. Likewise, the switches 1104g, 1104h of the second switching leg 1101b are configured to clamp the fifth node 1106e to the second node 1106b to provide a voltage level of Vdc/2 at the fifth node 1106e. As such, the voltage differential between the fourth node 1106d and the fifth node 1106e (e.g., Vdc/2−Vdc/2) provides the Level 0 output voltage 0V across the resonant tank 1110.

Figure 12B:
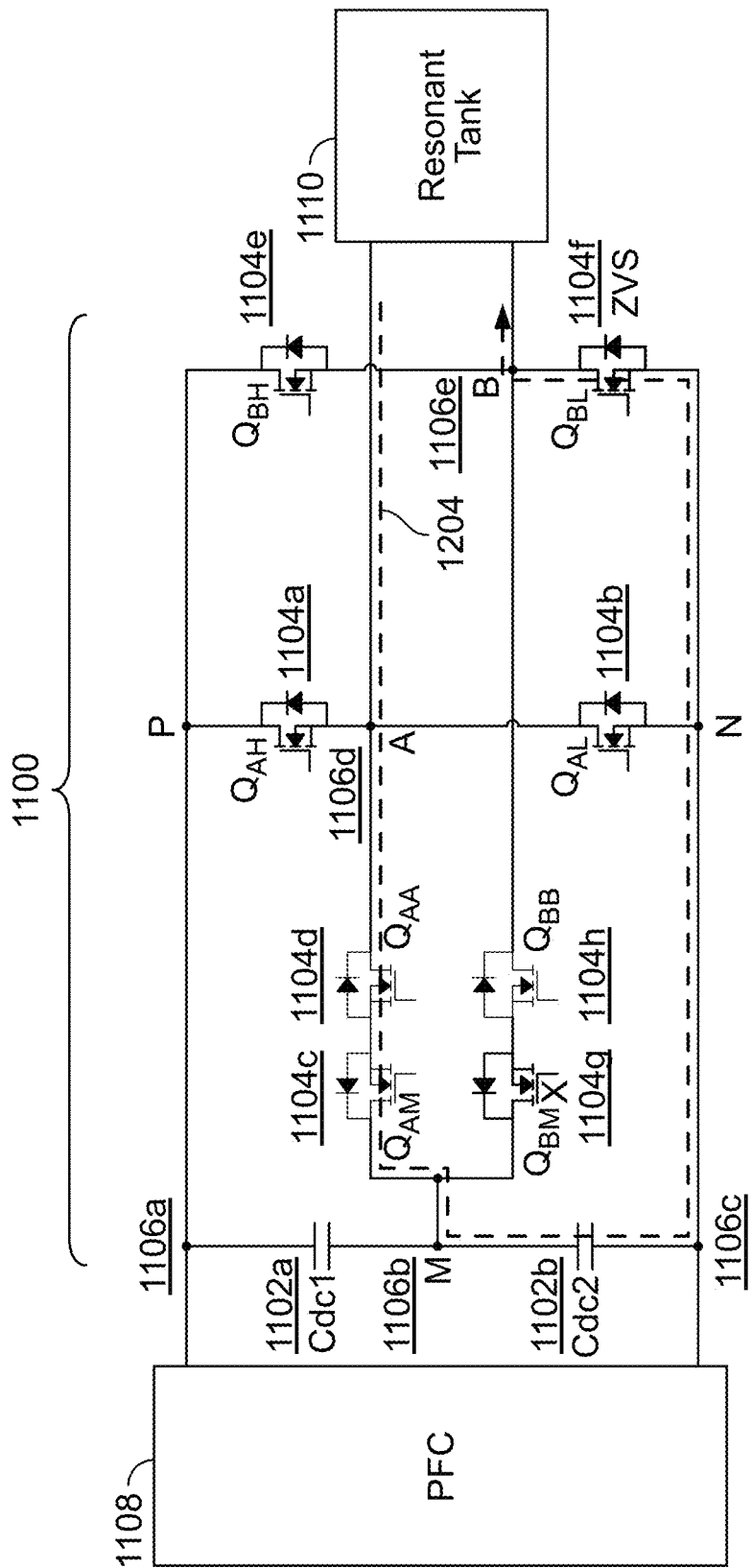

FIG. 12B corresponds to operation of the inverter 1100 during a second interval (II) (i.e., time $t_1$ to time $t_2$). In one example, the switching sequence 1152 controls the inverter 1100 to operate in the fourth mode shown in table 1020 of FIG. 10B during the second interval (II). As such, the first switching leg 1101a operates in switching state 'm' and the second switching leg 1101b operates in switching state 'a'. As shown in FIG. 11B, at time $t_1$, the sixth control signal 1158f is driven high to turn on the sixth switch 1104f with ZVS. The seventh control signal 1158g is driven low to turn off the seventh switch 1104g. The third switch 1104c, the fourth switch 1104d, and the eighth switch 1104h operate in a static on state during the second interval (II). Likewise, the first switch 1104a, the second switch 1104b, and the fifth switch 1104e operate in a static off state during the second interval (II).

Returning to FIG. 12B, a second commutation path 1204 is provided through the "on" switches 1104c, 1104d, and 1104f. Current is received at the fourth node 1106d from the resonant tank 1110. The second commutation path 1204 directs the current to the fifth node 1106e where it is returned to the resonant tank 1110. The switches 1104c, 1104d of the first switching leg 1101a are configured to couple the fourth node 1106d to the second node 1106b. Likewise, the switch 1104f of the second switching leg 1101b is configured to couple the fifth node 1106e to the third node 1106c. As such, the resonant tank 1110 is coupled across the second capacitor 1102b. The voltage level at the fourth node 1106d is Vdc/2 and the voltage level at the fifth node 1106e is 0V. Given that the second commutation path 1204 directs current from the fourth node 1106d to the fifth node 1106e, the voltage differential between the fourth node 1106d and the fifth node 1106e (e.g., Vdc/2−0V) provides the Level 1 output voltage +Vdc/2 across the resonant tank 1110.

Figure 12C:
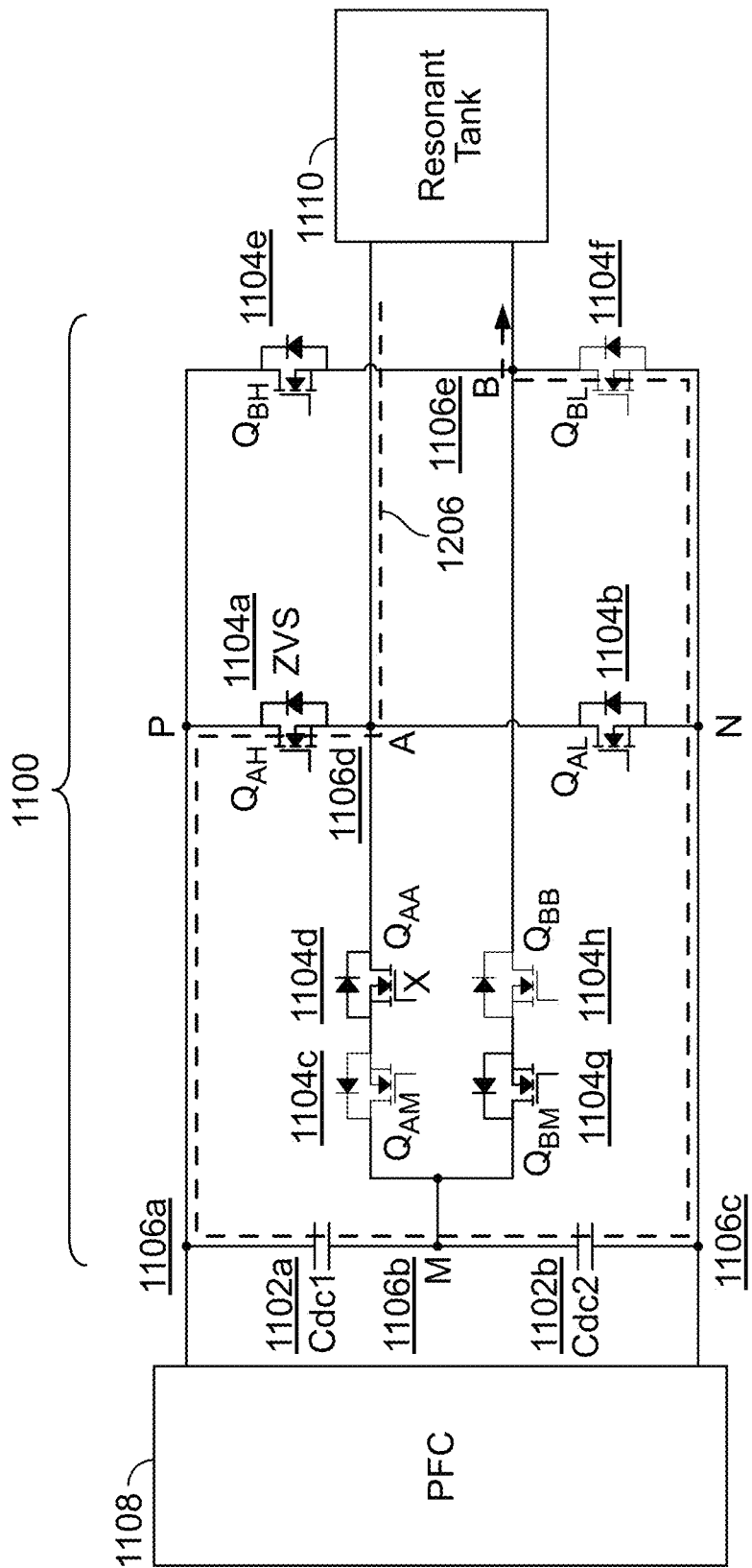

FIG. 12C corresponds to operation of the inverter 1100 during a third interval (III) (i.e., time $t_2$ to time $t_3$). As shown in FIG. 11B, the inverter current crosses zero during the third interval (III) from negative to positive (e.g., changes direction). In one example, the switching sequence 1152 controls the inverter 1100 to operate in the eighth mode shown in table 1020 of FIG. 10B during the third interval (III). As such, the first switching leg 1101a operates in switching state 'b' and the second switching leg 1101b operates in switching state 'a'. As shown in FIG. 11B, at time $t_2$, the first control signal 1158a is driven high to turn on the first switch 1104a with ZVS. The fourth control signal 1158d is driven low to turn off the fourth switch 1104d. The third switch 1104c, the sixth switch 1104f, and the eighth switch 1104h operate in a static on state during the third interval (III). Likewise, the second switch 1104b, the fifth switch 1104e, and the seventh switch 1104g operate in a static off state during the third interval (III).

Returning to FIG. 12C, a third commutation path 1206 is provided through the "on" switches 1104a and 1104f. Current is received at the fourth node 1106d from the resonant tank 1110. The third commutation path 1206 directs the current to the fifth node 1106e where it is returned to the resonant tank 1110. The switch 1104a of the first switching leg 1101a is configured to couple the fourth node 1106d to the first node 1106a. Likewise, the switch 1104f of the second switching leg 1101b is configured to couple the fifth node 1106e to the third node 1106c. As such, the resonant tank 1110 is coupled across the first capacitor 1102a and the second capacitor 1102b. The voltage level at the fourth node 1106d is Vdc and the voltage level at the fifth node 1106e is 0V. Given that the third commutation path 1206 directs current from the fourth node 1106d to the fifth node 1106e, the voltage differential between the fourth node 1106d and the fifth node 1106e (e.g., Vdc−0V) provides the Level 2 output voltage +Vdc across the resonant tank 1110.

Figure 12D:
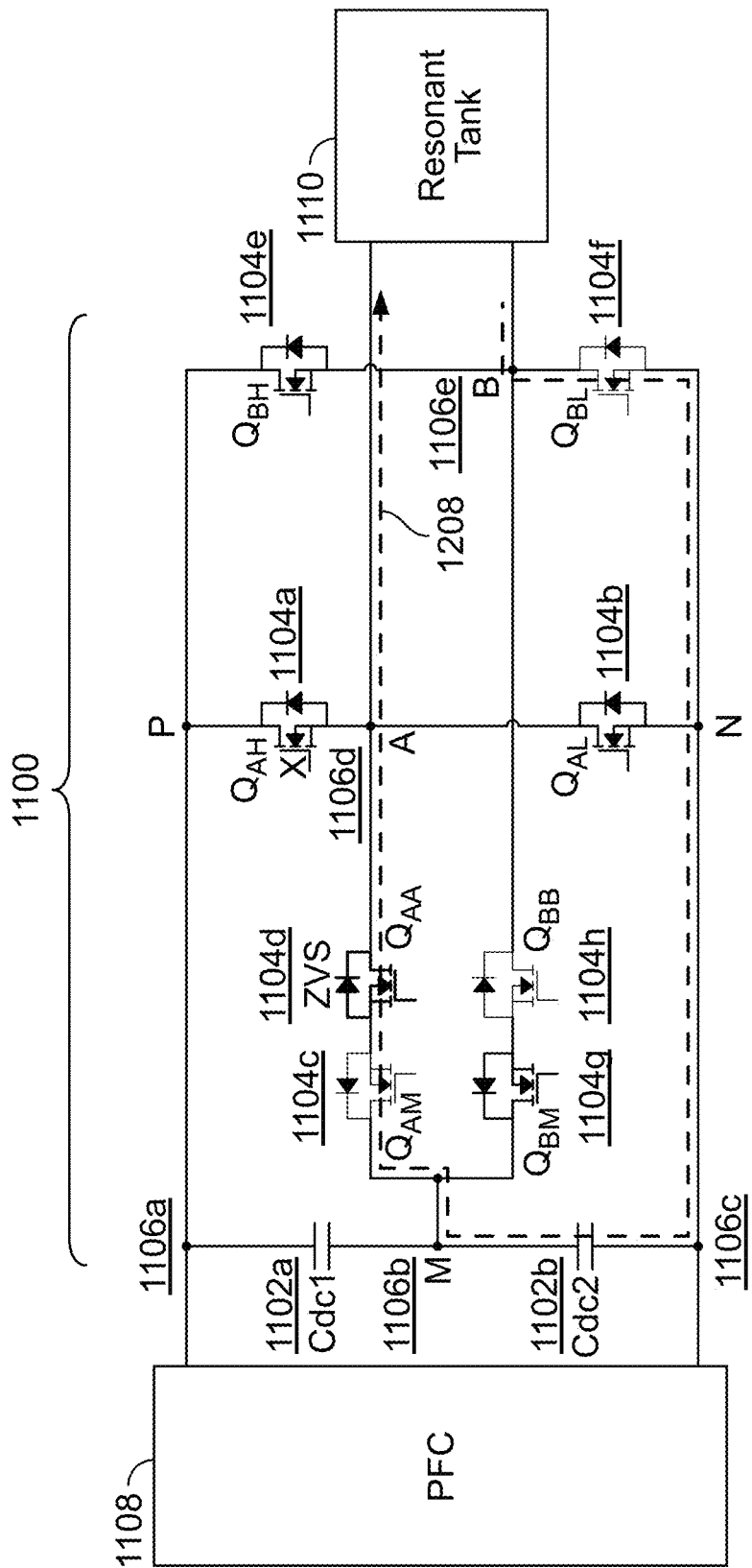

FIG. 12D corresponds to operation of the inverter 1100 during a fourth interval (IV) (i.e., time $t_3$ to time $t_4$). In one example, the switching sequence 1152 controls the inverter 1100 to operate in the fourth mode shown in table 1020 of FIG. 10B during the fourth interval (IV). As such, the first switching leg 1101a operates in switching state 'm' and the second switching leg 1101b operates in switching state 'a'. As shown in FIG. 11B, at time $t_3$, the fourth control signal 1158d is driven high to turn on the fourth switch 1104d with ZVS. The first control signal 1158a is driven low to turn off the first switch 1104a. The third switch 1104c, the sixth switch 1104f, and the eighth switch 1104h operate in a static on state during the fourth interval (IV). Likewise, the second switch 1104b, the fifth switch 1104e, and the seventh switch 1104g operate in a static off state during the fourth interval (IV).

Returning to FIG. 12D, a fourth commutation path 1208 is provided through the "on" switches 1104c, 1104d, and 1104f. Current is received at the fifth node 1106e from the resonant tank 1110. The fourth commutation path 1208 directs the current to the fourth node 1106*d* where it is returned to the resonant tank 1110 (e.g., now in the reverse direction). The switches 1104*c*, 1104*d* of the first switching leg 1101*a* are configured to couple the fourth node 1106*d* to the second node 1106*b*. Likewise, the switch 1104*f* of the second switching leg 1101*b* is configured to couple the fifth node 1106*e* to the third node 1106*c*. As such, the resonant tank 1110 is coupled across the second capacitor 1102*b*. The voltage level at the fourth node 1106*d* is Vdc/2 and the voltage level at the fifth node 1106*e* is 0V. Given that the fourth commutation path 1208 directs current from the fifth node 1106*e* to the fourth node 1104*d*, the voltage differential between the fourth node 1106*d* and the fifth node 1106*e* (e.g., Vdc/2−0V) provides the Level 1 output voltage +Vdc/2 across the resonant tank 1110.

Figure 12E:
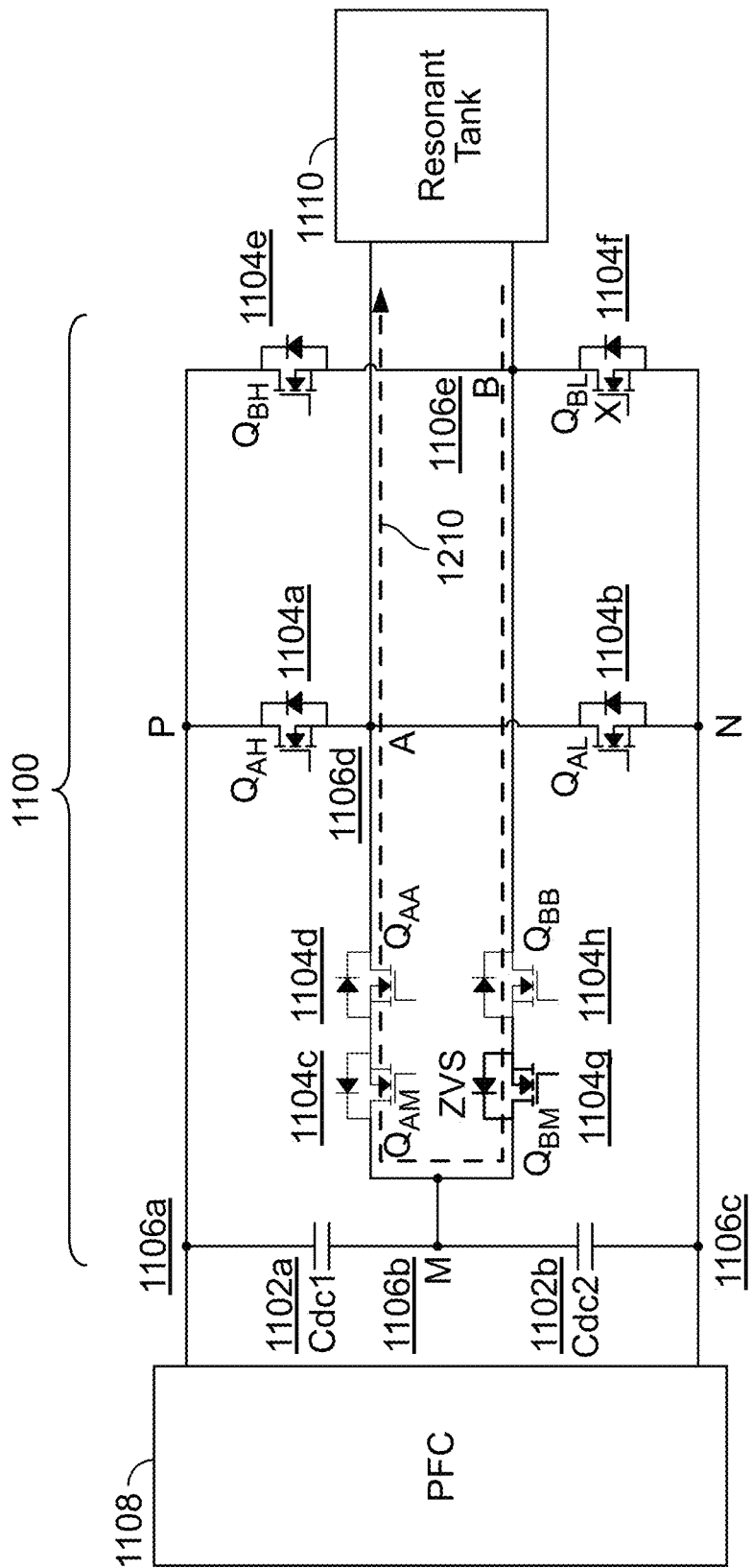

FIG. 12E corresponds to operation of the inverter 1100 during a fifth interval (V) (i.e., time $t_4$ to time $t_5$). In one example, the switching sequence 1152 controls the inverter 1100 to operate in the second mode shown in table 1020 of FIG. 10B during the fifth interval (V). As such, both the first and second switching legs 1101*a* operate in switching state 'm'. As shown in FIG. 11B, at time $t_4$, the seventh control signal 1158*g* is driven high to turn on the seventh switch 1104*g* with ZVS. The sixth control signal 1158*f* is driven low to turn off the sixth switch 1104*f*. The third switch 1104*c*, the fourth switch 1104*d*, and the eighth switch 1104*h* operate in a static on state during the fifth interval (V). Likewise, the first switch 1104*a*, the second switch 1104*b*, and the fifth switch 1104*e* operate in a static off state during the fifth interval (V).

Returning to FIG. 12E, a fifth commutation path 1210 is provided through the "on" switches 1104*c*, 1104*d*, 1104*g*, and 1104*h*. Current is received at the fifth node 1106*e* from the resonant tank 1110. The fifth commutation path 1210 directs the current to the fourth node 1106*d* where it is returned to the resonant tank 1110. The switches 1104*c*, 1104*d* of the first switching leg 1101*a* are configured to clamp the fourth node 1106*d* to the second node 1106*b* to provide a voltage level of Vdc/2 at the fourth node 1106*d*. Likewise, the switches 1104*g*, 1104*h* of the second switching leg 1101*b* are configured to clamp the fifth node 1106*e* to the second node 1106*b* to provide a voltage level of Vdc/2 at the fifth node 1106*e*. As such, the voltage differential between the fourth node 1106*d* and the fifth node 1106*e* (e.g., Vdc/2−Vdc/2) provides the Level 0 output voltage 0V across the resonant tank 1110.

Figure 12F:
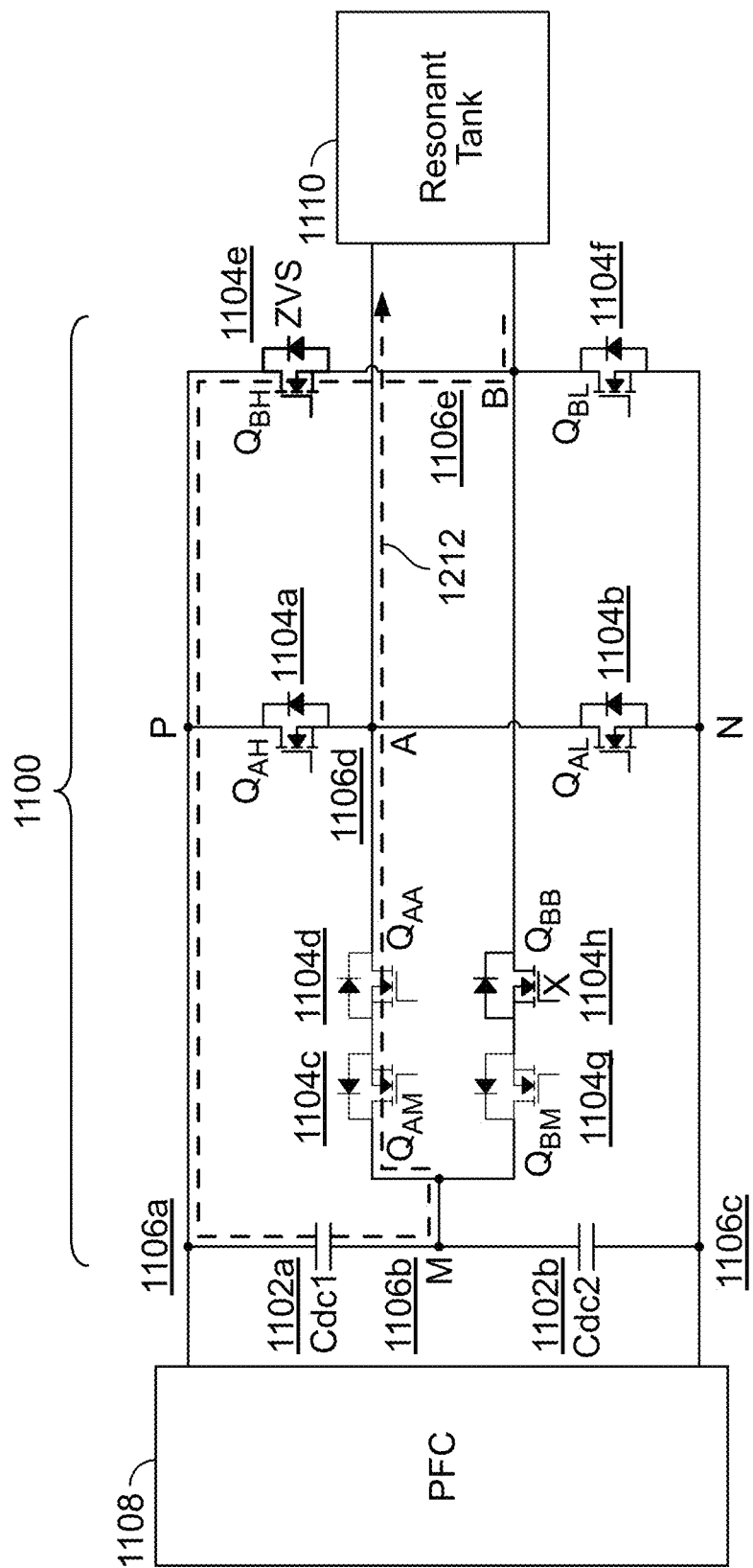

FIG. 12F corresponds to operation of the inverter 1100 during a sixth interval (VI) (i.e., time is $t_5$ time $t_6$). In one example, the switching sequence 1152 controls the inverter 1100 to operate in the seventh mode shown in table 1020 of FIG. 10B during the sixth interval (VI). As such, the first switching leg 1101*a* operates in switching state 'm' and the second switching leg 1101*b* operates in switching state 'b'. As shown in FIG. 11B, at time $t_5$, the fifth control signal 1158*e* is driven high to turn on the fifth switch 1104*e* with ZVS. The eighth control signal 1158*h* is driven low to turn off the eighth switch 1104*h*. The third switch 1104*c*, the fourth switch 1104*d*, and the seventh switch 1104*g* operate in a static on state during the sixth interval (VI). Likewise, the first switch 1104*a*, the second switch 1104*b*, and the sixth switch 1104*f* operate in a static off state during the sixth interval (VI).

Returning to FIG. 12F, a sixth commutation path 1212 is provided through the "on" switches 1104*c*, 1104*d*, and 1104*e*. Current is received at the fifth node 1106*e* from the resonant tank 1110. The sixth commutation path 1212 directs the current to the fourth node 1106*d* where it is returned to the resonant tank 1110. The switches 1104*c*, 1104*d* of the first switching leg 1101*a* are configured to couple the fourth node 1106*d* to the second node 1106*b*. Likewise, the switch 1104*e* of the second switching leg 1101*b* is configured to couple the fifth node 1106*e* to the first node 1106*a*. As such, the resonant tank 1110 is coupled across the first capacitor 1102*a*. The voltage level at the fourth node 1106*d* is Vdc/2 and the voltage level at the fifth node 1106*e* is Vdc. Given that the sixth commutation path 1212 directs current from the fifth node 1106*e* to the fourth node 1104*d*, the voltage differential between the fourth node 1106*d* and the fifth node 1106*e* (e.g., Vdc/2−Vdc) provides the Level 1 output voltage −Vdc/2 across the resonant tank 1110.

Figure 12G:
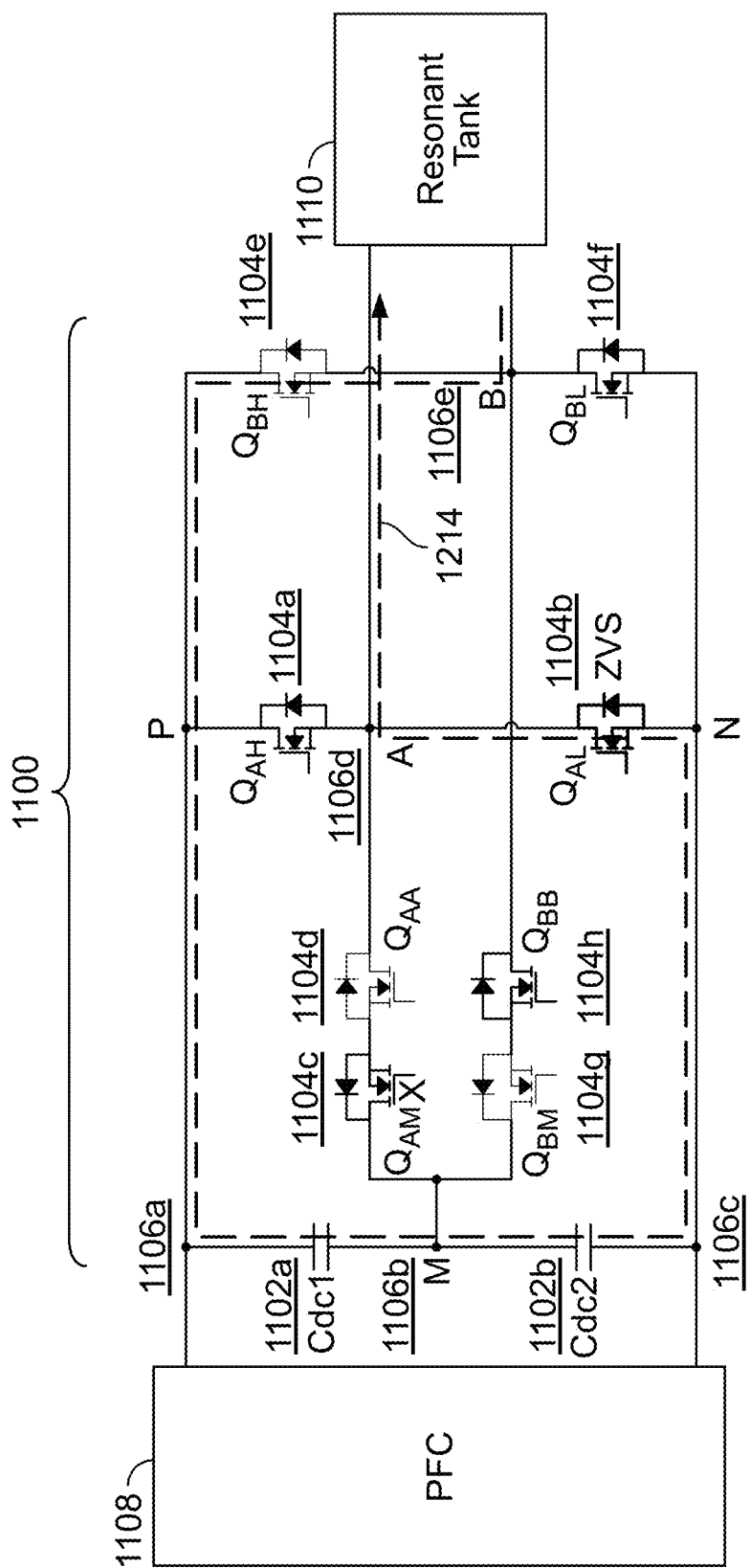

FIG. 12G corresponds to operation of the inverter 1100 during a seventh interval (VII) (i.e., time $t_6$ to time $t_7$). In one example, the switching sequence 1152 controls the inverter 1100 to operate in the ninth mode shown in table 1020 of FIG. 10B during the seventh interval (VII). As such, the first switching leg 1101*a* operates in switching state 'a' and the second switching leg 1101*b* operates in switching state 'b'. As shown in FIG. 11B, at time $t_6$, the second control signal 1158*b* is driven high to turn on the second switch 1104*b* with ZVS. The third control signal 1158*c* is driven low to turn off the third switch 1104*c*. The fourth switch 1104*d*, the fifth switch 1104*e*, and the seventh switch 1104*g* operate in a static on state during the seventh interval (VII). Likewise, the first switch 1104*a*, the sixth switch 1104*f*, and the eighth switch 1104*h* operate in a static off state during the seventh interval (VII).

Returning to FIG. 12G, a seventh commutation path 1214 is provided through the "on" switches 1104*b* and 1104*e*. Current is received at the fifth node 1106*e* from the resonant tank 1110. The seventh commutation path 1214 directs the current to the fourth node 1106*d* where it is returned to the resonant tank 1110. The switch 1104*b* of the first switching leg 1101*a* is configured to couple the fourth node 1106*d* to the third node 1106*c*. Likewise, the switch 1104*e* of the second switching leg 1101*b* is configured to couple the fifth node 1106*e* to the first node 1106*a*. As such, the resonant tank 1110 is coupled across the first capacitor 1102*a* and the second capacitor 1102*b*. The voltage level at the fourth node 1106*d* is 0V and the voltage level at the fifth node 1106*e* is Vdc. Given that the seventh commutation path 1214 directs current from the fifth node 1106*e* to the fourth node 1104*d*, the voltage differential between the fourth node 1106*d* and the fifth node 1106*e* (e.g., 0V−Vdc) provides the Level 2 output voltage −Vdc across the resonant tank 1110.

The switching sequence 1152 may continue to operate the inverter 1100 to generate the asymmetrical, multi-level voltage waveform 1154. In some examples, the inverter modes used to generate the various voltage levels of the waveform 1154 may change on a cycle-to-cycle (or period-to-period) basis. For example, during a first period of the waveform 1154 (e.g., time $t_0$ to time $t_8$) the switching sequence 1152 may control the inverter 1100 to provide the Level 1 output voltage +Vdc/2 by operating the inverter 1100 in the fourth mode. In a second period of the waveform 1154 (e.g., time $t_8$ to time $t_{16}$) the switching sequence 1152 may control the inverter 1100 to provide the Level 1 output voltage +Vdc/2 by operating the inverter 1100 in the sixth mode. Likewise, the switching sequence 1152 may control the inverter 1100 to provide the Level 1 output voltage −Vdc/2 by operating the inverter 1100 in the seventh mode during the first period and the fifth mode during the second period. This alternating configuration of the switching sequence 1152 is referred to herein as "alternation." In some examples, alternation enables the switching sequence 1152 to operate the inverter 1100 with DC link capacitor voltage balancing and balanced loss distribution. For example, the switching sequence 1152 may utilize alternation to balance the power (or current) drawn from each of the capacitors 1102*a*, 1102*b*. Likewise, the switching sequence 1152 may utilize alternation to manage the usage of each switch 1104 such that the inverter 1100 operates with a balanced loss distribution across the plurality of switches 1104. In addition to alternation, the switching sequence 1152 may be adjusted or modified in real-time based on feedback relating to the performance of the inverter 1100.

Figure 13:
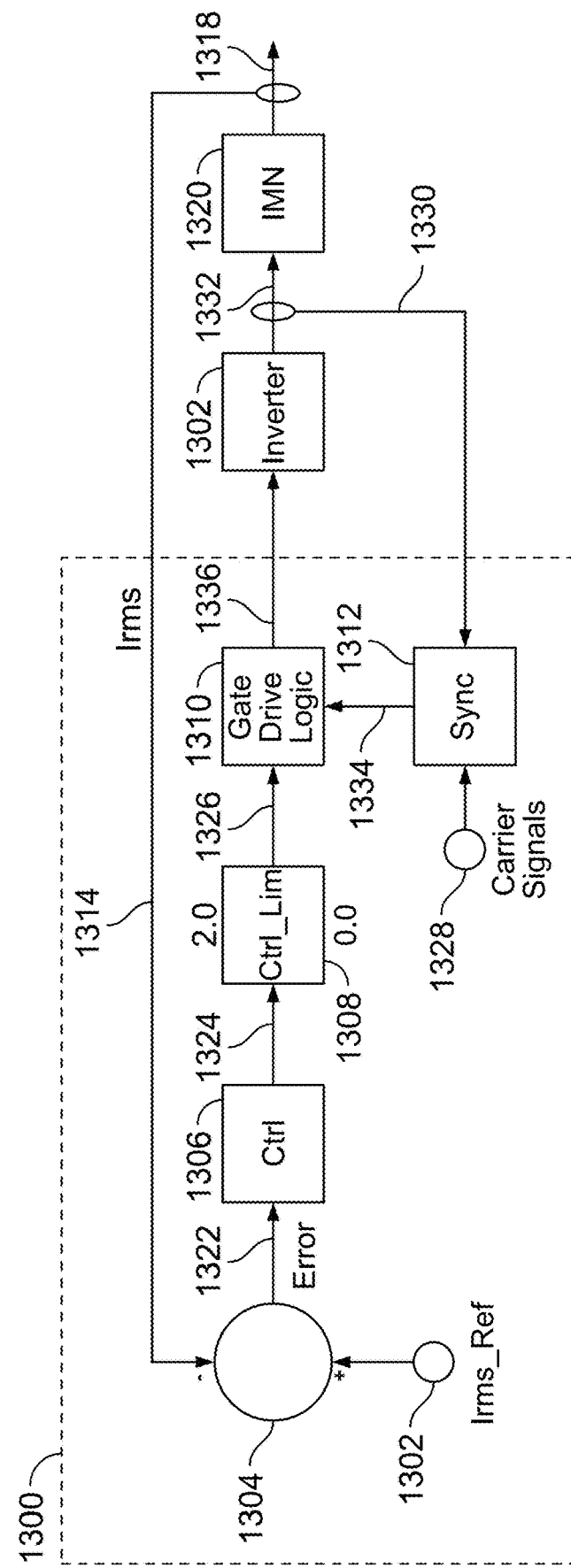
FIG. 13 is a block diagram of a modulator in accordance with at least one embodiment described herein.

Modulation Techniques for Generating Multi-Level, Asymmetrical Voltage Waveforms FIG. 13 is a block diagram of a modulator 1300. The modulator 1300 generates a switching sequence (e.g., switching sequence 1152 of FIG. 11B). The modulator 1300 is configured to generate the switching sequence by providing a plurality of gate drive signals (e.g., the plurality of control signals 1158 of FIG. 11B) to an inverter 1302. In some examples, the inverter 1302 corresponds to the inverter 1100 of FIG. 11A.

As shown, the modulator 1300 includes an adder module 1304, a control module 1306, limiter module 1308, a gate logic module 1310, and a sync module 1312. The adder module 1304 receives a current signal (e.g., a root mean square current signal) "Irms" signal 1314 and a reference current signal (e.g., a reference root mean square current signal) "Irms_Ref" (also referred to as Irms reference) signal 1316. In one example, the Irms signal 1314 represents the current of the AC power 1318 being transmitted by the wireless power transmitter (e.g., transmitter 102 of FIG. 1). In other words, the Irms signal 1314 represents a sampling of the current in the resonator coil (e.g., Tx resonator coil 112). In some examples, the Irms signal 1314 is sampled after the IMN 1320, which is coupled at the output of the inverter 1302; however, in other examples, the Irms signal 1314 may be sampled before the IMN 1320 (e.g., at the output of the inverter 1302). In some examples, the Irms signal 1314 is sampled at a wireless power receiver (e.g., receiver 104 of FIG. 1) receiving the transmitted power. In such examples, the Irms signal 1314 or data corresponding to the Irms signal 1314 may be transmitted back to the modulator 1300. The Irms reference signal 1316 represents an ideal or expected version of the Irms signal 1314.

The adder module 1304 receives the Irms signal 1314 and the Irms reference signal 1316 and produces an error signal 1320 representing the differences between the signals 1314, 1316. The error signal 1322 is provided to the control module 1306. The control module 1306 outputs a single control signal 1324 based on the error signal 1322. In one example, the control signal 1324 represents a level or threshold that is dynamically updated based on the error signal 1322. In some examples, the control signal 1322 corresponds to an output voltage level of the inverter 1302 (e.g., the Level 2 output voltage |Vdc|). The control signal 1324 is provided to the limiter module 1308. The limiter module 1308 limits the magnitude of the control signal to a value between a predetermined range (e.g., 0.0 to 1.0, 0.0 to 2.0, 1.0 to 3.0, etc.). The predetermined range corresponds to an expected input range for the gate logic module 1310. The limiter module 1308 may provide a rate limiting function that limits the rate of change of the control signal 1324. As such, the limiter module 1308 may output a control level signal 1326 that updates at a predetermined rate. In some examples, the control level signal 1326 represents an average of the control signal 1324 during each rate period.

The sync module 1312 receives a plurality of carrier signals 1328 and a sync reference signal 1330. The sync reference signal 1330 represents the current of the AC power 1332 being output from the inverter 1302. In some examples, the sync reference signal 1330 is substantially the same as the Irms signal 1314. The sync module 1312 is configured to sync at least a portion of the carrier signals 1328 to zero-crossings of the current of the AC power 1332 (e.g., as indicated by the sync reference signal 1330). For example, the sync reference signal 1330 may have a sinusoidal waveform corresponding to the current of the AC power 1332 to provide indications of the zero-crossing locations. In other examples, the sync reference signal 1330 may have a different waveform (e.g., pulsed) to provide indications of the zero-crossing locations.

Figure 14A:
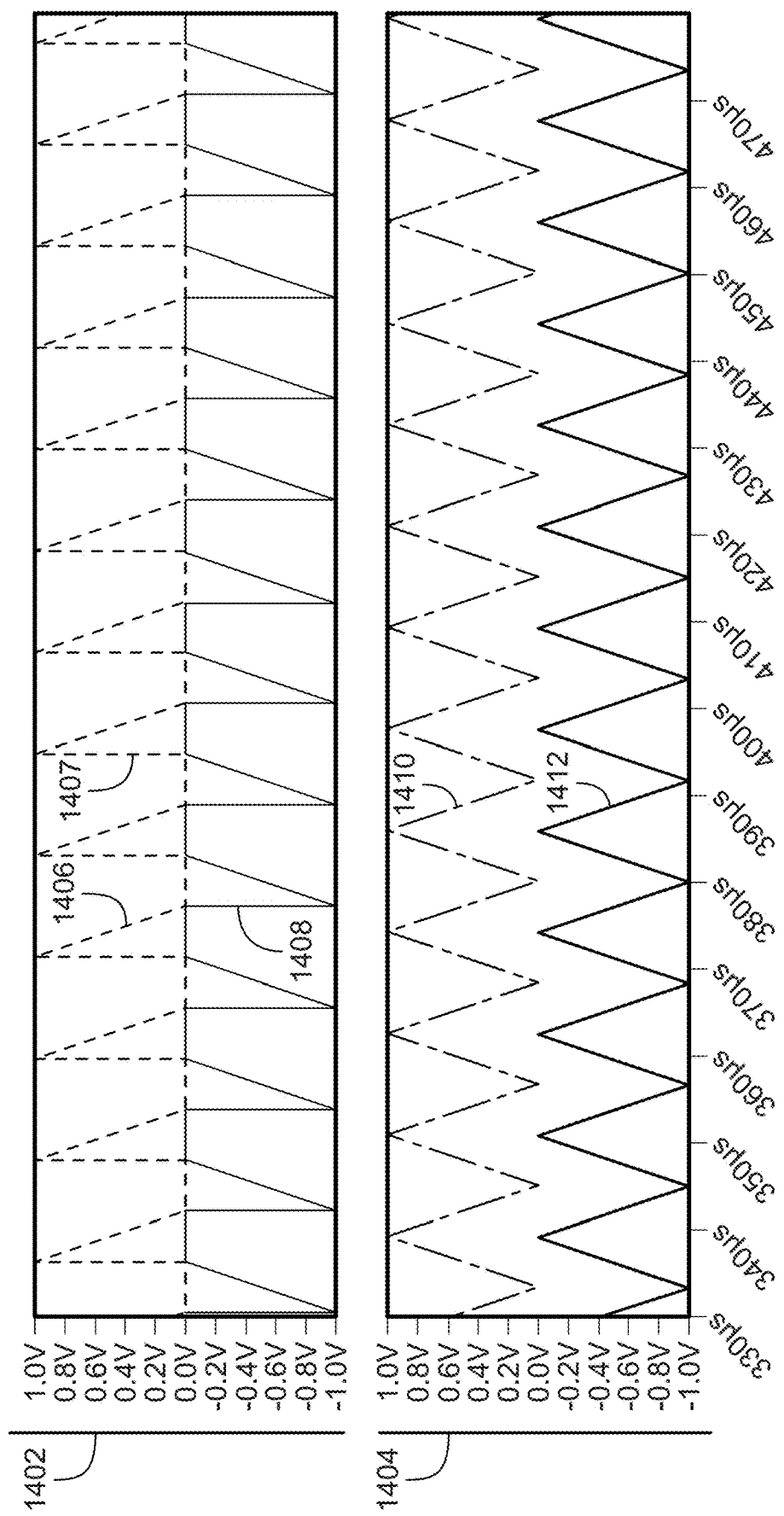
FIG. 14A is a plot of carrier signals associated with the modulator of FIG. 13 in accordance with at least one embodiment described herein.

FIG. 14A illustrates several examples of the plurality of carrier signals 1328 provided to the sync module 1312. A first plot 1402 includes a first carrier signal 1406 and a second carrier signal 1408. A second plot 1404 includes a third carrier signal 1410 and a fourth carrier signal 1412.

The first and second carrier signals 1406, 1408 are used to control the Level 2 output voltage |Vdc| of the inverter 1302. For example, the first carrier signal 1406 may correspond to the Level 2 output voltage +Vdc and the second carrier signal 1408 may correspond to the Level 2 output voltage −Vdc. As shown in FIG. 14A, the carrier signals 1406, 1408 have a sawtooth modulation waveform; however, in other examples, the carrier signals 1406, 1408 may have a different waveform (e.g., square, triangular, etc.). As shown, each tooth of the carrier signals 1406, 1408 includes a vertical leading edge 1407 that may be used for zero-crossing synchronization. In one example, the first carrier signal 1406 oscillates in the positive domain (e.g., between 0V and 1V) while the second carrier signal 1408 oscillates in the negative domain (e.g., between 0V and −1V). In other examples, the carrier signals 1406, 1408 oscillate in the same domain (e.g., positive or negative). In some examples, the first carrier signal 1406 and the second carrier signal 1408 are offset in phase (e.g., by 180 degrees).

The third and fourth carrier signals 1410, 1412 are used to control the Level 1 output voltage |Vdc/2| of the inverter 1302. For example, the third carrier signal 1410 may correspond to the Level 1 output voltage +Vdc/2 and the fourth carrier signal 1412 may correspond to the Level 1 output voltage −Vdc/2. As shown in FIG. 14A, the carrier signals 1410, 1412 have a triangular modulation waveform; however, in other examples, the carrier signals 1410, 1412 may have a different waveform (e.g., square, sawtooth, etc.). In one example, the third carrier signal 1410 oscillates in the positive domain (e.g., between 0V and 1V) while the fourth carrier signal 1412 oscillates in the negative domain (e.g., between 0V and −1V). In other examples, the carrier signals 1410, 1412 oscillate in the same domain (e.g., positive or negative). In some examples, the third carrier signal 1410 and the fourth carrier signal 1412 are offset in phase (e.g., by 180 degrees).

Figure 14B:
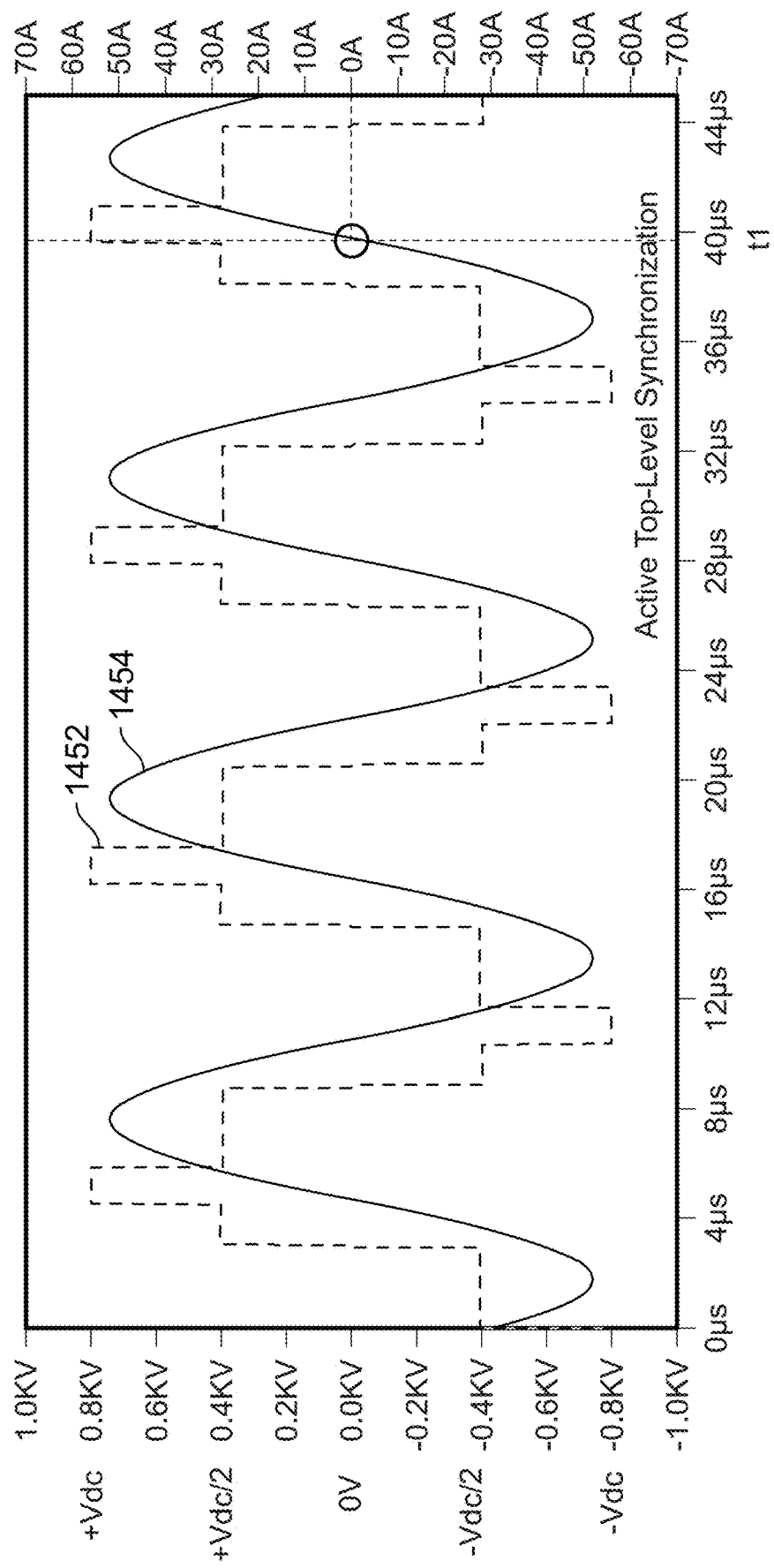
FIG. 14B is a plot illustrating a synchronization technique associated with the modulator of FIG. 12 in accordance with at least one embodiment described herein.

FIG. 14B illustrates a plot 1450 including example waveforms associated with the sync module 1312 and the inverter 1302. The plot 1450 includes an asymmetrical, multi-level voltage waveform 1452 corresponding to the voltage of the AC power 1332 output from the inverter 1302. Likewise, the plot 1450 includes a sinusoidal current waveform 1454 corresponding to the AC power 1332 output from the inverter 1302. As described above, the sync module 1312 is configured to sync at least a portion of the carrier signals 1328 to zero-crossings of the current of the AC power 1332. The sync module 1312 syncs the first carrier signal 1406 to the zero-crossings of the current waveform 1454 such that the voltage waveform 1452 transitions from the Level 1 output voltage level |Vdc/2| to the Level 2 output voltage level |Vdc| at or slightly before each zero-crossing (e.g., at time $t_1$). In some examples, the sync module 1312 is configured to sync the first carrier signal 1406 to the zero-crossings of the current waveform 1454 by adjusting or shifting the phase of the first carrier signal 1406 (e.g., via time delay) such that a leading edge 1407 of the carrier signal 1406 occurs at or slightly before each zero-crossing. In one example, the first carrier signal 1406 is synchronized such that the Level 2 output voltage level |Vdc| pulse begins slightly before the zero-crossing to account for a plurality of factors. Such factors can include increasing the output power range and reducing turn-on loss. By starting the Level 2 pulse early, a higher effective AC voltage output can be achieved, hence higher power. Given that the second carrier signal 1408 is offset from the first carrier signal 1406 by a fixed amount (e.g., 180 degrees), the second carrier signal 1408 may be automatically synchronized based on adjustments to the first carrier signal 1406. In certain examples, the second carrier signal 1408 may be synchronized independently.

Returning to FIG. 13, the gate drive logic module 1310 receives the control level signal 1326 from the limiter module 1308 and a plurality of synchronized carrier signals 1334 from the sync module 1312. The gate drive logic module 1310 provides a comparator function that derives the switching sequence for the inverter 1302 based on the control level signal 1326 and the plurality of synchronized carrier signals 1334.

Figure 14C:
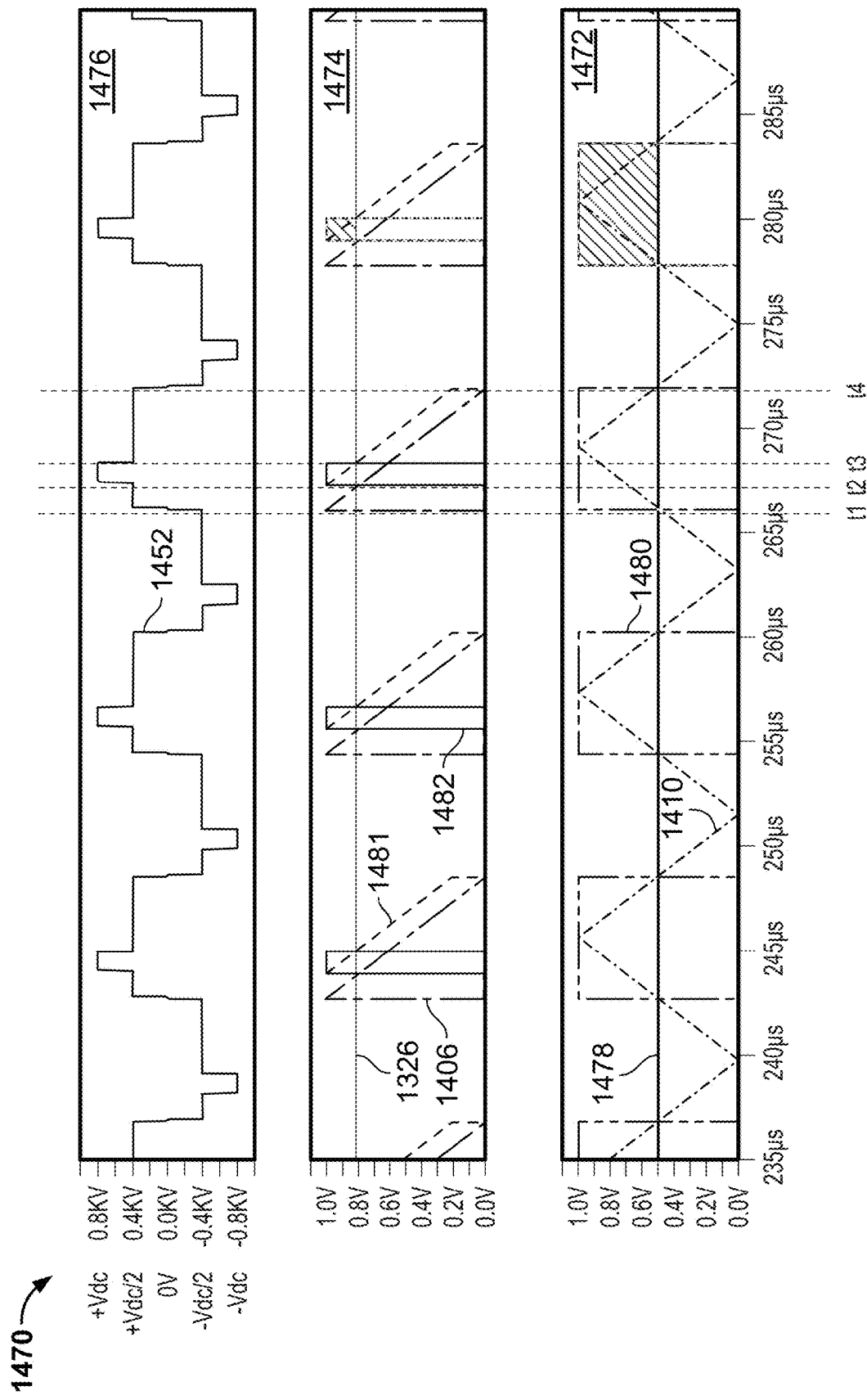
FIG. 14C is a plot illustrating several waveforms associated with the modulator of FIG. 13 in accordance with at least one embodiment described herein.

FIG. 14C illustrates several plots of example waveforms associated with the drive logic module 1310 and the inverter 1302. In one example, the waveforms of FIG. 14C represent the comparator function of the gate drive logic module 1310. A first plot 1472 represents a comparison between a derived control level signal 1478 and the third carrier signal 1410 for determining the timing and pulse width of the Level 1 output voltage +Vdc/2 in the multi-level voltage waveform 1452. A second plot 1474 represents a comparison between the control level signal 1326 and a synchronized carrier signal 1481 corresponding to the first carrier signal 1406 for determining the timing and pulse width of the Level 2 output voltage +Vdc in the multi-level voltage waveform 1452. A third plot 1476 includes the multi-level voltage waveform 1452 corresponding to the voltage of the AC power 1332 output from the inverter 1302.

The control level signal 1326 provided by the limiter module 1308 corresponds to the Level 2 output voltage +Vdc and the derived control level signal 1478 corresponds to the Level 1 output voltage +Vdc/2. In some examples, the derived control level signal 1478 is derived from the control level signal 1326 based on a fixed relationship between the two signals. For example, the derived control level signal 1478 may be a fixed percentage (e.g., 60%) of the control level signal 1326. As such, the derived control level signal 1478 may be adjusted as the control level signal 1326 is dynamically adjusted by the modulator 1300.

As shown in plot 1472, a first gate drive signal 1480 is driven high ('1') whenever the third carrier signal 1410 is above (or greater than) the derived control level signal 1478. The multi-level voltage waveform 1452 has the Level 1 voltage level +Vdc/2 (or higher) while the first gate drive signal 1480 is high. For example, at time t1, the voltage waveform 1452 transitions from the Level 0 output voltage 0V to the Level 1 output voltage level +Vdc/2 as the third carrier signal 1410 rises above the derived control level signal 1478 driving the first gate drive signal 1480 high. Likewise, at time t4, the voltage waveform 1452 transitions from the Level 1 output voltage +Vdc/2 to the Level 0 output voltage level 0V as the third carrier signal 1410 falls below the derived control level signal 1478 driving the first gate drive signal 1480 low ('0').

As shown in plot 1474, the synchronized carrier signal 1481 corresponds to the first carrier signal 1406 after being synchronized by the sync module 1312. A second gate drive signal 1482 is driven high ('1') whenever the synchronized carrier signal 1481 is above (or greater than) the control level signal 1326. The multi-level voltage waveform 1452 has the Level 2 voltage level +Vdc while the second gate drive signal 1482 is high. For example, at time t2, the voltage waveform 1452 transitions from the Level 1 output voltage +Vdc/2 to the Level 2 output voltage level +Vdc as the synchronized carrier signal 1481 rises above the control level signal 1326 driving the second gate drive signal 1482 high. Likewise, at time t3, the voltage waveform 1452 transitions from the Level 2 output voltage +Vdc to the Level 1 output voltage level +Vdc/2 as the synchronized carrier signal 1481 falls below the control level signal 1326 driving the second gate drive signal 1482 low ('0').

While not shown, the gate drive logic module 1310 may operate in a similar manner to determine the timing and pulse widths of the Level 1 output voltage −Vdc/2 and the Level 2 output voltage −Vdc in the multi-level voltage waveform 1452.

Returning to FIG. 13, the gate drive logic module 1310 provides a plurality of gate drive signals 1336 to the inverter 1302. In some examples, the plurality of gate drive signals 1336 includes the first gate drive signal 1480 and the second gate drive signal 1482 of FIG. 14C. The inverter 1302 (or a controller of the inverter 1302) may use the plurality of gate drive signals 1336 to determine a switching sequence for generating the asymmetrical, multi-level voltage waveform 1452. For example, the plurality of gate drive signals 1336 may be used in combination with the switching sequence selection method 900 of FIG. 9 to select a desired switching sequence for generating the voltage waveform 1452. The switching sequence are converted into a plurality of control signals (e.g, the plurality of control signals 1158 of FIG. 11B) for operating the switches of the inverter 1302 to generate the voltage waveform 1452. In other examples, the plurality of gate drive signals 1336 may correspond to other signals. For example, the gate drive logic module 1310 may convert the gate drive signals 1480, 1482 into switch-level control signals corresponding to a desired switching sequence. In some examples, the plurality of gate drive signals 1336 may include a digital representation of the voltage waveform 1452 that is processed by the inverter 1302 (or a controller of the inverter 1302) to derive the desired switching sequence and corresponding switch controls.

Multi-Step Commutation Sequences

In some examples, the step size of the commutation sequences used to generate the asymmetrical, multi-level voltage waveform can impact the performance of the inverter and/or the wireless power transmitter. For example, FIG. 15A illustrates an example commutation sequence 1500 for transitioning between two voltage levels. The commutation sequence 1500 represents a transition from the Level 2 output voltage +Vdc to the Level 2 output voltage −Vdc. A plurality of switch controls 1504 are provided to switches of an inverter (e.g., inverter 1100 of FIG. 11A) to provide the voltage transition from +Vdc to −Vdc. As shown, when the waveform 1502 transitions from +Vdc to −Vdc, a large current spike (or transient) 1506 occurs in the common-mode current of the inverter. The current spike 1506 causes the inverter switches to operate with increased switching losses during the voltage transition. The current spike 1506 can create (or induce) common mode noise that causes the inverter to operate with undesired performance during the voltage transition. As such, it may be advantageous to transition the voltage waveform in incremental steps to prevent (or minimize) common mode transients.

Figure 15B:
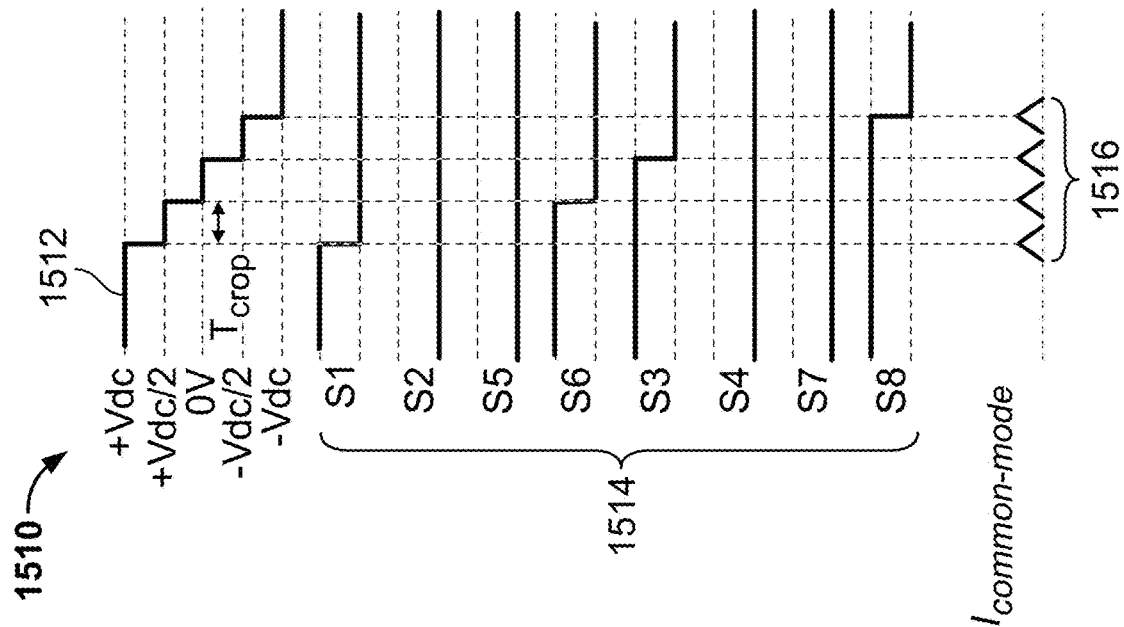
FIG. 15B is a diagram illustrating a multi-step inverter commutation sequence in accordance with at least one embodiment described herein.
Figure 15A:
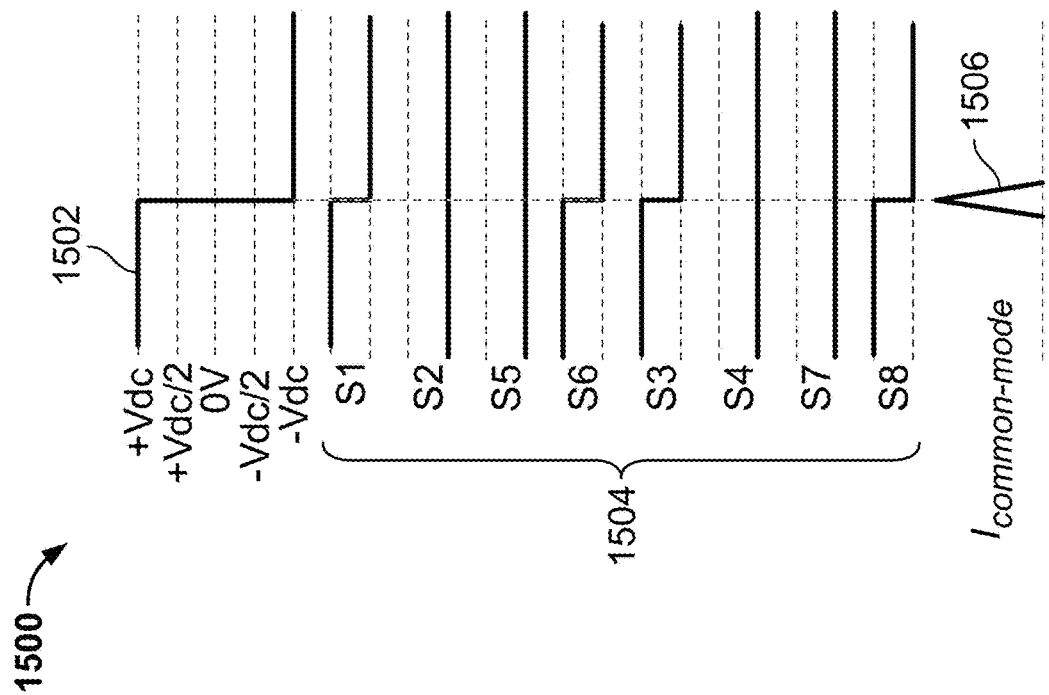
FIG. 15A is a diagram illustrating an example single-step inverter commutation sequence.

FIG. 15B illustrates an improved commutation sequence 1510 for transitioning between two voltage levels. The commutation sequence 1510 represents a multi-step transition from the Level 2 output voltage +Vdc to the Level 2 output voltage −Vdc. A plurality of switch controls 1514 are provided to switches of the inverter to provide the voltage transition from +Vdc to −Vdc. As shown, plurality of switch controls 1514 are configured to transition the voltage waveform 1512 from +Vdc to −Vdc by stepping the voltage down one level at a time. For example, the waveform 1412 includes a first step from the Level 2 output voltage +Vdc to the Level 1 output voltage +Vdc/2, a second step from the Level 1 output voltage +Vdc/2 to the Level 0 output voltage 0V, a third step from the Level 0 output voltage 0V to the Level 1 output voltage −Vdc/2, and a fourth step from the Level 1 output voltage −Vdc/2 to the Level 2 output voltage −Vdc. In one example, the duration of each step is a minimum step time $T_{crop}$. The minimum step time $T_{crop}$ may account for switching times of the inverter switches and parasitic effects of inverter components (e.g., bus capacitors). Given the reduced size of the voltage transition for each step, the common mode transients generated by each step are reduced. As shown, a plurality of current spikes 1516 occur during the voltage transition. Each spike corresponds to one step (e.g. the first step, the second step, etc.) of the multi-step voltage transition. In some examples, each spike has substantially the same magnitude. The magnitude of each spike is reduced relative to the large spike 1506, allowing the inverter switches to operate with improved efficiency during the transition. In addition, common mode noise during the voltage transition may be reduced. In some examples, the commutation sequence 1510 may simplify the design of the inverter and/or the wireless power transmitter to better comply with to electromagnetic compatibility (EMC) standards.

Smooth Transitions Between Output Voltage Levels

Figure 16:
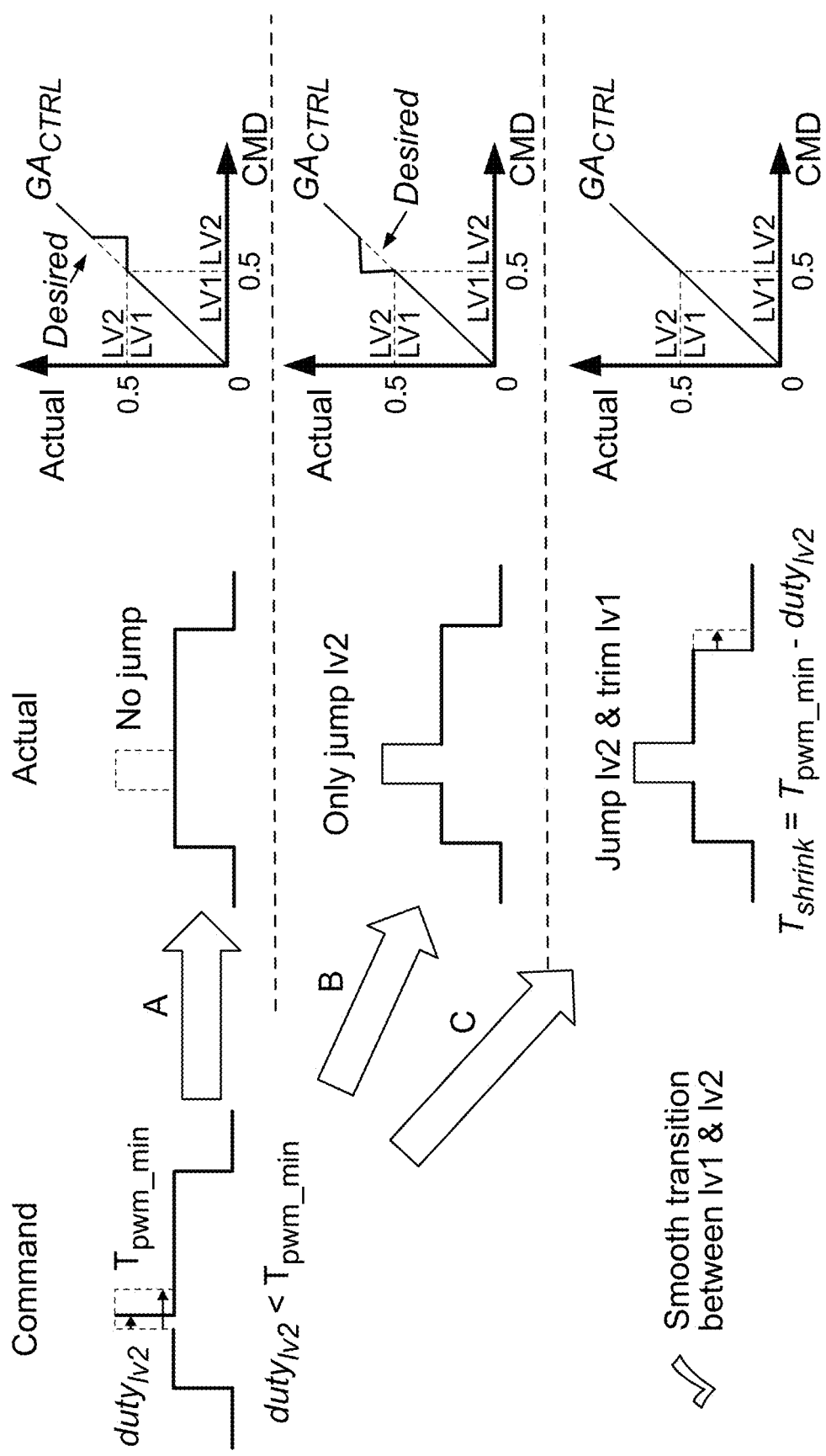
FIG. 16 is a diagram illustrating several voltage transition techniques in accordance with at least one embodiment described herein.

The multi-level inverter may have a minimum pulse width for each output voltage level (e.g., Level 0, Level 1, and Level 2) that can be implemented in the asymmetrical, multi-level voltage waveform. For example, as shown in FIG. 16, the Level 2 output voltage |Vdc| has a minimum pulse width (or duty) $T_{pwm\_min}$ that can be implemented by the inverter. In some examples, the switching sequence for operating the inverter corresponds to a multi-level voltage waveform having a Level 2 output voltage pulse having a pulse width $duty_{1v2}$ that is shorter than the minimum pulse width $T_{pwm\_min}$. In such events, the inverter may be commanded with one of three different options A, B, and C to account for the pulse width $duty_{1v2}$. In one example, the detection of these events and the corresponding selection of options A, B, or C is handled by the modulator 1300 (e.g., the limiter module 1308).

In option A, the inverter is commanded to exclude (or ignore) the Level 2 output voltage pulse having the pulse width $duty_{1v2}$. The voltage waveform includes an extended Level 1 output voltage step and may have a lower voltage than desired during the transition period. In option B, the inverter is commanded to include the Level 2 output voltage pulse but with the minimum pulse width $T_{pwm\_min}$. As such, the voltage waveform includes an extended Level 2 output voltage step and may have a higher voltage than desired during the transition period. In both options A and B, the desired configuration for the asymmetrical, multi-level voltage waveform is modified and may cause the inverter to operate with undesirable performance for wireless power transmission. The output voltage of the inverter changes abruptly during the transition between the Level 1 and Level 2 output voltages, leading to undesired oscillations or an increase in battery ripple current. Such modified waveforms may increase the output power error at the corresponding receiver. In option C, the inverter is commanded to include the Level 2 output voltage pulse with the minimum pulse width $T_{pwm\_min}$ and trim the Level 1 output voltage pulse width. For example, the Level 1 output voltage pulse width may be trimmed by an amount $T_{shrink}$. In one example, the amount $T_{shrink}$ is represented as:

$$T_{shrink} = T_{pwm\_min} - duty_{1v2}$$

As such, the voltage waveform includes an extended Level 2 output voltage step and a shortened Level 1 output voltage step to provide the desired voltage during the transition period.

On-Ground Inverter Packaging

As described above, the multi-level inverter may be included in a ground assembly (GA) of the wireless power transmitter (e.g., the multi-level inverter 458 of FIG. 4B). In example applications, the GA is positioned in or on the ground (or floor or other driving surface) for wireless power-enabled vehicles (including passenger vehicles, buses, motorcycles, autonomous vehicles, robots, industrial machines, etc.). A vehicle may drive and park over the GA to receive wireless power for charging one or more batteries of the vehicle (e.g., via a vehicle assembly (VA)). In some examples, because the inverter is positioned on the ground and accessible to users and bystanders, the inverter is enclosed in a heatsink to manage the temperature of the inverter (and the GA) and thereby reduce heat/energy exposure to humans, animals, or foreign objects (e.g., flammable or sensitive objects).

Figure 17A:
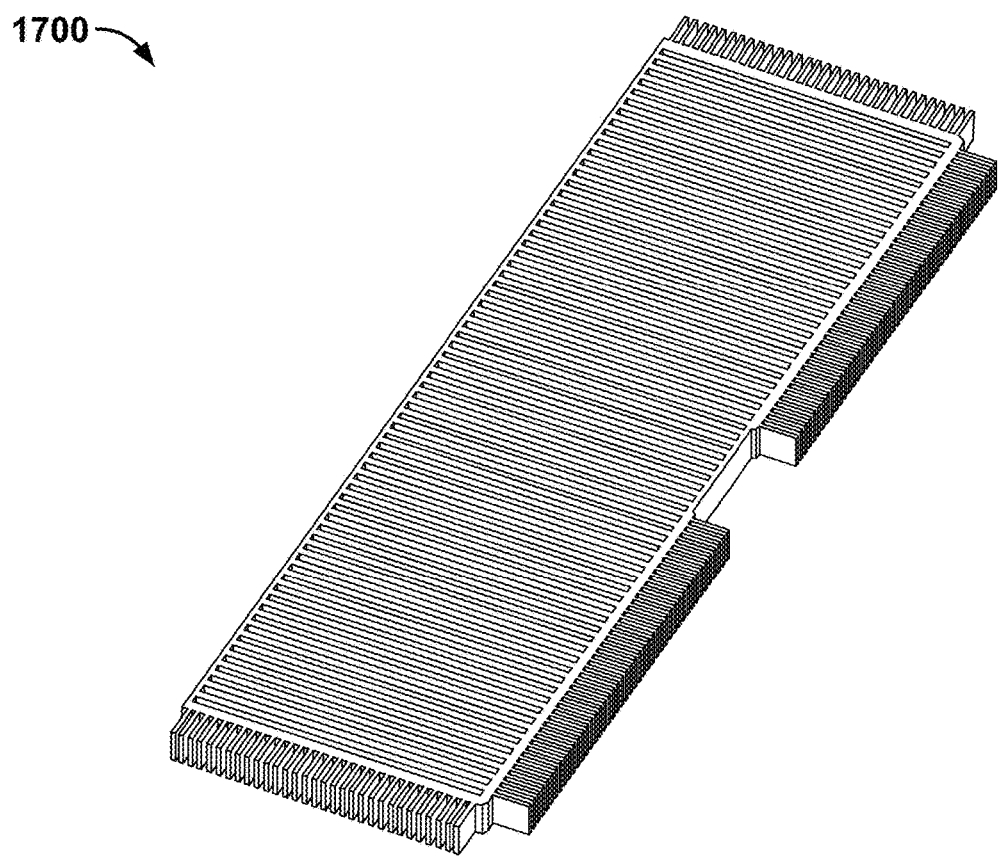
FIG. 17A is a diagram of a heatsink enclosure in accordance with at least one embodiment described herein.
Figure 17B:
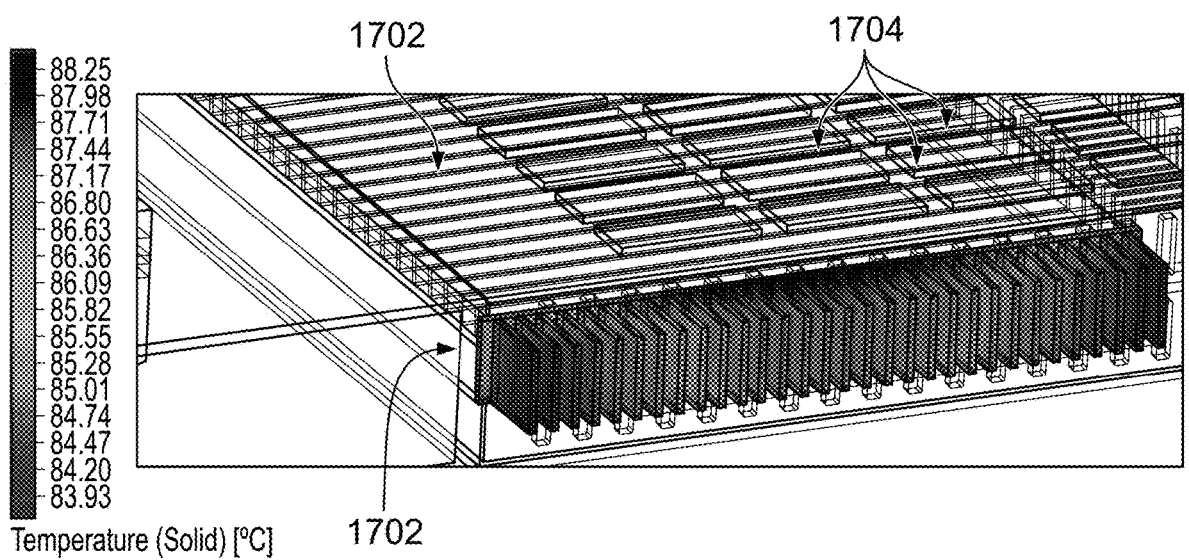
FIG. 17B is a diagram of a touch guard for the heatsink enclosure of FIG. 17A in accordance with at least one embodiment described herein.

FIG. 17A illustrates an example heatsink enclosure 1700. In one example, the heatsink enclosure 1700 is made from aluminum; however, in other examples, the heatsink enclosure 1700 may be made from different materials (e.g., other metals). In some examples, the heatsink enclosure 1700 is substantially flat on the top and bottom. Fins are included on the sides and configured to provide additional heat extraction from the inverter. As shown in FIG. 17B, a touch guard 1702 may be attached to the top and/or bottom of the heatsink enclosure 1700. In one example, the touch guard 1702 is made of plastic or other similar materials. The touch guard 1702 may prevent users from inadvertently touching the heatsink enclosure 1700. As such, the touch guard 1702 protects users from harmful exposure to the heatsink enclosure 1700.

The touch guard 1702 includes a plurality of slots 1704. In some examples, each slot of the plurality of slots 1704 is the same size. In other examples, the slots may be sized differently. For example, the slots may be smaller in hotter regions of the heatsink enclosure 1700. The plurality of slots 1704 may be positioned with a grid-like arrangement across the top/bottom surface of the heatsink enclosure 1700. The slots 1704 of the touch guard 1702 allow the heatsink enclosure 1700 to have an operating temperature that is higher than standard safe-touch temperature limits. As such, the touch guard 1702 enables the size of the heatsink enclosure 1700 to be reduced. For example, the touch guard 1702 may enable the size of the heatsink enclosure 1700 to be reduced by 200-300%. It should be appreciated that the heatsink enclosure 1700 and the touch guard 1702 may be used with any type of inverter or power converter and is not limited to use with the multi-level inverters described herein.

Additional Multi-Level Inverter Topologies

Figure 18:
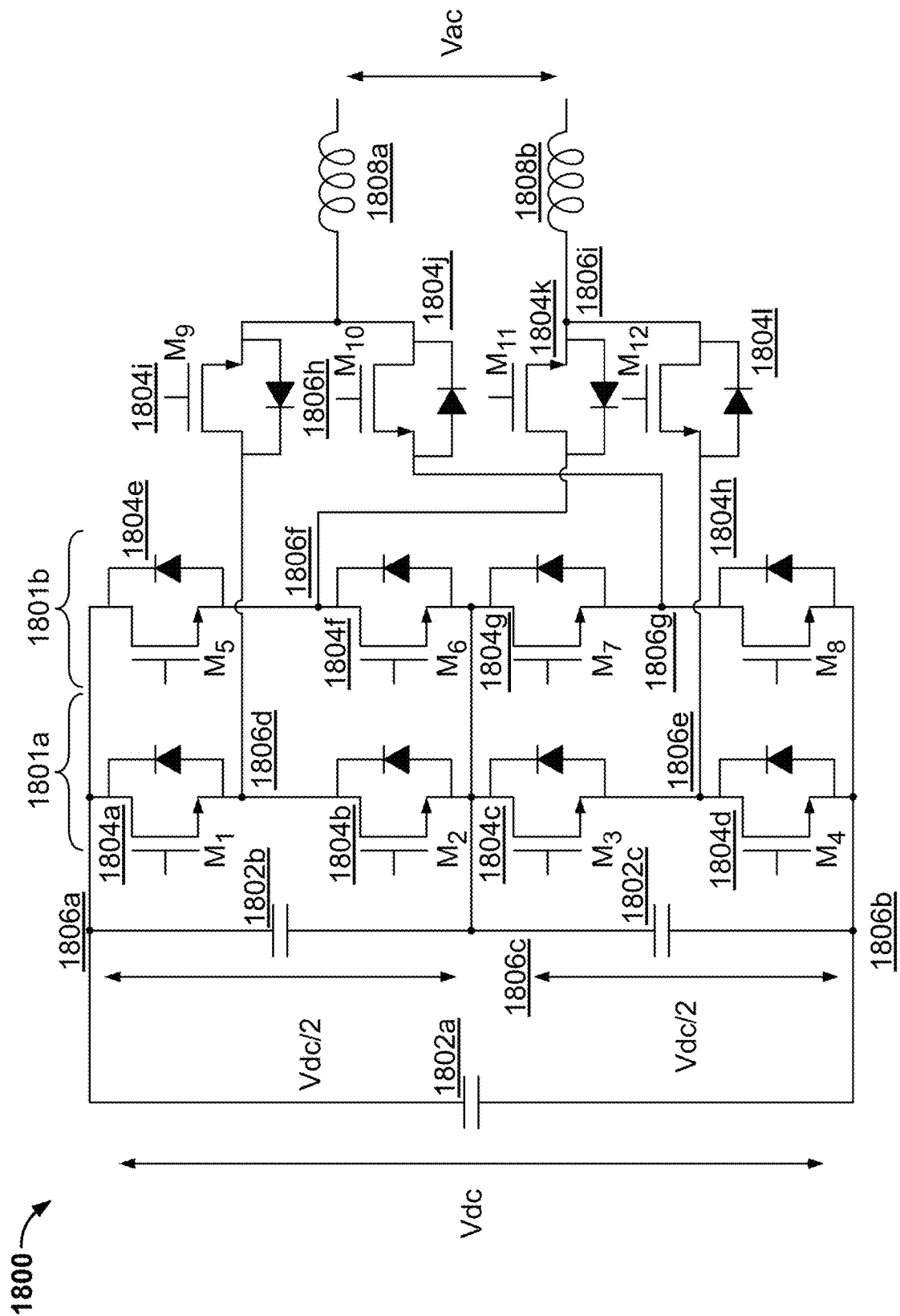
FIG. 18 is a schematic diagram of an inverter in accordance with at least one embodiment described herein.
Figure 19:
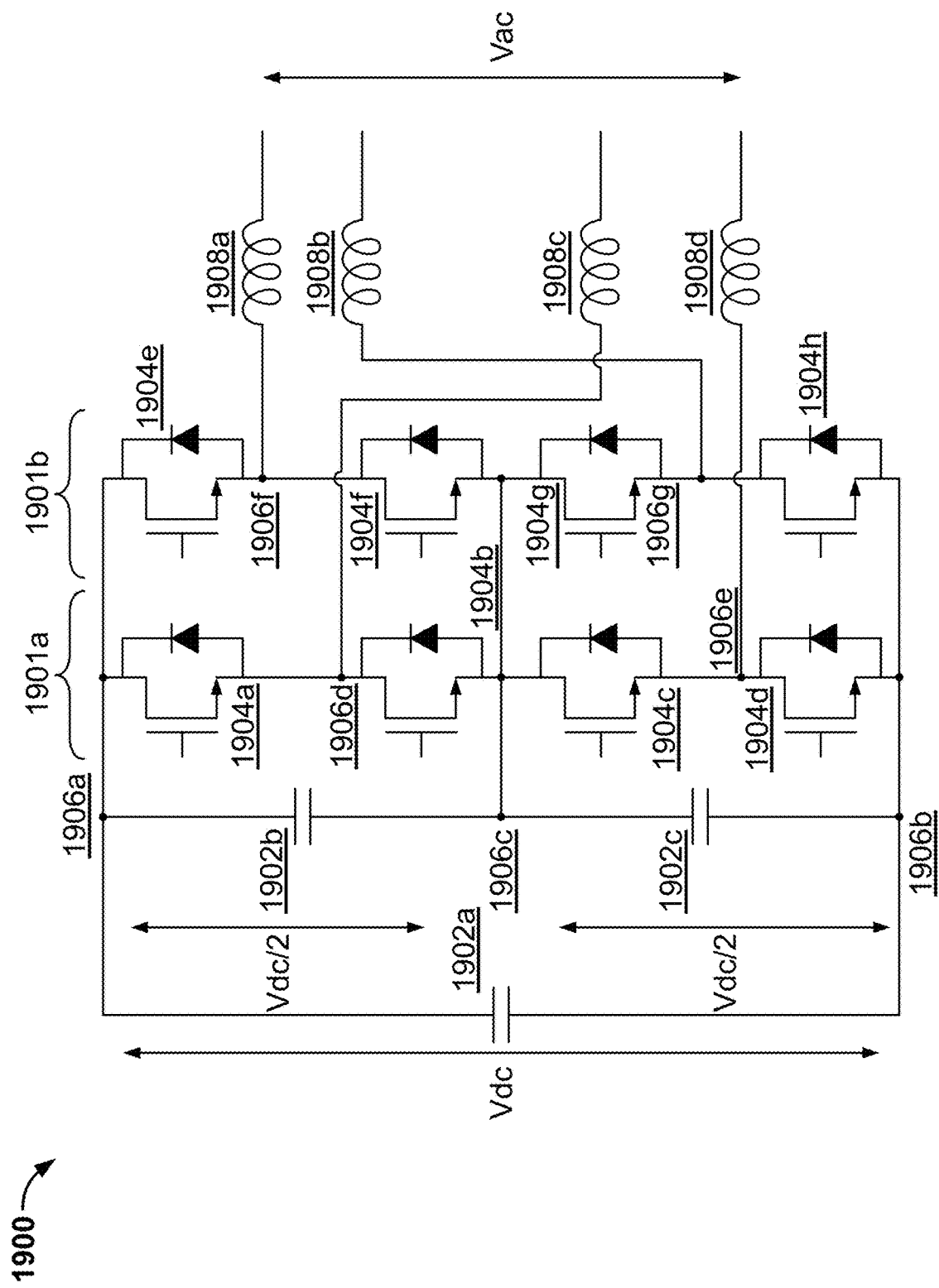
FIG. 19 is a schematic diagram of another inverter in accordance with at least one embodiment described herein.

As described above, the inverter 500 of FIG. 5 can be configured as a T-type inverter, an FC inverter, an NPC inverter, or an ANPC inverter to generate the multi-level, asymmetrical voltage waveform. FIGS. 18 and 19 illustrate multi-level inverter topologies representing two additional configurations of the inverter 500.

FIG. 18 is a schematic diagram of an inverter 1800. The inverter 1800 includes a first switching leg 1801*a* and a second switching leg 1801*b*. The first switching leg 1801*a* corresponds to the switching leg 504*a* of the inverter 500 and the second switching leg 1801*b* corresponds to the switching leg 504*b* of the inverter 500. As shown, the inverter 1800 includes a first capacitor 1802*a*, a second capacitor 1802*b*, a third capacitor 1802*c*, a plurality of switches 1804, a first inductor 1808*a*, and a second inductor 1808*b*. The inverter 1800 includes a first node 1806*a*, a second node 1806*b*, a third node 1806*c*, a fourth node 1806*d*, a fifth node 1806*e*, a sixth node 1806*f*, a seventh node 1806*g*, an eighth node 1806*h*, and a ninth node 1806*i*. The first and second nodes 1806*a*, 1806*b* are inputs to the inverter 1800 and receive DC power (e.g., from a PFC circuit). Likewise, the eighth and ninth nodes 1806*h*, 1806*i* are outputs of the inverter 1800 to provide AC power (e.g., to a transmit resonator coil). The eighth node 1806*h* is coupled to the first inductor 1808*a* and the ninth node 1806*i* is coupled to the second inductor 1808*b*. The third node 1806*c* is a mid-point connection.

As shown, the first capacitor 1802*a* is coupled between the first node 1806*a* and the second node 1806*b*. The first capacitor 1802*a* may be referred to as a DC link capacitor. The second capacitor 1802*b* is coupled between the first node 1806*a* and the third node 1806*c*. The third capacitor 1802*c* is coupled between the second node 1806*b* and the third node 1806*c*. In some examples, the capacitors 1802*b*, 1802*c* are referred to as bus capacitors. An input voltage Vdc received at the first node 1806*a* and the second node 1806*b* is stored by the first capacitor 1802*a* and split across the second and third capacitors 1802*b*, 1802*c*. For example, each capacitor 1802*b*, 1802*c* may store half of the input voltage Vdc (e.g., Vdc/2).

In the example inverter 1800, the plurality of switches 1804 includes a first switch 1804*a*, a second switch 1804*b*, a third switch 1804*c*, a fourth switch 1804*d*, a fifth switch 1804*e*, a sixth switch 1804*f*, a seventh switch 1804*g*, an eighth switch 1804*h*, a ninth switch 1804*i*, a tenth switch 1804*j*, an eleventh switch 1804*k*, and a twelfth switch 1804*l*. The first switching leg 1801*a* includes the first switch 1804*a*, the second switch 1804*b*, the third switch 1804*c*, the fourth switch 1804*d*, the ninth switch 1804*i*, and the twelfth switch 1804*l*. The second switching leg 1801*b* includes the fifth switch 1804*e*, the sixth switch 1804*f*, the seventh switch 1804*g*, the eighth switch 1804*h*, the tenth switch 1804*j*, and the eleventh switch 1804*k*.

The first switch 1804*a* is coupled between the first node 1806*a* and the fourth node 1806*d*. The drain of the first switch 1804*a* is coupled to the first node 1806*a* and the source of the first switch 1804*a* is coupled to the fourth node 1806*d*. The second switch 1804*b* is coupled between the third node 1806*c* and the fourth node 1806*d*. The drain of the second switch 1804*b* is coupled to the fourth node 1806*d* and the source of the second switch 1804*b* is coupled to the third node 1806*c*. The third switch 1804*c* is coupled between the third node 1806*c* and the fifth node 1806*e*. The drain of the third switch 1804*c* is coupled to the third node 1806*c* and the source of the third switch 1804*c* is coupled to the fifth node 1806*e*. The fourth switch 1804*d* is coupled between the second node 1806*b* and the fifth node 1806*e*. The drain of the fourth switch 1804*d* is coupled to the fifth node 1806*e* and the source of the fourth switch 1804*d* is coupled to the second node 1806*b*. The fifth switch 1804*e* is coupled between the first node 1806*a* and the sixth node 1806*f*. The drain of the fifth switch 1804*e* is coupled to the first node 1806*a* and the source of the fifth switch 1804*e* is coupled to the sixth node 1806*f*. The sixth switch 1804*f* is coupled between the third node 1806*c* and the sixth node 1806*f*. The drain of the sixth switch 1804*f* is coupled to the sixth node 1806*f* and the source of the sixth switch 1804*f* is coupled to the third node 1806*c*. The seventh switch 1804*g* is coupled between the third node 1806*c* and the seventh node 1806*g*. The drain of the seventh switch 1804*g* is coupled to the third node 1806*c* and the source of the seventh switch 1804*g* is coupled to the seventh node 1806*g*. The eighth switch 1804*h* is coupled between the second node 1806*b* and the seventh node 1806*g*. The drain of the eighth switch 1804*h* is coupled to the seventh node 1806*g* and the source of the eighth switch 1804*h* is coupled to the second node 1806*b*. The ninth switch 1804*i* is coupled between the fourth node 1806*d* and the eighth node 1806*h*. The drain of the ninth switch 1804*i* is coupled to the fourth node 1806*d* and the source of the ninth switch 1804*i* is coupled to the eighth node 1806*h*. The tenth switch 1804*j* is coupled between the seventh node 1806*g* and the eighth node 1806*h*. The drain of the tenth switch 1804*j* is coupled to the eighth node 1806*h* and the source of the tenth switch 1804*j* is coupled to the seventh node 1806*g*. The tenth switch 1804*j* is coupled between the seventh node 1806*g* and the eighth node 1806*h*. The drain of the tenth switch 1804*j* is coupled to the eighth node 1806*h* and the source of the tenth switch 1804*j* is coupled to the seventh node 1806*g*. The eleventh switch 1804*k* is coupled between the sixth node 1806*f* and the ninth node 1806*i*. The drain of the eleventh switch 1804*k* is coupled to the sixth node 1806*f* and the source of the eleventh switch 1804*k* is coupled to the ninth node 1806*i*. The twelfth switch 1804*l* is coupled between the fifth node 1806*e* and the ninth node 1806*i*. The drain of the twelfth switch 1804*l* is coupled to the ninth node 1806*i* and the source of the twelfth switch 1804*l* is coupled to the fifth node 1806*e*.

FIG. 19 is a schematic diagram of an inverter 1900. The inverter 1900 includes a first switching leg 1901*a* and a second switching leg 1901*b*. The first switching leg 1901*a* corresponds to the switching leg 504*a* of the inverter 500 and the second switching leg 1901*b* corresponds to the switching leg 504*b* of the inverter 500. As shown, the inverter 1900 includes a first capacitor 1902*a*, a second capacitor 1902*b*, a third capacitor 1902*c*, a plurality of switches 1904, a first inductor 1908*a*, a second inductor 1908*b*, a third inductor 1908*c*, and a fourth inductor 1908*d*. The inverter 1900 includes a first node 1906*a*, a second node 1906*b*, a third node 1906*c*, a fourth node 1906*d*, a fifth node 1906*e*, a sixth node 1906*f*, and a seventh node 1906*g*. The first and second nodes 1906*a*, 1906*b* are inputs to the inverter 1900 and receive DC power (e.g., from a PFC circuit). Likewise, the fourth, fifth, sixth, and seventh nodes 1906*d*-1906*g* are outputs of the inverter 1900 to provide AC power (e.g., to a transmit resonator coil). The sixth node 1906*f* is coupled to the first inductor 1908*a*, the seventh node 1906g is coupled to the second inductor 1908b, the fourth node 1906d is coupled to the third inductor 1908c, and the fifth node 1908e is coupled to the fourth inductor 1908d. The third node 1906c is a mid-point connection.

As shown, the first capacitor 1902a is coupled between the first node 1906a and the second node 1906b. In one example, the first capacitor 1902a may be referred to as a DC link capacitor. The second capacitor 1902b is coupled between the first node 1906a and the third node 1906c. The third capacitor 1902c is coupled between the second node 1906b and the third node 1906c. In some examples, the capacitors 1902b, 1902c are referred to as bus capacitors. An input voltage Vdc received at the first node 1906a and the second node 1906b is stored by the first capacitor 1902a and split across the second and third capacitors 1902b, 1902c. For example, each capacitor 1902b, 1902c may store half of the input voltage Vdc (e.g., Vdc/2).

In the example inverter 1900, the plurality of switches 1904 includes a first switch 1904a, a second switch 1904b, a third switch 1904c, a fourth switch 1904d, a fifth switch 1904e, a sixth switch 1904f, a seventh switch 1904g, and an eighth switch 1904h. The first switching leg 1901a includes the first switch 1904a, the second switch 1904b, the third switch 1904c, and the fourth switch 1904d. The second switching leg 1901b includes the fifth switch 1904e, the sixth switch 1904f, the seventh switch 1904g, and the eighth switch 1904h.

The first switch 1904a is coupled between the first node 1906a and the fourth node 1906d. The drain of the first switch 1904a is coupled to the first node 1906a and the source of the first switch 1904a is coupled to the fourth node 1906d. The second switch 1904b is coupled between the third node 1906c and the fourth node 1906d. The drain of the second switch 1904b is coupled to the fourth node 1906d and the source of the second switch 1904b is coupled to the third node 1906c. The third switch 1904c is coupled between the third node 1906c and the fifth node 1906e. The drain of the third switch 1904c is coupled to the third node 1906c and the source of the third switch 1904c is coupled to the fifth node 1906e. The fourth switch 1904d is coupled between the second node 1906b and the fifth node 1906e. The drain of the fourth switch 1904d is coupled to the fifth node 1906e and the source of the fourth switch 1904d is coupled to the second node 1906b. The fifth switch 1904e is coupled between the first node 1906a and the sixth node 1906f. The drain of the fifth switch 1904e is coupled to the first node 1906a and the source of the fifth switch 1904e is coupled to the sixth node 1906f. The sixth switch 1904f is coupled between the third node 1906c and the sixth node 1906f. The drain of the sixth switch 1904f is coupled to the sixth node 1906f and the source of the sixth switch 1904f is coupled to the third node 1906c. The seventh switch 1904g is coupled between the third node 1906c and the seventh node 1906g. The drain of the seventh switch 1904g is coupled to the third node 1906c and the source of the seventh switch 1904g is coupled to the seventh node 1906g. The eighth switch 1904h is coupled between the second node 1906b and the seventh node 1906g. The drain of the eighth switch 1904h is coupled to the seventh node 1906g and the source of the eighth switch 1904h is coupled to the second node 1906b.

It should be appreciated that the inverters 1800, 1900 can be operated using the techniques and switching sequences described above to generate an asymmetrical, multi-level waveform. For example, the plurality of switches 1804 convert the input DC power (i.e., input voltage Vdc) received at the first and second nodes 1806a, 1806b into the output AC power (i.e., output voltage Vac) provided at the eighth and ninth nodes 1806h, 1806i. Likewise, the plurality of switches 1904 convert the input DC power (i.e., input voltage Vdc) received at the first and second nodes 1906a, 1906b into the output AC power (i.e., output voltage Vac) provided at the fourth, fifth, sixth, and seventh nodes 1906d-1906g. The output voltage waveforms provided by the inverter 1800 or 1900 may have multiple distinct voltage levels (e.g., five distinct voltage levels).

Multi-Level Active Rectifier

While the examples above describe multi-level inverters and asymmetrical, multi-level voltage waveforms for wireless power transmission, it should be appreciated that similar techniques may be adapted for multi-level active rectifiers used for wireless power reception. For example, switching sequences and modulation schemes similar to those described above may be used to convert AC power received from a wireless power transmitter into DC power.

Figure 20:
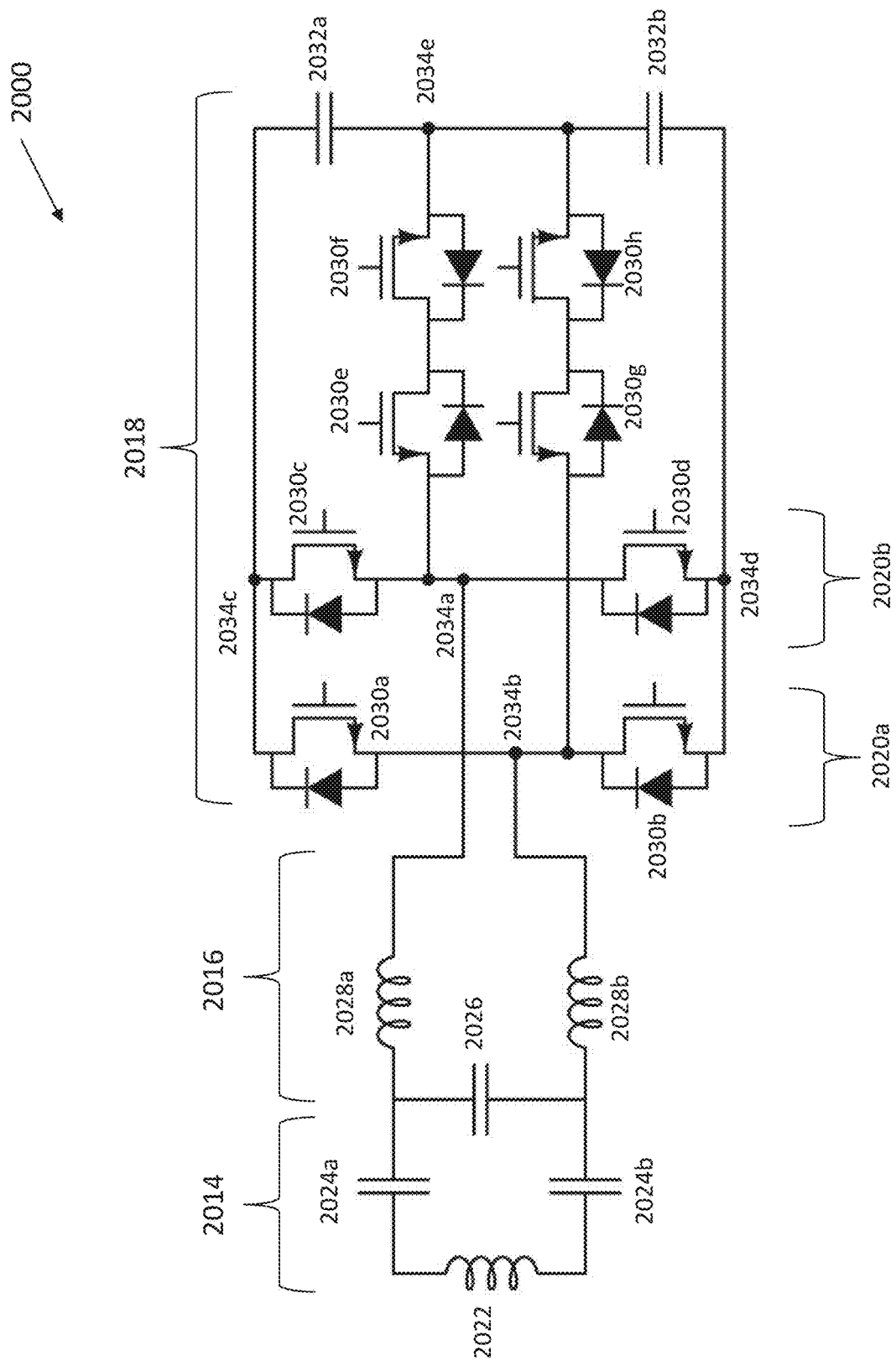
FIG. 20 is a schematic diagram of a multi-level rectifier in accordance with at least one embodiment described herein.

FIG. 20 is a schematic diagram of a wireless power receiver 2000. The wireless power receiver 2000 includes a receiver resonator 2014, a receiver IMN 2016, and a multi-level active rectifier 2018. In some examples, the receiver resonator 2014 includes a coil 2022 and capacitive components 2024a, 2024b; however, in other examples, different resonator configurations may be used. In some examples, the receiver IMN 2016 includes a capacitive component 2026 and inductive components 2028a, 2028b; however, in other examples, different IMN configurations may be used.

The multi-level active rectifier 2018 includes a first switching leg 2020a and a second switching leg 2020b. As shown, the rectifier 2018 includes a plurality of switches 2030, a first capacitor 2032a, and a second capacitor 2032b. The rectifier 2018 includes a first node 2034a, a second node 2034b, a third node 2034c, a fourth node 2034d, and a fifth node 2034e. The first and second nodes 2034a, 2034b are inputs to the rectifier 2018 and receive AC power (e.g., from the resonator 2014 via the IMN 2016). The first capacitor 2032a is coupled between the third node 2034c and the fifth node 2034e. The second capacitor 2032b is coupled between the fourth node 2034d and the fifth node 2034e. In some examples, the capacitors 2032a, 2032b are referred to as bus capacitors (e.g., DC bus capacitors). An output voltage (e.g., Vdc) may be split across the capacitors 2032a, 2032b. For example, each capacitor 2032a, 2032b may store half of the output voltage Vdc (e.g., Vdc/2). In some examples, the capacitors 2032a, 2032b are charged with an unequal distribution.

In the example rectifier 2018, the plurality of switches 2030 includes a first switch 2030a, a second switch 2030b, a third switch 2030c, a fourth switch 2030d, a fifth switch 2030e, a sixth switch 2030f, a seventh switch 2030g, and an eighth switch 2030h. The first switching leg 2020a includes the first switch 2030a and the second switch 2030b. The second switching leg 2020b includes the third switch 2030c and the fourth switch 2030d.

The first switch 2030a is coupled between the second node 2034b and the third node 2034c. The drain of the first switch 2030a is coupled to the third node 2034c and the source of the first switch 2030a is coupled to the second node 2034b. The second switch 2030b is coupled between the second node 2034b and the fourth node 2034d. The drain of the second switch 2030b is coupled to the second node 2034b and the source of the second switch 2030b is coupled to the fourth node 2034d. The third switch 2030c is coupled between the first node 2034a and the third node 2034c. The drain of the third switch 2030c is coupled to the third node 2034c and the source of the third switch 2030c is coupled to the first node 2034a. The fourth switch 2030d is coupled between the first node 2034a and the fourth node 2034d. The drain of the fourth switch 2030d is coupled to the first node 2034a and the source of the fourth switch 2030d is coupled to the fourth node 2034d. The fifth switch 2030e is coupled between the first node 2034a and the drain of the sixth switch 2030f. The drain of the fifth switch 2030e is coupled to the drain of the sixth switch 2030f and the source of the fifth switch 2030e is coupled to the first node 2034a. The sixth switch 2030f is coupled between the drain of the fifth switch 2030e and the fifth node 2034e. The drain of the sixth switch 2030f is coupled to drain of the fifth switch 2030e and the source of the sixth switch 2030f is coupled to the fifth node 2034e. The seventh switch 2030g is coupled between the second node 2034b and the drain of the eighth switch 2030h. The drain of the seventh switch 2030g is coupled to the drain of the eighth switch 2030h and the source of the seventh switch 2030g is coupled to the second node 2034b. The eighth switch 2030h is coupled between the drain of the seventh switch 2030g and the fifth node 2034e. The drain of the eighth switch 2030h is coupled to the drain of the seventh switch 2030g and the source of the eighth switch 2030h is coupled to the fifth node 2034e.

Figure 21:
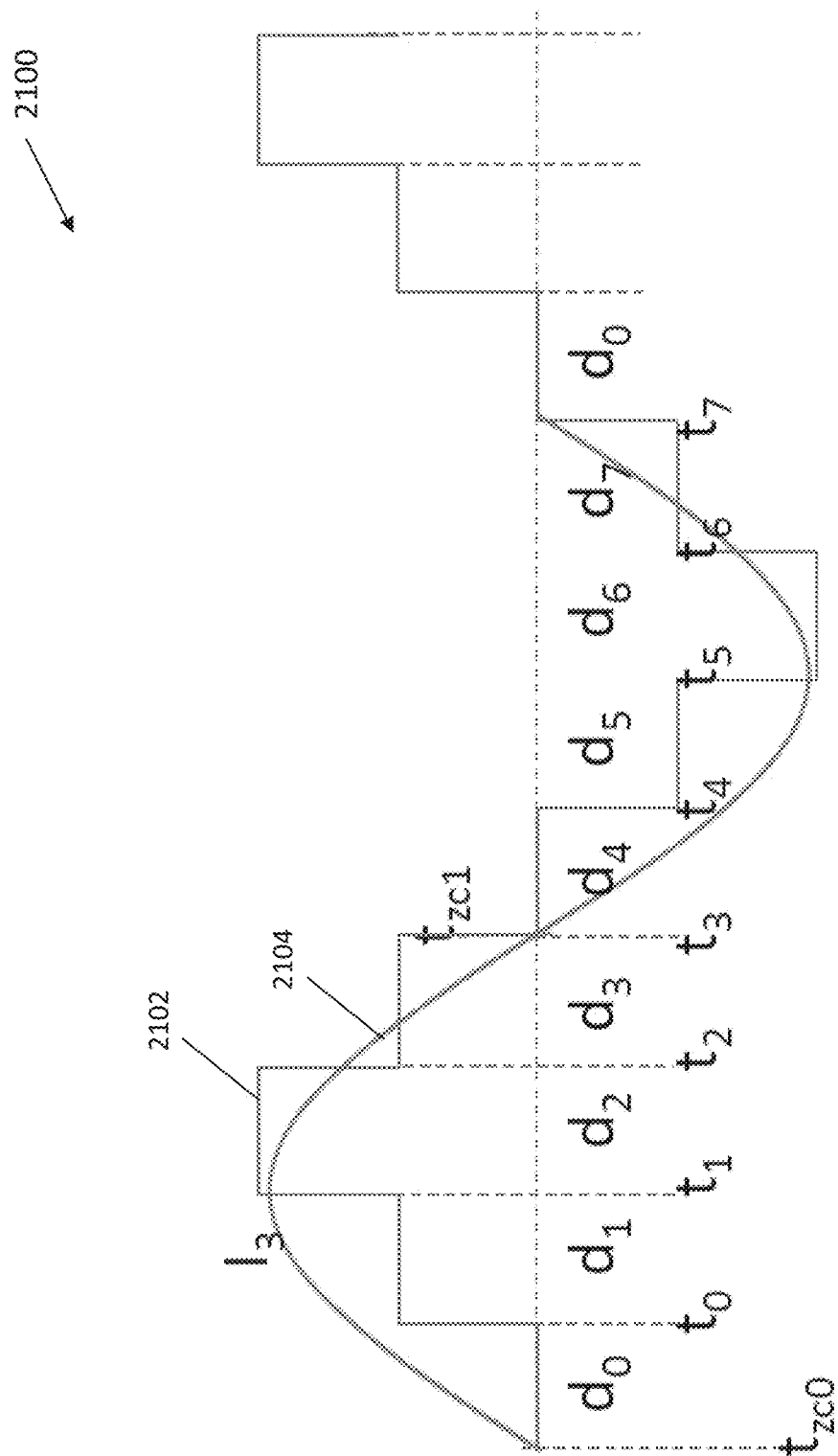
FIG. 21 is a plot illustrating several waveforms associated with the operation of the multi-level rectifier of FIG. 20 in accordance with at least one embodiment described herein.
Figure 22A:
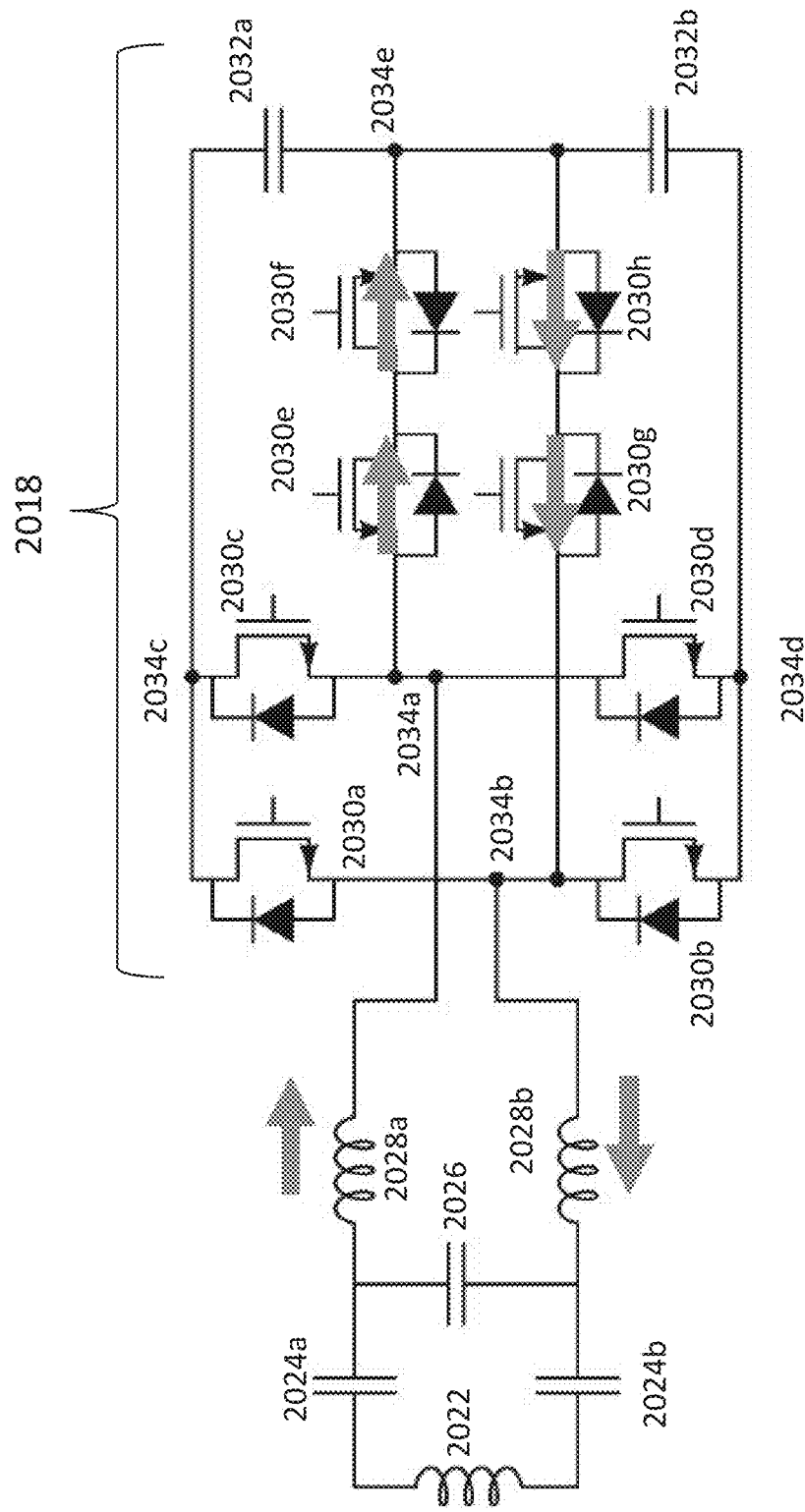
FIGS. 22A-22R are schematic diagrams illustrating the operation of the multi-level rectifier of FIG. 20 in accordance with at least one embodiment described herein.

The rectifier 2018 is operated to convert input AC power into multi-level DC power. FIG. 21 is a plot 2100 including a multi-level voltage waveform 2102 corresponding to multiple DC voltage levels generated by the rectifier 2018 based on an input current waveform 2104. In some examples, the rectifier 2018 is configured to output five distinct voltage levels (e.g., −Vdc, −Vdc/2, 0V, +Vdc/2, +Vdc). FIGS. 22A-22R illustrate various states of the rectifier 2018 while being operated to generate five-level DC power.

FIG. 22A corresponds to operation of the rectifier 1208 during a first interval ($d_0$) (i.e., time $t_{zc0}$ to time $t_0$). A commutation path is provided through switches 2030e, 2030f, 2030g, and 2030h. Current is received at the first node 2034a from the coil 2022. The commutation path directs the current to the fifth node 2034e where it is returned to the coil 2022 via the second node 2034b. As such, a first DC voltage level (e.g., 0V) is provided at the output of the rectifier 2018 (e.g., at node 2034e).

Figure 22B:
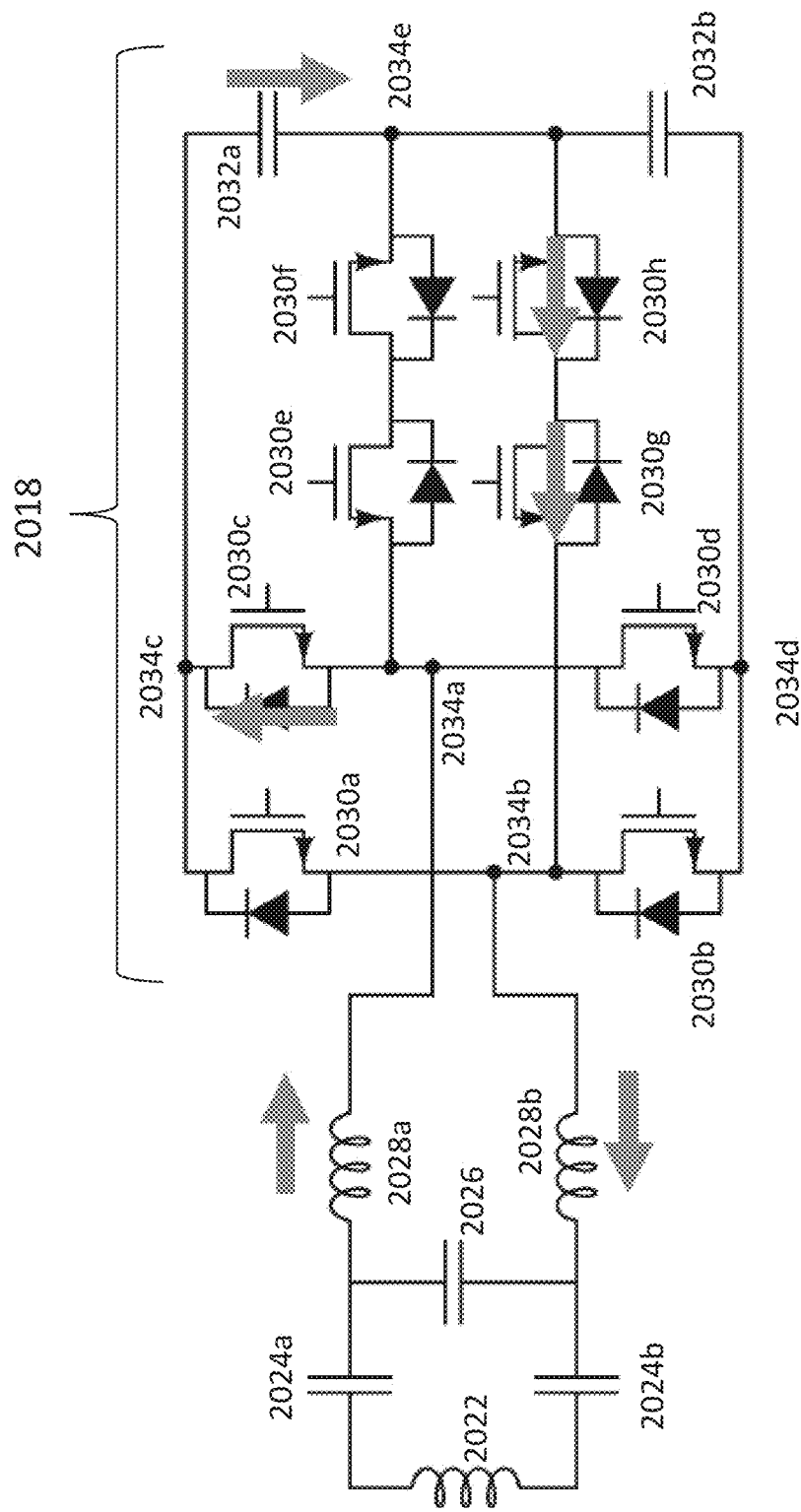

FIG. 22B corresponds to operation of the rectifier 1208 at a first transition time ($t_0$). A commutation path is provided through switches 2030c, 2030g, and 2030h. In some examples, the commutation path is provided through a body diode of switch 2030c. Current is received at the first node 2034a from the coil 2022. The commutation path directs the current to the third node 2034c to charge the first capacitor 2032a before returning to the coil 2022 via nodes 2034b and 2034e.

Figure 22C:
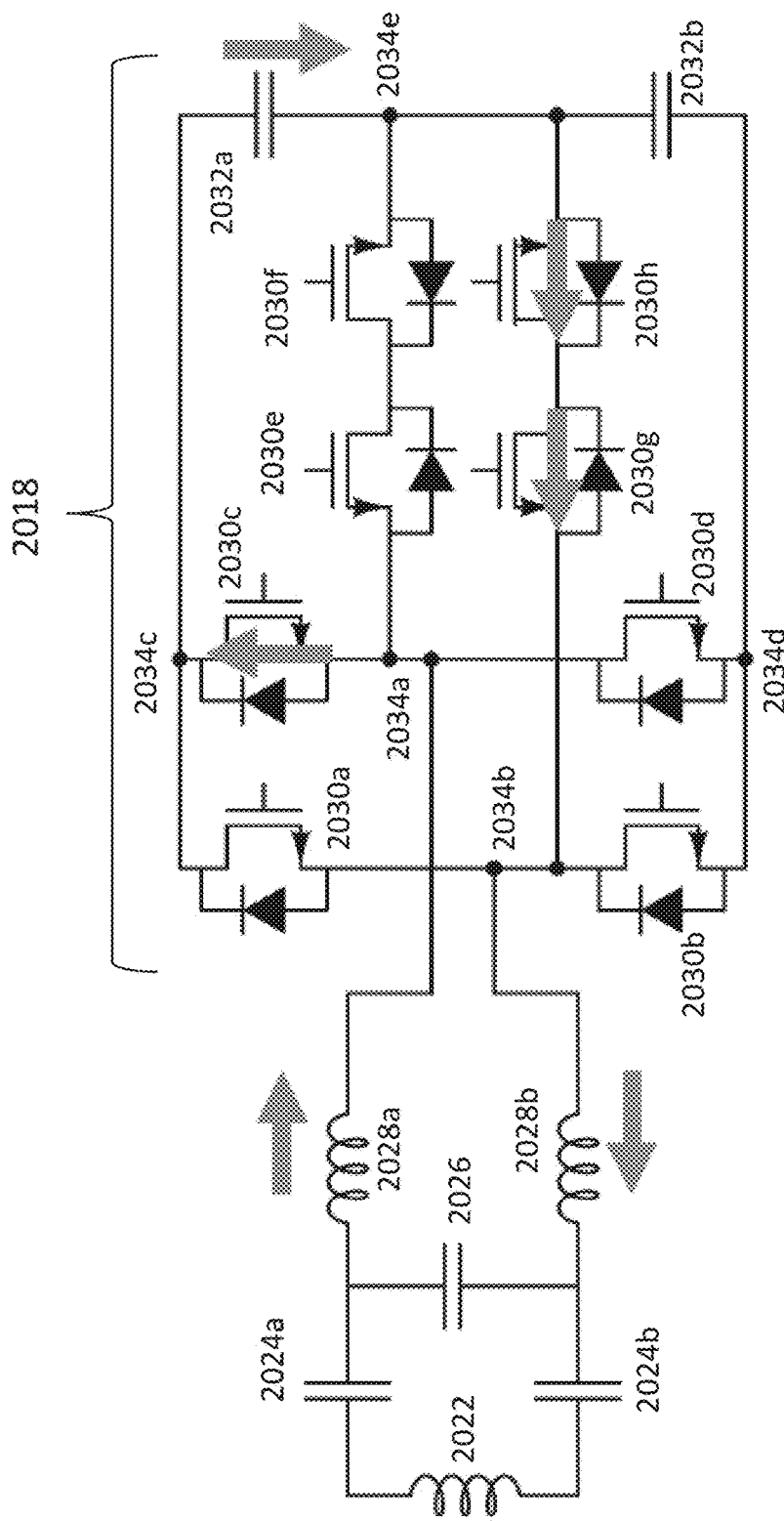

FIG. 22C corresponds to operation of the rectifier 1208 during a second interval ($d_1$) (i.e., time $t_0$ to time $t_1$). A commutation path is provided through switches 2030c, 2030g, and 2030h. Current is received at the first node 2034a from the coil 2022. The commutation path directs the current to the third node 2034c to continue to charge the first capacitor 2032a before returning to the coil 2022 via nodes 2034b and 2034e. As such, a second DC voltage level (e.g., +Vdc/2) is provided at the output of the rectifier 2018 (e.g., across the first capacitor 2032a).

Figure 22D:
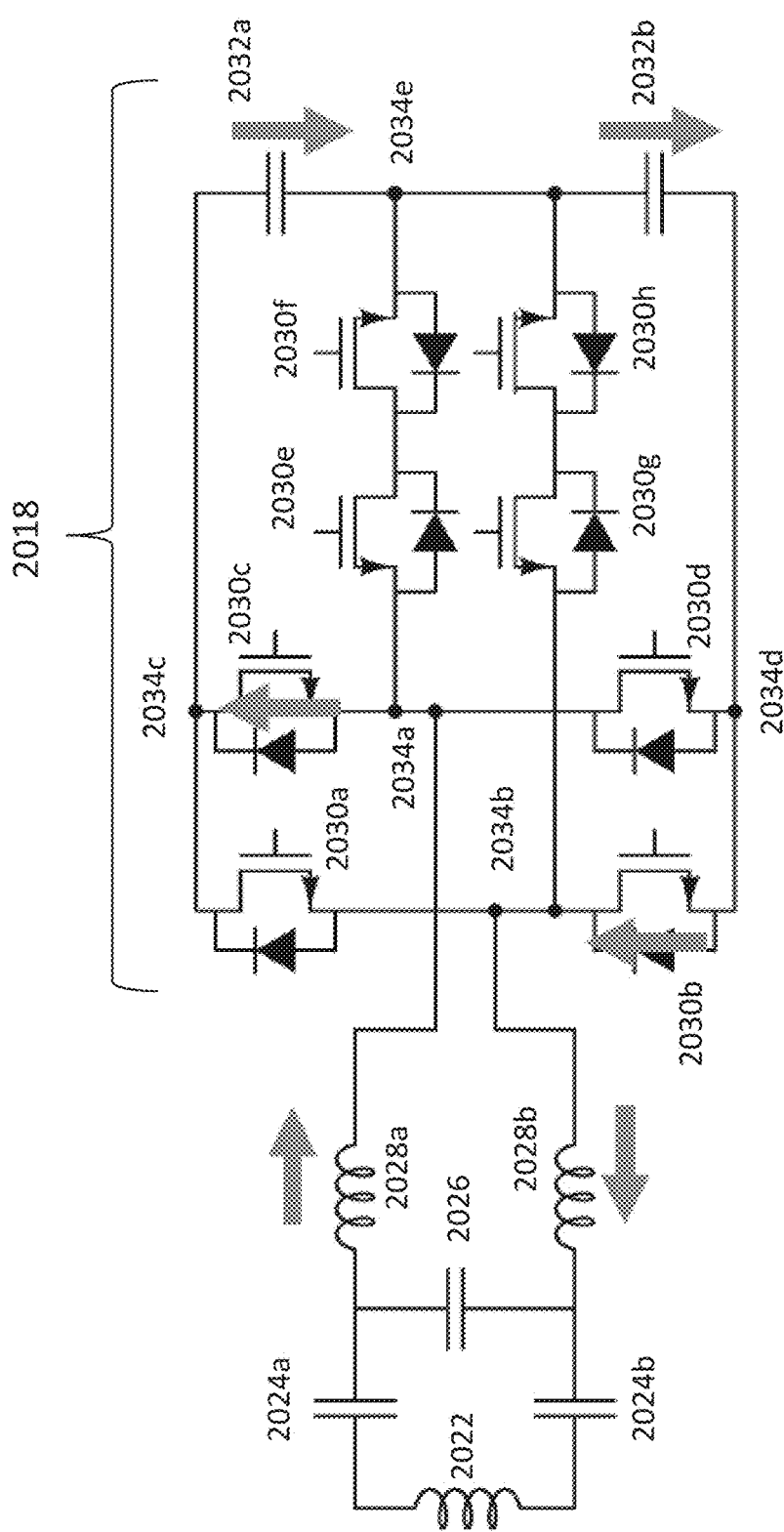

FIG. 22D corresponds to operation of the rectifier 1208 at a second transition time ($t_1$). A commutation path is provided through switches 2030c and 2030b. In some examples, the commutation path is provided through a body diode of switch 2030b. Current is received at the first node 2034a from the coil 2022. The commutation path directs the current to the third node 2034c to charge the first and second capacitors 2032a, 2023b before returning to the coil 2022 via nodes 2034b and 2034d.

Figure 22E:
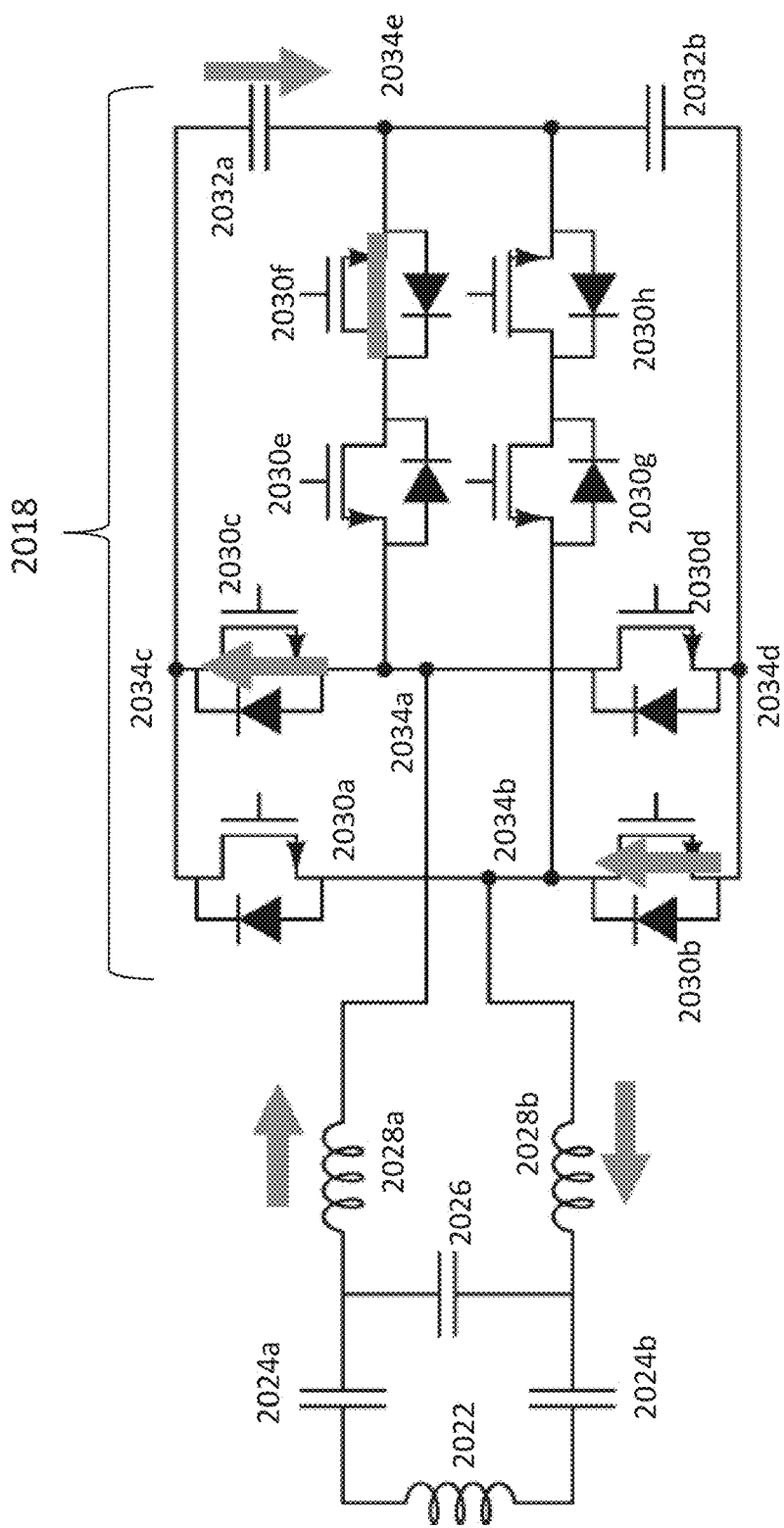

FIG. 22E corresponds to operation of the rectifier 1208 during a third interval ($d_2$) (i.e., time $t_1$ to time $t_2$). A commutation path is provided through switches 2030c and 2030b. Current is received at the first node 2034a from the coil 2022. The commutation path directs the current to the third node 2034c to continue to charge the first and second capacitors 2032a, 2023b before returning to the coil 2022 via nodes 2034b and 2034d. In some examples, the switch 2030f is turned on during the third interval. As such, a third DC voltage level (e.g., +Vdc) is provided at the output of the rectifier 2018 (e.g., across the first and second capacitors 2032a, 2032b).

Figure 22F:
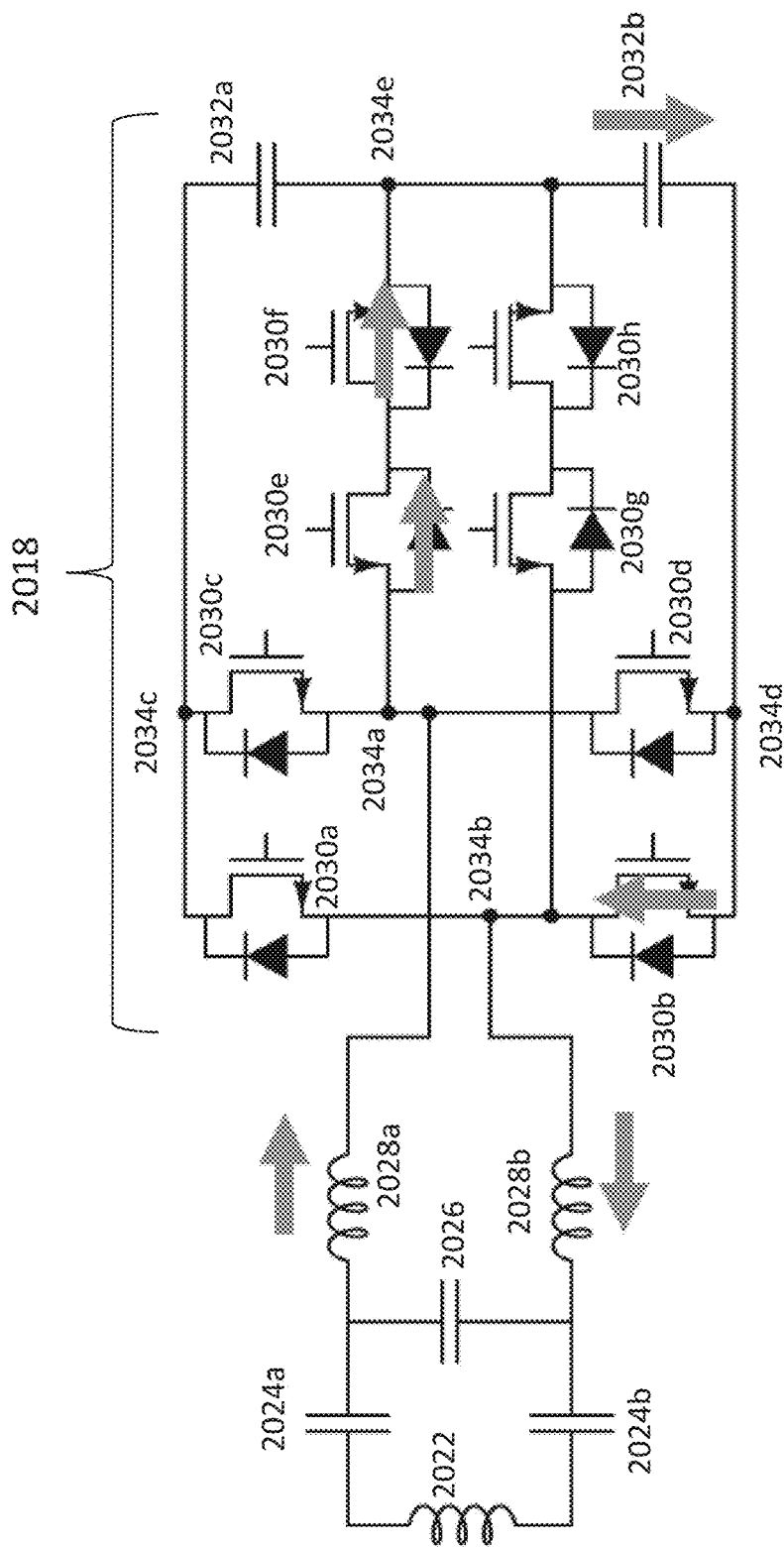

FIG. 22F corresponds to operation of the rectifier 1208 at a third transition time ($t_2$). A commutation path is provided through switches 2030e, 2030f, and 2030b. In some examples, the commutation path is provided through a body diode of switch 2030e. Current is received at the first node 2034a from the coil 2022. The commutation path directs the current to the fifth node 2034e to charge the second capacitor 2032b before returning to the coil 2022 via nodes 2034b and 2034d.

Figure 22G:
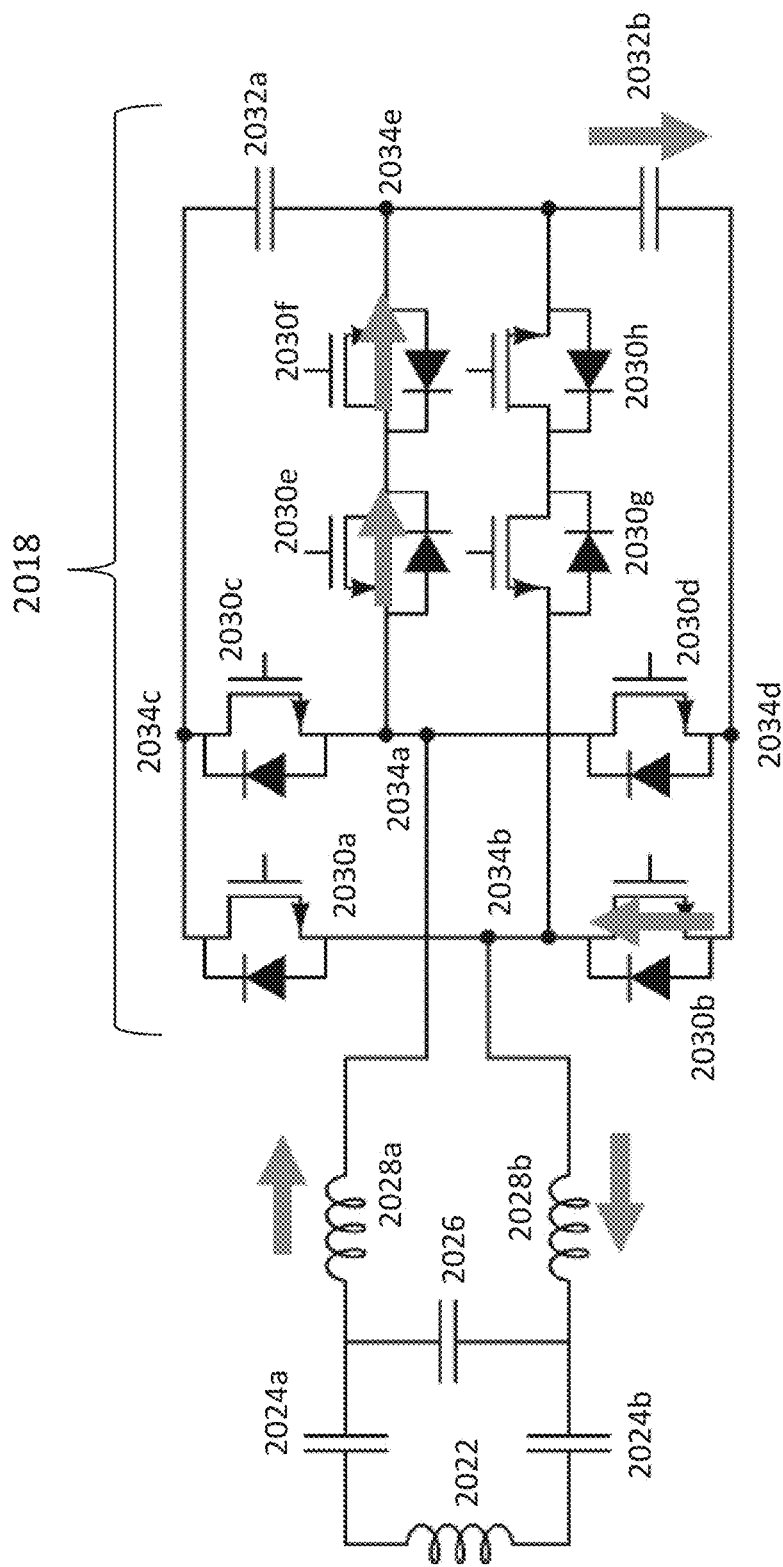

FIG. 22G corresponds to operation of the rectifier 1208 during a fourth interval ($d_3$) (i.e., time $t_2$ to time $t_3$). A commutation path is provided through switches 2030e, 2030f, and 2030b. Current is received at the first node 2034a from the coil 2022. The commutation path directs the current to the fifth node 2034e to continue to charge the second capacitor 2032b before returning to the coil 2022 via nodes 2034b and 2034d. As such, the third DC voltage level (e.g., +Vdc/2) is provided at the output of the rectifier 2018 (e.g., across the second capacitor 2032b).

Figure 22H:
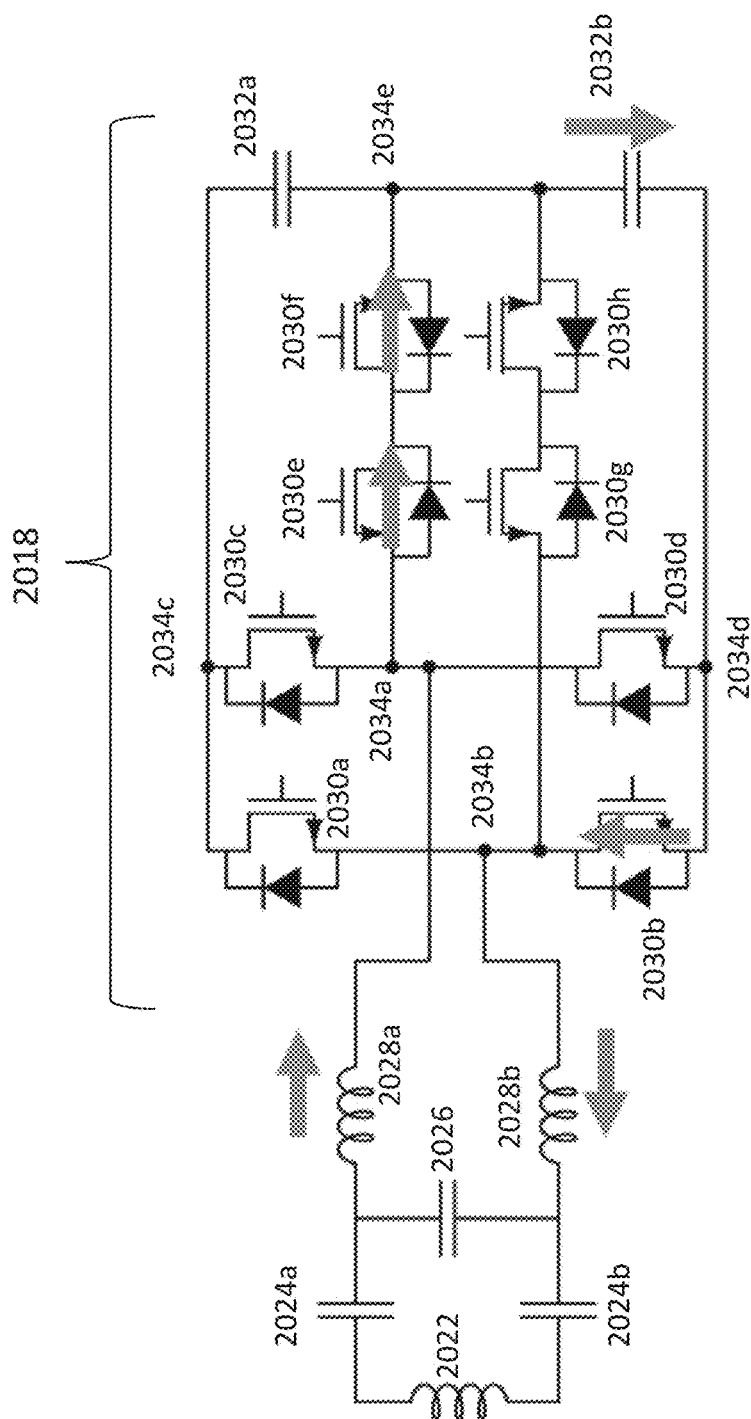

FIG. 22H corresponds to operation of the rectifier 1208 leading up to a zero-crossing $t_{zc1}$ event ($t_{zc1}$−dt). Operation at this pre-transition time is similar to that of operation during the fourth interval ($d_3$) (e.g., as shown in FIG. 22G).

Figure 22I:
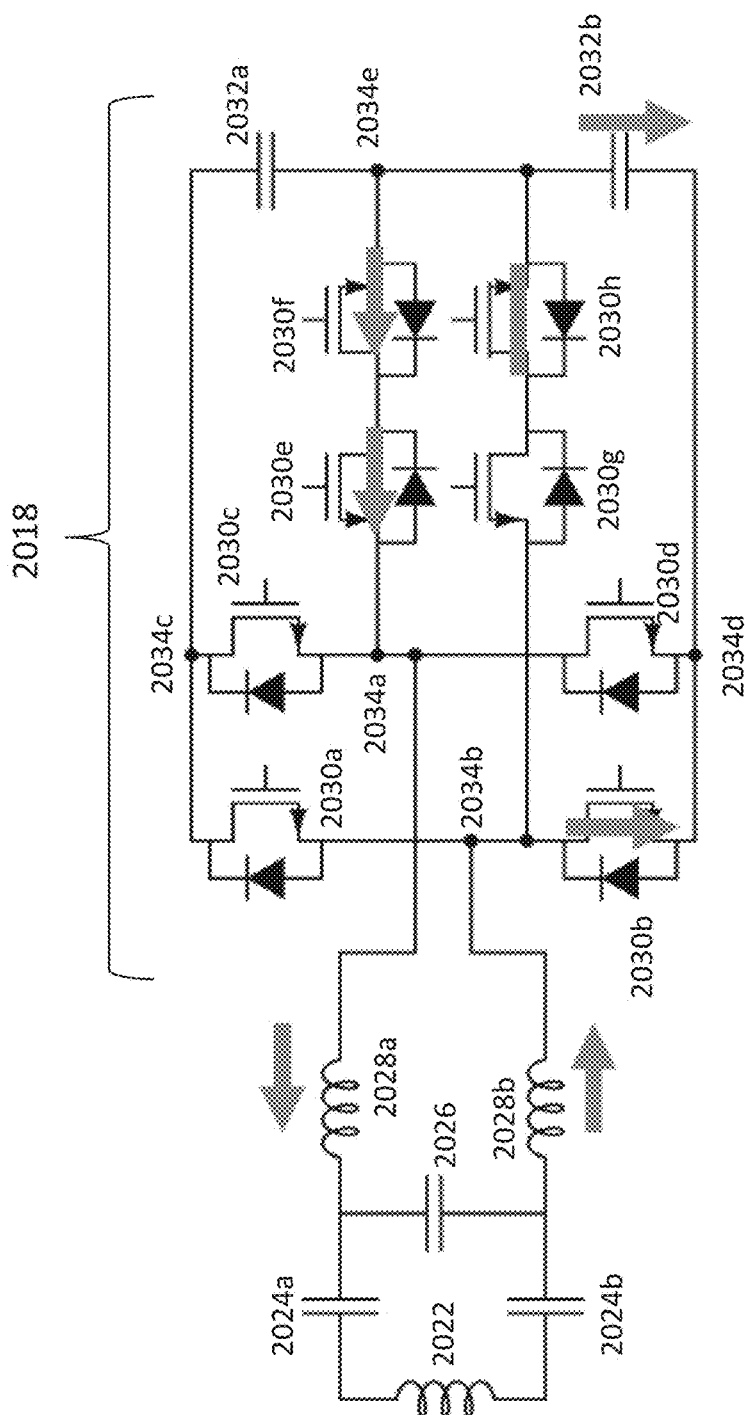

FIG. 22I corresponds to operation of the rectifier 1208 following the zero-crossing event $t_{zc1}$($t_{zc1}$+dt). A commutation path is provided through switches 2030e, 2030f, and 2030b. Current is received at the second node 2034b from the coil 2022. The commutation path directs the current to the fourth node 2034d and through the second capacitor 2032b before returning to the coil 2022 via nodes 2034a and 2034e. In some examples, the switch 2030h is turned on during this period.

Figure 22J:
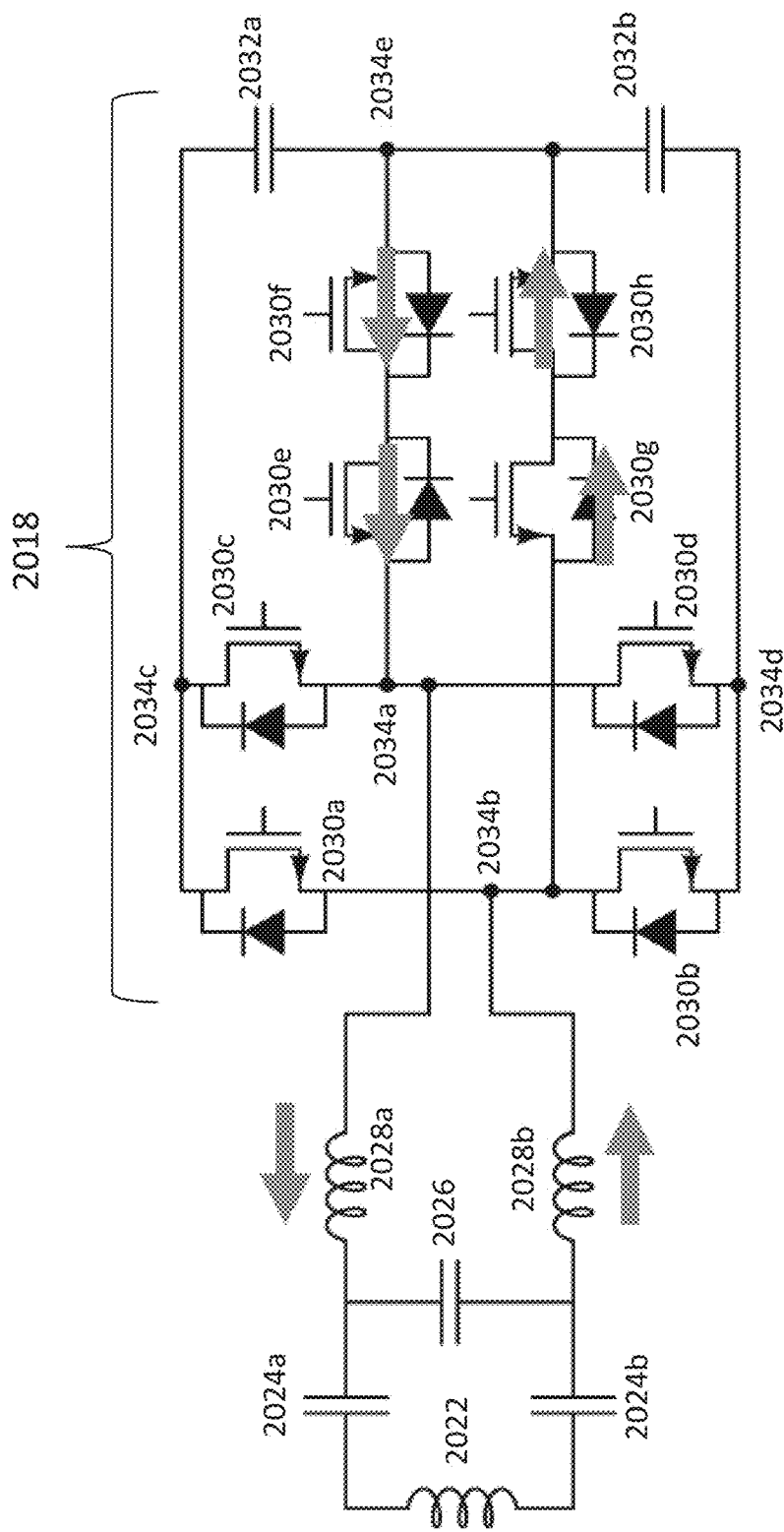

FIG. 22J corresponds to operation of the rectifier 1208 at a fourth transition time ($t_3$). A commutation path is provided through switches 2030e, 2030f, 2030g, and 2030h. In some examples, the commutation path is provided through a body diode of switch 2030g. Current is received at the second node 2034b from the coil 2022. The commutation path directs the current to the fifth node 2034e where it is returned to the coil 2022 via the first node 2034a.

Figure 22K:
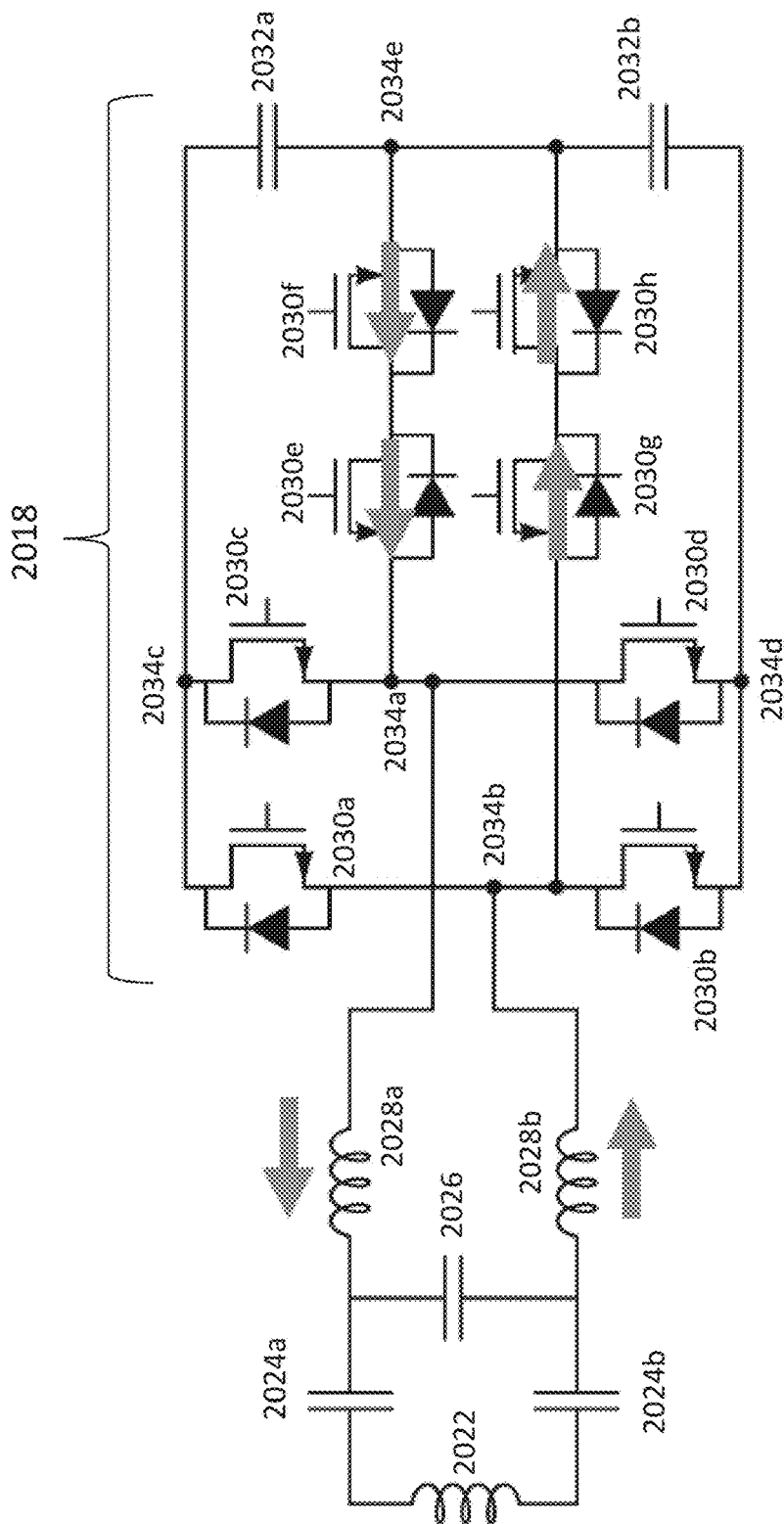

FIG. 22K corresponds to operation of the rectifier 1208 during a fifth interval ($d_4$) (i.e., time $t_3$ to time $t_4$). A commutation path is provided through switches 2030e, 2030f, 2030g, and 2030h. Current is received at the second node 2034b from the coil 2022. The commutation path directs the current to the fifth node 2034e where it is returned to the coil 2022 via the first node 2034a. As such, the first DC voltage level (e.g., 0V) is provided at the output of the rectifier 2018 (e.g., at node 2034e).

Figure 22L:
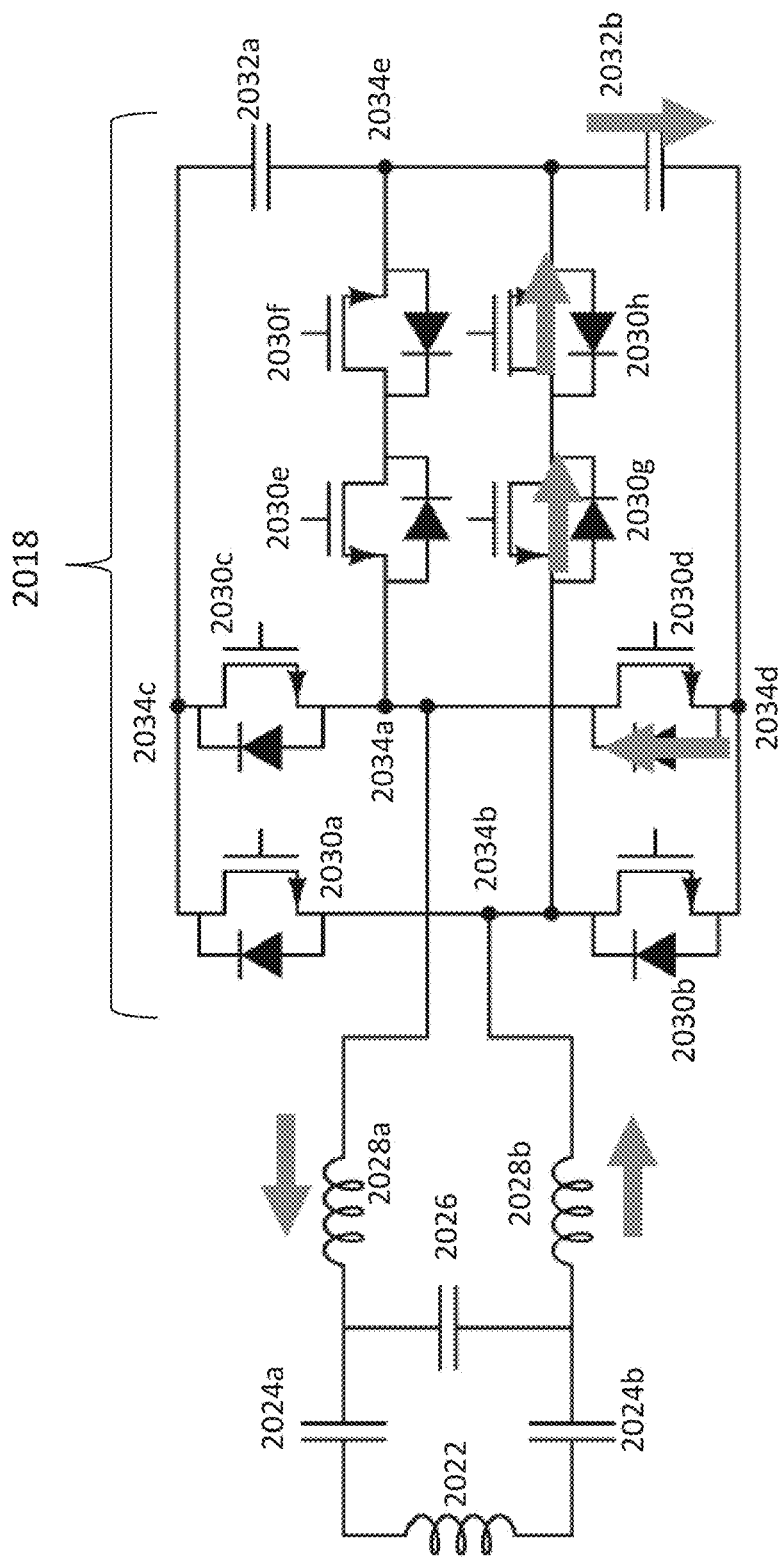

FIG. 22L corresponds to operation of the rectifier 1208 at a fifth transition time ($t_4$). A commutation path is provided through switches 2030d, 2030g, and 2030h. In some examples, the commutation path is provided through a body diode of switch 2030*d*. Current is received at the second node 2034*b* from the coil 2022. The commutation path directs the current to the fifth node 2034*e* to charge the second capacitor 2032*b* before returning to the coil 2022 via nodes 2034*a* and 2034*d*.

Figure 22M:
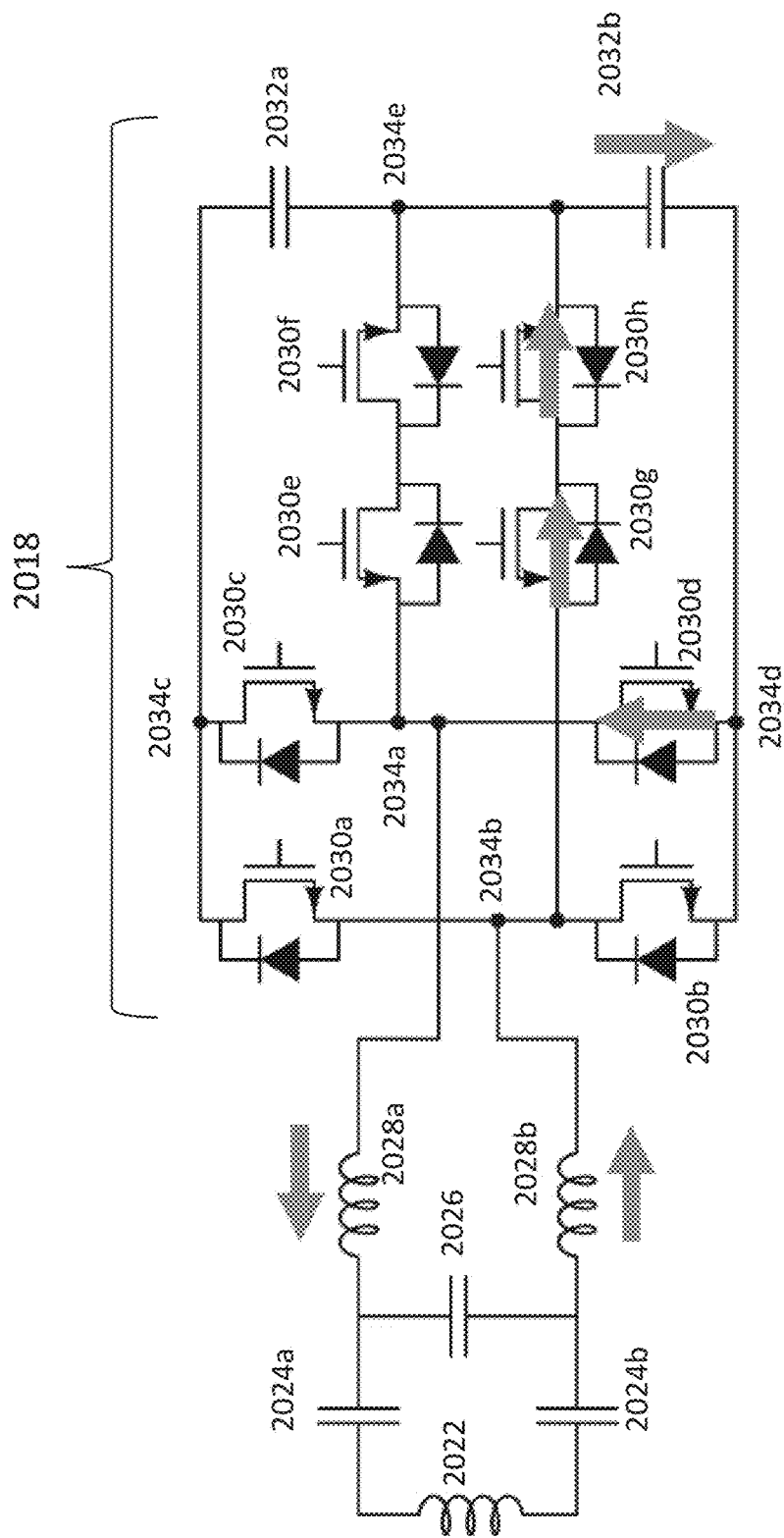

FIG. 22M corresponds to operation of the rectifier 1208 during a sixth interval ($d_5$) (i.e., time $t_4$ to time $t_5$). A commutation path is provided through switches 2030*d*, 2030*g*, and 2030*h*. Current is received at the second node 2034*b* from the coil 2022. The commutation path directs the current to the fifth node 2034*e* to continue to charge the second capacitor 2032*b* before returning to the coil 2022 via nodes 2034*a* and 2034*d*. As such, a fourth DC voltage level (e.g., −Vdc/2) is provided at the output of the rectifier 2018 (e.g., across the second capacitor 2032*b*).

Figure 22N:
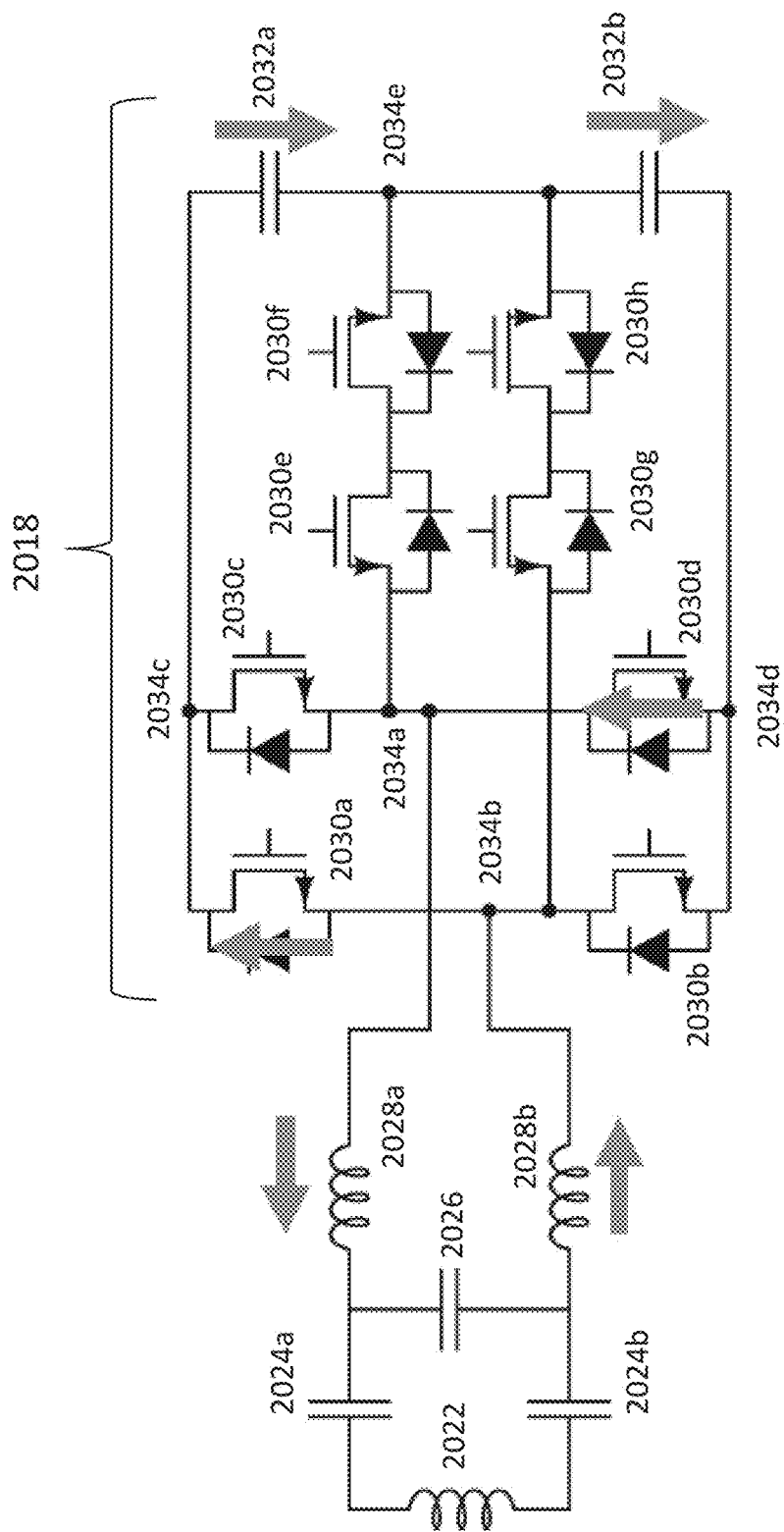

FIG. 22N corresponds to operation of the rectifier 1208 at a sixth transition time ($t_5$). A commutation path is provided through switches 2030*a* and 2030*d*. In some examples, the commutation path is provided through a body diode of switch 2030*a*. Current is received at the second node 2034*b* from the coil 2022. The commutation path directs the current to the third node 2034*c* to charge the first and second capacitors 2032*a*, 2032*b* before returning to the coil 2022 via nodes 2034*a* and 2034*d*.

Figure 22O:
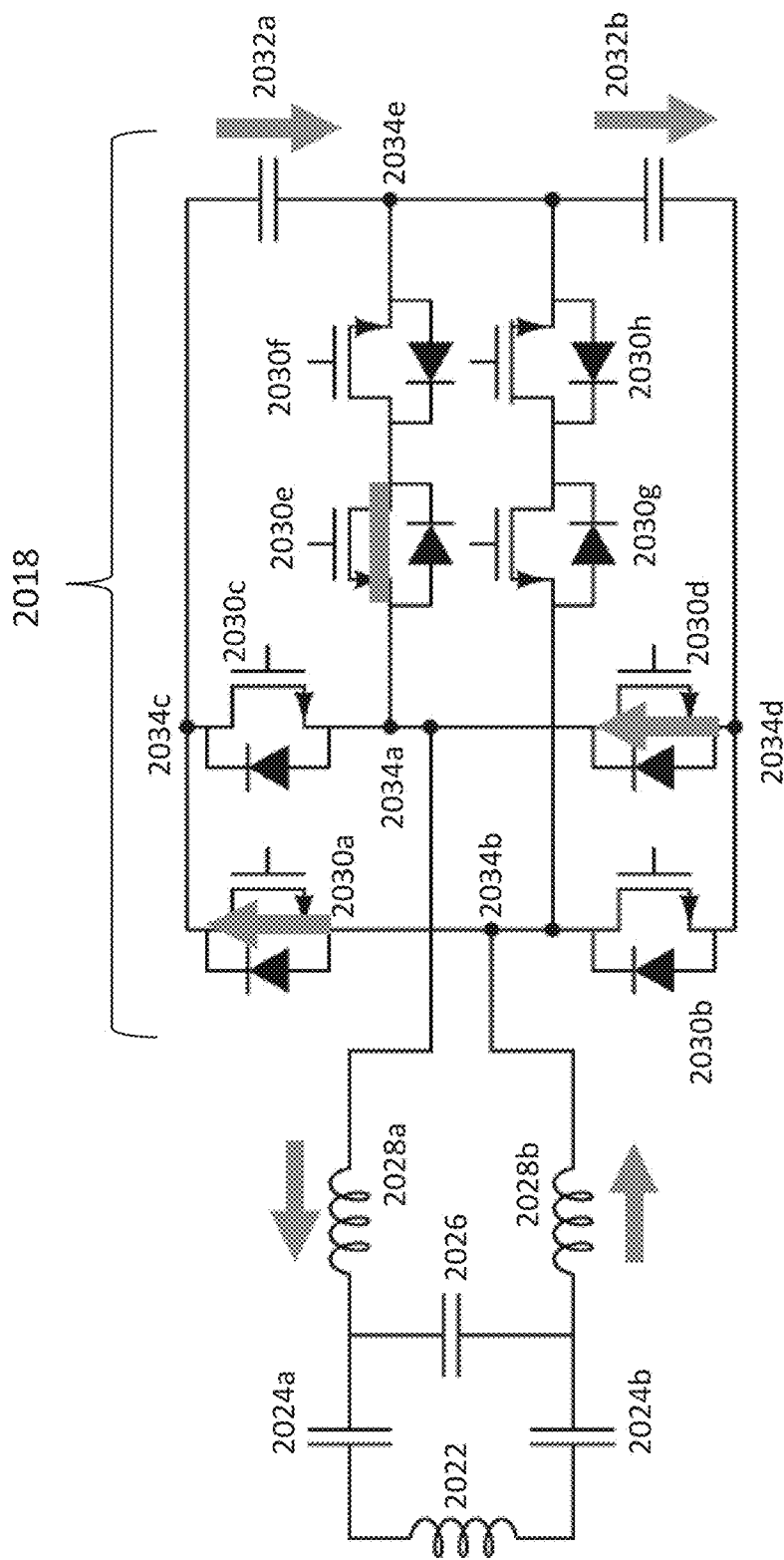

FIG. 22O corresponds to operation of the rectifier 1208 during a seventh interval ($d_6$) (i.e., time $t_5$ to time $t_6$). A commutation path is provided through switches 2030*a* and 2030*d*. Current is received at the second node 2034*b* from the coil 2022. The commutation path directs the current to the third node 2034*c* to continue to charge the first and second capacitors 2032*a*, 2032*b* before returning to the coil 2022 via nodes 2034*a* and 2034*d*. In some examples, the switch 2030*e* is turned on during the seventh interval. As such, a fifth DC voltage level (e.g., −Vdc) is provided at the output of the rectifier 2018 (e.g., across the first and second capacitors 2032*a*, 2032*b*).

Figure 22P:
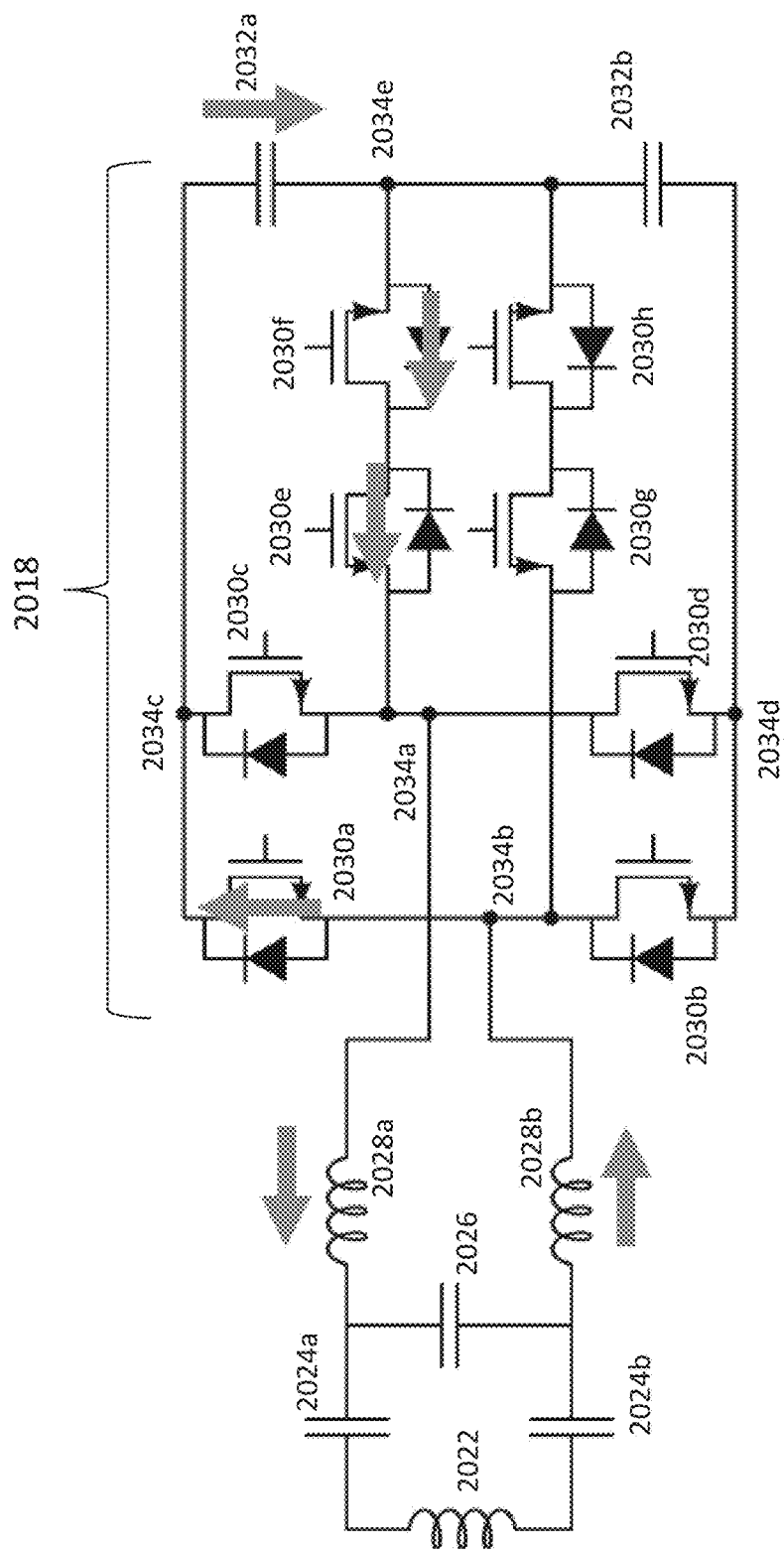

FIG. 22P corresponds to operation of the rectifier 1208 at a seventh transition time ($t_6$). A commutation path is provided through switches 2030*a*, 2030*e*, and 2030*f*. In some examples, the commutation path is provided through a body diode of switch 2030*f*. Current is received at the second node 2034*b* from the coil 2022. The commutation path directs the current to the third node 2034*c* to charge the first capacitor 2032*a* before returning to the coil 2022 via nodes 2034*a* and 2034*e*.

Figure 22Q:
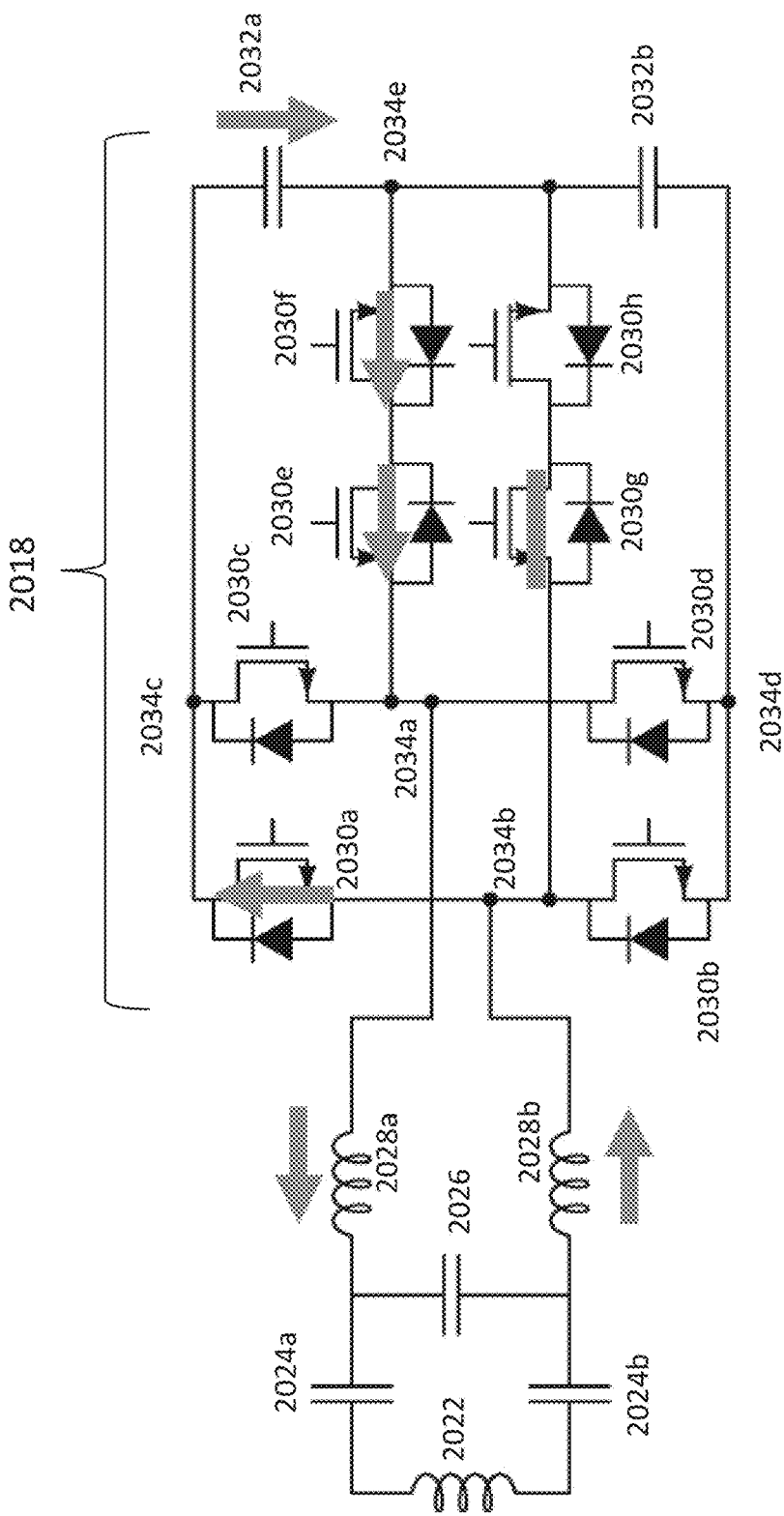
Figure 22R:
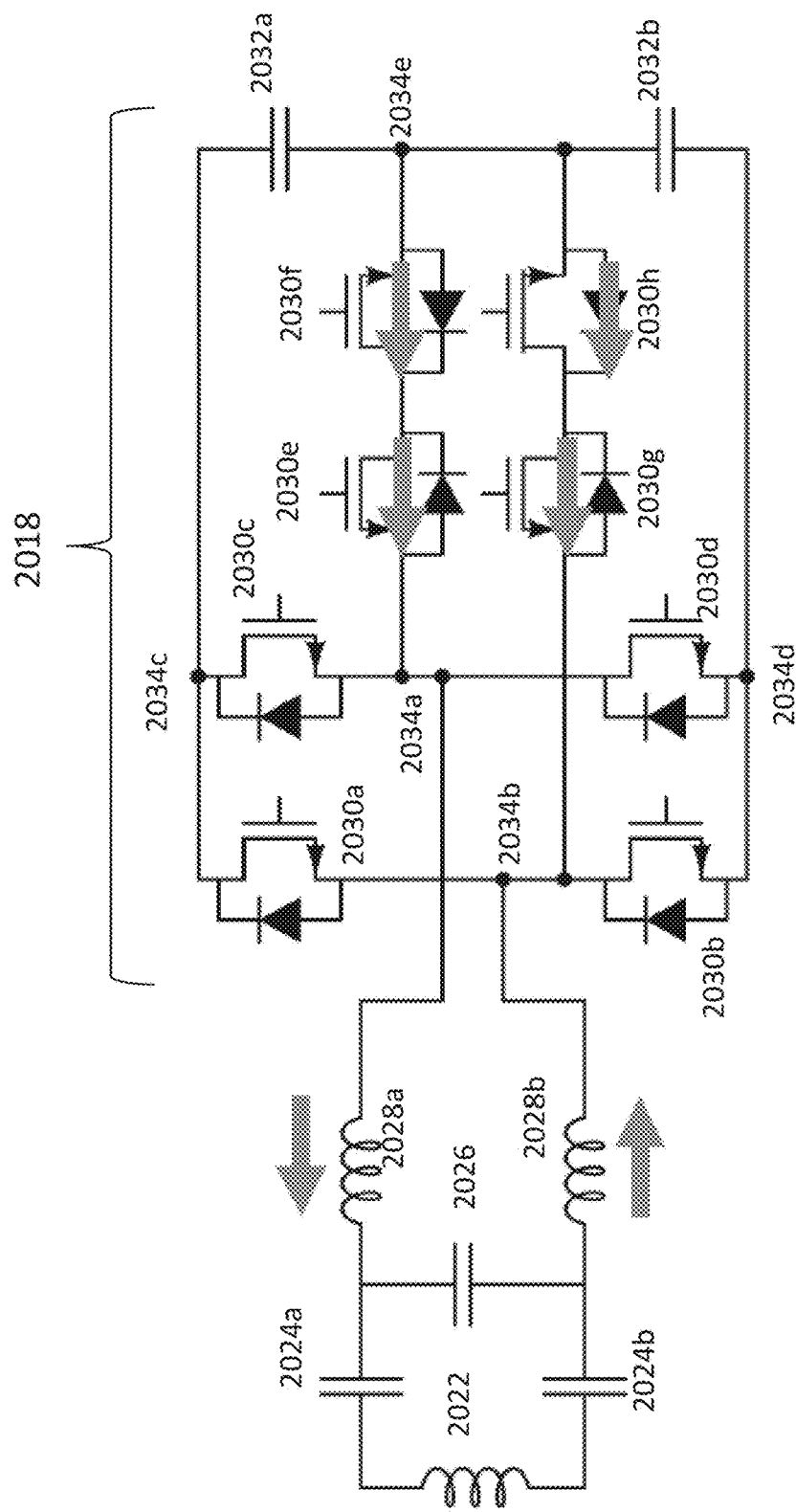

FIG. 22Q corresponds to operation of the rectifier 1208 during an eighth interval ($d_7$) (i.e., time $t_6$ to time $t_7$). A commutation path is provided through switches 2030*a*, 2030*e*, and 2030*f*. Current is received at the second node 2034*b* from the coil 2022. The commutation path directs the current to the third node 2034*c* to continue to charge the first capacitor 2032*a* before returning to the coil 2022 via nodes 2034*a* and 2034*e*. In some examples, the switch 2030*g* is turned on during the eighth interval. As such, the fourth DC voltage level (e.g., −Vdc/2) is provided at the output of the rectifier 2018 (e.g., across the first capacitor 2032*a*).

FIG. 22R corresponds to operation of the rectifier 1208 at an eighth transition time ($t_7$). A commutation path is provided through switches 2030*e*, 2030*f*, 2030*g*, and 2030*h*. In some examples, the commutation path is provided through a body diode of switch 2030*h*. Current is received at the second node 2034*b* from the coil 2022. The commutation path directs the current to the fifth node 2034*e* where it is returned to the coil 2022 via the first node 2034*a*.

Figure 23:
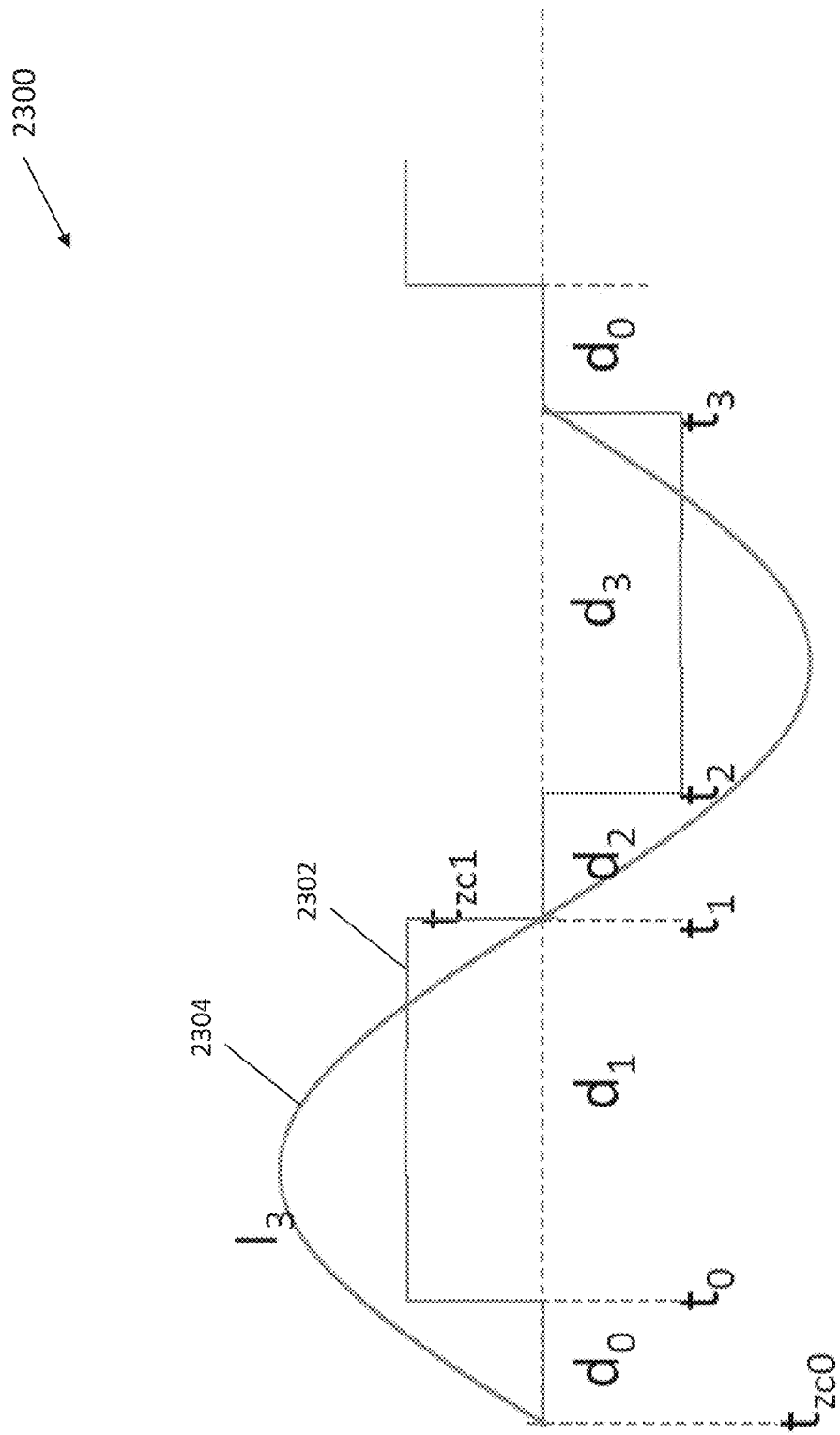
FIG. 23 is a plot illustrating several waveforms associated with the operation of the multi-level rectifier of FIG. 20 in accordance with at least one embodiment described herein.

While the examples above describe operating the rectifier 2018 to generate DC power having five distinct voltage levels, it should be appreciated that the rectifier 2018 may be operated to provide DC power with different multi-level variations. For example, FIG. 23 is a plot 2300 including a multi-level voltage waveform 2302 corresponding to multiple DC voltage levels generated by the rectifier 2018 based on an input current waveform 2304. As shown, the rectifier 2018 is configured to output three distinct voltage levels (e.g., −Vdc, 0V, +Vdc). In generating the three distinct output voltages, the first and second capacitors 2032*a*, 2032*b* are charged substantially equally. FIGS. 24A-24I illustrate various states of the rectifier 2018 while being operated to generate three-level DC power.

Figure 24A:
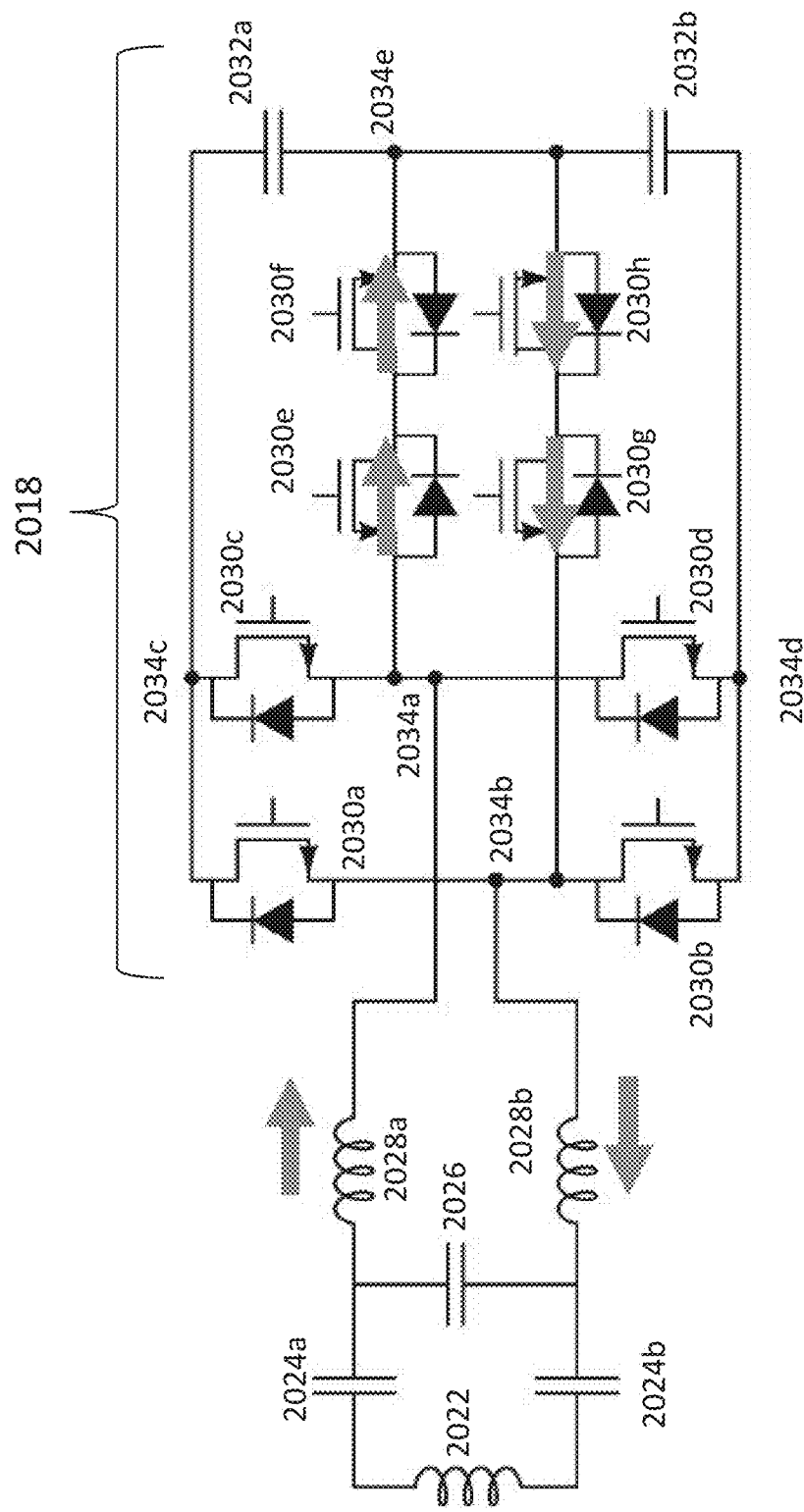
FIGS. 24A-24I are schematic diagrams illustrating the operation of the multi-level rectifier of FIG. 20 in accordance with at least one embodiment described herein.

FIG. 24A corresponds to operation of the rectifier 1208 during a first interval ($d_0$) (i.e., time $t_{zc0}$ to time $t_0$). A commutation path is provided through switches 2030*e*, 2030*f*, 2030*g*, and 2030*h*. Current is received at the first node 2034*a* from the coil 2022. The commutation path directs the current to the fifth node 2034*e* where it is returned to the coil 2022 via the second node 2034*b*. As such, a first DC voltage level (e.g., 0V) is provided at the output of the rectifier 2018 (e.g., at node 2034*e*).

Figure 24B:
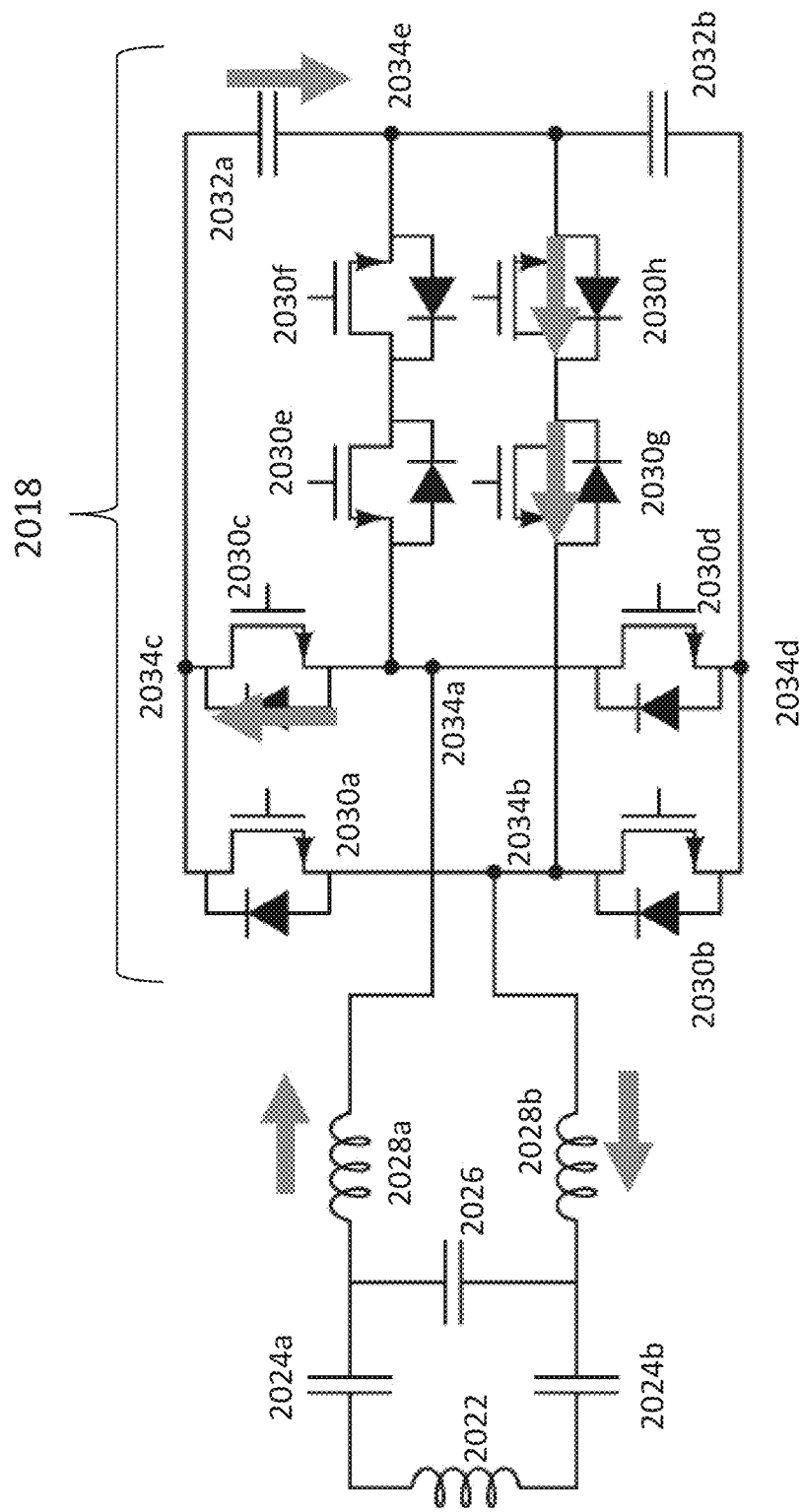

FIG. 24B corresponds to operation of the rectifier 1208 at a first transition time ($t_0$). A commutation path is provided through switches 2030*c*, 2030*g*, and 2030*h*. In some examples, the commutation path is provided through a body diode of switch 2030*c*. Current is received at the first node 2034*a* from the coil 2022. The commutation path directs the current to the third node 2034*c* to charge the first capacitor 2032*a* before returning to the coil 2022 via nodes 2034*b* and 2034*e*.

Figure 24C:
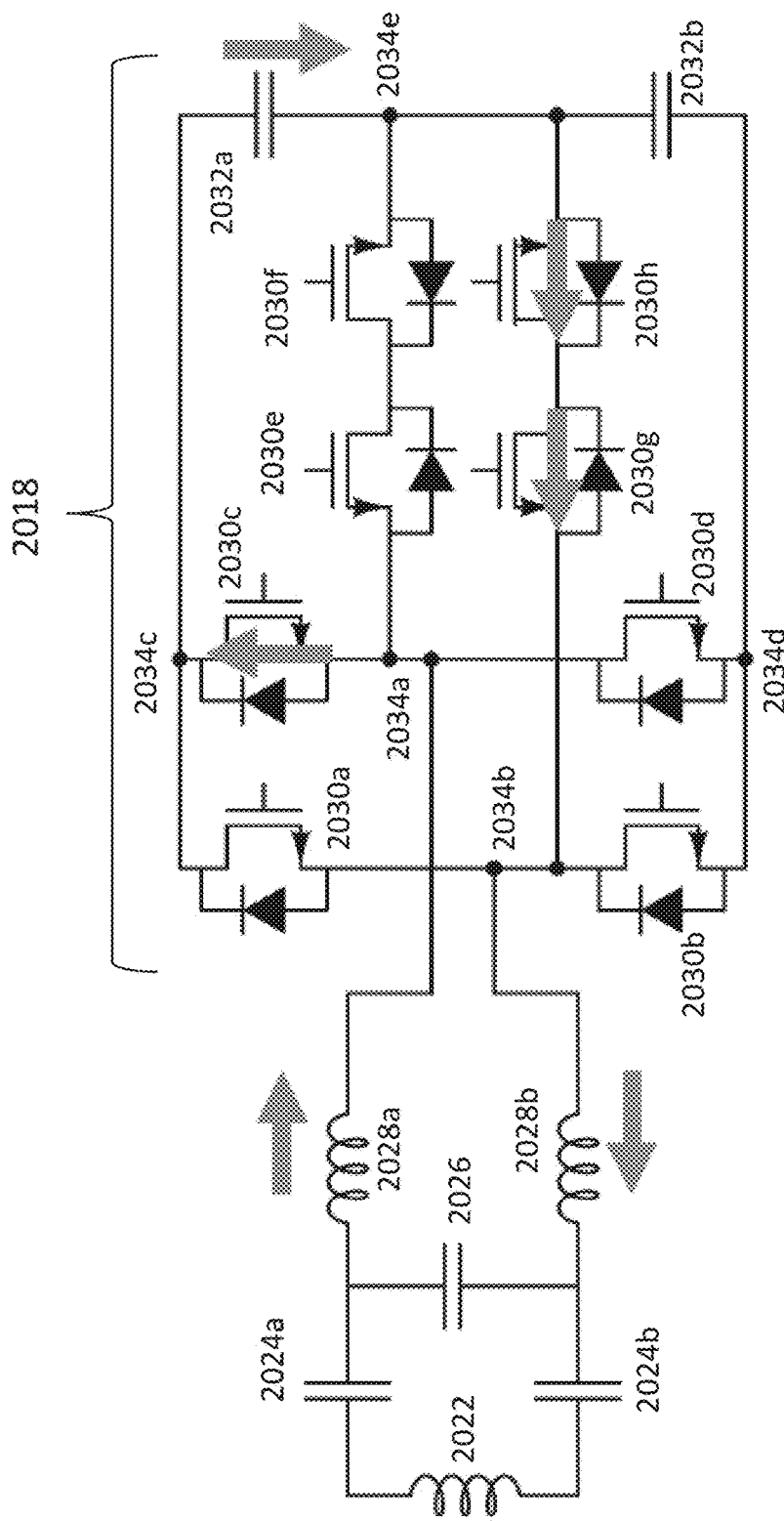

FIG. 24C corresponds to operation of the rectifier 1208 during a second interval ($d_1$) (i.e., time $t_0$ to time $t_1$). A commutation path is provided through switches 2030*c*, 2030*g*, and 2030*h*. Current is received at the first node 2034*a* from the coil 2022. The commutation path directs the current to the third node 2034*c* to continue to charge the first capacitor 2032*a* before returning to the coil 2022 via nodes 2034*b* and 2034*e*. As such, a second DC voltage level (e.g., +Vdc) is provided at the output of the rectifier 2018 (e.g., across the first capacitor 2032*a*).

Figure 24D:
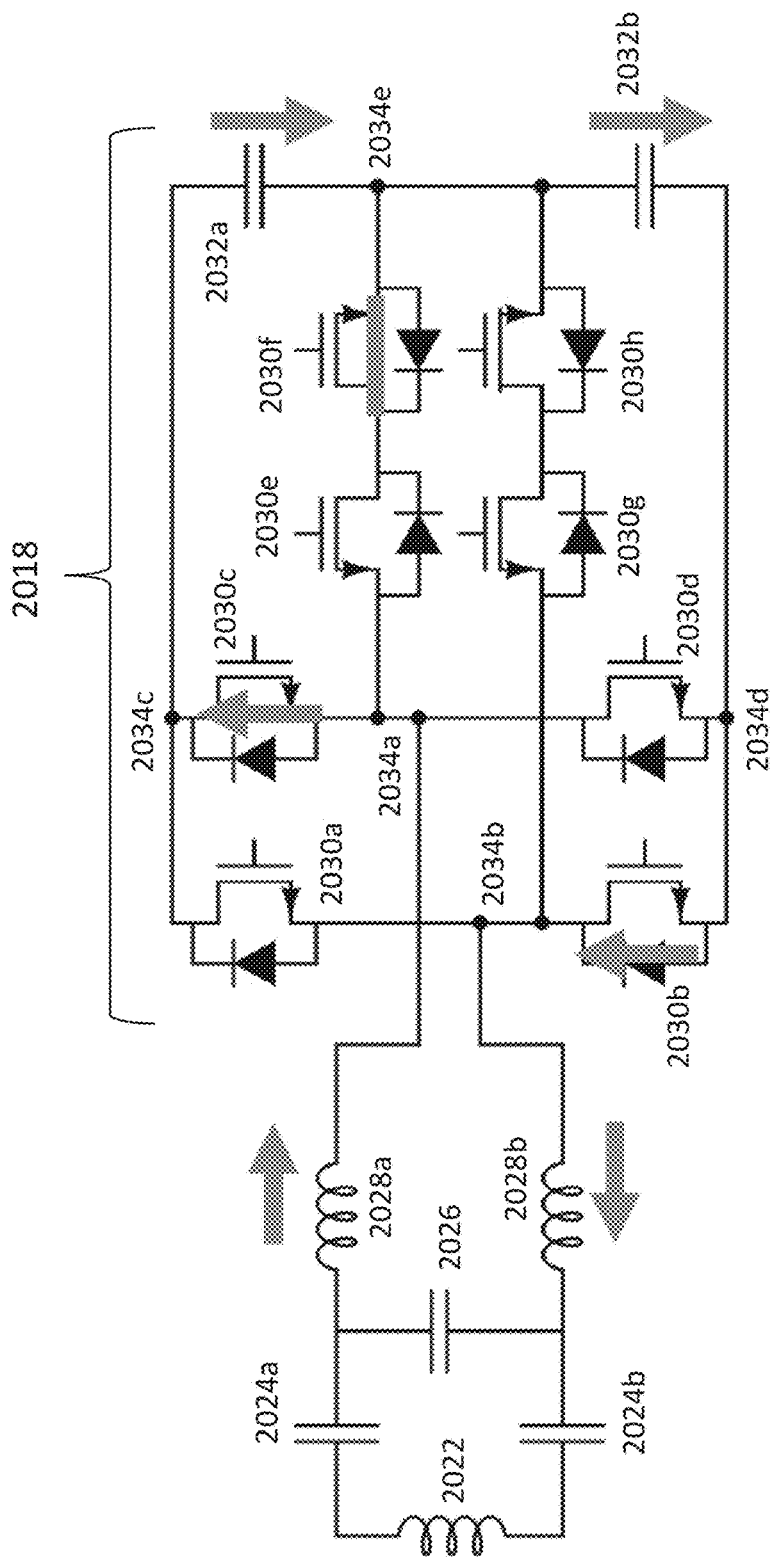

FIG. 24D corresponds to operation of the rectifier 1208 at a second transition time ($t_1$). A commutation path is provided through switches 2030*c* and 2030*b*. In some examples, the commutation path is provided through a body diode of switch 2030*b*. Current is received at the first node 2034*a* from the coil 2022. The commutation path directs the current to the third node 2034*c* to charge the first and second capacitors element 2032*a*, 2032*b* before returning to the coil 2022 via nodes 2034*b* and 2034*d*. In some examples, the switch 2030*f* is turned on at the second transition time.

Figure 24E:
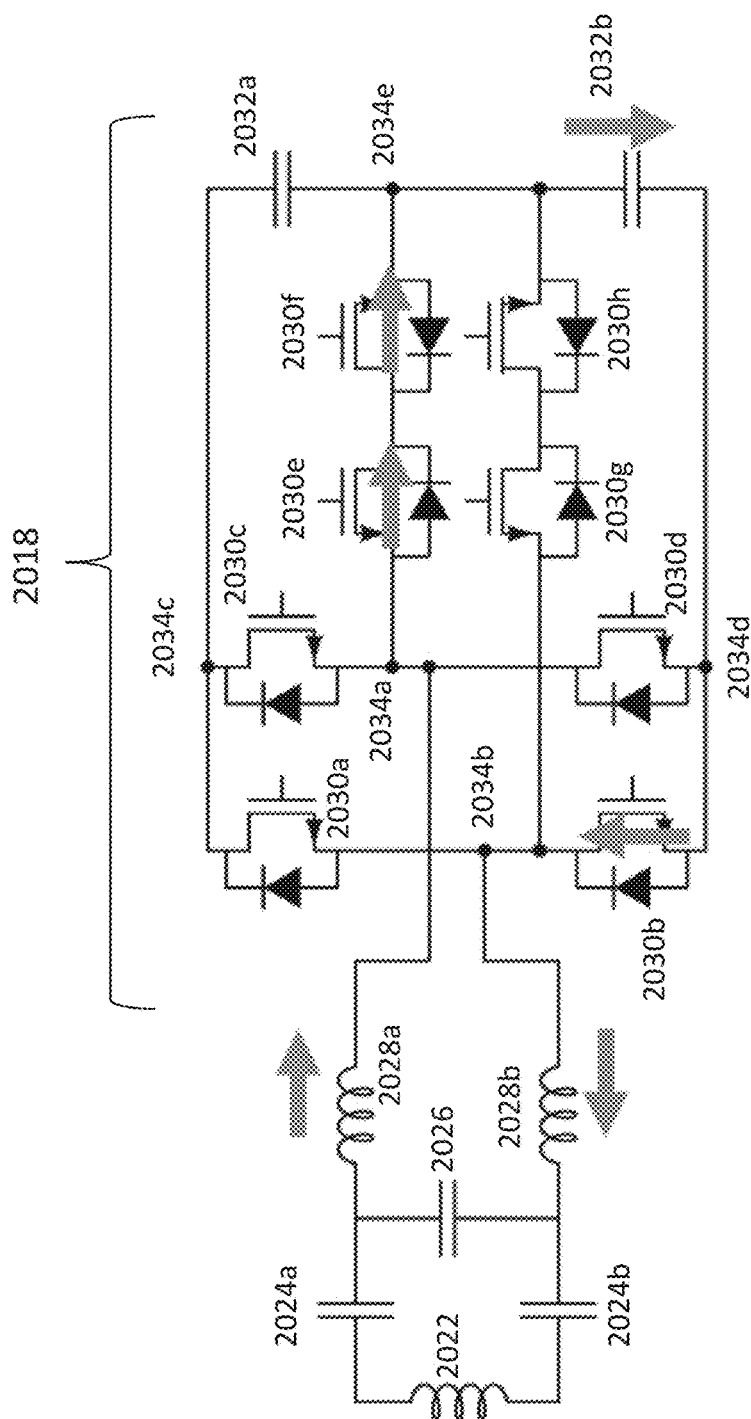

FIG. 24E corresponds to operation of the rectifier 1208 leading up to a zero-crossing $t_{zc1}$ event ($t_{zc1}$−dt). A commutation path is provided through switches 2030*e*, 2030*f*, and 2030*b*. Current is received at the first node 2034*a* from the coil 2022. The commutation path directs the current to the fifth node 2034*e* and through the second capacitor 2032*b* before returning to the coil 2022 via nodes 2034*b* and 2034*d*.

Figure 24F:
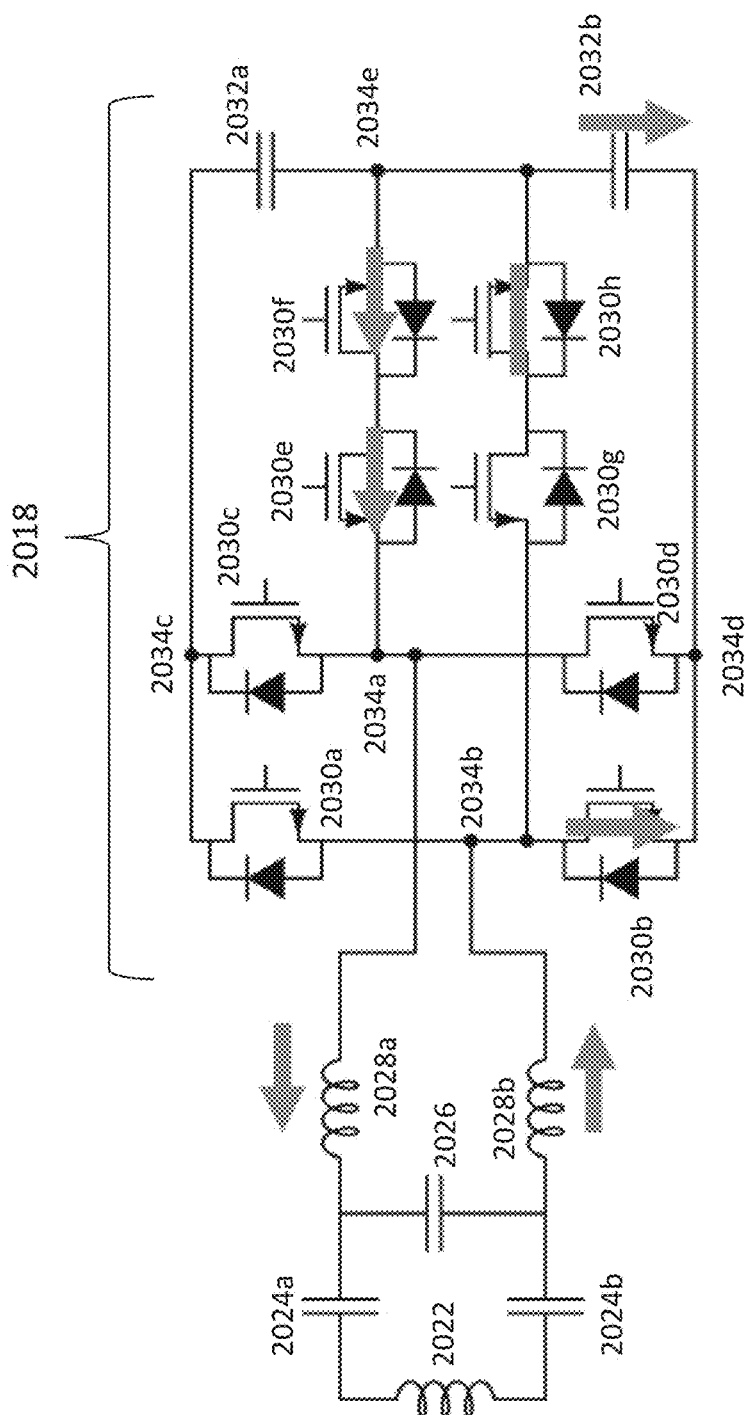

FIG. 24F corresponds to operation of the rectifier 1208 following the zero-crossing event $t_{zc1}$($t_{zc1}$+dt). A commutation path is provided through switches 2030*e*, 2030*f*, and 2030*b*. Current is received at the second node 2034*b* from the coil 2022. The commutation path directs the current to the fourth node 2034*d* and through the second capacitor 2032*b* before returning to the coil 2022 via nodes 2034*a* and 2034*e*. In some examples, the switch 2030*h* is turned on during this period.

Figure 24G:
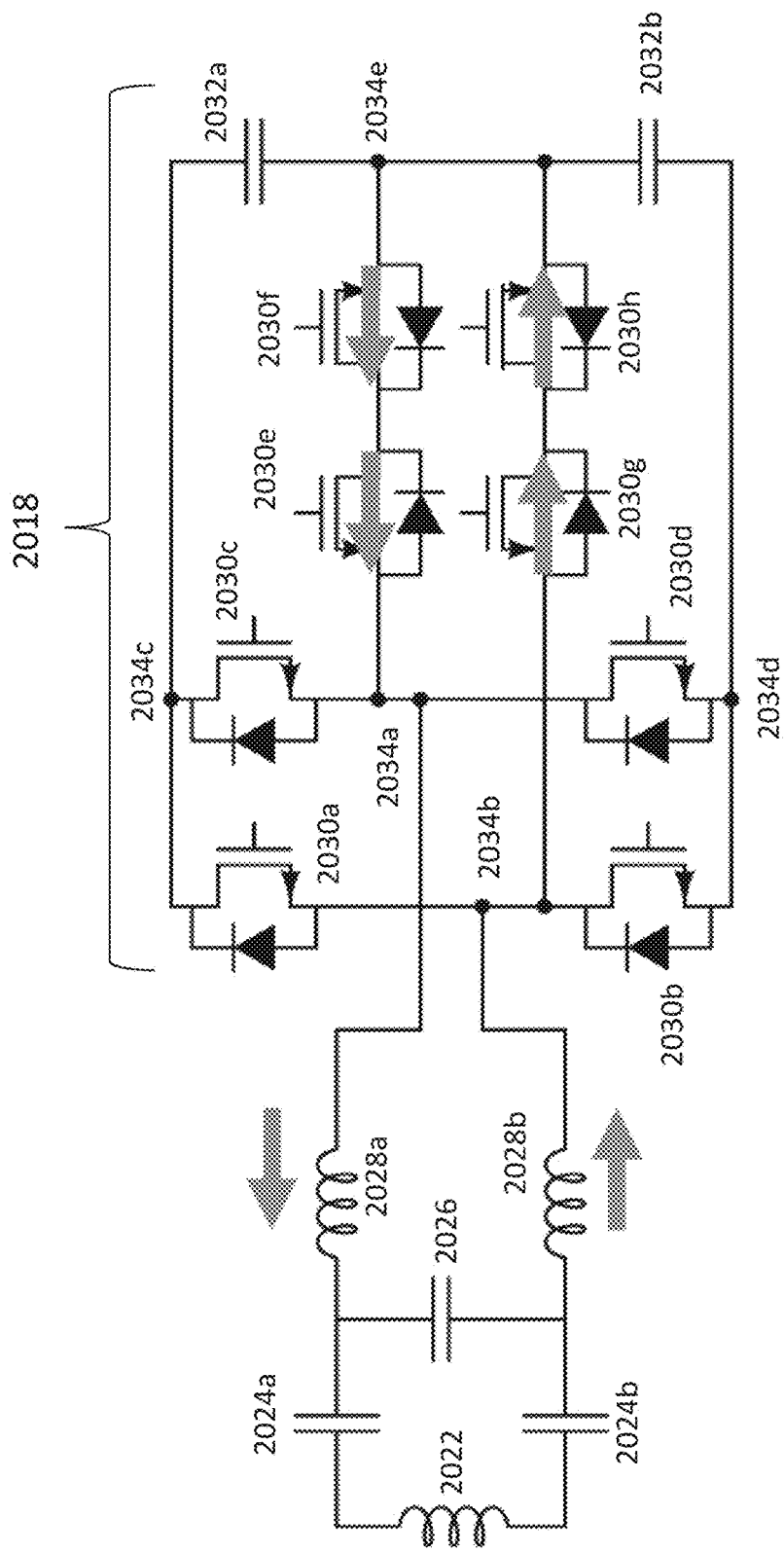

FIG. 24G corresponds to operation of the rectifier 1208 during a third interval ($d_2$) (i.e., time $t_1$ to time $t_2$). A commutation path is provided through switches 2030e, 2030f, 2030g, and 2030h. Current is received at the second node 2034b from the coil 2022. The commutation path directs the current to the fifth node 2034e where it is returned to the coil 2022 via the first node 2034a. As such, the first DC voltage level (e.g., 0V) is provided at the output of the rectifier 2018 (e.g., at node 2034e).

Figure 24H:
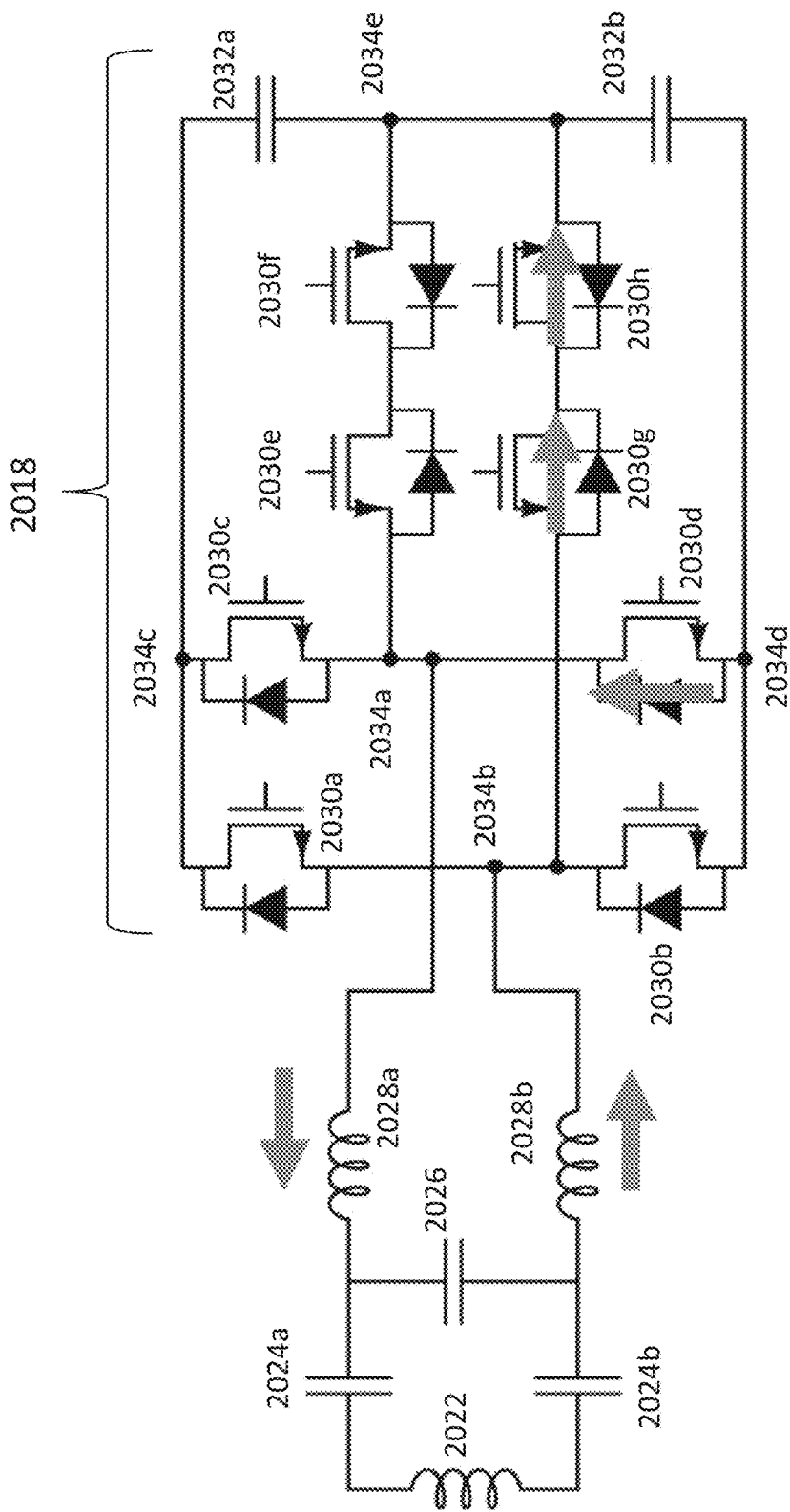

FIG. 24H corresponds to operation of the rectifier 1208 at a third transition time ($t_2$). A commutation path is provided through switches 2030d, 2030g, and 2030h. In some examples, the commutation path is provided through a body diode of switch 2030d. Current is received at the second node 2034b from the coil 2022. The commutation path directs the current to the fifth node 2034e to charge the second capacitor 2032b before returning to the coil 2022 via nodes 2034a and 2034d.

Figure 24I:
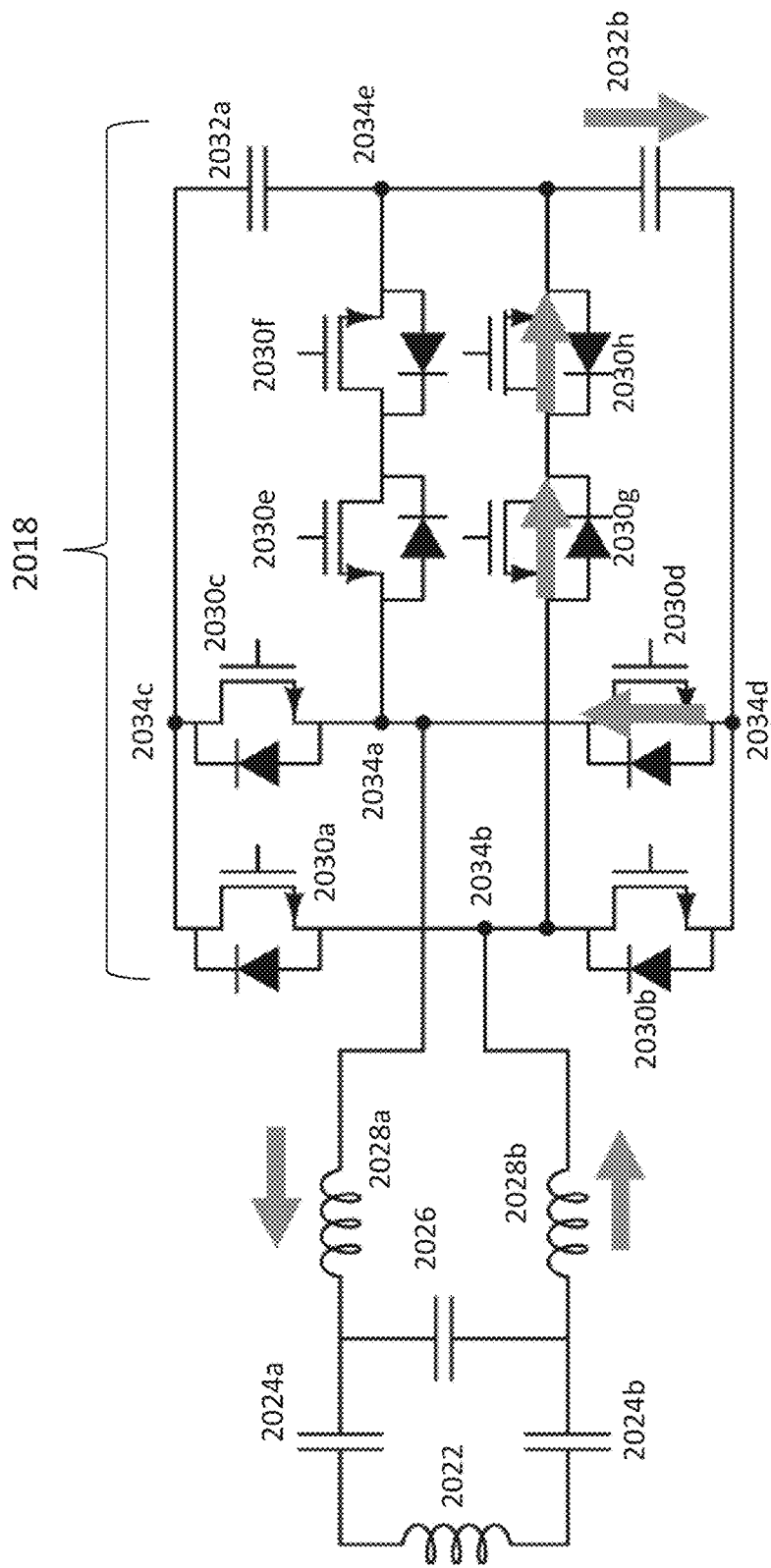

FIG. 24I corresponds to operation of the rectifier 1208 during a fourth interval ($d_3$) (i.e., time $t_2$ to time $t_3$). A commutation path is provided through switches 2030d, 2030g, and 2030h. Current is received at the second node 2034b from the coil 2022. The commutation path directs the current to the fifth node 2034e to continue to charge the second capacitive element 2032b before returning to the coil 2022 via nodes 2034a and 2034d. As such, a third DC voltage level (e.g., -Vdc) is provided at the output of the rectifier 2018 (e.g., across the second capacitor 2032b).

Figure 25:
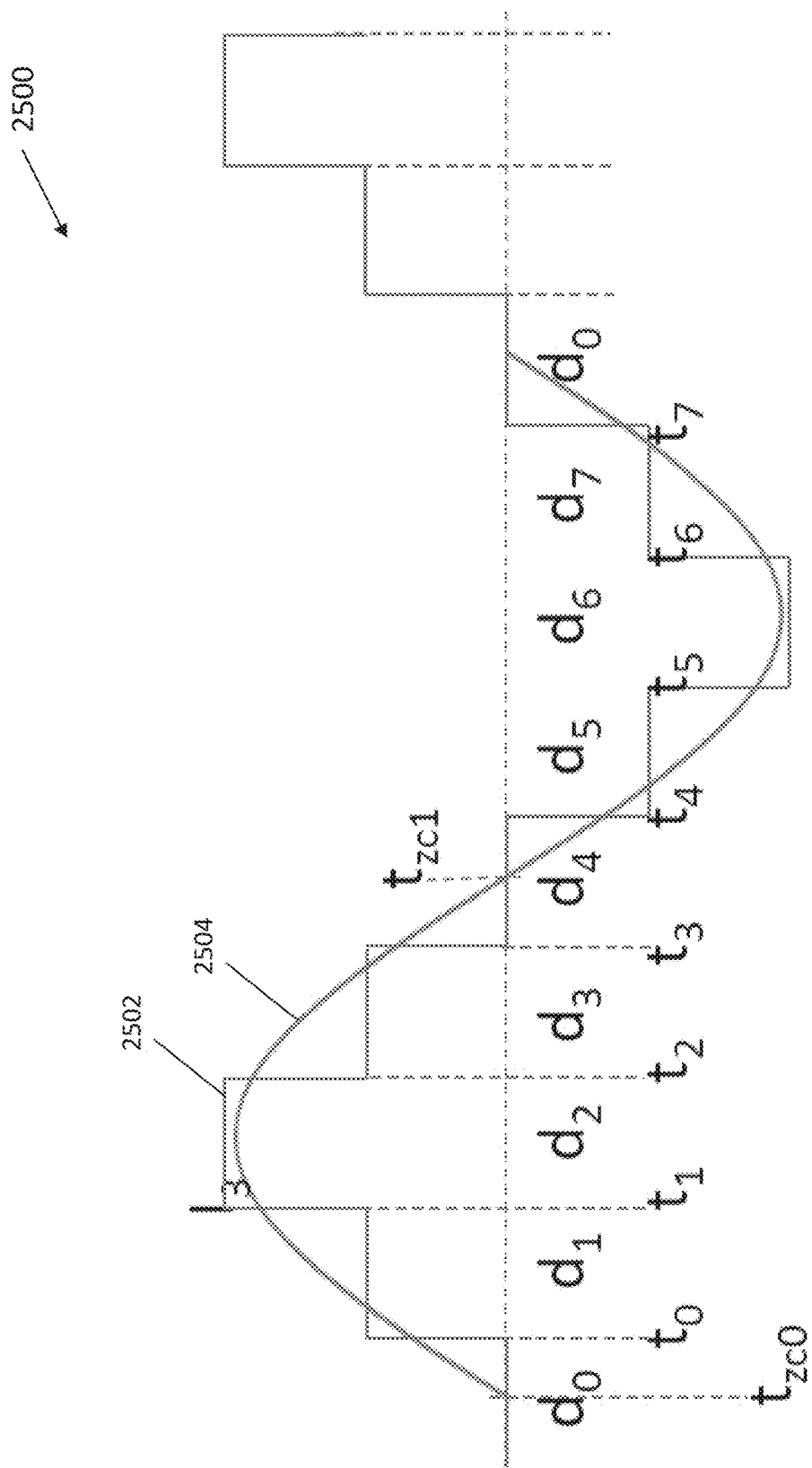
FIG. 25 is a plot illustrating several waveforms associated with the operation of the multi-level rectifier of FIG. 20 in accordance with at least one embodiment described herein.

While the examples above describe transitioning one or more switches of the rectifier 2018 at zero-crossing events, it should be appreciated that rectifier 2018 may be operated without alignment to zero-crossing events. For example, FIG. 25 is a plot 2500 including a multi-level voltage waveform 2502 corresponding to multiple DC voltage levels generated by the rectifier 2018 based on an input current waveform 2504. FIGS. 26A-26D illustrate various states of the rectifier 2018 while being operated to generate multi-level DC power.

Figure 26A:
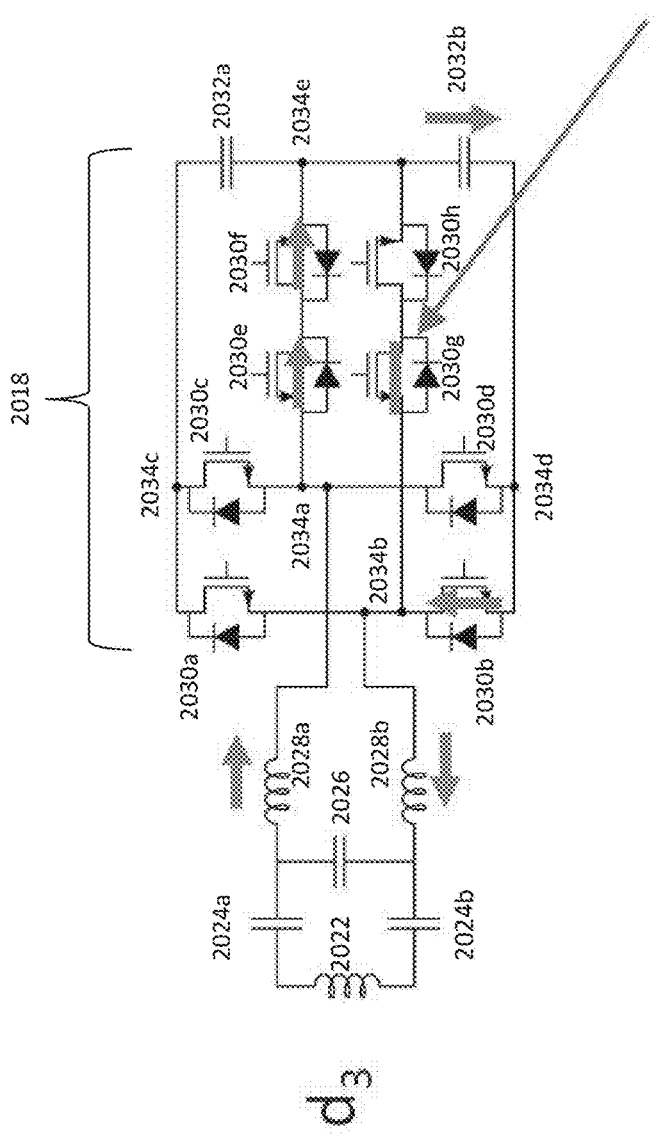
FIGS. 26A-26D are schematic diagrams illustrating the operation of the multi-level rectifier of FIG. 20 in accordance with at least one embodiment described herein.

FIG. 26A corresponds to operation of the rectifier 1208 during a fourth interval ($d_3$) (i.e., time $t_2$ to time $t_3$). A commutation path is provided through switches 2030e, 2030f, and 2030b. Current is received at the first node 2034a from the coil 2022. The commutation path directs the current to the fifth node 2034e and through the second capacitor 2032b before returning to the coil 2022 via nodes 2034b and 2034d. At time $t_3$–dt, the switch 2030g is turned on.

Figure 26B:
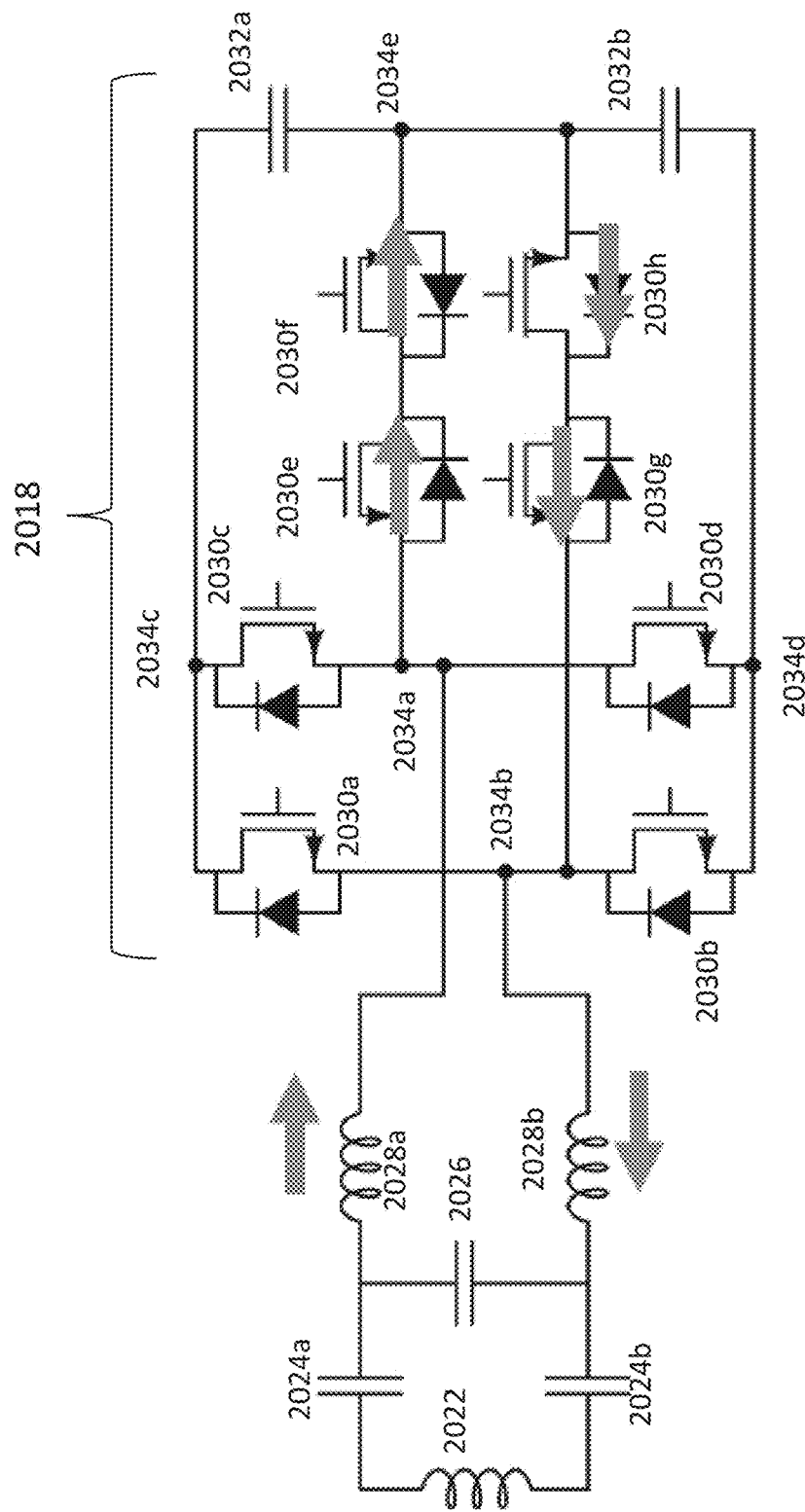

FIG. 26B corresponds to operation of the rectifier 1208 at a fourth transition time ($t_3$). A commutation path is provided through switches 2030e, 2030f, 2030g, and 2030h. In some examples, the commutation path is provided through a body diode of switch 2030h. Current is received at the first node 2034a from the coil 2022. The commutation path directs the current to the fifth node 2034e where it is returned to the coil 2022 via the second node 2034b.

Figure 26C:
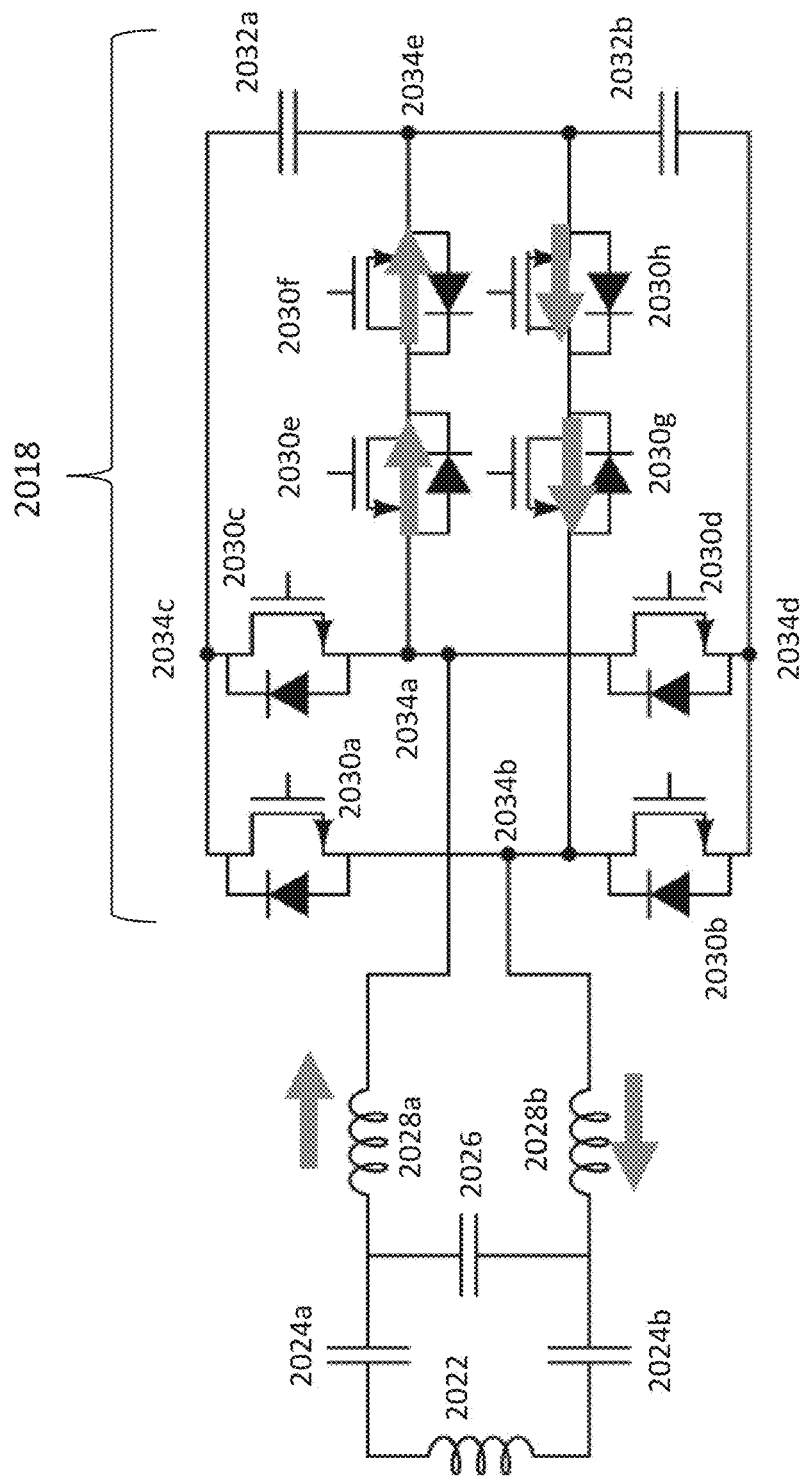

FIG. 26C corresponds to operation of the rectifier 1208 during a fifth interval ($d_4$) and before a zero-crossing event (i.e., time $t_3$ to time $t_{zc1}$). A commutation path is provided through switches 2030e, 2030f, 2030g, and 2030h. Current is received at the first node 2034a from the coil 2022. The commutation path directs the current to the fifth node 2034e where it is returned to the coil 2022 via the second node 2034b.

Figure 26D:
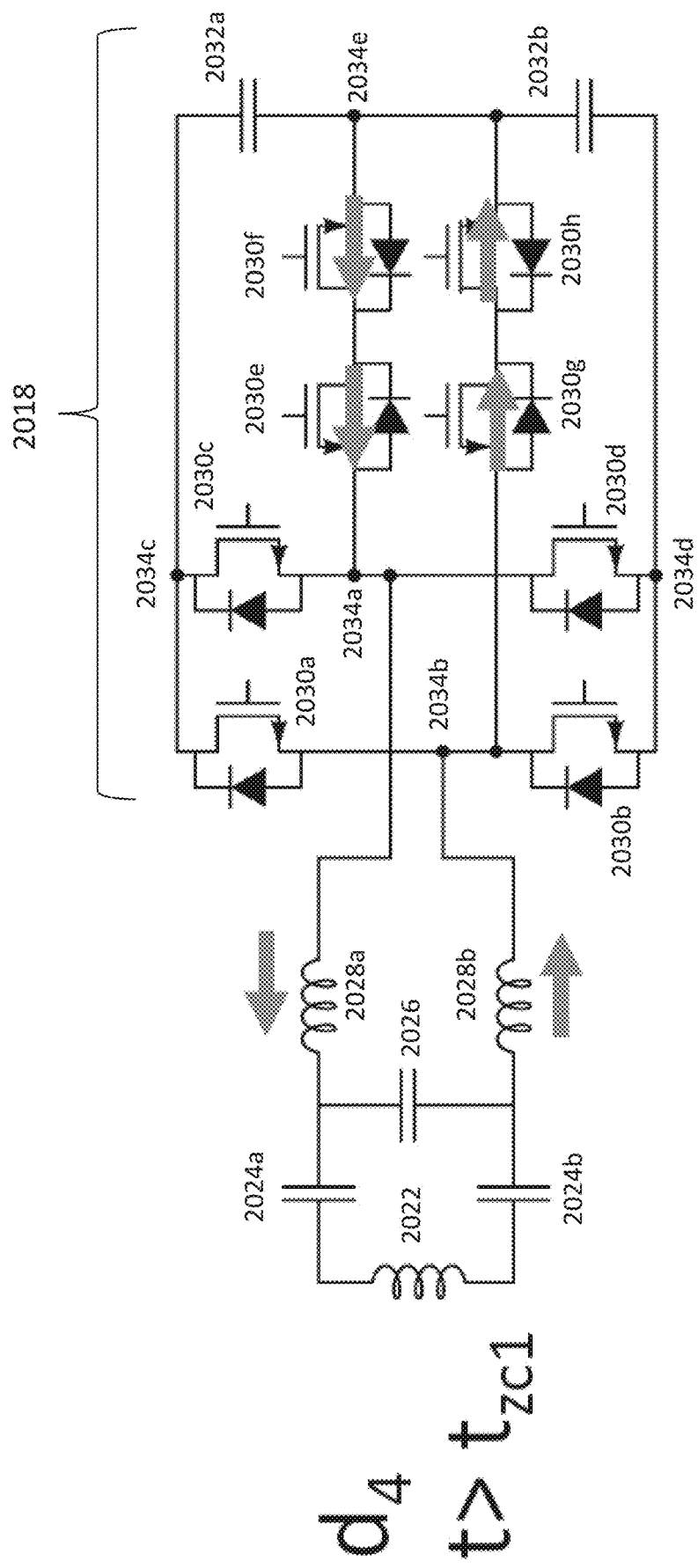

FIG. 26D corresponds to operation of the rectifier 1208 during a fifth interval ($d_4$) and after the zero-crossing event (i.e., time $t_{zc1}$ to time $t_4$). A commutation path is provided through switches 2030e, 2030f, 2030g, and 2030h. Current is received at the second node 2034b from the coil 2022. The commutation path directs the current to the fifth node 2034e where it is returned to the coil 2022 via the first node 2034a.

Figure 27:
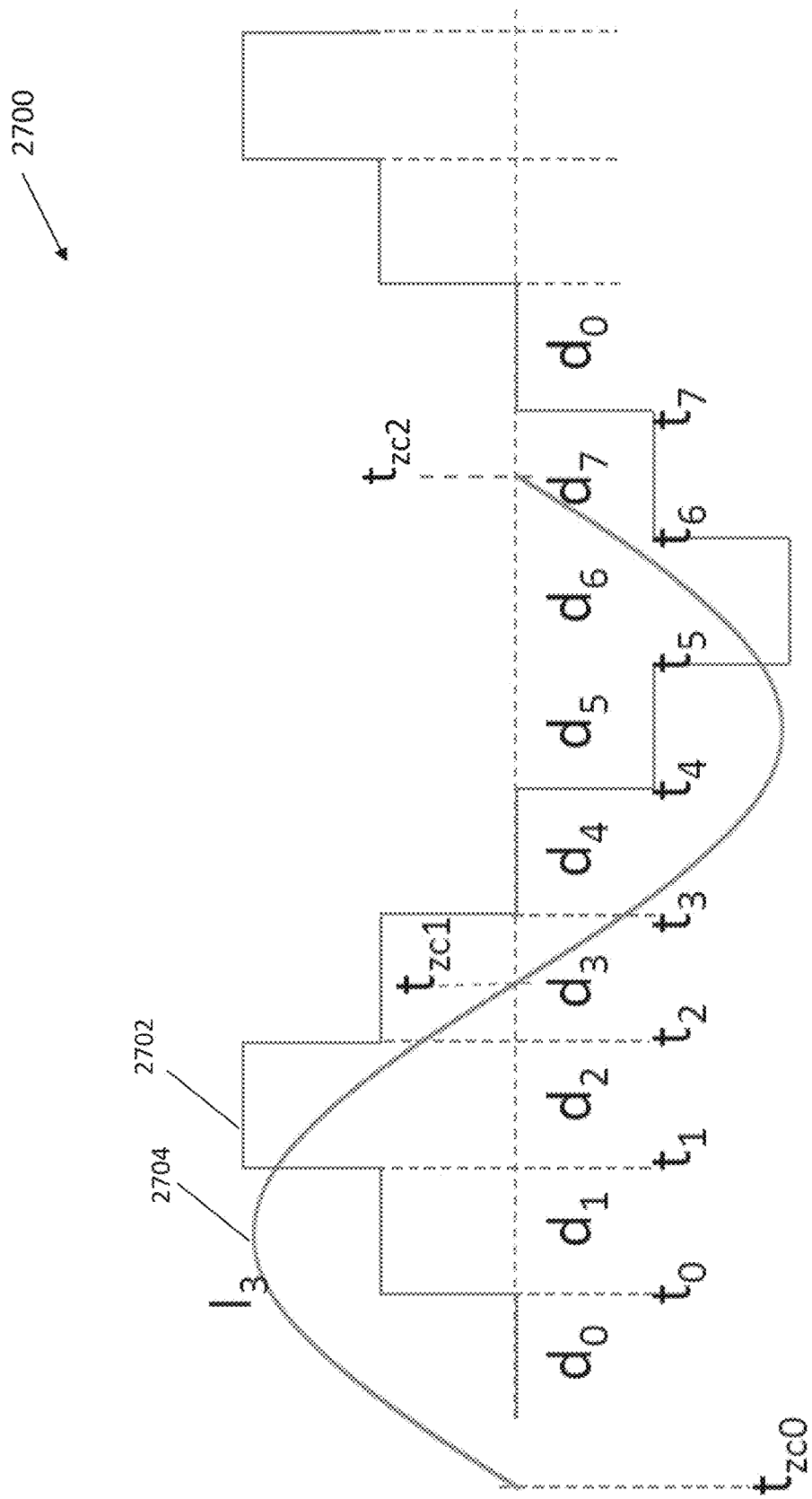
FIG. 27 is a plot illustrating several waveforms associated with the operation of the multi-level rectifier of FIG. 20 in accordance with at least one embodiment described herein.

The rectifier 2018 may be operated to provide negative power. For example, FIG. 27 is a plot 2700 including a multi-level voltage waveform 2702 corresponding to multiple DC voltage levels generated by the rectifier 2018 based on an input current waveform 2704. FIGS. 28A-28G illustrate various states of the rectifier 2018 while being operated to generate multi-level DC power.

Figure 28A:
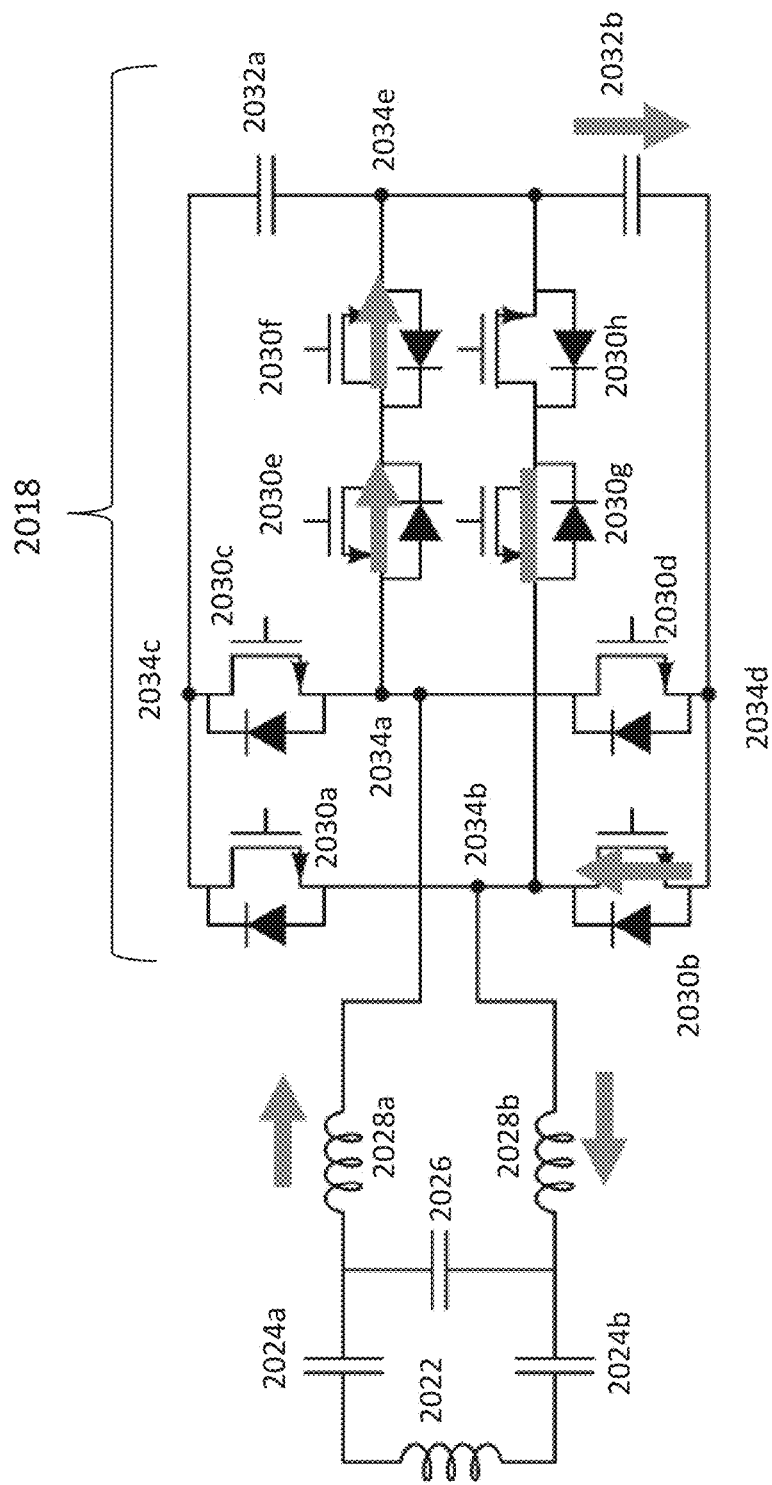
FIGS. 28A-28G are schematic diagrams illustrating the operation of the multi-level rectifier of FIG. 20 in accordance with at least one embodiment described herein.

FIG. 28A corresponds to operation of the rectifier 1208 during a fourth interval ($d_3$) and before a zero-crossing event (i.e., time $t_2$ to time $t_{zc1}$). A commutation path is provided through switches 2030e, 2030f, and 2030b. Current is received at the first node 2034a from the coil 2022. The commutation path directs the current to the fifth node 2034e and through the second capacitor 2032b before returning to the coil 2022 via nodes 2034b and 2034d. In some examples, the switch 2030g is turned on during this period.

Figure 28B:
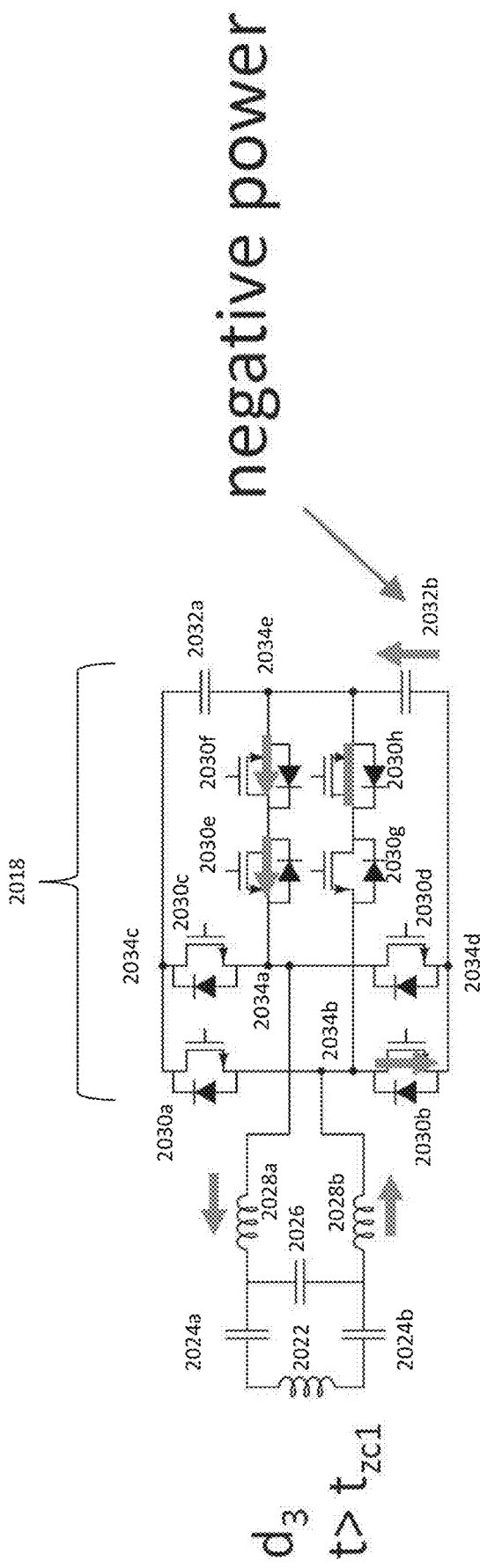

FIG. 28B corresponds to operation of the rectifier 1208 during a fourth interval ($d_3$) and after the zero-crossing event (i.e., time $t_{zc1}$ to time $t_3$). A commutation path is provided through switches 2030e, 2030f, and 2030b. Current is received at the second node 2034b from the coil 2022. The commutation path directs the current through the second capacitor 2032b and to the fifth node 2034e and before returning to the coil 2022 via node 2034a. In some examples, the switch 2030h is turned on during this period. As such, negative power is provided across the second capacitor 2032b.

Figure 28C:
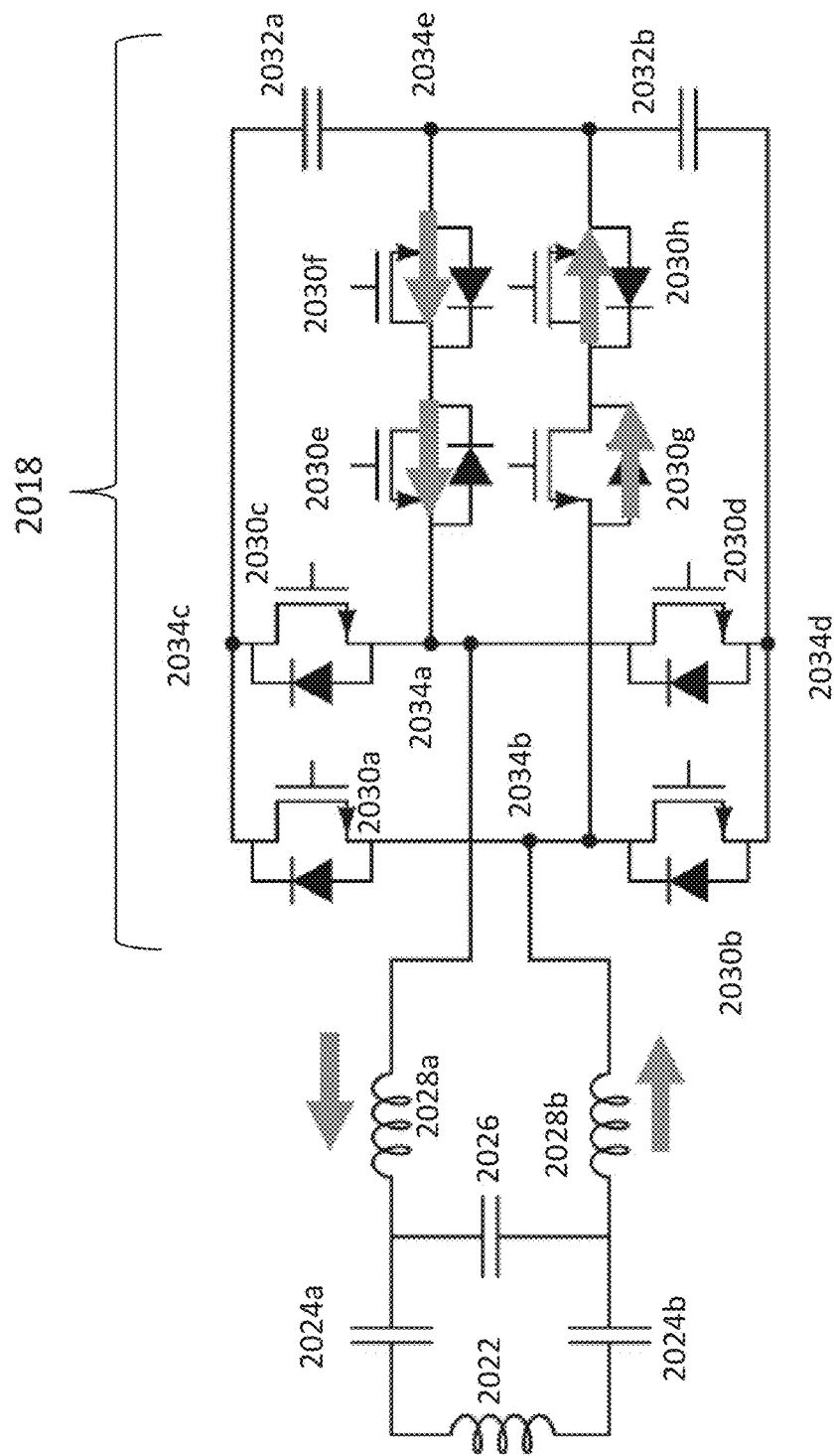

FIG. 28C corresponds to operation of the rectifier 1208 at a fourth transition time ($t_3$). A commutation path is provided through switches 2030e, 2030f, 2030g, and 2030h. In some examples, the commutation path is provided through a body diode of switch 2030g. Current is received at the second node 2034b from the coil 2022. The commutation path directs the current to the fifth node 2034e where it is returned to the coil 2022 via the first node 2034a.

Figure 28D:
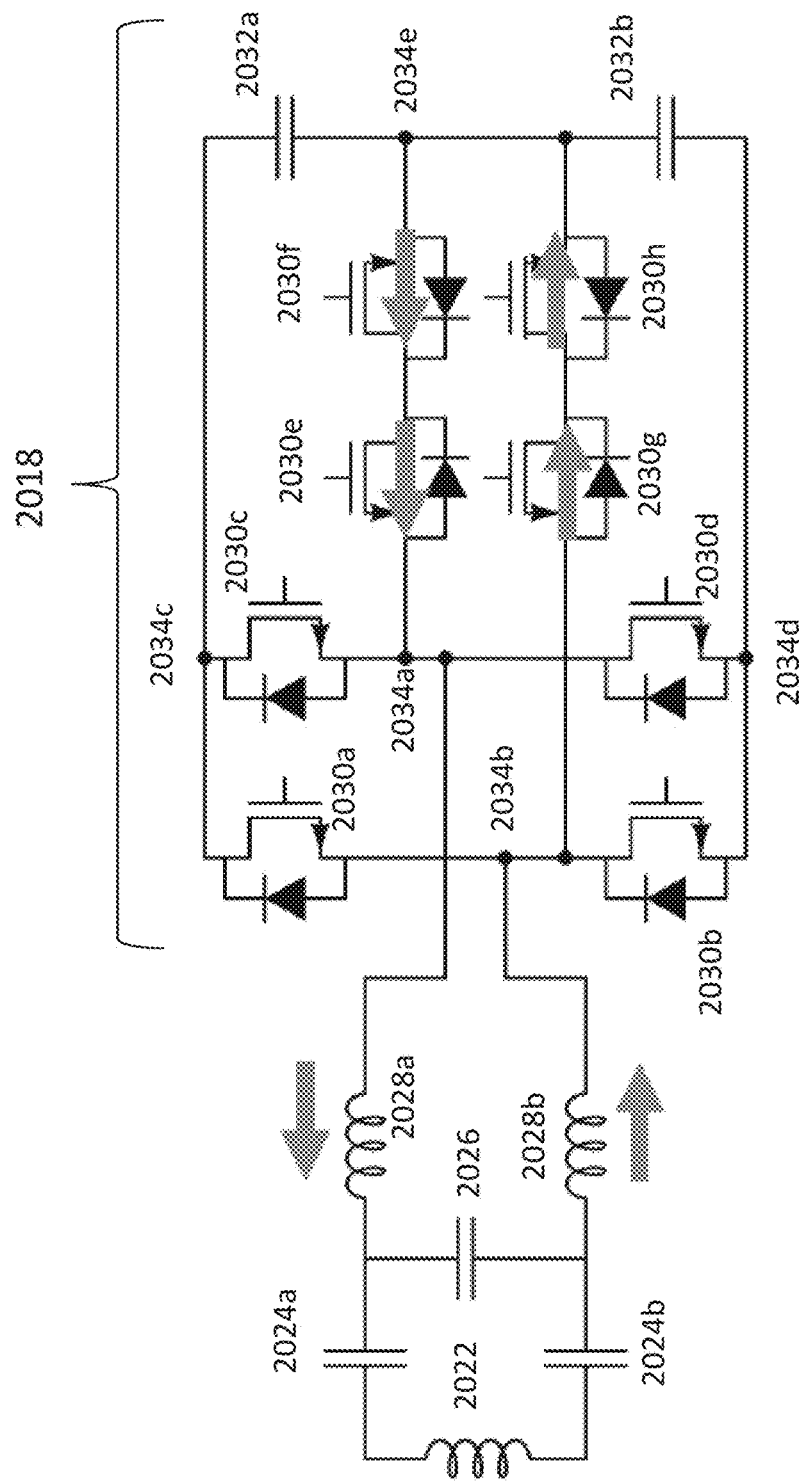

FIG. 28D corresponds to operation of the rectifier 1208 during a fifth interval ($d_4$) (i.e., time $t_3$ to time $t_4$). A commutation path is provided through switches 2030e, 2030f, 2030g, and 2030h. Current is received at the second node 2034b from the coil 2022. The commutation path directs the current to the fifth node 2034e where it is returned to the coil 2022 via the first node 2034a.

Figure 28E:
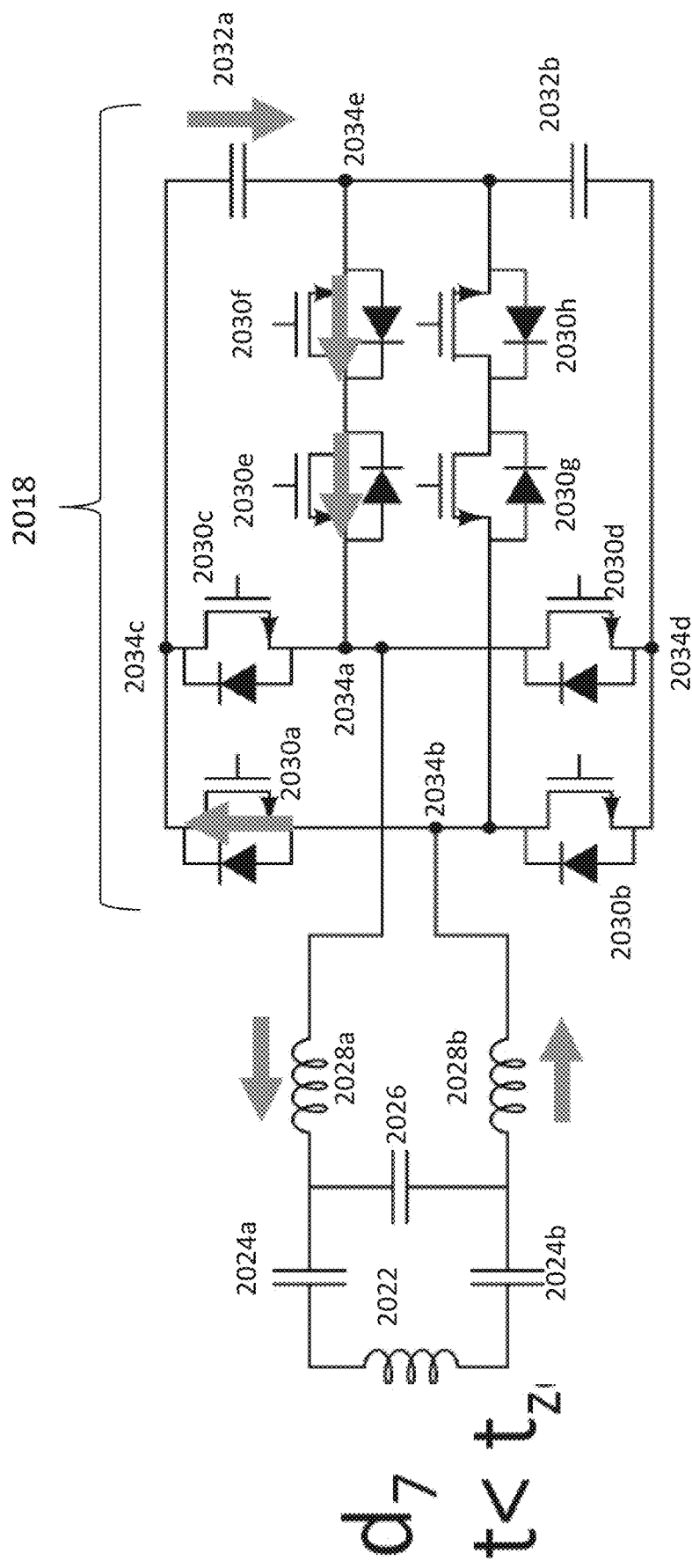

FIG. 28E corresponds to operation of the rectifier 1208 during an eighth interval ($d_7$) and before a zero-crossing event (i.e., time $t_6$ to time $t_{zc2}$). A commutation path is provided through switches 2030a, 2030e, and 2030f. Current is received at the second node 2034b from the coil 2022. The commutation path directs the current through the first capacitor 2032a and to the fifth node 2034e before returning to the coil 2022 via node 2034a.

Figure 28F:
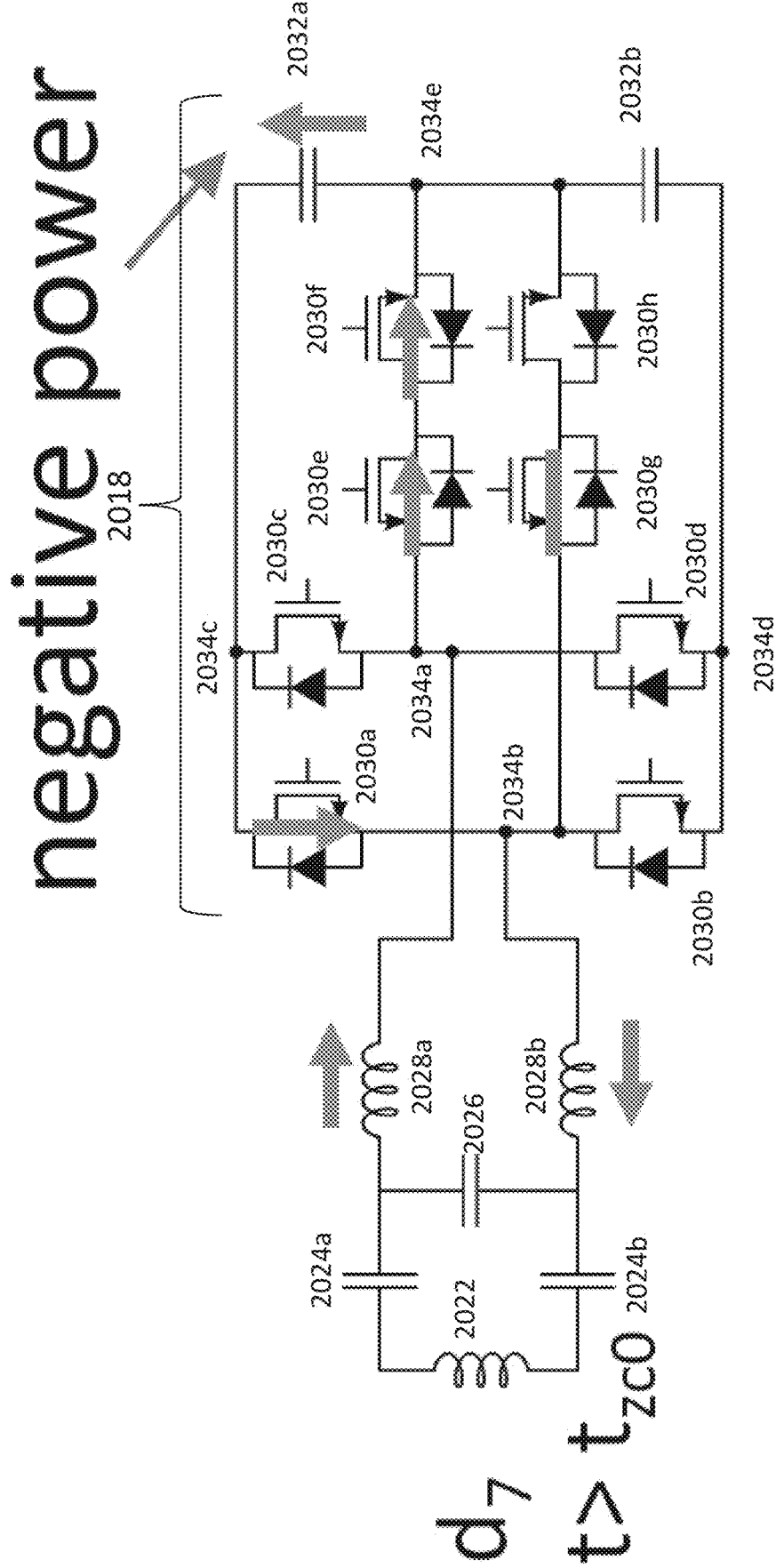

FIG. 28F corresponds to operation of the rectifier 1208 during an eighth interval ($d_7$) and after the zero-crossing event (i.e., time $t_{zc2}$ to time $t_7$). A commutation path is provided through switches 2030a, 2030e, and 2030f. Current is received at the first node 2034a from the coil 2022. The commutation path directs the current to the fifth node 2034e and through the first capacitor 2032a before returning to the coil 2022 via node 2034b. In some examples, the switch 2030g is turned on during this period. As such, negative power is provided across the first capacitive element 2032a.

Figure 28G:
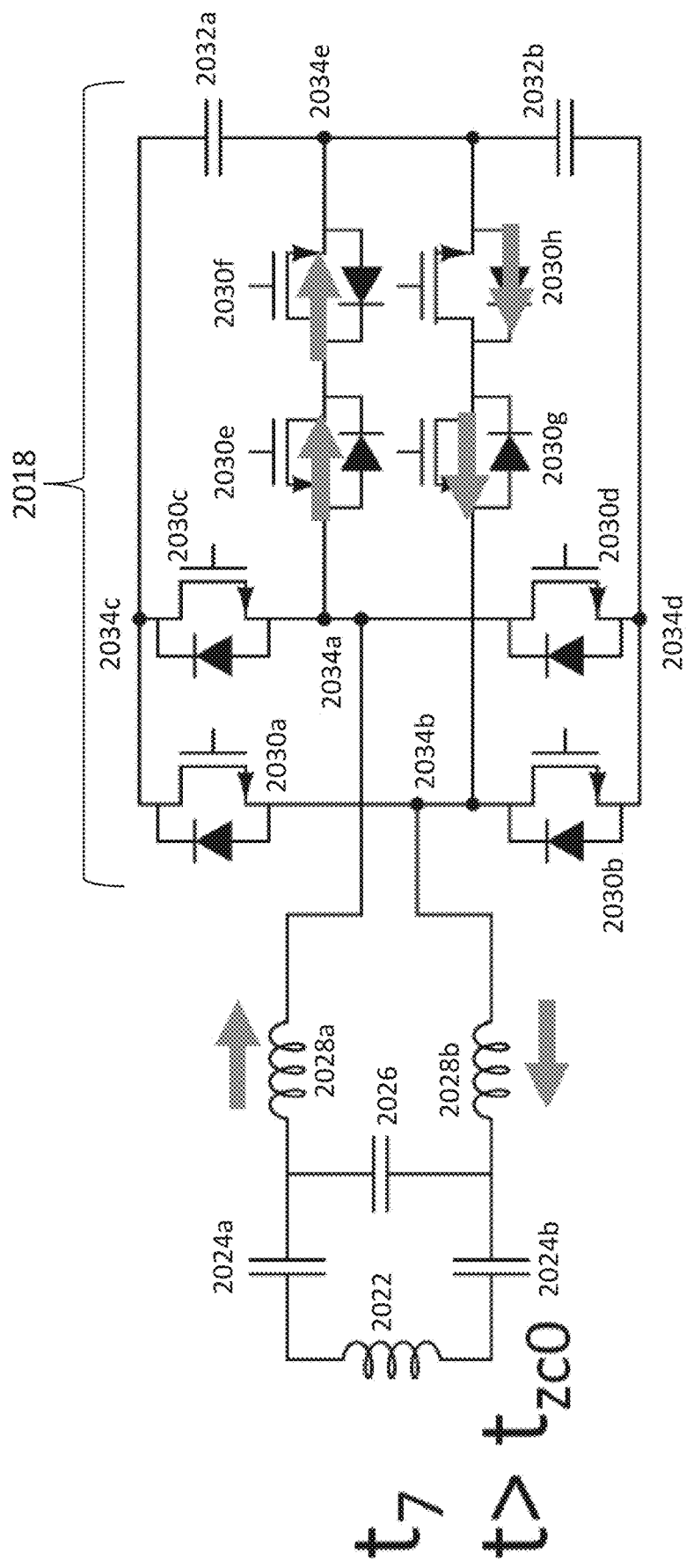

FIG. 28G corresponds to operation of the rectifier 1208 at an eighth transition time ($t_7$). A commutation path is provided through switches 2030e, 2030f, 2030g, and 2030h. In some examples, the commutation path is provided through a body diode of switch 2030h. Current is received at the first node 2034*a* from the coil 2022. The commutation path directs the current to the fifth node 2034*e* where it is returned to the coil 2022 via the second node 2034*b*.

Figure 29:
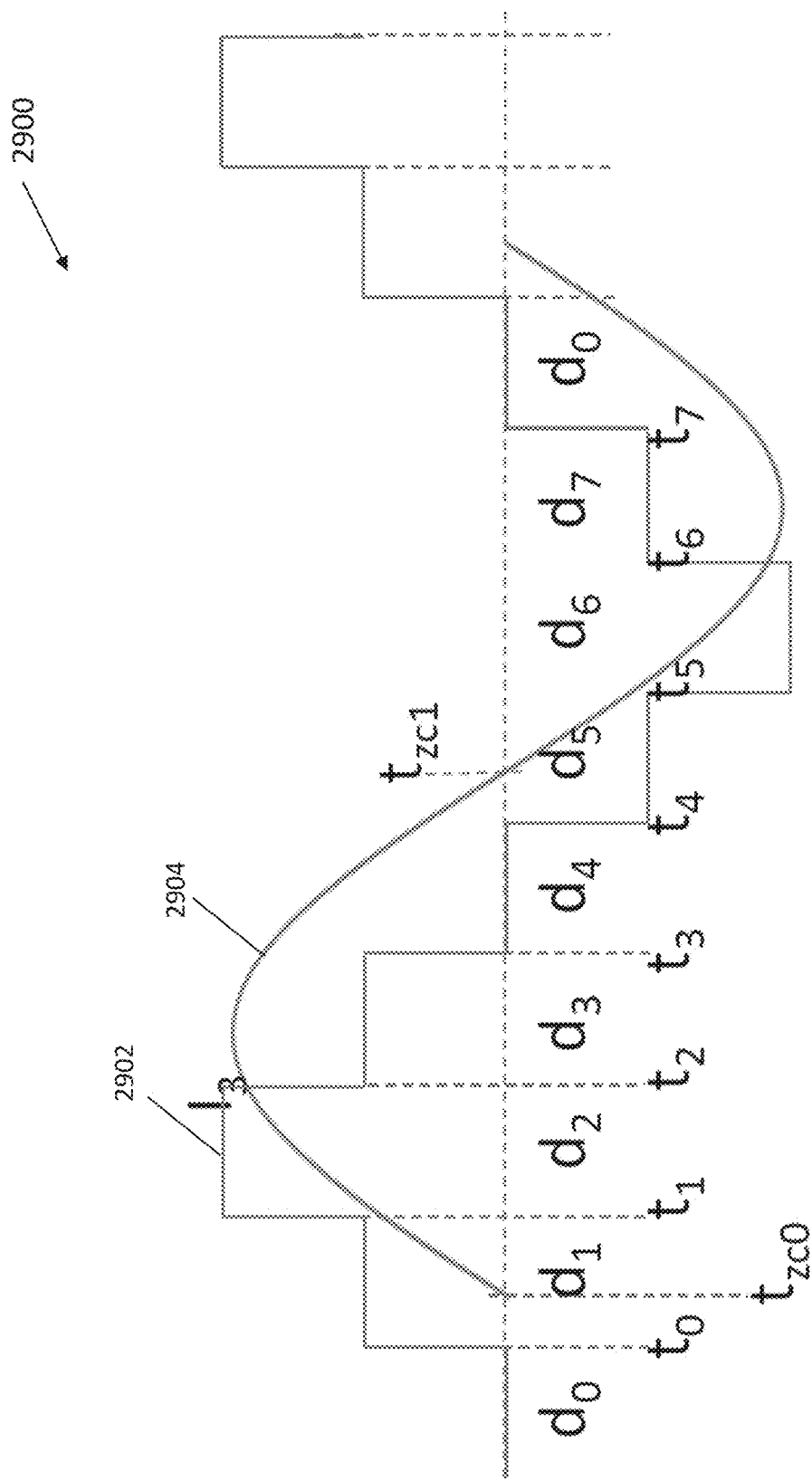
FIG. 29 is a plot illustrating several waveforms associated with the operation of the multi-level rectifier of FIG. 20 in accordance with at least one embodiment described herein.
Figure 30A:
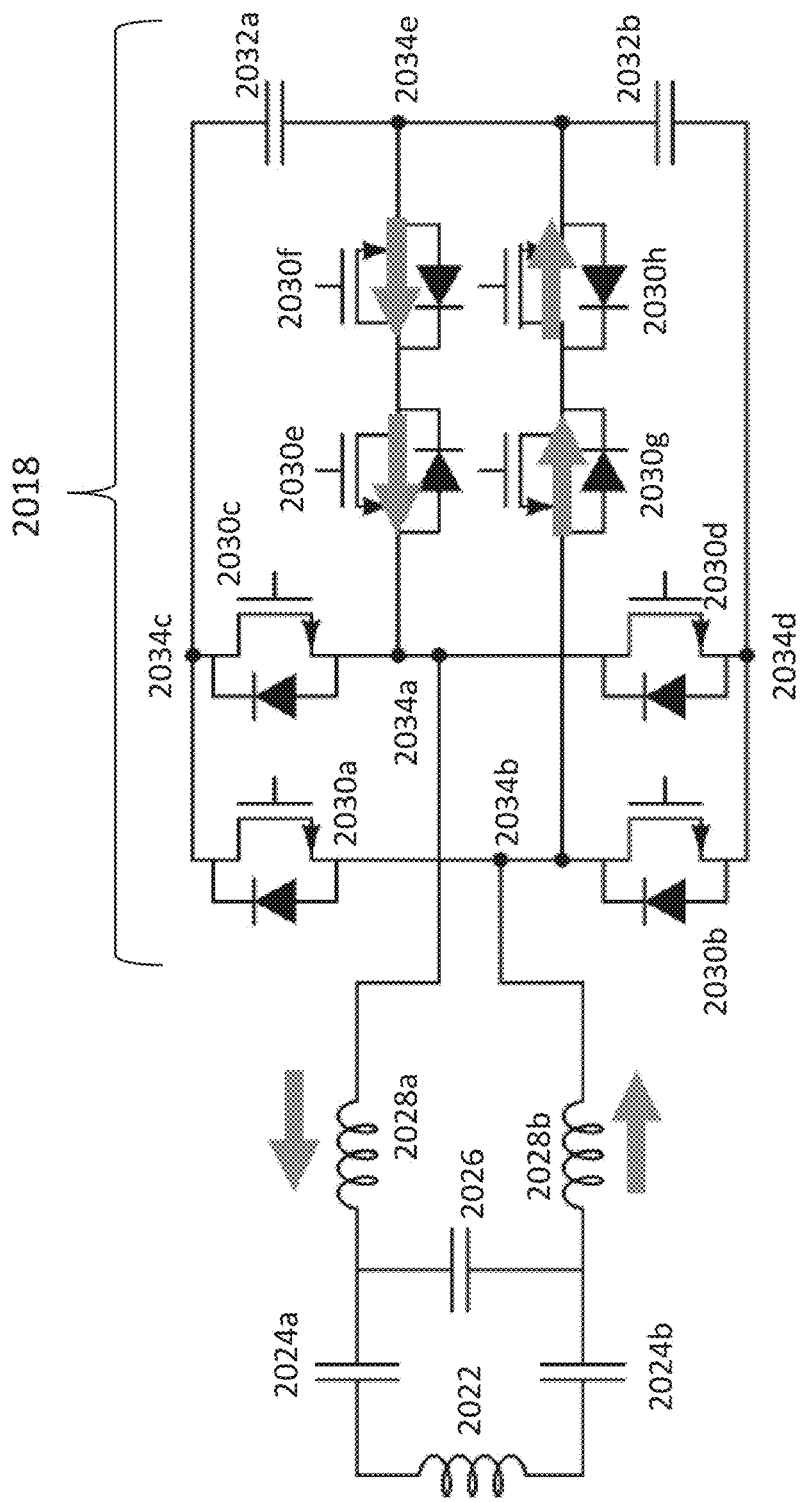
FIGS. 30A-30C are schematic diagrams illustrating the operation of the multi-level rectifier of FIG. 20 in accordance with at least one embodiment described herein.
Figure 30B:
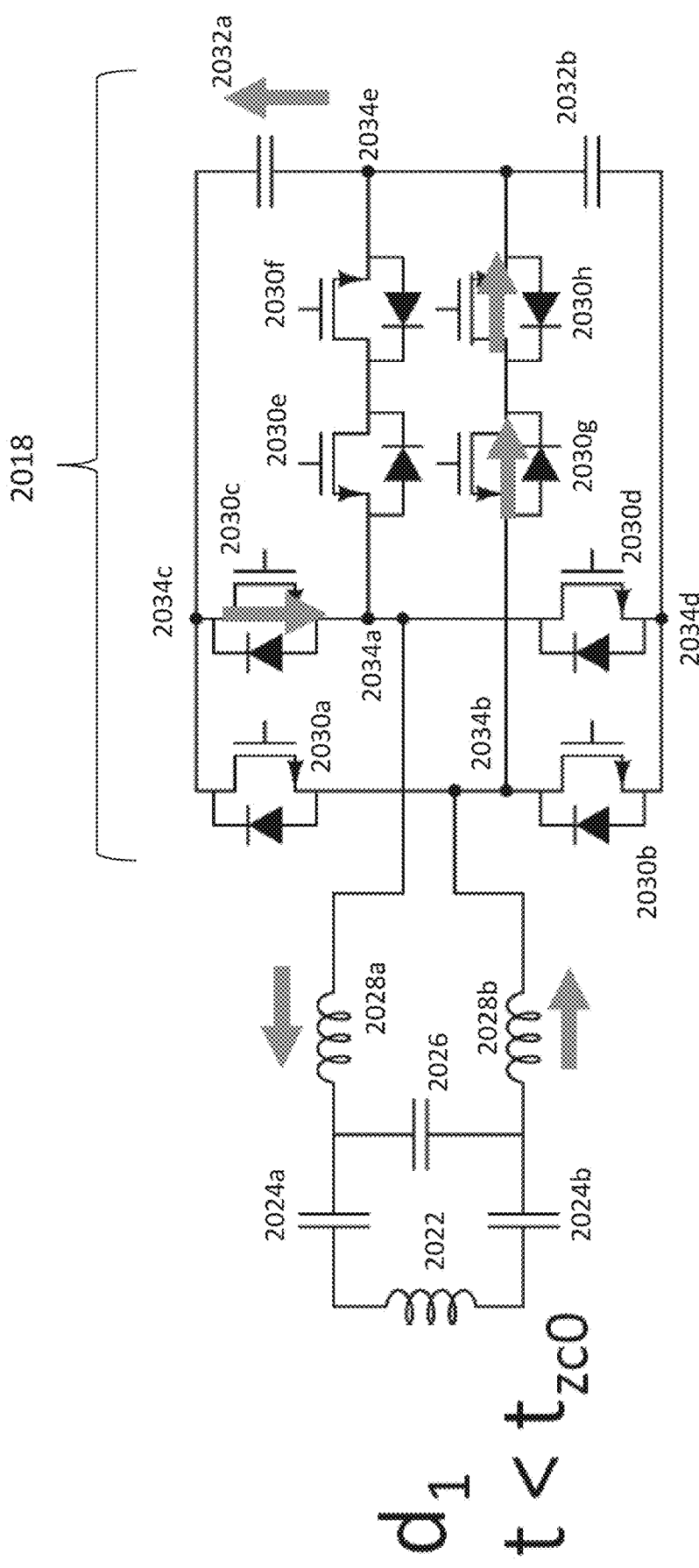
Figure 30C:
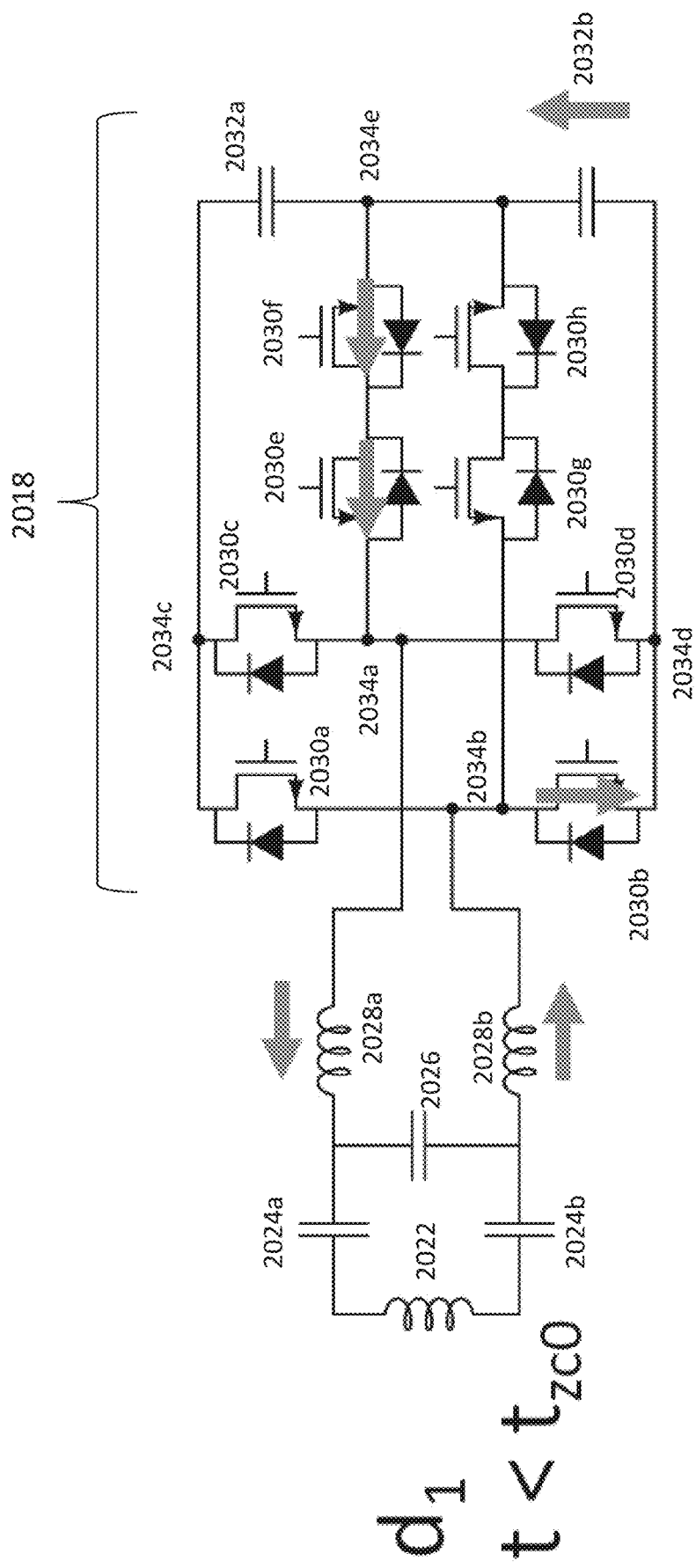

The rectifier 2018 may be operated in an inductive case. For example, FIG. 29 is a plot 2900 including a multi-level voltage waveform 2902 corresponding to multiple DC voltage levels generated by the rectifier 2018 based on an input current waveform 2904. FIGS. 30A-30C illustrate various states of the rectifier 2018 while being operated to generate multi-level DC power.

FIG. 30A corresponds to operation of the rectifier 1208 during a first interval (do). A commutation path is provided through switches 2030*e*, 2030*f*, 2030*g*, and 2030*h*. Current is received at the second node 2034*b* from the coil 2022. The commutation path directs the current to the fifth node 2034*e* where it is returned to the coil 2022 via the first node 2034*a*.

FIG. 30B corresponds to a first option for operation of the rectifier 1208 during a second interval ($d_1$) and before a zero-crossing event (i.e., time $t_0$ to time $t_{zc0}$). A commutation path is provided through switches 2030*c*, 2030*g*, and 2030*h*. Current is received at the second node 2034*b* from the coil 2022. The commutation path directs the current to the fifth node 2034*e* and through the first capacitor 2032*a* before returning to the coil 2022 via node 2034*a*.

FIG. 30C corresponds to a second option for operation of the rectifier 1208 during the second interval ($d_1$) and before the zero-crossing event (i.e., time $t_0$ to time $t_{zc0}$). A commutation path is provided through switches 2030*b*, 2030*e*, and 2030*f*. Current is received at the second node 2034*b* from the coil 2022. The commutation path directs the current through the second capacitor 2032*b* and to the fifth node 2034*e* before returning to the coil 2022 via node 2034*a*. In both the first and second options illustrated in FIGS. 30B and 30C, the rectifier 2018 is operated with hard switching and negative power is provided.

The following equations (1)-(5) represent parameters of the rectifier 2018 (and the wireless power receiver 2000) when the top and bottom pulses are aligned. Equation (1) represents the fundamental component of the rectifier voltage (d=rectifier duty cycle (e.g., 0–0.5)).

$$V_{ac} = \frac{4}{\pi}\left(\frac{V_{batt}}{2}\sin(d_b\pi) + \frac{V_{batt}}{2}\sin(d_t\pi)\right) \quad \text{Equation (1)}$$

[Amplitude]

Equation (2) represents the fundamental component of the rectifier current, assuming no phase shift on the rectifier. The rectifier current increases as duty cycle decreases.

$$I_{ac} = \frac{2P_{batt}}{V_{ac}} = \frac{\pi}{2}\frac{P_{batt}}{\left(\frac{V_{batt}}{2}\sin(d_b\pi) + \frac{V_{batt}}{2}\sin(d_t\pi)\right)} \quad \text{Equation (2)}$$

[Amplitude]

Equation (3) represents the equivalent AC impedance of the rectifier.

$$R_{ac} = \frac{2P_{batt}}{I_{ac}^2} = \frac{8}{\pi^2}\frac{\left(\frac{V_{batt}}{2}\sin(d_b\pi) + \frac{V_{batt}}{2}\sin(d_t\pi)\right)^2}{P_{batt}} \quad \text{Equation (3)}$$

Equation (4) represents the equivalent load resistance seen by the vehicle assembly (VA) coil (e.g. coil 2022).

$$R_{VA} = \frac{X_{VA}^2}{R_{ac}} = \frac{\pi^2}{8}\frac{X_{VA}^2}{\left(\frac{V_{batt}}{2}\sin(d_b\pi) + \frac{V_{batt}}{2}\sin(d_t\pi)\right)^2}P_{batt} \quad \text{Equation (4)}$$

Equation (5) represents the VA coil current (e.g., the current in coil 2022).

$$I_{VA} = \sqrt{\frac{P_{batt}}{R_{VA}}} = \sqrt{\frac{8}{\pi^2}}\frac{\left(\frac{V_{batt}}{2}\sin(d_b\pi) + \frac{V_{batt}}{2}\sin(d_t\pi)\right)}{X_{VA}} \text{ [rms]} \quad \text{Equation (5)}$$

The following equations (6)-(9) represent a generalized case of the rectifier 2018. Equation (6) represents a voltage of the rectifier.

$$V_R(t) = \text{Re}[\Sigma_{n=1}^{\infty} V_{Rbn}\exp(j\omega_0 n(t-\Delta\tau_b)) + V_{Rtn}\exp(j\omega_0 n(t-\Delta\tau_t))] \quad \text{Equation (6):}$$

The parameter $\Delta\tau$=delay of the voltage relative to the current at the rectifier. This parameter is enforced by the operation of the active rectifier. If this parameter is zero, then the middle of the positive cycle of the voltage waveform will be one-quarter period after the negative to positive zero crossing of the rectifier current. A positive $\Delta\tau$ delays the voltage waveform relative to the current. Parameters $\Delta\tau_b$ and $\Delta\tau_t$ are delays at the bottom and top pulses, respectively. Equation (7) represents a current of the rectifier.

$$I_R(t) = \text{Re}[\Sigma_{n=1}^{\infty} I_{Rn}\exp(j\omega_0 n(t))] \quad \text{Equation (7):}$$

Equation (8) represents a voltage of the bottom pulse.

$$V_{Rbn} = \frac{4}{\pi n}\frac{V_{batt}}{2}\sin(\beta_b n) \quad \text{Equation (8)}$$

Equation (9) represents a voltage of the top pulse.

$$V_{Rtn} = \frac{4}{\pi n}\frac{V_{batt}}{2}\sin(\beta_t n) \quad \text{Equation (9)}$$

Figure 31:
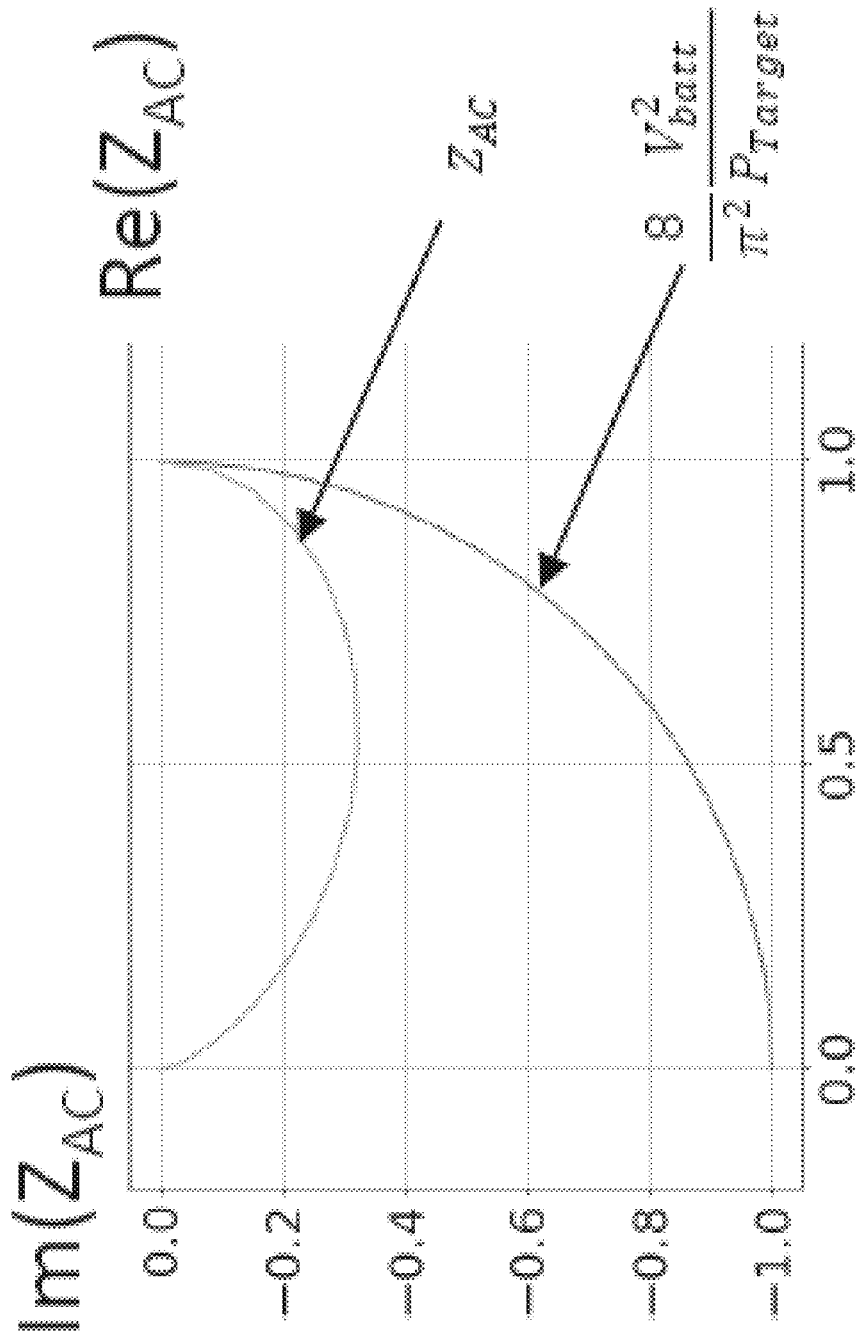
FIG. 31 is a plot illustrating an input impedance of the multi-level rectifier of FIG. 20 in accordance with at least one embodiment described herein.

FIG. 31 and equation (10) represent the input impedance of a three-level rectifier operating with constant power and ZVS. As shown in FIG. 31, the input impedance $Z_{AC}$ of the three-level rectifier for ZVS falls on the curve corresponding to equation (10).

$$Z_{AC} = \frac{8}{\pi^2}\frac{V_{batt}^2}{P_{Target}}\sin^3\beta e^{-j(\frac{\pi}{2}-\beta)} \quad \text{Equation (10)}$$

Figure 32:
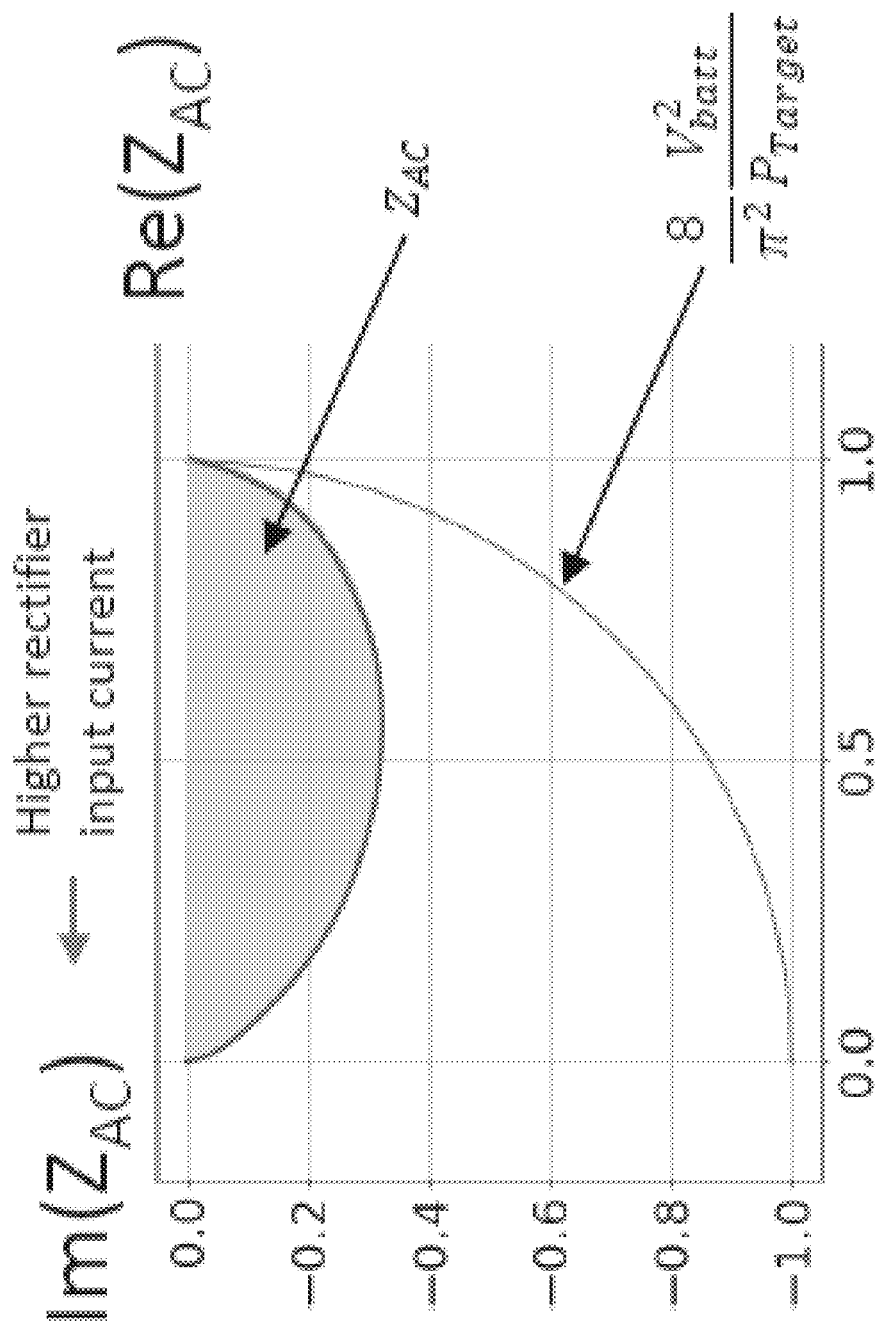
FIG. 32 is a plot illustrating an input impedance of the multi-level rectifier of FIG. 20 in accordance with at least one embodiment described herein.

FIG. 32 and equation (11) represent the input impedance of a five-level rectifier operating with constant power and ZVS. As shown in FIG. 32, because the five-level rectifier may change states at non-zero-crossings of the input current, the input impedance $Z_{AC}$ can fall anywhere in the fourth quadrant defined by the curve corresponding to equation (11). To prevent discharging the battery, rectifier delay is restricted by equation (11).

$$Z_{AC} = \frac{8}{\pi^2} \frac{V_{batt}^2}{P_{Target}} \sin^3 \beta e^{-j(\Delta\tau)}, \qquad \text{Equation (11)}$$

where $0 < \Delta\tau < \frac{\pi}{2} - \beta$

The following equations (12)-(16) represent the input impedance of a five-level rectifier with a general non-inductive load.

$$Z_{AC} = Z_{AC,b} + Z_{AC,t} \qquad \text{Equation (12)}$$

$$Z_{AC,b} = \frac{8}{\pi^2} \frac{V_{batt}^2}{4P_{Target,b}} \sin^3 \beta_b e^{-j(\Delta\tau_b)}, \qquad \text{Equation (13)}$$

where $0 < \Delta\tau_b < \frac{\pi}{2} - \beta_b$ $$Z_{AC,t} = \frac{8}{\pi^2} \frac{V_{batt}^2}{4P_{Target,t}} \sin^3 \beta_t e^{-j(\Delta\tau_t)}, \qquad \text{Equation (14)}$$

where $0 < \Delta\tau_t < \beta_b - \beta_t$, $P_{Target,t} \le P_{Target,b}$, $P_{Target} = P_{Target,t} + P_{Target,b}$ $$Z_{VA} = \frac{X_{VA}^2}{Z_{AC}} \qquad \text{Equation (15)}$$

$$\text{Im}\{Z_{VA} + (X_{L,VA} - X_{VA})\} = 0 \qquad \text{Equation (16)}$$

$\text{Re}\{Z_{VA}\}^*$ can be maximized by choosing appropriate values for $\Delta\tau_b$, $\Delta\tau_t$, $\beta_b$, $\beta_t$, $P_{Target,b}$, and $P_{Target,t}$.

Figure 33:
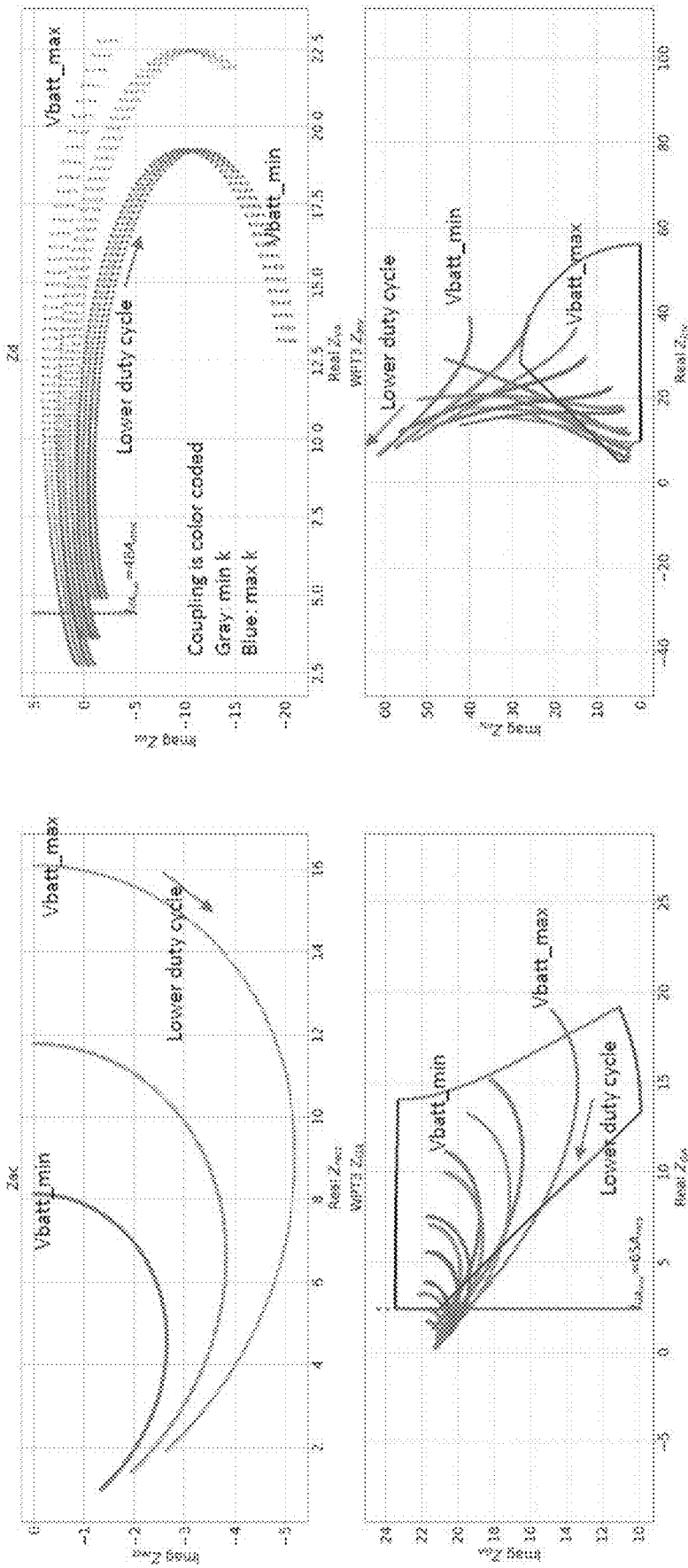
FIGS. 33-35 are plots illustrating parameters which indicate the effect of the multi-level active rectifier of FIG. 20 on a ground assembly and an inverter in accordance with at least one embodiment described herein.
Figure 34:
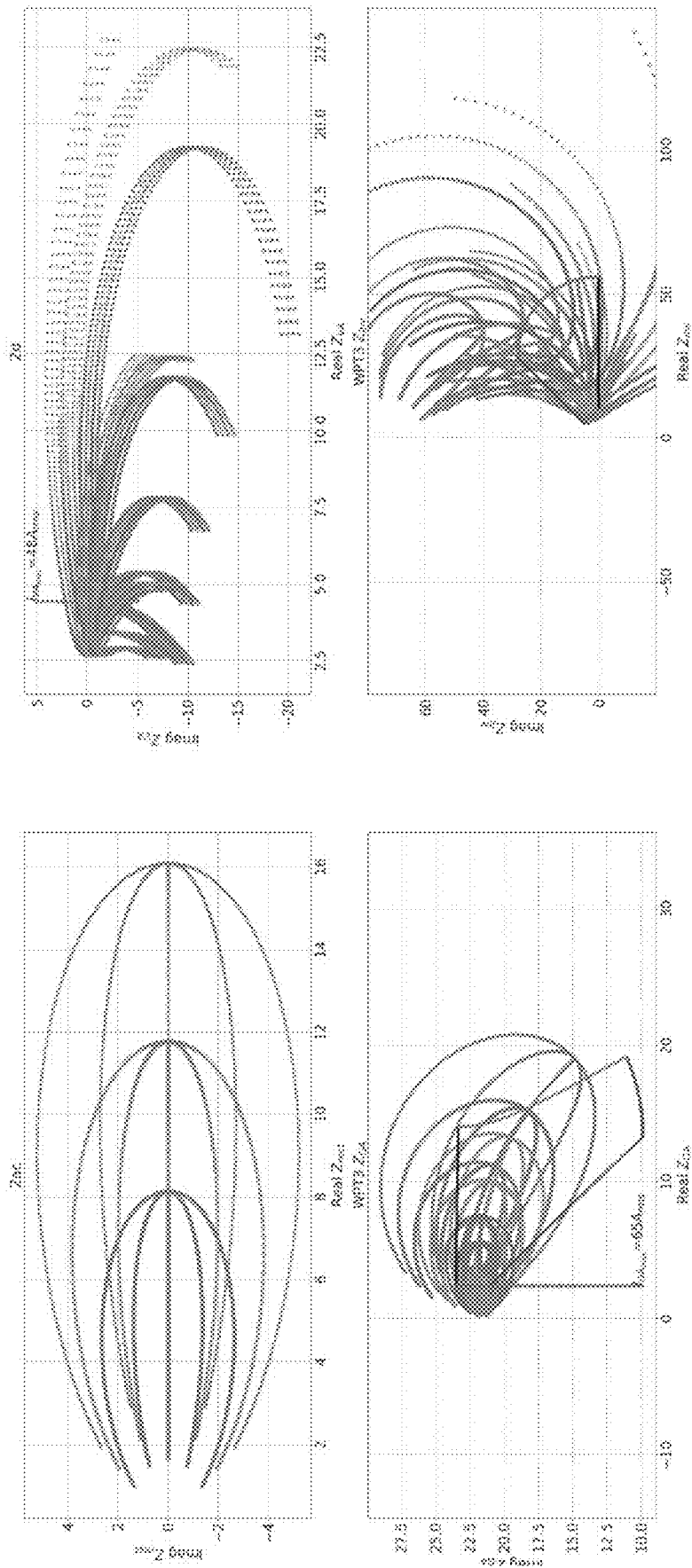
Figure 35:
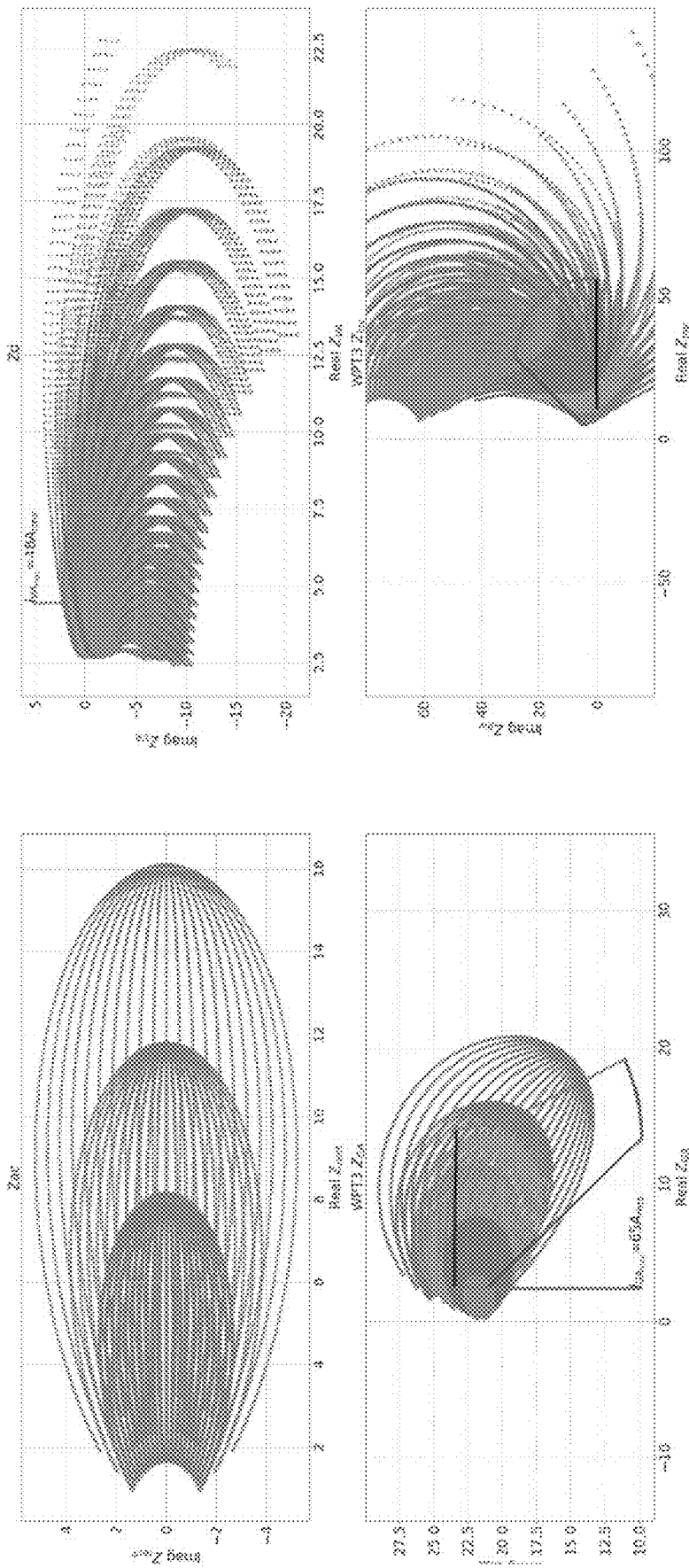

FIGS. 33-35 represent various parameters which indicate the effect of the multi-level active rectifier on a ground assembly (GA) and inverter.

Hardware and Software Implementations

Embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

What is claimed is:

1. A controller for a wireless power system, wherein the system comprises an inverter configured to output an output current and the controller is configured to generate gate drive signals for driving respective switches of the inverter, the controller comprising:
    a control module configured to generate a first control signal having a first voltage level and a second control signal having a second voltage level; and
    a modulator configured to (a) receive a signal representative of the output current of the inverter and (b) generate carrier signals based on the output current of the inverter, wherein the carrier signals comprise a first carrier signal and a second carrier signal such that:
        (i) when the first carrier signal is greater than the first voltage level, a first gate drive signal for a first switch is high, and
        (ii) when the second carrier signal is greater than the second voltage level, a second gate drive signal for a second switch is high,
        thereby driving the inverter to output a multi-level voltage having a first output level based on the first gate drive signal and a second output level based on the second gate drive signal.

2. The controller of claim 1, wherein the multi-level voltage has an asymmetrical waveform.

3. The controller of claim 1, wherein the carrier signals are configured, at least in part, to maintain zero voltage switching by the switches of the inverter.

4. The controller of claim 1, wherein a voltage value of the second output level is approximately equal to a value of the second voltage level.

5. The controller of claim 1, wherein a voltage value of the first output level is approximately half of a value of the second voltage level.

6. The controller of claim 1, wherein the first gate drive signal is high for a first duration in which the first carrier signal is greater than the first voltage level and the second gate drive signal is high for a second duration in which the second carrier signal is greater than the second voltage signal.

7. The controller of claim 1, wherein the first voltage level is based on a value of the second voltage level.

8. The controller of claim 1, wherein at least one of the first carrier signal and the second carrier signal has sawtooth modulation.

9. The controller of claim 1, wherein at least one of the first carrier signal and the second carrier signal has triangular modulation.

10. The controller of claim 1, wherein the modulator is configured to receive and generate analog signals.

11. The controller of claim 1, wherein the modulator is configured to receive and generate digital signals.

12. A method for controlling a wireless power system, wherein the system comprises an inverter configured to output an output current and a controller configured to generate gate drive signals for driving respective switches of the inverter, the method comprising:
    generating, via the controller, a first control signal having a first voltage level and a second control signal having a second voltage level;
    receiving, at the controller, a signal representative of the output current of the inverter; and generating, via the controller, carrier signals based on the output current of the inverter, wherein the carrier signals comprise a first carrier signal and a second carrier signal such that:
  (i) when the first carrier signal is greater than the first voltage level, a first gate drive signal for a first switch is high, and
  (ii) when the second carrier signal is greater than the second voltage level, a second gate drive signal for a second switch is high,
  thereby driving the inverter to output a multi-level voltage having a first output level based on the first gate drive signal and a second output level based on the second gate drive signal.

13. The method of claim 12, wherein the multi-level voltage has an asymmetrical waveform.

14. The method of claim 12, wherein generating the carrier signals based on the output current includes generating carrier signals that are configured, at least in part, to maintain zero voltage switching by the switches of the inverter.

15. The method of claim 12, wherein a voltage value of the second output level is approximately equal to a value of the second voltage level.

16. The method of claim 12, wherein a voltage value of the first output level is approximately half of a value of the second voltage level.

17. The method of claim 12, wherein the first gate drive signal is high for a first duration in which the first carrier signal is greater than the first voltage level and the second gate drive signal is high for a second duration in which the second carrier signal is greater than the second voltage signal.

18. The method of claim 12, wherein the first voltage level is based on a value of the second voltage level.

19. The method of claim 12, wherein at least one of the first carrier signal and the second carrier signal has sawtooth modulation.

20. The method of claim 12, wherein at least one of the first carrier signal and the second carrier signal has triangular modulation.

21. The method of claim 12, wherein the controller is configured to receive and generate analog signals.

22. The method of claim 12, wherein the controller is configured to receive and generate digital signals.

* * * * *